US012801970B2

(12) United States Patent
Kenemer et al.

(10) Patent No.: US 12,801,970 B2
(45) Date of Patent: Nov. 17, 2026

(54) MANAGING NOISE MITIGATION FOR QUANTUM NETWORKS

(71) Applicant: Aliro Technologies, Inc., Brighton, MA (US)

(72) Inventors: Keith Kenemer, Roswell, GA (US); Michael Cubeddu, New York, NY (US); Matthew Skrzypczyk, Downers Grove, IL (US); Bruno Rijsman, Seattle, WA (US); Michelle Chalupnik, Somerville, MA (US); Eric Brown, Toronto (CA)

(73) Assignee: Aliro Technologies, Inc., Brighton, MA (US)

( * ) Notice: Subject to any disclaimer, the term of this patent is extended or adjusted under 35 U.S.C. 154(b) by 14 days.

(21) Appl. No.: 18/650,857

(22) Filed: Apr. 30, 2024

(65) Prior Publication Data

US 2025/0077932 A1 Mar. 6, 2025

Related U.S. Application Data

(60) Provisional application No. 63/536,998, filed on Sep. 7, 2023, provisional application No. 63/465,598, filed on May 11, 2023.

(51) Int. Cl.
*G06N 10/70* (2022.01)
*G06N 10/00* (2022.01)
(Continued)

(52) U.S. Cl.
CPC ............. *G06N 10/70* (2022.01); *G06N 10/00* (2019.01); *G06N 10/20* (2022.01); *G06N 10/40* (2022.01); *G06N 10/60* (2022.01)

(58) Field of Classification Search
CPC ........ G06N 10/70; G06N 10/00; G06N 10/20; G06N 10/40; G06N 10/60
See application file for complete search history.

(56) References Cited

U.S. PATENT DOCUMENTS 9,286,154 B2 3/2016 Ashikhmin
9,762,262 B2 9/2017 Ashikhmin
(Continued)

FOREIGN PATENT DOCUMENTS

CN 113810180 B 3/2023
CN 115883077 A 3/2023
(Continued)

OTHER PUBLICATIONS

Matsuoka, Machine Learning Approach for Identification of Objective Function in Production Scheduling Problems (Year: 2019).*
(Continued)

*Primary Examiner* — Mark D Featherstone
*Assistant Examiner* — Jack Kensington Barnett
(74) *Attorney, Agent, or Firm* — Young Basile Hanlon & MacFarlane, P.C.

(57) ABSTRACT

A quantum element (QE) at a network node stores a first quantum state constituent (QSC) of an entangled quantum state characterized by a non-factorable quantum relationship among QSCs comprising the first QSC and a second QSC stored at another QE at another network node. Managing one or more quantum error management (QEM) operations includes: (1) providing a schedule for the QEM operations that is based at least in part on at least a portion of a time over which the first QSC is stored at the first QE and an estimated fidelity of the entangled quantum state after at least one of the QEM operations, or (2) providing a type of one or more QEM operations selected from two or more different types based at least in part on a number of resource
(Continued)

quantum elements available at the first node after the first QSC is stored at the first QE.

70 Claims, 66 Drawing Sheets

(51) Int. Cl.

| | |
|---|---|
| ***G06N 10/20*** | (2022.01) |
| ***G06N 10/40*** | (2022.01) |
| ***G06N 10/60*** | (2022.01) |

(56) References Cited

U.S. PATENT DOCUMENTS

| | | | | |
|---|---|---|---|---|
| 11,475,189 | B2 | 10/2022 | Gunnels et al. | |
| 11,477,015 | B1 | 10/2022 | Smith et al. | |
| 2020/0174836 | A1 | 6/2020 | Gunnels et al. | |
| 2020/0274554 | A1 | 8/2020 | Aspuru-Guzik et al. | |
| 2020/0311220 | A1* | 10/2020 | Gunnels | G06N 10/80 |
| 2021/0201187 | A1* | 7/2021 | Olivadese | G06N 10/40 |
| 2021/0365827 | A1 | 11/2021 | Monroe et al. | |
| 2023/0058994 | A1 | 2/2023 | Vacon et al. | |
| 2023/0401471 | A1* | 12/2023 | Singh | H04L 9/0855 |
| 2024/0354630 | A1* | 10/2024 | Lee | G06N 10/40 |
| 2024/0428110 | A1* | 12/2024 | Te Raa | H04B 10/70 |

FOREIGN PATENT DOCUMENTS

| | | | |
|---|---|---|---|
| WO | 2022040151 | A1 | 2/2022 |
| WO | 2024137626 | A2 | 6/2024 |

OTHER PUBLICATIONS

Shchukin, On the waiting time in quantum repeaters with probabilistic entanglement swapping (Year: 2019).*

Mukhtar, Protecting unknown two-qubit entangled states by nesting Uhrig's dynamical decoupling sequences (Year: 2010).*

L. Jiang et al., "Quantum repeater with encoding", American Physical Society (APS), Physical Review A, pp. 1-11, Dec. 21, 2008, DOI: 10.1103/physreva.79.032325.

S. Muralidharan et al., "Efficient long distance quantum communication", Springer Science and Business Media LLC, Scientific Reports, pp. 1-16, Sep. 28, 2015, DOI: 10.1038/srep20463.

R. Van Meter et al., "Distributed Quantum Error Correction", Keio University, pp. 1-3, Sep. 30, 2007, retrieved at URL: https://web.sfc.keio.ac.jp/~rdv/quantum/publications/dist-qec-QEC-letter.pdf.

W. Dür et al., "Entanglement purification and quantum error correction", IOP Publishing, Reports on Progress in Physics, pp. 1-48, Aug. 7, 2007, DOI: 10.1088/0034-4885/70/8/r03.

M. Epping et al., "Robust entanglement distribution via quantum network coding", New J. Phys. Vol. 18, pp. 1-20, Oct. 31, 2016, DOI: 10.1088/1367-2630/18/10/103052.

M. Epping et al., "Large-scale quantum networks based on graphs", New J. Phys., vol. 18, 13 p. May 26, 2016, DOI: 10.1088/1367-2630/18/5/053036.

M. Zwerger et al., "Quantum repeaters based on trapped ions with decoherence free subspace encoding", arXiv, quant-ph, pp. 1-9, Nov. 9, 2017, DOI: 10.48550/arXiv.1611.07779.

W. Kozlowski et al., "RFC 9340: Architectural Principles for a Quantum Internet", RFC Editor, pp. 1-37, Mar. 1, 2023, DOI: 10.17487/RFC9340.

D. Layden et al., "Efficient Quantum Error Correction of Dephasing Induced by a Common Fluctuator", Phys. Rev. Lett., vol. 124, 16 pages, Jan. 2020, DOI: 10.1103/PhysRevLett.124.020504.

D. Leung et al., "Approximate quantum error correction can lead to better codes", Phys. Rev. A, vol. 56, 7 pages, Oct. 1997, DOI: 10.1103/PhysRevA.56.2567.

A. Pirker et al., "A quantum network stack and protocols for reliable entanglement-based networks", New J. Phys., vol. 21, 30 pages, Mar. 15, 2019, DOI: 10.1088/1367-2630/ab05f7.

Y. Hasegawa et al., "Experimental time-reversed adaptive Bell measurement towards all-photonic quantum repeaters", Nat Commun, pp. 1-9, Jan. 2019, DOI: 10.1038/s41467-018-08099-5.

A. Jayashankar et al., "Quantum Error Correction: Noise-adapted Techniques and Applications", arXiv, quant-ph, pp. 1-26, Jul. 31, 2022, DOI: 10.48550/arXiv.2208.00365.

D. Niu et al., "All-photonic one-way quantum repeaters", arXiv, quant-ph, pp. 1-11, Oct. 18, 2022, DOI: 10.48550/arXiv.2210.10071.

A. Siegel et al., "Adaptive surface code for quantum error correction in the presence of temporary or permanent defects", arXiv, quant-ph, 8 pages, Nov. 15, 2022, DOI: 10.48550/arXiv.2211.08468.

I. Henao et al., "Adaptive quantum error mitigation using pulse-based inverse evolutions", npj Quantum Information, pp. 1-42, 2023, DOI: 10.1038/s41534-023-00785-7.

T. Nakazato et al., "Quantum error correction of spin quantum memories in diamond under a zero magnetic field", Communications Physics, pp. 1-7, 2022, DOI: 10.1038/s42005-022-00875-6.

E. Knill et al., "Concatenated Quantum Codes", arXiv, quant-ph, pp. 1-16, Aug. 8, 1996, DOI: 10.48550/arXiv.quant-ph/9608012.

S. Muralidharan et al., "Ultrafast and Fault-Tolerant Quantum Communication across Long Distances", American Physical Society (APS), Physical Review Letters, pp. 1-14, Feb. 13, 2014, DOI: 10.1103/physrevlett.112.250501.

J. M. Gertler et al., "Protecting a bosonic qubit with autonomous quantum error correction", Nature, 23 p. Oct. 6, 2020, DOI: 10.1038/s41586-021-03257-0.

C. Ryan-Anderson et al., "Realization of Real-Time Fault-Tolerant Quantum Error Correction", Phys. Rev. X, vol. 11, 29 pages, Dec. 2021, DOI: 10.1103/PhysRevX.11.041058.

Barbara M. Terhal, "Quantum error correction for quantum memories", American Physical Society (APS), Reviews of Modern Physics, 47 pages, Apr. 2015, DOI: 10.1103/revmodphys.87.307.

Joschka Roffe, "Quantum Error Correction: An Introductory Guide", Contemporary Physics, 29 pages, Jul. 2019, DOI: 10.1080/00107514.2019.1667078.

W. Dür et al., "Quantum repeaters based on entanglement purification", American Physical Society (APS), Physical Review A, 19 pages, Aug. 31, 1998, DOI: 10.1103/physreva.59.169.

Laszlo Gyongyosi, "A Poisson Model for Entanglement Optimization in the Quantum Internet", arXiv, quant-ph, 17 pages, Mar. 6, 2018, DOI: 10.1007/s11128-019-2335-1.

Extended European search report issued in corresponding EP Application No. 24803935.6, dated Jul. 24, 2026.

* cited by examiner

100B

| Syndrome | Detection | Error |
|---|---|---|
| 00 | All ancillas measure 0 | No error |
| 01 | Error detected by $U_{S'}$ only | Error on$(q_1$ or $q_{R'}) = E_1$ |
| 10 | Error detected by $U_S$ only | Error on $(q_0$ or $q_R) = E_2$ |
| 11 | Error detected by $U_S$ and $U_{S'}$ | Error $(E_1$ and $E_2)$ |

FIG. 10B

| Syndrome | Detection | Error |
|---|---|---|
| 0000 | no detection | No error |
| 0001 | $U_{S',1}$ only | Error on $q_{R'_1}$ |
| 0010 | $U_{S',0}$ only | Error on $q_1$ |
| 0011 | $U_{S',0}$ and $U_{S',1}$ | Error on $q_{R'_0} = E_1$ |
| (0011) | $U_{S',0}$ and $U_{S',1}$ | Error on $(q_1$ and $q_{R'_1}) = E_2$ |
| 0100 | $U_{S,1}$ only | Error on $q_{R_1}$ |
| 0101 | $U_{S,1}$ and $U_{S',1}$ | Error on $q_{R_1}$ and $q_{R'_1}$ |
| 0110 | $U_{S,1}$ and $U_{S',0}$ | Error on $q_{R_1}$ and $q_1$ |
| 0111 | $U_{S,1}$, $U_{S',0}$, and $U_{S',1}$ | Error on $q_{R_1}$ and $q_{R'_0}$ |
| (0111) | $U_{S,1}$, $U_{S',0}$, and $U_{S',1}$ | Error on $q_{R_1}$ and $(q_1$ and $q_{R'_1})$ |
| 1000 | $U_{S,0}$ only | Error on $q_0$ |
| 1001 | $U_{S,0}$ and $U_{S',1}$ | Error on $q_0$ and $q_{R'_1}$ |
| 1010 | $U_{S,0}$ and $U_{S',0}$ | Error on $q_0$ and $q_1$ |
| 1011 | $U_{S,0}$, $U_{S',0}$, and $U_{S',1}$ | Error on $(q_0$ and $q_{R'_0})$ |
| (1011) | $U_{S,0}$, $U_{S',0}$, and $U_{S',1}$ | Error on $q_0$ and $(q_1$ and $q_{R'_1})$ |
| 1100 | $U_{S,0}$ and $U_{S,1}$ | Error on $q_{R_0} = E_3$ |
| (1100) | detected by $U_{S,0}$ and $U_{S,1}$ | Error on $(q_0$ and $q_{R_1}) = E_4$ |
| 1101 | $U_{S,0}$, $U_{S,1}$, and $U_{S',1}$ | Error on $q_{R_0}$ and $q_{R'_1}$ |
| (1101) | $U_{S,0}$, $U_{S,1}$, and $U_{S',1}$ | Error on $(q_0$ and $q_{R_1})$ and $q_{R'_1}$ |
| 1110 | $U_{S,0}$, $U_{S,1}$, and $U_{S',0}$ | Error on $q_{R_0}$ and $q_1$ |
| (1110) | $U_{S,0}$, $U_{S,1}$, and $U_{S',0}$ | Error on $(q_0$ and $q_{R_1})$ and $q_1$ |
| 1111 | detected by all stabilizers | Error $(E_1$ or $E_2)$ and $(E_3$ or $E_4)$ |

FIG. 10D

MANAGING NOISE MITIGATION FOR QUANTUM NETWORKS

CROSS-REFERENCE TO RELATED APPLICATION(S)

This application claims priority to and the benefit of U.S. Provisional Application Ser. No. 63/536,998, entitled "MANAGING NOISE MITIGATION FOR QUANTUM NETWORKS," filed Sep. 7, 2023, and U.S. Provisional Application Ser. No. 63/465,598, entitled "MANAGING NOISE MITIGATION FOR QUANTUM NETWORKS," filed May 11, 2023, each of which is incorporated herein by reference.

TECHNICAL FIELD

This disclosure relates to managing noise mitigation for quantum networks.

BACKGROUND

A variety of techniques for quantum error correction (QEC) are used in quantum computers, where a particular quantum computation that is to be performed may be known in advance. For example, error syndromes associated with a code (e.g., a stabilizer code) may be measured and used for error correction. In quantum networks, quantum error correction techniques may be more challenging for a variety of reasons (e.g., the stateful communications occurring between nodes may have associated delays that are not necessarily predetermined). For example, with two-way quantum repeater arrangements that use two-way classical communication for entanglement swap operations, quantum state constituents may be stored in quantum memories for relatively long and/or unknown period of time. Some quantum error management techniques may assume certain arrangements for quantum repeaters (e.g., one-way quantum repeater protocols that do not rely on two-way classical communication), which may reduce the demands on memory storage. The resources available at a node in a quantum network to perform quantum error correction may also change over time depending on the pattern of quantum communication through the network. Techniques other than quantum error correction, such as entanglement purification (also called entanglement distillation), may also be used in some quantum networks.

SUMMARY

In one aspect, in general, a method for managing entangled quantum states in a network of nodes comprises: generating a first entangled quantum state characterized by a non-factorable quantum relationship among two or more quantum state constituents comprising (1) a first quantum state constituent stored at a first quantum element at a first node in the network and (2) a second quantum state constituent stored at a second quantum element at a second node in the network; determining a first estimated wait time over which the first quantum state constituent is estimated to be stored at the first quantum element while preserving a fidelity of the first entangled quantum state above a fidelity threshold; and determining a first schedule for performing one or more quantum error management operations over a portion of the first estimated wait time, where the one or more quantum error management operations affect the first quantum state constituent, and where the first schedule is based at least in part on (1) the first estimated wait time and (2) one or more estimated fidelities of the first entangled quantum state associated with one or more candidate quantum error management operations.

Aspects can include one or more of the following features.

The method further comprises updating the first schedule in response to received classical information.

The received classical information is from the first node.

The received classical information comprises at least one of (1) a noise strength or (2) a noise type, associated with a third quantum element at the first node.

The received classical information comprises at least one of (1) a noise strength or (2) a noise type, associated with the first quantum element at the first node.

The received classical information is from the second node.

The received classical information comprises information that an entanglement process in the network failed.

The received classical information is from a third node in the network.

The received classical information comprises information that an entanglement process in the network failed.

The received classical information is from a controller in the network that sends messages to each of a plurality of nodes in the network comprising at least a portion of scheduling information that specifies a procedure to be executed for scheduling entanglement swap operations associated with portions of a plurality of paths through nodes in the network.

The first node and the second node are spatially separated by at least one meter.

The first node and the second node are optically coupled in free space or by an optical fiber.

The estimated fidelity is based at least in part on an estimated noise associated with at least one quantum error management operation.

The first entangled quantum state further comprises a third quantum state constituent.

The third quantum state constituent is stored at a third quantum element at the first node.

The third quantum state constituent is stored at a third quantum element at a third node in the network.

The one or more quantum error management operations comprise a quantum gate operation.

A gate noise characteristic of the quantum gate operation is associated with a fidelity reduction.

The one or more quantum error management operations comprise one or more quantum error correction operations performed using the quantum gate operation in a quantum circuit.

A quantity of the one or more quantum error correction operations in the first schedule is two or more.

The quantity is determined based at least in part on the first estimated wait time.

A quantity of the one or more quantum error management operations in the first schedule is two or more.

The method further comprises determining a second estimated wait time over which the second quantum state constituent is estimated to be stored at the second quantum element while preserving the fidelity of the first entangled quantum state above the fidelity threshold; and determining a second schedule for performing one or more quantum error management operations over a portion of the second estimated wait time, where the one or more quantum error management operations affect the second quantum state constituent, and the second schedule is based at least in part on (1) the second estimated wait time and (2) an estimated fidelity of the first entangled quantum state after at least one of the one or more quantum error management operations.

The one or more quantum error management operations affecting the second quantum state constituent are performed independently from the one or more quantum error management operations affecting the first quantum state constituent.

Each of the quantum error management operations affecting the second quantum state constituent increases the estimated fidelity of the first entangled quantum state.

The one or more quantum error management operations affecting the second quantum state constituent are different from the one or more quantum error management operations affecting the first quantum state constituent.

The one or more quantum error management operations affecting the second quantum state constituent comprise one or more quantum error correction operations having a first code size, and the one or more quantum error management operations affecting the first quantum state constituent comprise one or more quantum error correction operations having a second code size different from the first code size.

The one or more quantum error management operations affecting the second quantum state constituent comprise one or more quantum error correction operations based on a first code, and the one or more quantum error management operations affecting the first quantum state constituent comprise one or more quantum error correction operations based on a second code different from the first code.

A quantity of the one or more quantum error management operations in the first schedule is different from a quantity of the one or more quantum error management operations in the second schedule.

The method further comprises selecting the one or more quantum error management operations from a plurality of types of quantum error management operations that are each configured to use a different quantity of quantum resources available at the first node, based at least in part on a quantity of quantum resources available at the first node before a start of the first estimated wait time.

The plurality of types of quantum error management operations include two or more of: a dynamical decoupling operation configured to use no redundancy quantum elements or ancilla quantum elements, a first decoherence-free subspace encoding operation configured to use no redundancy quantum elements or ancilla quantum elements, a second decoherence-free subspace encoding operation configured to use at least one redundancy qubit and no ancilla quantum elements, or a quantum error correction operation configured to use at least one redundancy qubit and at least one ancilla qubit.

The fidelity of the first entangled quantum state is preserved above the fidelity threshold before an entanglement swap operation is performed on the first entangled quantum state and a second entangled quantum state associated with the second node and a third node in the network.

The entanglement swap operation is performed during establishment of end-to-end entanglement between respective quantum elements in nodes at the ends of a path over a set of N nodes using a set of classical messages transmitted over one or more classical communication channels, where $N>3$.

The entanglement swap operation is one of a plurality of entanglement swap operations among different respective subsets of nodes in the set of N nodes using pairs of entangled quantum elements in respective pairs of nodes between which entanglement has been established.

Each entanglement swap operation of the plurality of entanglement swap operations comprises performing a joint measurement on a non-entangled pair of quantum elements in a node that is a member of two different pairs of nodes of the respective pairs of nodes.

The fidelity of the first entangled quantum state is preserved above the fidelity threshold before an entanglement purification operation is performed on the first entangled quantum state and a second entangled quantum state associated with the first node and the second node.

The method further comprises modifying a timer associated with an estimated time of decoherence of the first entangled quantum state based at least in part on the first schedule.

The first estimated wait time is based at least in part on an entanglement generation time associated with a second entangled quantum state characterized by a non-factorable quantum relationship among two or more quantum state constituents comprising (1) a third quantum state constituent stored at a third quantum element at the second node and (2) a fourth quantum state constituent stored at a fourth quantum element at a third node in the network. The method further comprises generating a third entangled quantum state characterized by a non-factorable quantum relationship among two or more quantum state constituents comprising (1) the first quantum state constituent and (2) the fourth quantum state constituent, the generating comprising performing a joint measurement of the second quantum state constituent and the third quantum state constituent.

The joint measurement is a Bell state measurement.

An initial estimated fidelity of the first entangled quantum state is determined based at least in part on a message received at the first node, where message comprises a first estimate of a fidelity of the first entangled quantum state, and a timestamp indicating a time associated with the first estimate.

An updated estimated fidelity of the first quantum state is determined based at least in part on a second estimate of the fidelity of the first entangled quantum state determined after the time indicated by the timestamp.

The first estimated wait time is determined after comparing the initial estimated fidelity of the first entangled quantum state to the fidelity threshold.

The first schedule is also based at least in part on the initial estimated fidelity of the first entangled quantum state.

The first schedule is also based at least in part on post-operation estimated fidelities associated with the first quantum state constituent after each of the one or more quantum error management operations.

At least one of the one or more quantum error management operations is a quantum error mitigation operation.

At least one of the one or more quantum error management operations is a quantum error correction operation.

The one or more estimated fidelities of the first entangled quantum state comprise a first estimated fidelity of the first entangled quantum state after a first candidate quantum error management operation associated with a first time, and a second estimated fidelity of the first entangled quantum state after a second candidate quantum error management operation associated with a second time.

The first and second candidate quantum error management operations are the same quantum error management operation associated with different times.

Determining the first schedule further comprises determining a first value based at least in part on the first estimated fidelity and the first time, and determining a second value based at least in part on the second estimated fidelity and the second time.

The first value and the second value are further based at least in part on an initial fidelity of the first entangled quantum state at the beginning of the first estimated wait time.

The first value depends at least in part on a first difference between the initial fidelity and the first estimated fidelity, and the second value depends at least in part on a second difference between the initial fidelity and the second estimated fidelity.

The first value is proportional to the first difference between the initial fidelity and the first estimated fidelity, and the second value is proportional to the second difference between the initial fidelity and the second estimated fidelity.

Determining the first schedule further comprises scheduling the first candidate quantum error management operation to be performed at the first time if the first value is smaller than the second value and if the first estimated fidelity is larger than a third estimated fidelity of the first entangled quantum state at the first time with no candidate quantum error management operation performed.

Determining the first schedule further comprises scheduling the second candidate quantum error management operation to be performed at the second time if the second value is smaller than the first value and if the second estimated fidelity is larger than a fourth estimated fidelity of the first entangled quantum state at the second time with no candidate quantum error management operation performed.

The method further comprises determining an objective function that depends at least in part on (1) the one or more estimated fidelities of the first entangled quantum state, and (2) one or more times associated with the one or more candidate quantum error management operations.

Determining the first schedule further comprises scheduling a candidate quantum error management operation to be performed based at least in part on the objective function.

The scheduled candidate quantum error management operation is associated with the at least one minimum value or the at least one maximum value of the objective function.

Determining the objective function comprises executing one or more machine learning algorithms.

At least one candidate quantum error management operation is not scheduled to be performed during the first estimated wait time.

In another aspect, in general, a method for managing entangled quantum states in a network of nodes comprises: generating a first entangled quantum state characterized by a non-factorable quantum relationship among two or more quantum state constituents comprising (1) a first quantum state constituent stored at a first quantum element at a first node in the network and (2) a second quantum state constituent stored at a second quantum element at a second node in the network; determining, for one or more errors associated with at least the first quantum state constituent, one or more probabilities of the errors occurring over a first time period; and determining a first schedule for performing one or more quantum error management operations over a second time period that starts after the first time period, where the one or more quantum error management operations affect the first quantum state constituent, and where the first schedule is based at least in part on (1) the first time period and (2) an estimated fidelity of the first entangled quantum state after at least one of the one or more quantum error management operations.

Aspects can include one or more of the following features.

The estimated fidelity is based at least in part on an estimated noise associated with at least one quantum error management operation.

The first schedule is also based at least in part on post-operation estimated fidelities associated with the first quantum state constituent after each of the one or more quantum error management operations.

The determining of one or more probabilities of the errors occurring over the first time period is based at least in part on one or more errors affecting at least the first quantum state constituent.

In another aspect, in general, a method for managing entangled quantum states in a network of nodes comprises: generating a first entangled quantum state characterized by a non-factorable quantum relationship among two or more quantum state constituents comprising (1) a first quantum state constituent stored at a first quantum element at a first node in the network and (2) a second quantum state constituent stored at a second quantum element at a second node in the network; selecting a type of one or more quantum error management operations from two or more different types of quantum error management operations, based at least in part on a number of resource quantum elements available at the first node after the first quantum state constituent is stored at the first quantum element; and applying one or more quantum error management operations of the selected type to affect the first quantum state constituent; where at least two of the different types of quantum error management operations use a different number of resource quantum elements.

Aspects can include one or more of the following features.

The set of two or more quantum error management operations comprises a first quantum error management operation that operates on a different number of resource quantum elements than a second quantum error management operation.

The resource quantum elements at the first node include at least one of (1) redundancy quantum elements that are entangled with the first quantum state constituent for a portion of the selected quantum error management operation, or (2) ancilla quantum elements that are not entangled with the first quantum state constituent for a portion of the selected quantum error management operation.

There are no resource quantum elements at the first node and a dynamical decoupling quantum error management operation is selected, the dynamical decoupling quantum error management operation comprising one or more quantum operations that only act on the first quantum state constituent.

The dynamical decoupling quantum error management operation reduces a coupling between the first quantum state constituent and a noise process.

There are no resource quantum elements at the first node and a first decoherence-free subspace encoding quantum error management operation is selected.

The first decoherence-free subspace encoding quantum error management operation comprises at least one of (1) transporting the first quantum state constituent or (2) converting the first quantum state constituent into a quantum element with a longer coherence time.

Transporting the first quantum state constituent comprises moving the first quantum state constituent into an optical cavity.

There is one resource quantum element at the first node and a second decoherence-free subspace encoding quantum error management operation is selected, the second decoherence-free subspace encoding quantum error management operation comprising configuring the one resource quantum element at the first node to be a redundancy quantum element, the configuring comprising applying one or more quantum operations that jointly act on both the first quantum state constituent and the one resource quantum element at the first node to entangle the first quantum state constituent and the one resource quantum element at the first node.

There are two or more resource quantum elements at the first node and a quantum error correction quantum error management operation is selected, the quantum error correction quantum error management operation comprising configuring a first resource quantum element at the first node to be a redundancy quantum element and a second resource quantum element at the first node to be an ancilla quantum element, the configuring comprising entangling the first quantum state constituent and the first resource quantum element at the first node, and applying one or more quantum operations that act on the first quantum state constituent and the redundancy quantum element, where the one or more quantum operations are based at least in part on the ancilla quantum element.

The one or more ancilla quantum elements are measured.

The measurements of the ancilla quantum elements provide information associated with errors in the first quantum state constituent.

The method further comprises applying one or more quantum operations that act on one or more redundancy quantum elements and the first quantum state constituent, where the one or more quantum operations are based at least in part on the information associated with errors in the first quantum state constituent.

The method further comprises, after measuring one or more ancilla quantum elements, configuring at least one of the measured ancilla quantum elements to be a reset ancilla quantum element prepared in a predetermined quantum state and applying one or more quantum operations that act on the first quantum state constituent and the redundancy quantum element, where the one or more quantum operations are based at least in part on the reset ancilla quantum element.

The information associated with errors in the first quantum state constituent includes information that an error has occurred.

The information that an error has occurred specifies one error.

The information that an error has occurred specifies two or more possible errors.

The measurements of the ancilla quantum elements provide information also associated with errors in one or more of the resource quantum elements.

At least one of the resource quantum elements at the first node are configured to be one or more redundancy quantum elements by being operated on by a set of encoding quantum operations and a set of decoding quantum operations that are the inverse to the set of encoding quantum operations.

The set of encoding quantum operations includes one or more controlled unitary quantum gates.

The redundancy quantum elements are entangled with the first quantum state constituent after being operated on by the set of encoding quantum operations.

The redundancy quantum elements are not entangled with the first quantum state constituent after being operated on by the set of decoding quantum operations.

The redundancy quantum elements are configured to be resource quantum elements after the set of decoding quantum operations.

The set of encoding quantum operations encode the first quantum state constituent into a decoherence-free subspace that reduces a coupling between the first quantum state constituent and a noise process.

Selecting a type of one or more quantum error management operations from two or more different types of quantum error management operations is also based at least in part on at least one of a set of quantum gate operations available at the first node, a type of quantum elements at the first node, a connectivity of quantum elements at the first node, or one or more classically conditioned resources at the first node.

Selecting a type of one or more quantum error management operations from two or more different types of quantum error management operations is also based at least in part on a connectivity of the resource quantum elements available at the first node.

In another aspect, in general, an apparatus at a first node in a network of nodes comprises: a quantum memory system comprising: an interface configured to receive an electromagnetic wave from a transmission medium, and a coupling component configured to couple one or more photons from the interface to a first quantum element at the first node configured to store a first quantum state constituent of a first entangled quantum state characterized by a non-factorable quantum relationship among two or more quantum state constituents, the quantum state constituents comprising (1) the first quantum state constituent and (2) a second quantum state constituent stored at a second quantum element at a second node in the network; a quantum processing system comprising: control circuitry configured to perform one or more quantum error management operations affecting the first quantum state constituent, and one or more resource quantum elements at the first node, where at least one of the quantum resource elements is configurable to be coupled to the first quantum element; and at least one processing unit, the processing unit configured to manage the one or more quantum error management operations, the managing comprising at least one of: providing a first schedule for one or more quantum error management operations affecting the first quantum state constituent, where the first schedule is based at least in part on (1) at least a portion of a time over which the first quantum state constituent is stored at the first quantum element and (2) an estimated fidelity of the first entangled quantum state after at least one of the one or more quantum error management operations, or providing a type of one or more quantum error management operations selected from two or more different types of quantum error management operations based at least in part on a number of the resource quantum elements available at the first node after the first quantum state constituent is stored at the first quantum element.

Aspects can include one or more of the following features.

One or more of the available resource quantum elements at the first node in the network are configured to be one or more redundancy quantum elements, the configuring comprising operating on at least one resource quantum element with a set of encoding quantum operations and a set of decoding quantum operations that are the inverse to the set of encoding quantum operations.

The set of encoding quantum operations includes one or more controlled unitary quantum gates.

The one or more redundancy quantum elements are entangled with the first quantum state constituent after being operated on by the set of encoding quantum operations.

The one or more redundancy quantum elements are not entangled with the first quantum state constituent after being operated on by the set of decoding quantum operations.

The one or more redundancy quantum elements are configured to be resource quantum elements after the set of decoding quantum operations.

The one or more redundancy quantum elements are used in a decoherence-free subspace encoding.

One or more of the available resource quantum elements at the first node in the network are configured to be one or more ancilla quantum elements that are measured.

The measurements of the one or more ancilla quantum elements provide information associated with errors in the first quantum state constituent.

The first schedule is also based at least in part on one or more measurements of one or more ancilla quantum elements.

The measurements provide information comprising at least one of (1) a noise strength or (2) a noise type associated with the first quantum state constituent.

The information provided by the measurements comprises a measured noise strength differing from an estimated noise strength prior to the measurements, and the estimated noise strength is updated based at least in part on the measured noise strength.

The control circuitry is also configured to perform one or more quantum error management operations affecting the first quantum state constituent based at least in part on classical information.

The electromagnetic wave comprises an optical wave.

The interface comprises one or more polarization elements.

The one or more polarization elements compensate for changes in a polarization of the electromagnetic wave.

The coupling component transduces one or more photons into one or more quantum elements in the network of nodes.

The interface is further configured to transmit a second electromagnetic wave, received from the coupler component, to the transmission medium.

Aspects can have one or more of the following advantages.

Techniques for noise mitigation in quantum systems (e.g., quantum computing systems, or quantum networking systems) in some cases involve reducing the impact of noise associated with certain quantum operations or certain quantum components, even when full quantum error correction is not being performed (e.g., quantum error correction that enables fault-tolerant quantum computing and communications). In addition to that type of quantum noise mitigation, the techniques described herein also support quantum error management that is able to adapt to dynamic conditions and changing availability of resources for mitigating and managing errors that can result from noise (e.g., gate noise, photon loss, and other sources of fidelity reduction, including long wait times in quantum memories). Such adaptive quantum error management is able to adapt to select different types of error management (e.g., different procedures, different modes of execution, and/or different degrees of correction). For example, some types of error management (e.g., procedures using dynamical decoupling) may not require use of any resource quantum elements. Some types of error management (e.g., procedures using decoherence-free subspace encoding) may use redundancy quantum element(s) but not ancillary quantum elements, as described in more detail below. Other types of error management (e.g., quantum error correction) may use both redundancy quantum element(s) and ancillary quantum element(s). Another example of the adaptive nature of the quantum error management described herein is adapting to apply different degrees of quantum error correction (e.g., different code lengths) depending on the quantity of available resource quantum elements, and/or other resources, at any given time.

Some of the example local QEC schemes, when used in the context of a quantum networking protocol, may: protect long-range entanglement with no additional protocol overhead, dynamically utilize available local quantum resources, detect local errors, report loss of coherence to the higher layers of the protocol, and/or be used with other mitigation strategies (such as dynamical decoupling) as an integral component of a broader quantum error management strategy.

Some of the disclosed schemes can significantly improve the overall performance of current generation quantum networks and could be used alongside future fault-tolerant quantum network protocols and to bridge the performance gap between current and future (e.g., Generation-2+) quantum repeaters.

Extending the effective coherence time of the shared quantum states may therefore reduce the performance overhead and improve protocol metrics. Other useful scenarios include providing buffering that can be used by the quantum network stack to fulfill requests from the application (such as teleportation).

Some of the example QEC circuits disclosed have roughly the same local resource requirements as purification circuits, which are assumed to be available in first generation networks, but have no additional channel and protocol overhead. Such approaches can be used to increase the effective quantum memory coherence time of the protected memories as well as to detect loss of coherence.

In some implementations of the techniques described herein, a quantum memory system is configured to apply various kinds of quantum error management techniques to ensure high fidelity of the potentially entangled quantum states associated with the quantum state constituent that may be stored in a quantum element of the quantum memory system (also referred to herein as simply a "quantum memory," or a "memory"). For example, in addition to an interface that is configured to receive and/or transmit an electromagnetic wave from a transmission medium, and a coupling component configured to couple one or more photons between the interface and the quantum element, there may also be other components and circuitry for performing quantum operations. A quantum processing system may be integrated within the quantum memory system to provide additional quantum resource elements and control circuitry used to perform quantum error management operations affecting the quantum state constituent stored in the coupled quantum element and quantum states of the resource quantum element. Alternatively, the quantum memory system may be coupled to a separate quantum processing system that is able to provide the control circuitry and resource quantum elements used to perform the quantum error management operations. In some examples, the quantum state constituent stored in the quantum element of the quantum memory system may be transferred to one or more quantum elements in a quantum processing system and then acted upon by quantum operations by the quantum processing system.

In some examples, local errors may be mitigated without the need for distributed operations or other coordination between different nodes, which can be desirable in a quantum networking protocol.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 10B shows a table of example error syndromes, the stabilizers involved in error detection, and possible underlying error locations, for a distributed two-qubit code.

FIG. 10D shows a table of example error syndromes, the stabilizers involved in error detection, and possible underlying error locations, for a distributed three-qubit code.

DETAILED DESCRIPTION

Figure 1A:
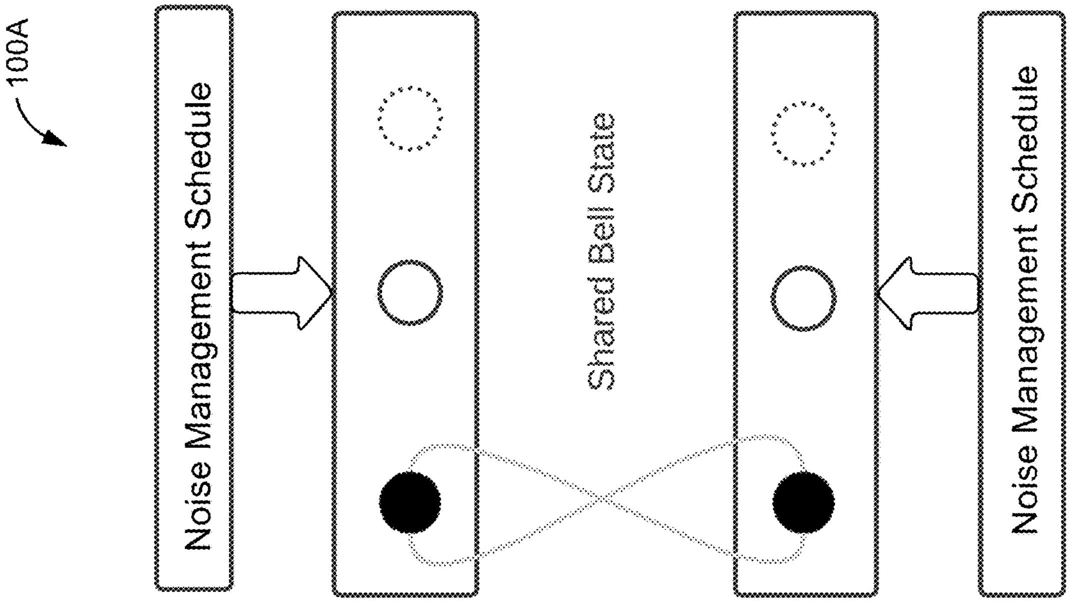
FIG. 1A shows a schematic diagram of an example quantum error management schedule applied to a shared Bell state and resource quantum elements.

One challenge in quantum networking is the mitigation of noise during entanglement distribution and subsequent data transmission. Herein, some of the methods and apparatuses disclosed perform quantum error correction (QEC) in the context of quantum networking. Some of the examples disclosed may be useful for noise management even in near term quantum nodes with a limited number of quantum memories which may not support general fault-tolerant operation. In some examples, efficient (i.e., short) QEC codes are tuned to the dominant noise of the quantum memories and adaptively scheduled as a noise management mechanism to protect the stored quantum state. Some of the example local QEC schemes fit well within a quantum networking protocol as they may: protect long-range entanglement with no additional protocol overhead, dynamically utilize local quantum resources, report loss of coherence to the higher layers of the protocol, and/or be used with other mitigation strategies (such as dynamical decoupling) as an integral component of a broader quantum error management strategy. In some examples, fidelity of a quantum state is used as an indication of how close that quantum state is to an associated ideal quantum state (e.g., with fidelity of 1 being the highest fidelity corresponding to the ideal quantum state, and a fidelity at or close to 0 being the lowest fidelity, which may correspond to a situation in which decoherence or other factors cause deviation from the ideal quantum state).

In some examples, common fluctuator dephasing (CFD) QEC codes for nitrogen-vacancy (NV) center memories (or other color center memories based on point defects in a lattice) may be utilized by adapting a logical state encoding to a distributed context. The efficacy of some example schemes are validated by prophetic simulations which show significant increases in the effective coherence times of protected quantum states. The disclosed schemes can therefore significantly improve the overall performance of current generation quantum networks and could be used alongside future fault-tolerant quantum network protocols and to bridge the performance gap between current and future (e.g., Generation-2+) quantum repeaters.

In some examples, a core requirement for the transmission of quantum data in a quantum network may be the establishment of end-to-end entanglement between a source and destination node prior to teleportation of the application data. Often, the end-to-end entanglement is established link-wise and then bound together using entanglement swapping operations.

There are several scenarios within a quantum networking protocol where the ability to buffer and protect distributed entanglement is useful. For example, a frequent scenario arises whereby entanglement has been established on one side (A) of a quantum repeater and the protocol must wait for entanglement to be established on the other side (B) before performing the entanglement swap. During this wait time, the A-side entanglement is experiencing decoherence, which may result in a need to either restart the protocol or perform a round of purification if the estimated fidelity drops too low. Purification generates (and sacrifices) additional entanglement to boost the primary entanglement fidelity, but at an additional quantum resource and protocol messaging cost which increases with entanglement distance. Extending the effective coherence time of the shared quantum states may therefore reduce the protocol overhead and improve performance metrics. In some examples, when an effective coherence time is extended, a timer associated with tracking coherence (e.g., the "decoherence timer" described in more detail below) can be modified based on least in part on the extending (e.g., a time delay associated with the timer can be extended and/or set to a time based on a determined schedule for performing one or more quantum error management operations). Other useful scenarios include providing buffering used by the quantum network stack to fulfill requests from the application (such as teleportation). Dynamical decoupling (DD) and decoherence-free subspace (DFS) encoding are also techniques for mitigating decoherence. An open system may experience decoherence corresponding to non-unitary evolution. But, an open system that is decoherence-free has purely unitary evolution, corresponding to a subspace of its Hilbert space that is decoupled from the environment. Encoding states based on such subspaces can be used for quantum error mitigation. With dynamical decoupling, sequences of operations can be used to suppress decoherence by approximately averaging coupling between the system and the environment to zero.

Quantum error correction (QEC) may be used to improve noise robustness by encoding physical qubits into logical qubits in a larger state space, thereby introducing redundancy and providing the ability to detect and potentially correct errors. QEC is considered to be an important aspect of fault-tolerant quantum computation and therefore typically considered in the context of future large-scale quantum computing platforms and future generations of quantum networks. In a deployed quantum networking scenario with connections being dynamically created and destroyed, there may be opportunities to leverage unallocated quantum resources for local QEC-based noise management, even if the error correcting codes are unable to correct general errors. Thus, some of the examples disclosed herein may use small QEC circuits in the current generation of memory-based quantum repeaters as a noise management mechanism for quantum memories which are holding distributed quantum data (e.g., shared Bell states) where the dominant class of noise is known. The performance advantages of such approaches and how they fit well within the context of a quantum networking protocol are also discussed. Some of the example QEC circuits have roughly the same local resource requirements as purification circuits, which are assumed to be available in first generation networks, but have no additional channel and protocol overhead. Such approaches can be used to increase the effective coherence time of the protected states as well as to detect errors.

The direct detection of errors can inform the higher-layer protocol to reset entanglement as opposed to operating under an assumption of coherence based on an analytic estimate of the coherence time. The active correction of errors allows the quantum memories holding shared entanglement to be periodically "refreshed" in a way loosely analogous to classical DRAM memories. The local QEC scheme can be used in many ways in a quantum networking protocol, such as protecting entanglement while waiting for application-level qubits to arrive for teleportation, slowing the decoherence of short-range entanglement waiting for purification, and can be used alongside other mitigation strategies (such as dynamical decoupling) as an integral component of a broader noise management strategy.

FIG. 1A shows an example quantum error management schedule applied to a shared Bell state and resource quantum elements. Two constituents of an entangled quantum state at a first node and second node, respectively, are shown as solid black circles. A given entangled quantum state can be characterized by a non-factorable quantum relationship among two or more quantum state constituents. In this example, the entangled quantum state corresponds to a Bell state characterized by a non-factorable quantum relationship between a pair of constituents (also referred to as a Bell pair). In other examples, there may be a multipartite entanglement among three or more quantum state constituents. A non-factorable relationship between quantum state constituents of an entangled quantum state refers to the fact that that the complete entangled quantum state cannot be factored into a product state of those quantum state constituents. Such quantum state constituents characterized by a non-factorable quantum relationship represent states of associated quantum elements that are entangled with each other. Redundancy quantum elements are shown as empty circles with a solid black border and ancilla quantum elements are shown as empty circles with a dotted black border. The noise management schedule applied to each node is based at least in part on the number or type of resource quantum elements (e.g., redundancy, ancilla, or undesignated) available at the node. In some examples, undesignated resource quantum elements may be configured to be either redundancy quantum elements or ancilla quantum elements for a portion of the quantum error management schedule (e.g., by applying one or more quantum gates to each respective undesignated quantum element).

Figure 1B:
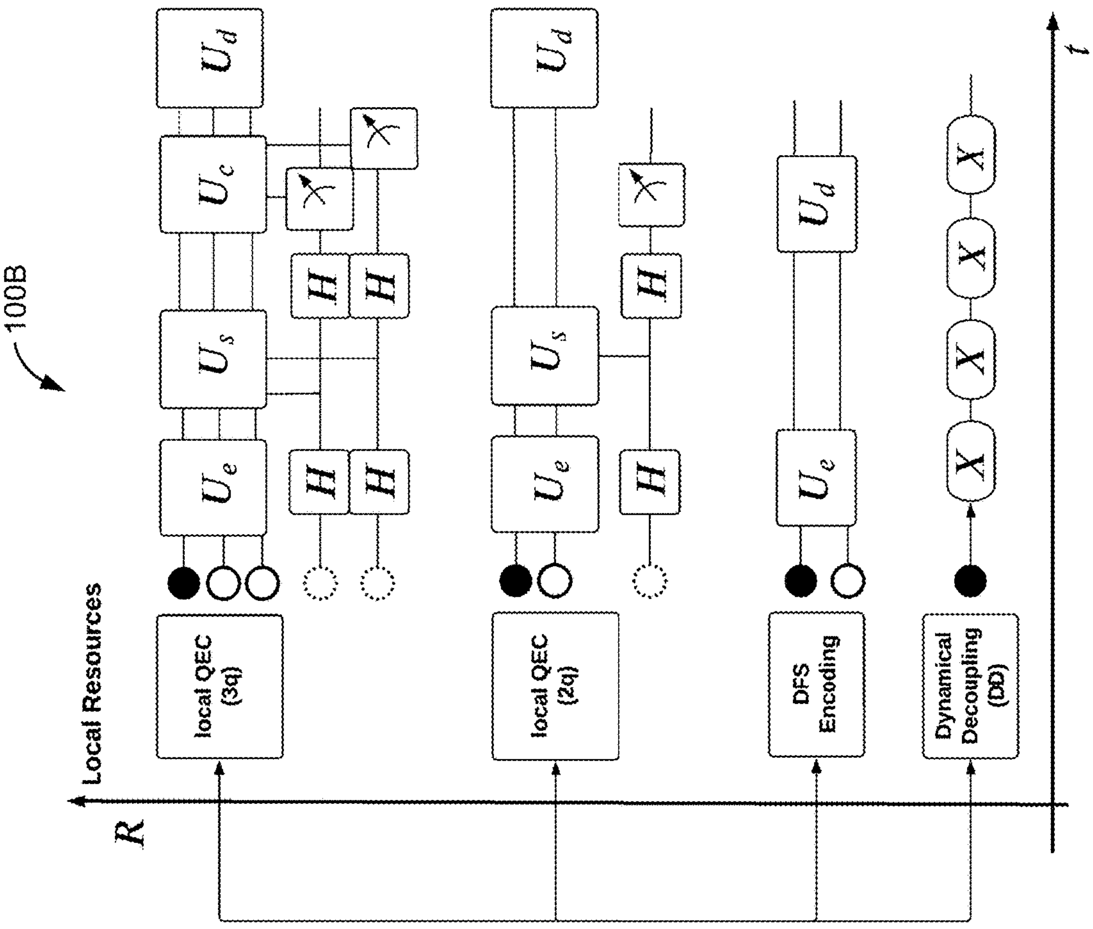
FIG. 1B shows a schematic diagram of an example quantum error management scheme.

FIG. 1B shows a quantum error management scheme for scheduling local QEC and/or dynamical decoupling operations based on availability of local resources for a particular entanglement generation run (i.e., dynamically selecting appropriate action(s) based on currently available local resources). Actions may include: local QEC (code size based on available resources), dynamical decoupling (DD), decoherence free subspace (DFS) encoding or a combination of methods. Such a scheme is therefore applicable to both current and future generations of quantum repeaters.

Figure 2:
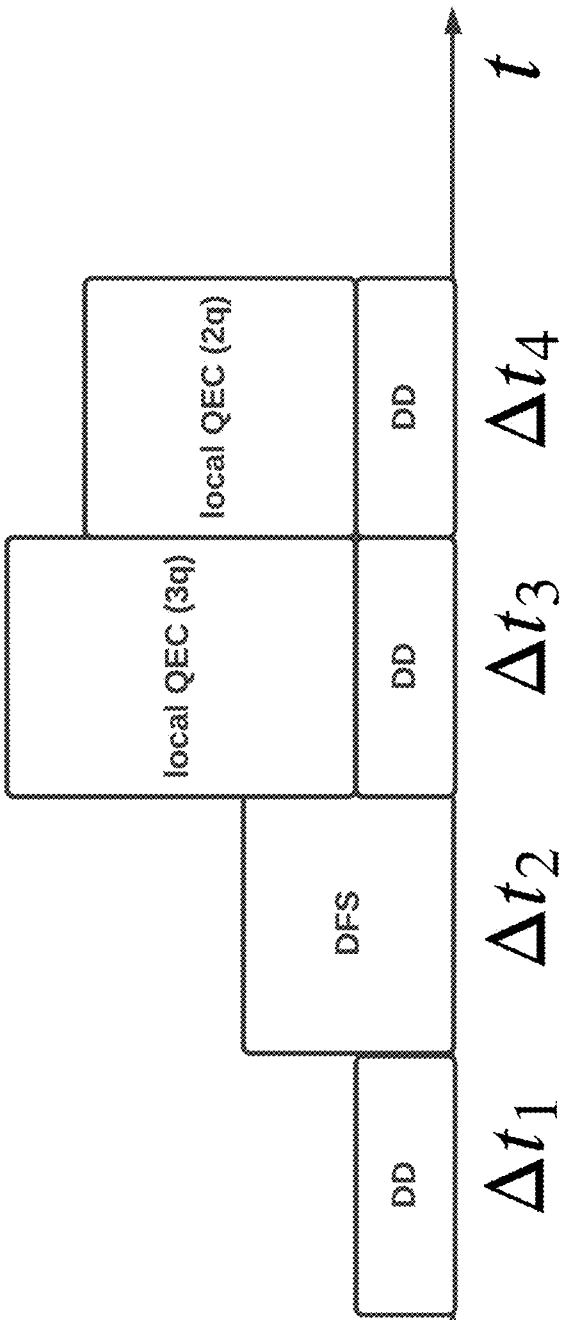
FIG. 2 shows a schematic diagram of an example quantum error management schedule.

FIG. 2 shows an example quantum error management schedule comprising time steps (e.g., $\Delta t_1$, $\Delta t_2$, etc.) and quantum error mitigation operations (e.g., DD, DFS, and/or local QEC).

Stabilizer operations may be determined by encoding qubit states into a larger logical state space $\psi_L$ and identifying stabilizer operators which stabilize the logical state $U_s|\psi_L\rangle=|\psi_L\rangle$, commute with each other, and anti-commute with the expected local errors (e.g., $U_S E=-EU_s$). The local stabilizers may be applied to protect the associated logical encoded state from noise that is encountered while waiting for the protocol to retrieve the stored quantum state for swapping or other operations.

Figure 3B:
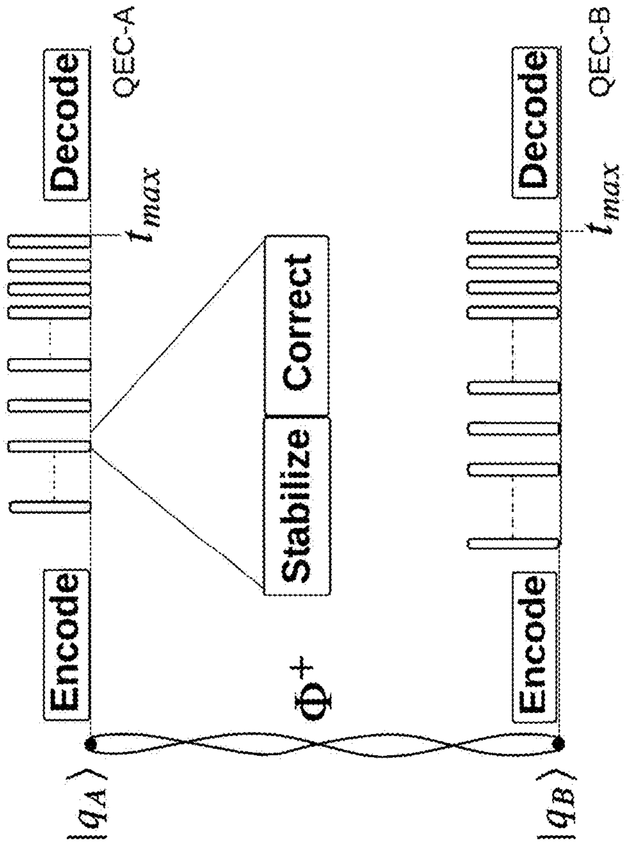
FIG. 3B shows a schematic diagram of an example quantum error management scheme.
Figure 3A:
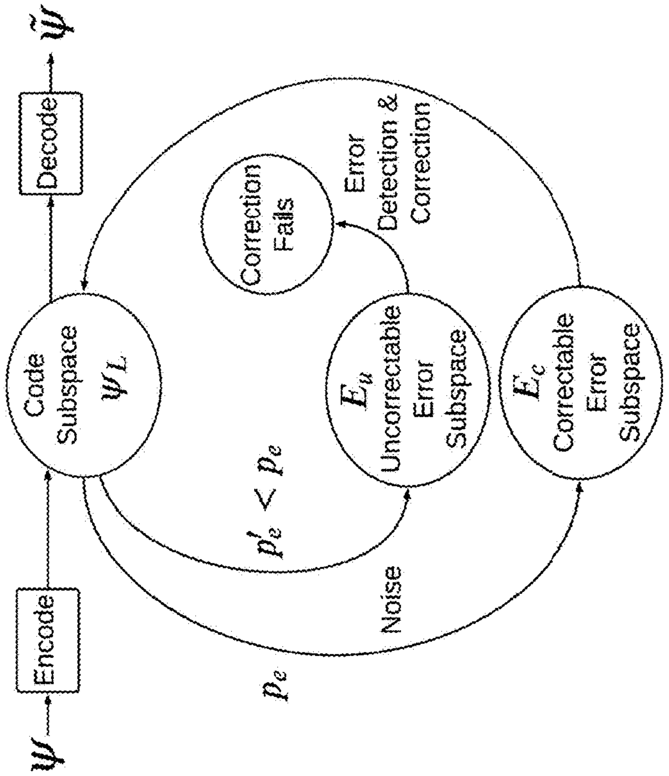
FIG. 3A shows a flowchart of an example quantum error management scheme.

FIGS. 3A and 3B show an example QEC process comprising an encoding step where an input (quantum) state is logically encoded into a logical (quantum) state after entanglement generation, followed by iterations of the noise channel pushing the logical state into an error subspace and the QEC operations attempting to restore the logical state to the code subspace. Multiple applications of the QEC circuit can be scheduled in order to actively "refresh" the shared state during the idle wait time. Since each QEC code has a limited capacity for error detection (defined by the code distance), there is a probability $$p_e'$$

that within a small time interval Δt the noise pushes the encoded state into an uncorrectable subspace, in which case the error correction may have unexpected results. This probability of transitioning to an uncorrectable subspace is less than the probability of moving to a correctable subspace (with fewer errors), i.e.

$$p_e' < p_e$$

assuming independent errors and the code is tuned to the dominant noise. Thus, it is expected that the shared state fidelity decays with time even with rapid scheduling of QEC stabilization, albeit with a slower decay rate than without stabilization. When the wait is complete, the logical state is decoded back to the original state for use.

Referring to FIG. 3A, a flowchart shows an example quantum error management scheme where an encoded state transitions between the code subspace and error subspaces due to the action of idle noise and error correction.

Referring to FIG. 3B, a schematic diagram shows an example quantum error management scheme where decoherence is reduced by adaptively scheduling QEC stabilizer and correction circuits to enhance (and in some examples, maximize) the fidelity of the shared quantum state given the idle and gate noise characteristics.

Consider a distributed Bell state such as $$\Phi^+ = \frac{1}{\sqrt{2}}(|00\rangle + |11\rangle)_{A,B}$$

which is then locally encoded on each node (e.g., in a quantum memory in a quantum network), resulting in a restricted class of logical states of the form $\psi_L = |\phi_A\rangle\phi_B\rangle + |\phi_A'\rangle|\phi_B'\rangle$ where $$|\phi_A\rangle \equiv |0\rangle_{L(A)},\ |\phi_A'\rangle \equiv |1\rangle_{L(A)},\ |\phi_B\rangle \equiv |0\rangle_{L(B)},\text{ and}$$
$$|\phi_B'\rangle \equiv |1\rangle_{L(B)}$$

that define the logical qubit encoding on each side. By using local stabilizers $U_{S,A} \in S_A$ on node A and $U_{S,B} \in S_B$ on node B, such that $$U_{S,A}|\phi_A\rangle = |\phi_A\rangle,\ U_{S,A}|\phi_A'\rangle = |\phi_A'\rangle,\ U_{S,B}|\phi_B\rangle = |\phi_B\rangle,\text{ and}$$
$$U_{S,B}|\phi_B'\rangle = |\phi_B'\rangle,$$

this allows the complete distributed state to be stabilized locally since $$U_{S,A} \otimes I_B^{\otimes n}|\psi_L\rangle = |\psi_L\rangle,\ I_A^{\otimes m} \otimes U_{S,B}|\psi_L\rangle = |\psi_L\rangle,\text{ and}$$
$$U_{S,A} \otimes U_{S,B}|\psi_L\rangle = |\psi_L\rangle.$$

In some examples, the stabilizers in $S_A$ all commute with each other, and the stabilizers in $S_B$ all commute with each other, so that they can jointly stabilize a non-trivial code subspace. This local stabilization property means that local errors may be mitigated without the need for distributed operations or other coordination between nodes, which can be desirable in a quantum networking protocol. After entanglement generation, each node can perform local noise management to protect the shared state while waiting for subsequent stages of the entanglement distribution protocol. Note that $U_{S,A}$ and $U_{S,B}$ can in general detect different error types, which means the local QEC mitigation scheme can be used in scenarios with heterogeneous idle noise environments across the nodes.

For illustration purposes, consider bit flip and phase flip noise repetition codes. For a 3-qubit bit flip code, the encoded state can be written as $$\Psi_L = \frac{1}{\sqrt{2}}(|000\rangle_A|000\rangle_B + |111\rangle_A|111\rangle_B)$$

which has A-side stabilizers ZZIIII, IZZIII, ZIZIII and B-side stabilizers IIIZZI, IIIIZZ, IIIZIZ. The simultaneous application of an A-side and B-side stabilizer results in additional valid stabilizers, which means the nodes can act independently. Similarly for a 3-qubit phase flip code, the encoded state can be written as $$\Psi_L = \frac{1}{\sqrt{2}}(|{+}{+}{+}\rangle_A|{+}{+}{+}\rangle_B + |{-}{-}{-}\rangle_A|{-}{-}{-}\rangle_B)$$

with A-side stabilizers XXIIII, IXXIII, XIXIII and B-side stabilizers IIIXXI, IIIIXX, IIIXIX. Recall that $$|\pm\rangle = \frac{|0\rangle \pm |1\rangle}{\sqrt{2}}.$$

In each case, the stabilizer operations anti-commute with the expected local errors {Z, X}=ZX+XZ=0 and the local stabilizers are able to stabilize the complete logical distributed state.

Figure 4:
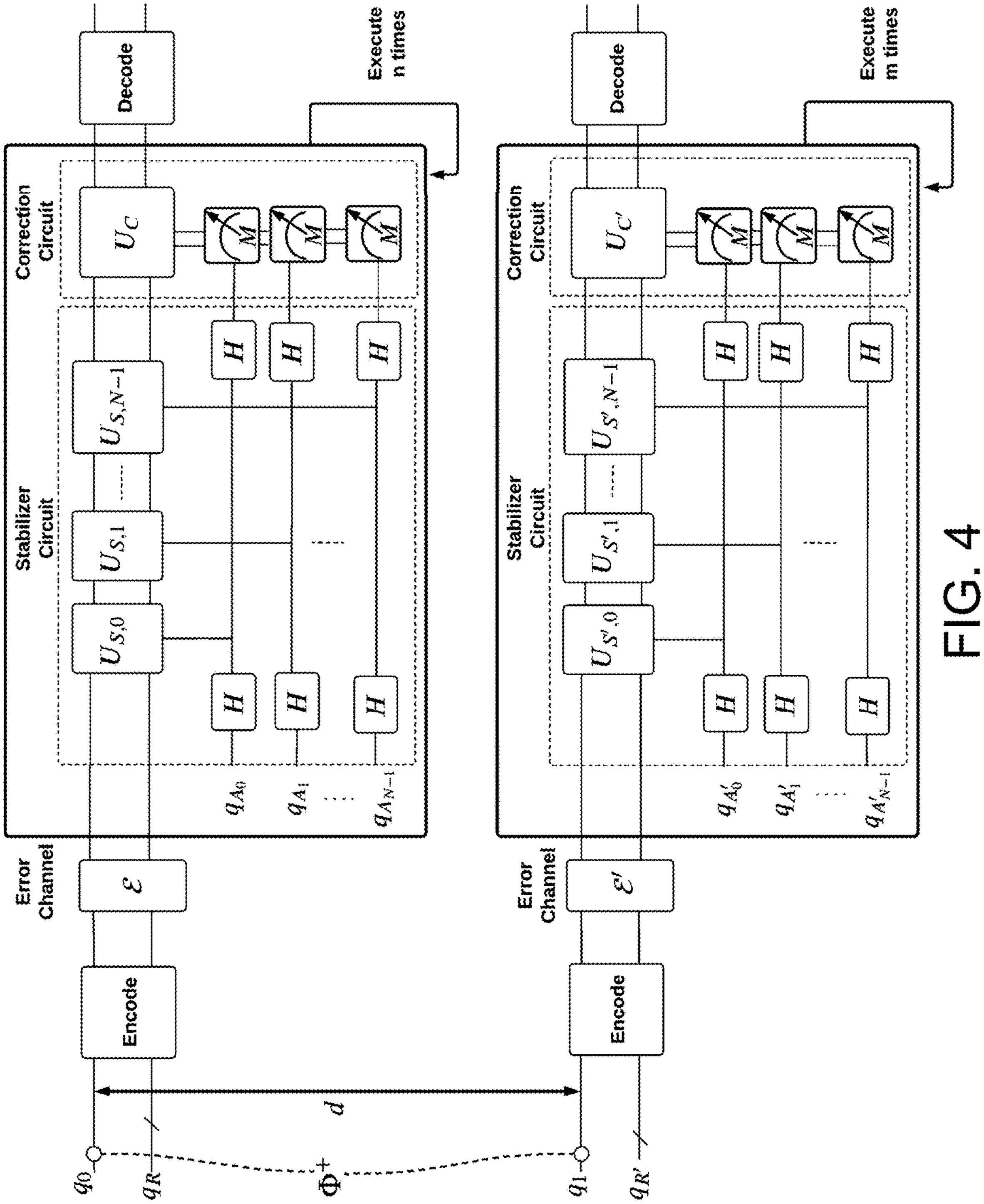
FIG. 4 shows a schematic diagram of an example quantum error management scheme.

FIG. 4 shows an example quantum error management scheme for protecting a shared Bell state across two nodes, using local QEC. The stabilizers and correction circuits may be scheduled to execute multiple times during a wait time interval. The distributed logical state $\psi_L$, after it has been exposed to idle noise errors ($\tilde{\psi}_L$) and then operated on by the local stabilizers, is then in state $\psi_S$. After applying the first Hadamard gate on the ancillary qubits of the stabilizer circuits on each side of the entanglement, the state $\psi_S$ becomes:

$$\psi_{S_1} = \tilde{\psi}_L \sum_{m_i \in 0,1} \sum_{m_i \in 0,1} |m_0 m_1 \ldots m_{N-1}\rangle|n_0 n_1 \ldots n_{N-1}\rangle \quad (1)$$

where $m_i$ is associated with the ancillary qubits of the first node (controlling the stabilizers) and $n_i$ is associated with the ancillary qubits of the second node since the Hadamards generate a uniform superposition from the initial $|00\ldots\rangle|00\ldots\rangle$ state. The states in the superposition where the ancillary qubits are in the $|1\rangle$ state will enable the corresponding controlled stabilizer operation $U_{S,i}$ or $U_{S',i}$. After the controlled stabilizer operations, the state becomes:

$$\psi_{S_2} = \sum_{m_i \in 0,1} \sum_{n_i \in 0,1} \left(U_{S,0}^{m_0} U_{S,1}^{m_1} \ldots U_{S',0}^{n_0} U_{S',1}^{n_1} \ldots\right) \tilde{\psi}_L |m_0 m_1 \ldots m_{N-1}\rangle |n_0 n_1 \ldots n_{N-1}\rangle \quad (2)$$

Note that the stabilizer unitaries are only enabled where the corresponding $m_i$ or $n_i$ control qubits are $|1\rangle$—this is analogous to the two qubit code case discussed later. The application of a local stabilizer operation has implied identity (I) operations at other locations in the circuit but these are suppressed for clarity. Before writing the state after the final Hadamard operation in the stabilizer circuit, it is noted that: (1) after the final basis transformation, the amplitude from each original basis state $|m_0 m_1 \ldots m_i \ldots\rangle|n_0 n_1 \ldots n_i \ldots\rangle$ will make a contribution to all output basis state amplitudes, and (2) amplitudes which are indexed by $m_i=1$ or $n_i=1$ (non-zero bitfields) in the original basis have the possibility of a negative contribution due to the action of the Hadamard gate, but the negative sign is only assured when the corresponding index $k_i=1$ or $l_i=1$ because this is the portion of the output superposition where the sign change actually occurred in the new basis. The output state can be written as:

$$\psi_S = \sum_k \sum_l \sum_m \sum_n (-1)^{m \cdot k} (-1)^{n \cdot l} \left(U_{S,0}^{m_0} U_{S,1}^{m_1} \ldots U_{S',0}^{n_0} U_{S',1}^{n_1} \ldots\right) \tilde{\psi}_L |k\rangle |l\rangle \quad (3)$$

where $m=\Sigma_i 2^i m_i$, $n=\Sigma_i 2^i n_i$ and $m \cdot k$ and $n \cdot l$ are the inner products of index bitstrings. Note this is analogous to the two qubit case. Local errors may be detected due to the anti-commutation of the error(s) with the local stabilizers—this results in sign changes/permutations in Eq. 3, causing all terms to vanish except the term where the ancillary registers $|k\rangle|l\rangle$ measure the corresponding error syndrome. Since the restricted class of logical states can be stabilized locally and, in this example, only local errors are assumed, the local QEC scheme can detect and correct errors on both nodes independently/concurrently and the local QEC framework can incorporate any existing QEC code and define a distributed version of it for protecting shared Bell states.

In some scenarios it may be possible to reduce the number of ancillary qubits needed to control the stabilizer circuits by executing the stabilizer operations sequentially in time. Since the stabilizer operations do not collapse the protected state, they can be run sequentially in time instead of in parallel. The measurement result of the first stabilizer may be stored in a classical register and concatenated with the subsequent stabilizer measurement results. Once all measurements are collected the error syndrome is known and the correction circuit can be run. This represents a time/space trade off that can save on the number of required local quantum memories by incurring a longer time needed to execute the stabilizer circuit.

Common fluctuator dephasing (CFD) is a noise environment (i.e., model) that corresponds to phase noise experienced by storage qubits (e.g., nuclear spin qubits) by the action of spin defect communication qubits in an NV center quantum memory with error Hamiltonian $H_E=g_1 Z_1+g_2 Z_2$. CFD is an example of a possible dominant noise environment of quantum memories, including in quantum memories not comprising NV centers, and hardware-efficient QEC codes may be chosen to address such noise in quantum memories. Let $g_1$ and $g_2$ be the coupling strengths and $$u \equiv \begin{bmatrix} -g_1 + g_2 \\ g_1 + g_2 \end{bmatrix} \quad (4)$$

with $$c = \frac{1}{\|u\|_1}$$

and $g^+ \equiv \sqrt{g_1+g_2}$ and $g^- \equiv \sqrt{g_1-g_2}$. The logical states of this hardware-efficient code are $|0\rangle_L, =|\chi_0\rangle|0\rangle$ and $|1\rangle_L=|\chi_1\rangle|1\rangle$ with stabilizer $$U_S = U_z \otimes Z_2 = (|\chi_0\rangle\langle\chi_0| - |\chi_1\rangle\langle\chi_1|) \otimes Z_2,$$

where $|\chi_0\rangle=c(g\_e^{i\theta_0}|0\rangle+g_+e^{i\theta_2}|1\rangle))$ and $|\chi_1\rangle=c(g_+e^{i\phi_1}|0\rangle+g\_e^{i\phi_3}|1\rangle)$. Proper choice of angles results in $\langle\chi_0|\chi_1\rangle=0$ and sets up the expected stabilizer behavior $U_S|0\rangle_L=U_z|\chi_0\rangle\otimes Z_2|0\rangle=|0\rangle_L$ and similarly $U_S|1\rangle_L=U_z|\chi_1\rangle\otimes Z_2|1\rangle=-|\chi_1\rangle\otimes-|1\rangle=|1\rangle_L$. The error correction operation implements the unitary $U_x=|\chi_0\rangle\langle\chi_1|+|\chi_1\rangle\langle\chi_0|$.

The stabilizers and errors do not necessarily anti-commute over the entire Hilbert space but do over the logical code space. Let $\psi_L=\alpha|0\rangle_L+\beta|1\rangle_L$ be an arbitrary logical qubit, then $E|0\rangle_L=k|\chi_1\rangle|0\rangle$ and $E|1\rangle_L=k|\chi_0\rangle|1\rangle$ where k is some proportionality constant. Error operations on the logical qubit result in $E\psi_L=\alpha k|\chi_1\rangle|0\rangle+\beta k|\chi_0\rangle|1\rangle$. Continuing. $U_S E\psi_L=[(|\chi_0\rangle\langle\chi_0|-|\chi_1\rangle\langle\chi_1|)\otimes Z_2](\alpha k|\chi_1\rangle|0\rangle+\beta k|\chi_0\rangle|1\rangle)=-\beta k|\chi_0\rangle\langle 1|-\alpha k|\chi_1\rangle\langle 0|$. Therefore $U_S E\psi_L=-E\psi_L=-EU_S\psi_L$ which shows the stabilizers and errors anti-commute over the code subspace.

In general, the CFD QEC code described above can be adapted to protect a Bell state shared across two network nodes (denoted A and B). Without loss of generality to other Bell states, for illustration purposes a $\phi^+$ Bell state is analyzed. In order to construct a distributed version of the code, an initial distributed state $$\psi_0 = |\chi_0\rangle_A |\chi_0\rangle_B \frac{1}{\sqrt{2}}(|00\rangle + |11\rangle)_{A,B}$$

is constructed. By defining a local mapping, $U_E:|\chi_0\rangle\rightarrow|\chi_1\rangle$, by using controlled operation c-$U_E$ the logical distributed state can be constructed as:

$$\psi_L = \frac{1}{\sqrt{2}}(|\chi_0\rangle_A|\chi_0\rangle_B|00\rangle_{A,B} + |\chi_1\rangle_A|\chi_1\rangle_B|11\rangle_{A,B}),$$

herein referred to as the CFD encoded state. This CFD encoded state can be re-written as:

$$\psi_L = \frac{1}{\sqrt{2}}(|\chi_0\rangle_A|0\rangle_A|\chi_0\rangle_B|0\rangle_B + |\chi_1\rangle_A|1\rangle_A|\chi_1\rangle_B|1\rangle_B)$$

with qubit re-ordering and it can be shown that $U_{S,A}\otimes I_B$, $I_A\otimes U_{S,B}$, and $U_{S,A}\otimes U_{S,B}$ stabilize the logical state (i.e., the local, single-sided stabilizers can stabilize the distributed logical state).

The example CFD encoder and decoder circuits use an encoding unitary $U_E$ which maps $|\chi_0\rangle \rightarrow |\chi_1\rangle$. Using simplified expressions for these states: $|\chi_0\rangle = \alpha_0|0\rangle + \beta_0|\rangle$, $|\chi_1\rangle = \alpha_1|0\rangle + \beta_1|1\rangle$, and assuming $U_E$ is a unitary matrix of the form:

$$U_E = \begin{bmatrix} a & b \\ -e^{i\phi}b^* & e^{i\phi}a^* \end{bmatrix} \tag{5}$$

then the following matrix expression can be solved (analytically or via a solver) for a, b, and ¢ to get the desired mapping from $|\chi_0\rangle \rightarrow |\chi_1\rangle$:

$$\begin{bmatrix} a & b \\ -e^{i\phi}b^* & e^{i\phi}a^* \end{bmatrix}\begin{bmatrix} \alpha_0 \\ \beta_0 \end{bmatrix} = \begin{bmatrix} \alpha_1 \\ \beta_1 \end{bmatrix}. \tag{6}$$

Since $$U_E^\dagger U_E|\chi_0\rangle = U_E^\dagger|\chi_1\rangle,$$

the decoder unitary is $$U_E^\dagger$$

because it performs the reverse mapping $|\chi_1\rangle \rightarrow |\chi_0\rangle$. This encoding creates the distributed logical state $$\psi_L = \frac{1}{\sqrt{2}}(|\chi_0\rangle_A|0\rangle_A|\chi_0\rangle_B|0\rangle_B + |\chi_1\rangle_A|1\rangle_A|\chi_1\rangle_B|1\rangle_B) \tag{7}$$

which can be stabilized locally on each node.

Figure 5:
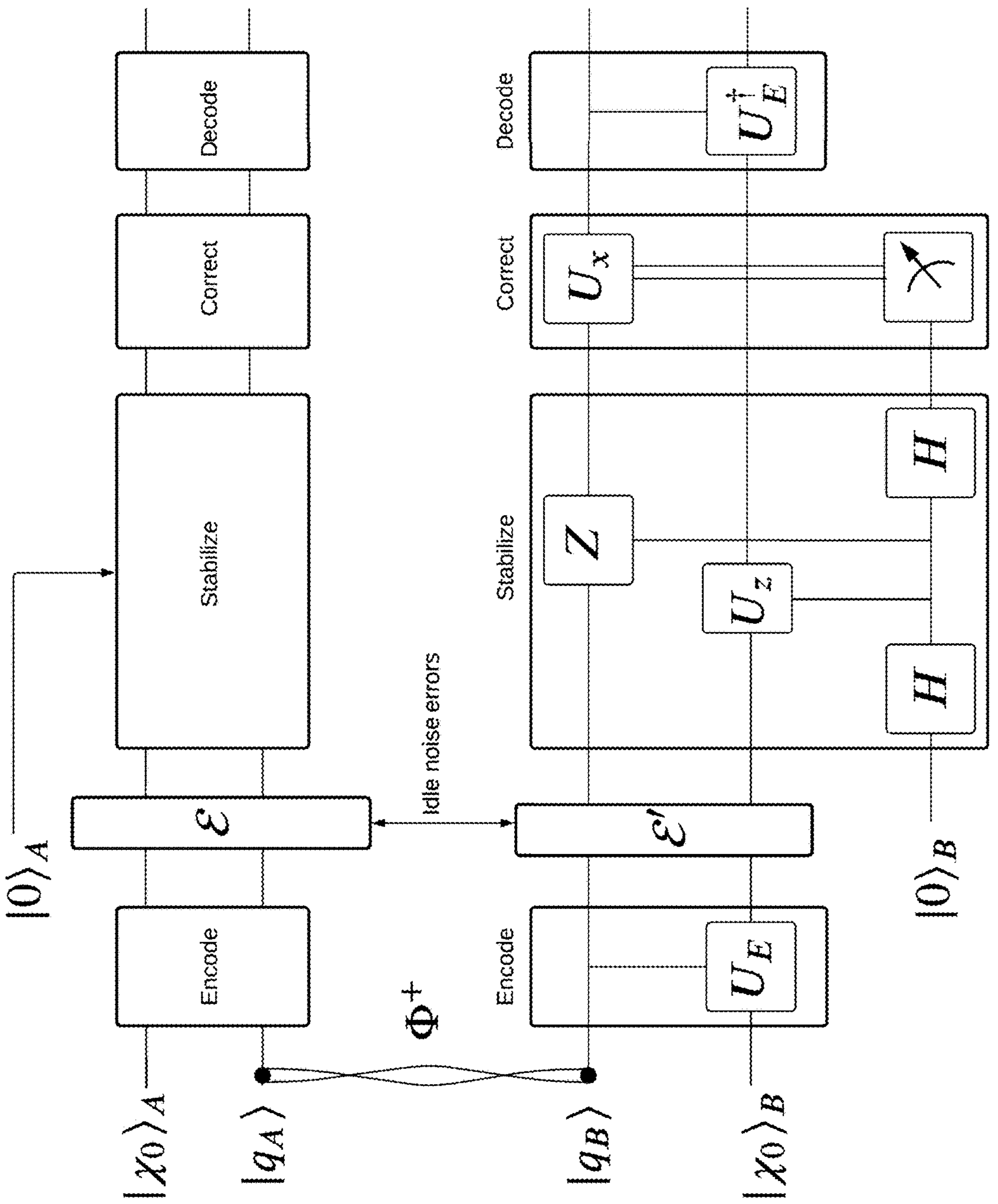
FIG. 5 shows a schematic diagram of an example quantum error management scheme.

FIG. 5 shows an example quantum error management scheme with CFD encoder, decoder, stabilizer, and correction circuits. Note that the initial state of the redundancy qubit used in the encoding is $|\chi_0\rangle$ so there is an implicit unitary operation $U_{\chi_0}$ prior to the encoder which performs the $|0\rangle \rightarrow |\chi_0\rangle$, where $$U_{\chi_0} = \begin{bmatrix} \alpha_0 & -\beta_0^* \\ \beta_0 & \alpha_0^* \end{bmatrix}. \tag{8}$$

Local QEC operations may be used within a broader quantum error management strategy which, for example, optimizes the scheduling of actions appropriate for the noise environments of the quantum memories holding the entanglement and the available local resources available for encoding logical states for QEC. Consider a $\phi^+$ state distributed across two nodes A and B with each node experiencing an idle noise of type $N_A$ and $N_B$ respectively over a wait time of $\Delta t_W$. The scheduling algorithm may optimize the following:

$$S_A^*, S_B^* = \text{argmax}_{S_A,S_B} F(\theta_A, \theta_B, S_A, S_B, \Delta t_w) \tag{9}$$

where $$S_A^* = \{(A_0, t_0), (A_1, t_1), \ldots, (A_{N-1}, t_{N-1})\}$$

is a schedule of actions for node A (with an analogous schedule of actions $$S_B^*$$

for node B) which are chosen (in some examples, optimized) to increase (in some examples, maximize) the fidelity F of the decoded state at the end of the wait time. The set of possible actions A may include the application of a QEC code circuit, a no-op (i.e., do-nothing), or some other noise management action(s) (e.g., A={no-op, $QEC_0$, $QEC_1$+M, . . . , M}, where M represents another mitigation strategy (such as dynamical decoupling) operating in tandem). The actions may be constrained by, for example, relevance to the noise type and/or if they are able to be executed with available quantum (and/or classical) resources on the node during the wait time. The node-dependent system parameters may be outside user control and can include parameters such as idle noise type, one and two qubit gate noise strengths and times: $\theta=\{\mathcal{N}_{idle}, \mathcal{N}_{G_1}, \mathcal{N}_{G_2}, T_{G_1}, T_{G_2}\}$. In some examples, one or more machine learning algorithms may be utilized to assist with generating the schedule of actions for node A and node B (e.g., at all scheduling times). For example, the one or more machine learning algorithms may optimize an objective function associated with the schedule of actions (e.g., the objective function on the right-hand side of Eq. 9), where inputs to the optimization may include initial fidelity, system parameters associated with idle and gate noise, or one or more probability distributions of overall wait time. The machine learning algorithms may be trained utilizing data associated with simulation results or from experimental data.

In many cases it may be sufficient or beneficial to return a simplified version of the schedule switching between actions defined by a start time, repetition time, and maximum cutoff time, $$(\text{e.g., } S_A^* = (C_{k^*}, \delta t_{qec}, t_{start}, t_{max})$$

where $C_{k*}$ is the selected QEC code). In some examples, a schedule (possibly optimized) may be computed by a network controller or locally by the nodes and may account for crossover points where one schedule outperforms another at specific noise thresholds. An example optimized schedule may, in some cases, achieve the convex hull of the fidelity curves associated with all valid schedules, thereby maximizing the fidelity at each point in time, since waiting times may be interrupted in a dynamic network protocol with stochastic operations. The scheduling may therefore be adaptive in two ways: (1) in the choice of the mitigation action, such as selection of a QEC code with specific size and execution mode (e.g., parallel or sequential), based on availability of local resources and (2) the generation of a time-varying schedule optimizing the expected benefit of QEC at each point in time during the wait interval while accounting for the gate noise cost.

In some examples (e.g., codes with a limited error correction capacity and therefore small code distance), the scheduling algorithm may take such limitations into account as errors accumulate during the idle wait time. Additionally, the impact of operational gate noise may be included in order to be applicable in realistic environments.

Consider an initial mixed state which has been encoded into a logical state $\rho_L$ and has components which include the desired (logical) Bell state, a correctable subspace $\rho_c$, and an uncorrectable subspace $\rho_u$. This initial state has fidelity $$F = \langle \phi_L^+ | \rho | \phi_L^+ \rangle = p_\phi$$

assuming the error subspaces are orthogonal to the Bell state. The logical state $\rho_L$ can then be written as:

$$\rho_L = p_\phi |\Phi_L^+\rangle\langle\Phi_L^+| + p_c\rho_c + p_u\rho_u. \tag{10}$$

After some time delay $\tau$ the state evolves toward a new distribution $\rho_\tau$. Note that $p_c(\tau)$ represents the probability that the number of errors which occurred during the delay time $\tau$ does not exceed the number correctable by the code. Then $\rho_\tau$ can then be written as:

$$\rho_\tau = p_\phi(\tau)|\Phi_L^+\rangle\langle\Phi_L^+| + p_c(\tau)\rho_c + p_u(\tau)\rho_u. \tag{11}$$

After the QEC circuit is executed, the state becomes $\rho_{qec}=U\rho_\tau U^\dagger$, where U is the QEC circuit operation. Since the QEC circuit stabilizes the logical Bell state, the Bell state component will remain unchanged. The correctable subspace $\rho_c$ will be transformed into the desired Bell state and the post-QEC state will be:

$$\rho_{qec} = p_\phi(\tau)|\Phi_L^+\rangle\langle\Phi_L^+| + p_c(\tau)|\Phi_L^+\rangle\langle\Phi_L^+| + p_u(\tau)\rho_u \tag{12}$$

which can be re-written by combining terms as $$\rho_{qec} = p'_\phi(\tau)|\Phi_L^+\rangle\langle\Phi_L^+| + p_u(\tau)\rho_u, \tag{13}$$

where $$p'_\phi(\tau) = p_\phi(\tau) + p_c(\tau).$$

The re-written form highlights that the post-QEC state comprises the Bell state and the uncorrectable subspaces. Therefore, a time delay may be implemented before the next QEC execution, thus allowing more correctable errors to accumulate in order to derive more benefit from QEC.

In some examples, the goal of QEC may be to optimize (e.g., increase or decrease) some metric associated with the post-QEC fidelity $$F(\rho_{qec}, |\Phi_L^+\rangle\langle\Phi_L^+|).$$

Assuming the error states are orthogonal to the target Bell state $$F(\rho_c, |\Phi_L^+\rangle\langle\Phi_L^+|) \approx 0 \text{ and } F(\rho_u, |\Phi_L^+\rangle\langle\Phi_L^+|) \approx 0 \text{ then} \tag{14}$$
$$\tilde{F}_{qec}(\tau) = F(\rho_{qec}, |\Phi_L^+\rangle\langle\Phi_L^+|) = p_\phi(\tau) + p_c(\tau) = p_{\phi'}(\tau)$$

where $\tilde{F}_{qec}(\tau)$ is the idealized post-QEC fidelity which excludes the fidelity cost associated with the QEC circuit operations and F(·) is the fidelity operator.

After defining the idealized post-QEC fidelity, the expected negative impact of gate noise $E\{\delta F_g(\theta)\}$ may be taken into account. The net post-QEC fidelity can be conservatively estimated as follows:

$$F_{qec}(\tau_{opt}) = \tilde{F}_{qec}(\tau_{opt}) - E\{\delta F_g(\theta)\} \tag{15}$$

where $\delta F_g(\theta)$ is the expected fidelity decrease due to gate noise which is parameterized by system parameters $\theta$. In some examples, one or more machine learning algorithms can be used to improve the modeling of the impact of gate noise (e.g., the reduction in fidelity) of the QEC circuits. For example, modeling the expected negative impact of gate noise as a constant value can be a conservative approach that is more accurate when the input density state has a higher probability of being correctable, but such an approach can become less accurate as the probability of the input density state being uncorrectable increases. The modeling of the impact of gate noise may also be performed analytically or via a hybrid method (e.g., a machine learning algorithm determines the values of the parameters of an analytic model associated with the impact of gate noise).

In some examples, in order for a QEC operation to be scheduled, it is estimated that the QEC operation will provide a benefit over idle operation (i.e., no QEC operation being performed). In such examples, the following condition holds:

$$F_{qec}(\tau_{opt}) > F_{idle}(\tau_{opt}). \tag{16}$$

An optimal time delay, $\tau_{opt}$, which optimizes a chosen metric (also referred to as an objective function) associated with the post-QEC fidelity, can be determined by finding or estimating the critical points (e.g., minima or maxima) of this metric as a function of the time delay, $\tau$. For example, a metric which minimizes the rate of fidelity loss may exhibit local minima and may be defined as follows:

$$\tau_{opt} = \text{argmin}_{\tau \le \tau_{max}} \left\{ \frac{F_0 - F_{qec}(\tau)}{\tau} \right\}, \tag{17}$$

where $F_0$ is in the initial fidelity (i.e., at the beginning of a cycle or estimated wait time), $F_{qec}(\tau)$ is the post-QEC fidelity that accounts for gate noise, and $\tau_{opt}$ is the optimal time delay, which is less than or equal to $\tau_{max}$. Other example metrics that are associated with the post-QEC fidelity can depend on one or more differences between (1) the initial fidelity and (2) one or more estimated fidelities associated with one or more candidate quantum error management operations. Some example metrics may depend on the one or more such differences raised to a power different than one (e.g., $(F_0-F_{qec}(\tau))^2$) and/or may inversely depend explicitly on t raised to a power different than one (e.g., $\tau^{1/2}$). In some examples, the metric can depend on a sum of such differences raised to different powers and with different inverse dependencies on T $$\left(\text{e.g., } \alpha\frac{F_0 - F_{qec}(\tau)}{\tau} + \beta\frac{(F_0 - F_{qec}(\tau))^2}{\tau^3},\right.$$

where $\alpha$ and $\beta$ are constants). The inverse explicit dependence of some metrics on $\tau$ may be used to enforce an objective/goal for performing fewer quantum error management operations. For example, it may be undesirable to perform many quantum error management operations because of the computational resources needed or because of the delay imposed on future operations in the quantum network.

In general, determining two or more values associated with a metric (i.e., objective function) may comprise determining a first value based at least in part on a first estimated fidelity and a first time, and determining a second value based at least in part on a second estimated fidelity and a second time. Determining a schedule for one or more quantum error management operations can include scheduling a quantum error management operation to be performed based at least in part on the objective function. In some examples, the scheduled quantum error management operation is associated with at least one minimum value or at least one maximum value of the objective function.

In some examples, one or more machine learning algorithms may be utilized to determine or update a metric (i.e., an objective function) associated with selecting an optimal delay time, $\tau_{opt}$, from a set of possible times for one or more QEC cycles. For example, a parameterized metric that includes scaling factors and/or polynomial powers could be optimized by a machine learning algorithm that determines values for the scaling factors and/or polynomial powers (e.g., based on current experimental conditions or other information). In some examples, the metric can be modified (i.e., adapted) for each QEC cycle. Inputs to the optimization may include initial fidelity, system parameters associated with idle and gate noise, or one or more probability distributions of overall wait time. The machine learning algorithms may be trained utilizing data associated with simulation results or from experimental data.

In some examples, the $p_\phi(\tau)$, $p_c(\tau)$, and $p_\phi(\tau)$ curves may be analytically computed, pre-computed from previous simulations modeling the target environment, or estimated from simulated or actual state tomography information. One way to simulate these curves is to simulate the noise and, for each $\Delta t$ timestep, project the noisy idle state $\rho_\tau$ onto the $$\phi_L^+, \rho_c, \rho_u$$

basis. Alternatively, for specific codes and known idle noise generation rates, the probability the state is correctable may be computed and used for $p_c(\tau)$. It is interesting to note that in some examples, if the initial state had a large enough bias toward correctable states, then it may be more advantageous to schedule the first QEC operation immediately.

Figure 6A:
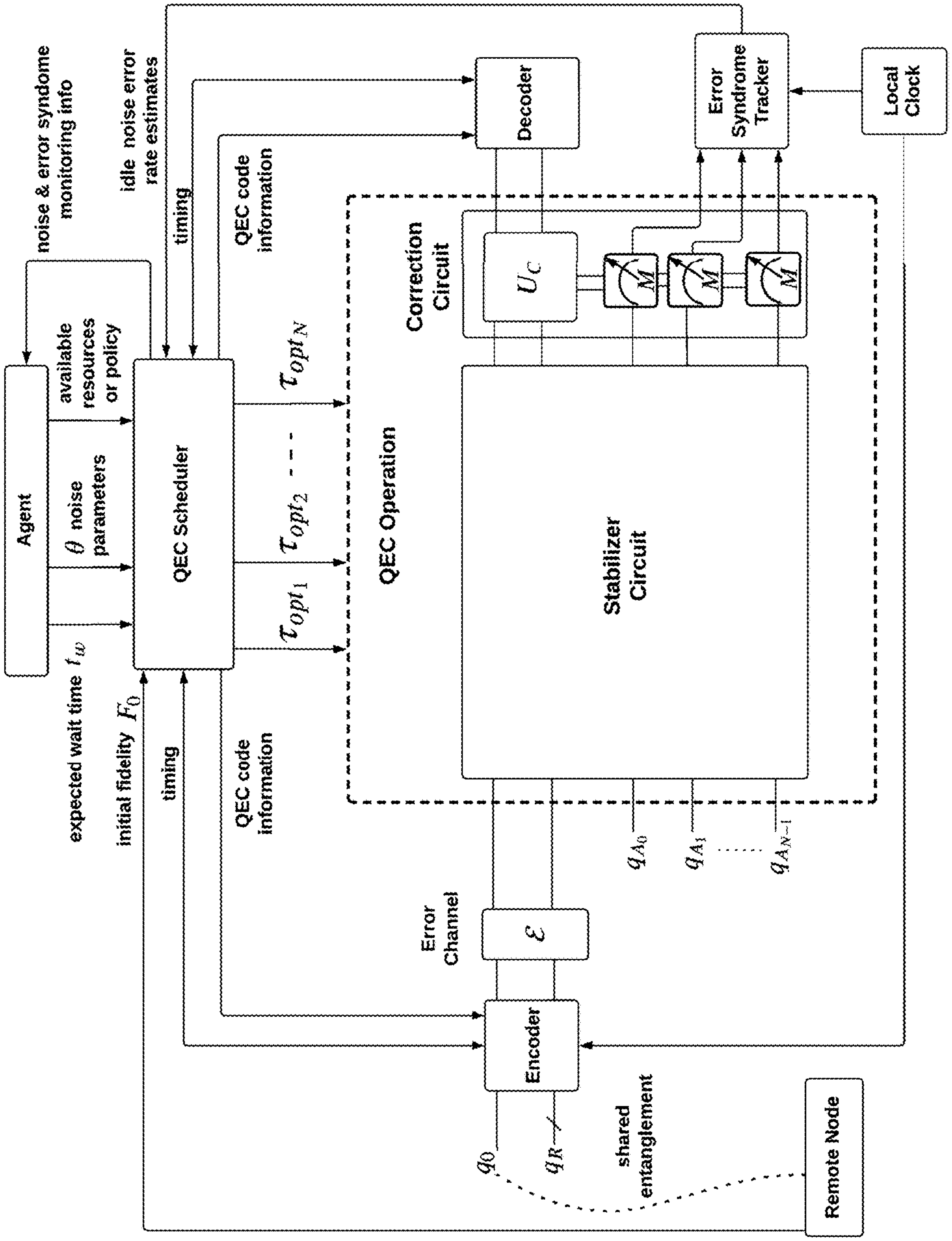
FIGS. 6A, 6B, and 6C show schematic diagrams of example quantum error management schemes.

FIG. 6A shows an example quantum error management scheme. A first quantum state constituent is stored at a first quantum element $q_0$ and is entangled with one or more quantum state constituents, one of which is at a remote node. The first quantum element and one or more redundancy quantum elements $q_R$ are encoded by an encoder that comprises one or more quantum gates that entangles the two or more quantum elements. After the encoder, the two or more quantum elements experience an error channel before being operated on by a stabilizer circuit. N ancilla quantum elements (e.g., $q_{A_0}$, $q_{A_1}$, etc.) are also acted on by the stabilizer circuit, and then are measured. After the stabilizer circuit, the first quantum element and the one or more redundancy quantum elements are operated on by quantum gates that are determined by the results of the measurements of the ancilla quantum elements, which are also sent to an error syndrome tracker in this example. The error syndrome tracker receives a clock signal that synchronizes it with the encoder, and the error syndrome tracker transmits classical information associated with the measurement results to a QEC scheduler. The QEC scheduler also receives information from an agent, such as expected wait times, noise parameters, and available resources or policies. The agent may be in communication with a centralized controller of the network, or may be configured to serve as the centralized controller, or may be in communication with agents located at other nodes to collectively serve as a controller (e.g., a distributed controller rather than a centralized controller). In some implementations, the agent is on the same node as the QEC scheduler, while in other implementations, the agent is on a different node that is in communication with the node on which the QEC scheduler is located. Furthermore, the QEC scheduler can transmit information to the agent, such as local noise and error syndrome information (e.g., that is received by the error syndrome tracker). The QEC scheduler also may receive information from the remote node regarding an entanglement fidelity between the first quantum state constituent and the quantum state constituent stored at the remote node. The encoder also transmits information to the QEC scheduler regarding the start time at which it encodes the first quantum state constituent with any resource quantum elements. Finally, the QEC scheduler, based at least in part on the information that it receives, selects a QEC code to run, determines when the QEC code should be run (e.g., at times $\tau_{opt_1}$, $\tau_{opt_2}$, etc.) and transmits QEC code information (e.g., timing, QEC code selected, basis) to the encoder and decoder. In this example, the QEC scheduler is used over N time windows, selecting a respective QEC operation or no operation for each time window.

Referring again to FIG. 6A, the QEC scheduler receives initial information from the agent related to (1) the expected fidelity of the initial state for this wait time (and the expected wait time itself as a constraint) (2) the expected idle noise rates on the qubits which are available to the QEC scheduler and the expected gate noise fidelity cost for a QEC operation/execution of each type of QEC code (3) optionally, a pre-computed schedule from the agent using an algorithm described below. The QEC scheduler decides on which QEC code and execution mode (e.g., parallel or sequential) to utilize based on the number of available resources. It may initially use the expected idle noise rates on qubits to inform the construction of a QEC schedule which tries to estimate the probability of being in the target logical Bell state subspace, a correctable subspace, or uncorrectable subspace, and then determine how to schedule the first QEC execution in order to provide a net fidelity improvement while accounting for gate noise. After each QEC execution this subspace estimation may be performed again to schedule the next QEC execution, which results in a schedule. The QEC scheduler can utilize pre-computed analytic curves for estimating idle noise errors rates over time as input to the schedule construction. As mentioned, the QEC scheduler could alternatively run a schedule which has been pre-computed at the agent. Over time, the error syndromes may be monitored to determine if the actual idle error rates match the expected rates and a feedback loop adjustment may be performed to obtain the idle error rates on each qubit. This monitoring can be done in two modes that are not mutually exclusive: (a) during QEC detection/correction or (b) during idle times when qubits are unscheduled. This monitoring will allow the system to determine a more accurate actual idle noise error rate and to detect anomalous conditions (e.g., error syndromes showing errors on $q_0$ more than others, etc.). The monitoring information is fed back up to the agent.

Referring again to FIG. 6A, one or more machine learning algorithms may be utilized to assist with noise monitoring to, for example, map error syndromes to underlying conditions (e.g., noise model drift). As before, the noise monitoring can be done in two modes that are not mutually exclusive: (a) during QEC detection/correction or (b) during idle times when qubits are unscheduled. In some examples, the error syndrome patterns may be used as inputs to the one or more machine learning algorithms so as to determine if the noise model parameters should be updated (e.g., if more or fewer errors are occurring than expected, or if the distribution of errors over the qubits has changed). Additionally, the one or more machine learning algorithms may be used to map error syndromes to the most likely underlying error. Such a mapping can be particularly useful for complex codes or noise models where there are nontrivial ambiguities between the error syndrome and the underlying cause.

Figure 6B:
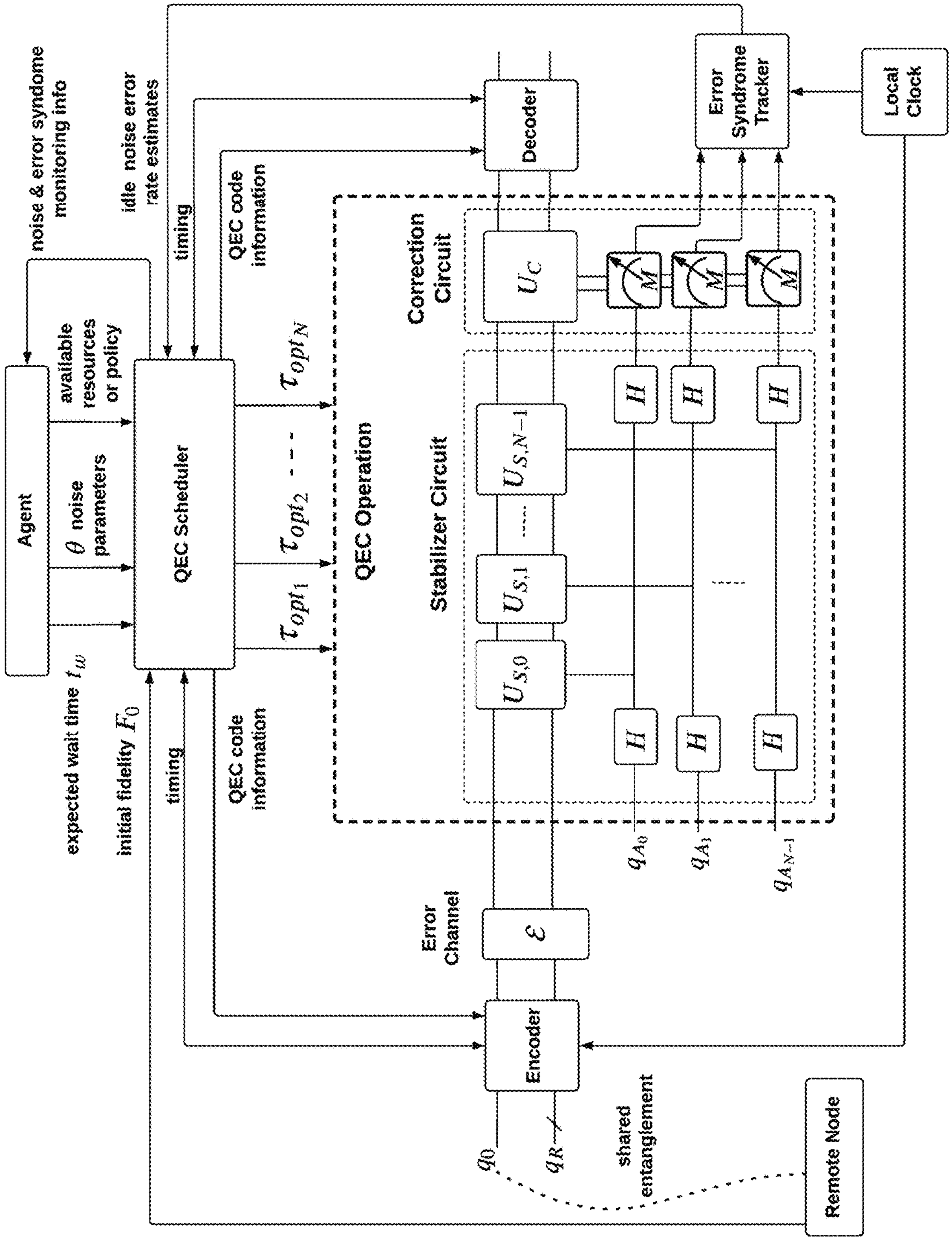

FIG. 6B shows an example quantum error management scheme. In this example, an example stabilizer circuit is shown. The stabilizer circuit has N ancilla quantum elements, each of which is operated on by a Hadamard gate. The stabilizer circuit further comprises quantum gates (e.g., $U_{S,0}$) that that are based at least in part on respective quantum states associated with the ancilla quantum elements (e.g., the quantum gates are controlled by the ancilla quantum elements such that they only execute if the respective ancilla quantum state is |1)). Next, each ancilla quantum element is acted on by a second Hadamard gate and then measured. After the stabilizer circuit, the first quantum element and the one or more redundancy quantum elements are operated on by quantum gates that are determined by the results of the measurements of the ancilla quantum elements.

Figure 6C:
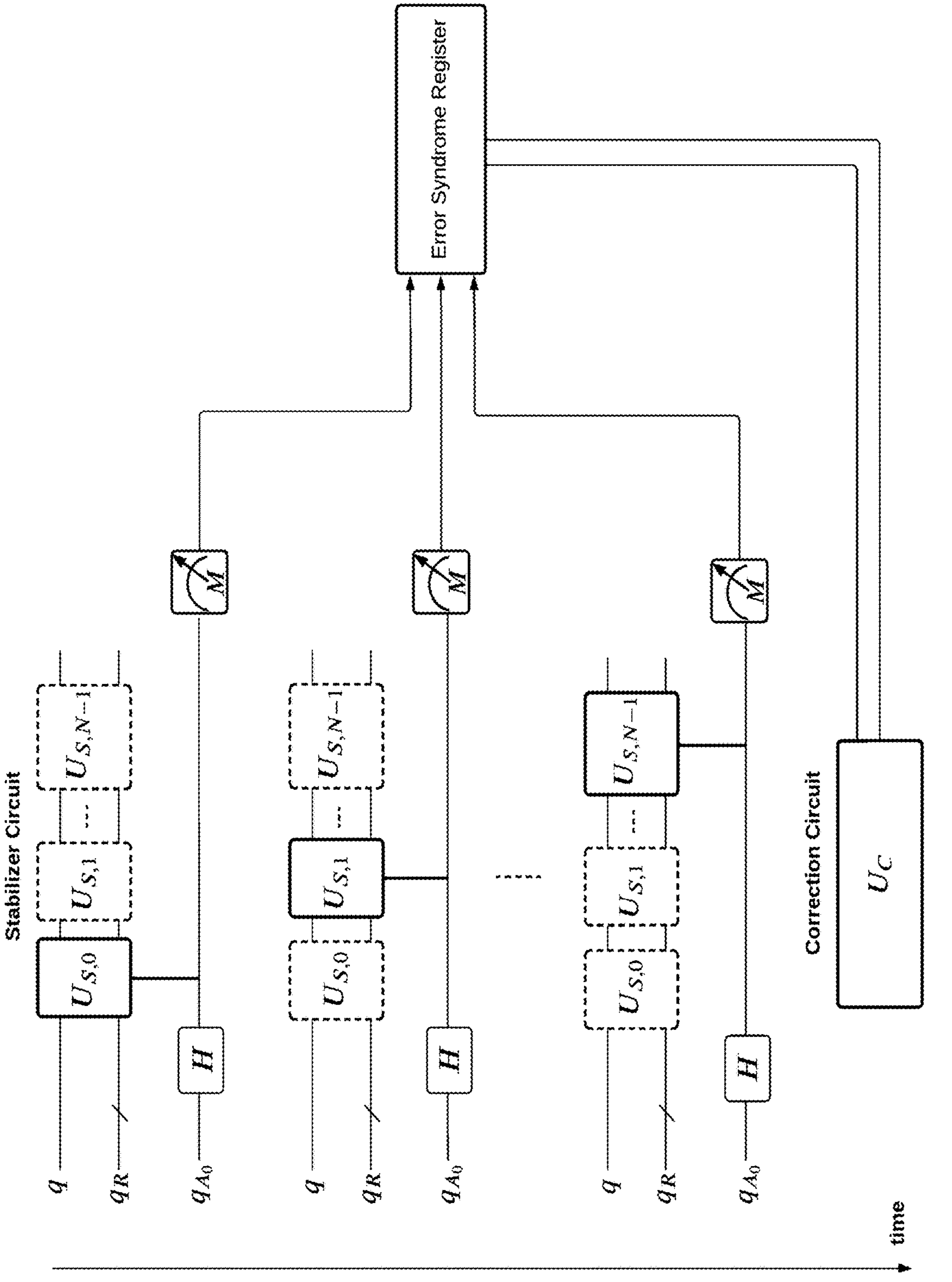

FIG. 6C shows an example quantum error management scheme. In this example, a QEC code is run in series, rather than in parallel (e.g., FIGS. 6A and 6B). A first quantum element and one or more redundancy quantum elements that are entangled (e.g., by an encoder) are used in each execution of the serial QEC code. After each measurement of a first ancilla quantum element, the first ancilla quantum element is reset and used as an ancilla quantum element for the next execution of the serial QEC code. The results of the measurements are transmitted to an error syndrome register, which then transmits information to a correction circuit that can apply quantum gates to the first quantum element and the first resource quantum element after the serial QEC code has finished its last execution. Such an execution may be used if resource quantum elements are limited, so that a QEC code may still be executed but over a longer duration of time.

Consider the three-qubit code with parameters [n, k, d]=(3,1,3) which can detect 2 errors but only correct a single error. The n parameter is the number of physical qubits used in the code for constructing the logical state, the k parameter is the number of logically encoded qubits ($k_i$n), and d is the code distance, which is related to the number of errors the code can detect (d-1) and the number of errors the code can correct (d-2). Also consider an idle noise source which produces errors with probability $p_e=1-e^{-\alpha t}$. The probability that no errors occur is $p_\phi(\tau)=e^{-\alpha\tau}$, and the probability of a single (correctable) error occurring can be calculated by considering all permutations of errors on the qubits comprising the logical state (i.e., [error, no error, no error], [no error, error, no error], and [no error, no error, error]), which results in a probability of $p_c(t)=3p_e(1-p_e)^2=3\,(1-e^{-\alpha\tau})\,e^{-2\alpha\tau}$. Using these probabilities, the scheduling of QEC operations may be performed using methods discussed above.

In some examples, a given idle and gate noise environment can be simulated or emulated and the corresponding fidelity decay curves (i.e., fidelity vs time) can be computed for later use in a deployed environment. In order to utilize these pre-computed curves in a deployed environment where the wait times are known, the schedule which exhibits the highest fidelity at the expected wait time is selected. When utilizing these pre-computed curves in a deployed environment where the wait times will be unknown, decay curves may be simulated in a dependent way, an example of which is discussed below.

First, the fidelity-vs-time curve may be simulated for the case where no action is taken (i.e., no QEC operations are performed within the wait duration), resulting in the $F_0(t)$ curve. Next, the $F_1(t)$ curve may be simulated (i.e., the curve associated with the execution of one QEC circuit during the wait time), followed by calculating the cross-over time $\tau_{opt_1}$ where $F_1(t=\tau_{opt_1})>F_0(t=\tau_{opt_1})$. In general, it may be assumed that $F_1(t>\tau_{opt_1})>F_0(t>\tau_{opt_1})$. When continuing on to the simulation of the $F_2(t)$ curve (two QEC executions within the wait time), the first execution is fixed at $\tau_{opt_1}$ and the second execution is performed at the end of the wait duration, and then the cross-over point where two executions are more optimal is determined, $F_2(t=\tau_{opt_2})>F_1(t=\tau_{opt_2})$. In general, it may be assumed that $F_2(t>\tau_{opt_2})>F_1(t>\tau_{opt_2})$. Continuing in this manner leads to a schedule (that may be optimal in some contexts) $S=\{\tau_{opt_1}, \tau_{opt_2}, \ldots\}$ which can be used even for unknown wait times.

In some cases, the local quantum memories at some nodes may be idle (i.e., not used for holding entanglement). In this case, these resources may used to estimate the noise error rate on the memories by placing the memories into a known state and using a short code to detect errors. By varying the wait time of the detection, an estimate of the noise error rate could be obtained. The node may then communicate with the agent if this rate goes outside the expected range, for example.

FIGS. 7A, 7B, 7C, and 7D show prophetic plots associated with an example for using short QEC codes in quantum networks as part of an adaptive scheme for noise reduction. The Bell state fidelities plotted are means, over 100 simulations, for a shared Bell state between Alice and Bob, given different idle noise durations and refresh wait durations. In the example, an entangled pair experiencing noise (an "error channel") during idle wait time is simulated where both Alice and Bob share one entangled qubit, and each have their own local ancillary qubits. After entanglement is established between Alice and Bob, their respective entangled qubits are encoded according to the corresponding QEC code. Then noise is applied across Alice and Bob's qubits. Finally, syndromes are extracted, and operations are applied to correct detected errors. The prophetic plots show simulated Bell state fidelities with and without four different types of noise and four different QEC codes. Noise is applied to each of Alice and Bob's qubits during the idle wait time. Applying a cycle of QEC matching the corresponding noise increases the fidelity of the shared Bell state between Alice and Bob for a given noise duration. Fidelities can be further improved with repeated applications of QEC for a given noise duration. In this example, to apply QEC multiple times, the duration over which noise is applied is divided into segments of equal length, after each of which an error detection and correction step is applied. In general, unequal segments of time between applications of QEC may be used. The fidelities are plotted for different numbers of QEC cycles, with greater fidelities seen at greater cycle numbers. Errors for are calculated as standard deviations of bootstrapped means with replacement.

Figure 7A:
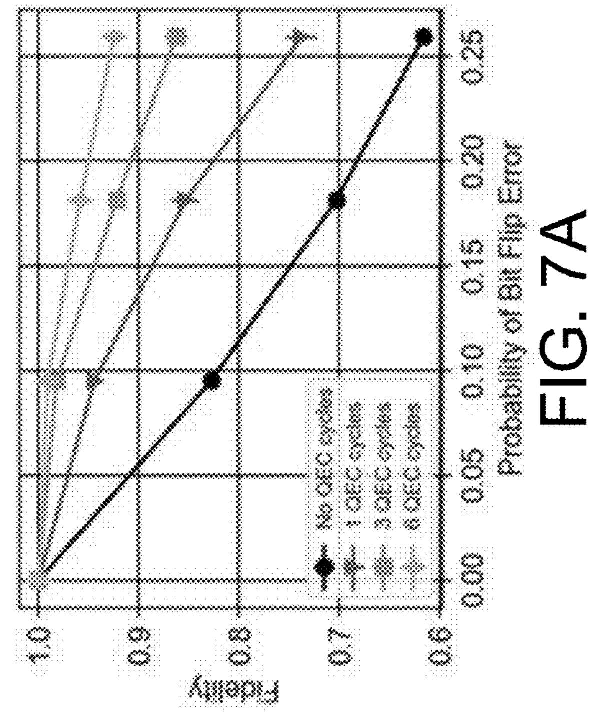
FIGS. 7A, 7B, 7C, and 7D show prophetic plots of fidelity of the shared entanglement as a function of the probability of error during idle time, for various example quantum error management schemes.

Referring to FIG. 7A, the Bell state fidelity is shown, for several different numbers of applications of QEC, as a function of probability of error during idle time for bit flip error noise (with decay rate of 0.1 Hz) and a three-qubit bit flip QEC code.

Figure 7B:
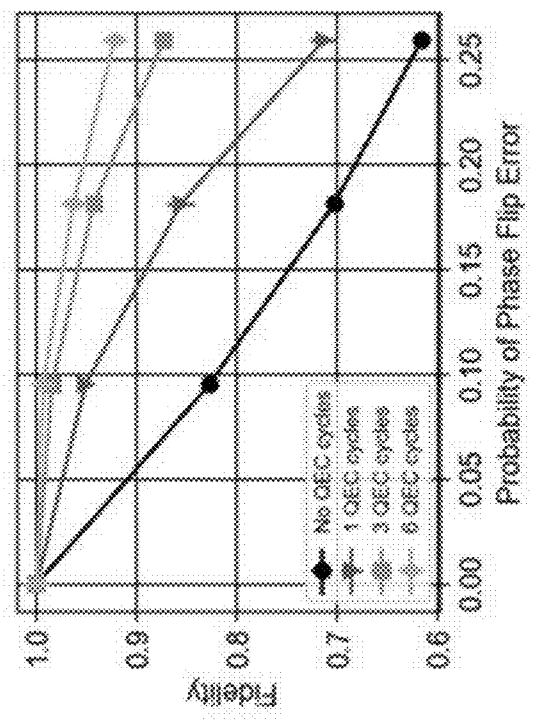

Referring to FIG. 7B, the Bell state fidelity is shown, for several different numbers of applications of QEC, as a function of probability of error during idle time for phase flip error noise (with decay rate of 0.1 Hz) and a three-qubit phase flip QEC code.

Figure 7C:
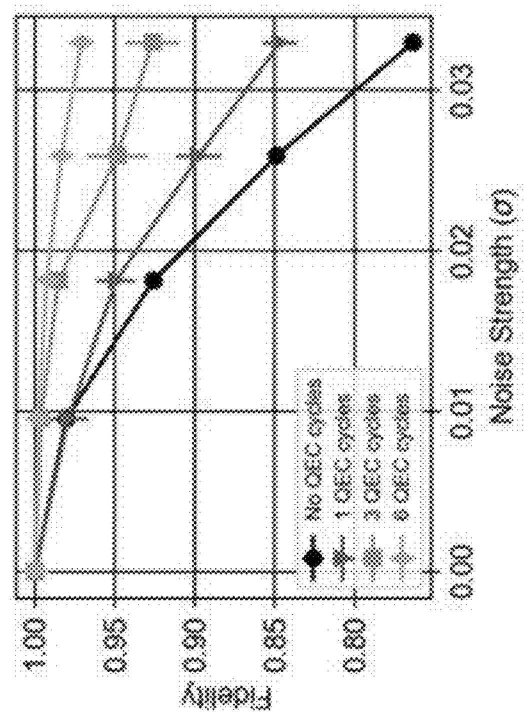

Referring to FIG. 7C, the Bell state fidelity is shown, for several different numbers of applications of QEC, as a function of probability of error during idle time for amplitude damping noise (decay rate of 0.1 Hz) on only one node and a five-qubit general QEC code on the noisy node.

Figure 7D:
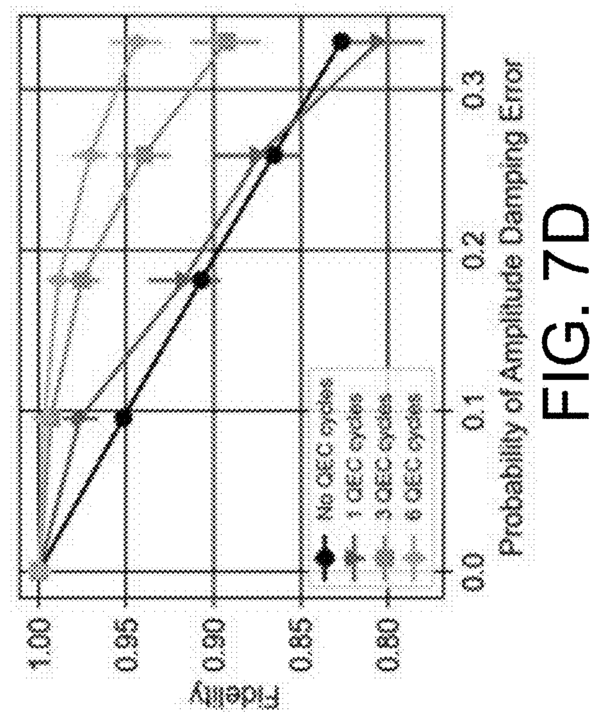

Referring to FIG. 7D, the Bell state fidelity is shown, for several different numbers of applications of QEC, as a function of probability of error during idle time for CFD noise (coupling strengths $g_1=1.0$, $g_2=0.5$) and a CFD error correcting code.

In some examples, the fidelity of a shared Bell state between Alice and Bob may also be degraded by adding additional gate operations, which add additional noise. Determining the threshold at which additional gate operations in a QEC code add more noise than they remediate may be important for creating a practical quantum error management scheme, where decisions can be made based in part on particular network and node parameters on which error mitigation protocols to run or not run. At a certain threshold, use of a QEC circuit may introduce more noise than it will mitigate.

Figure 8:
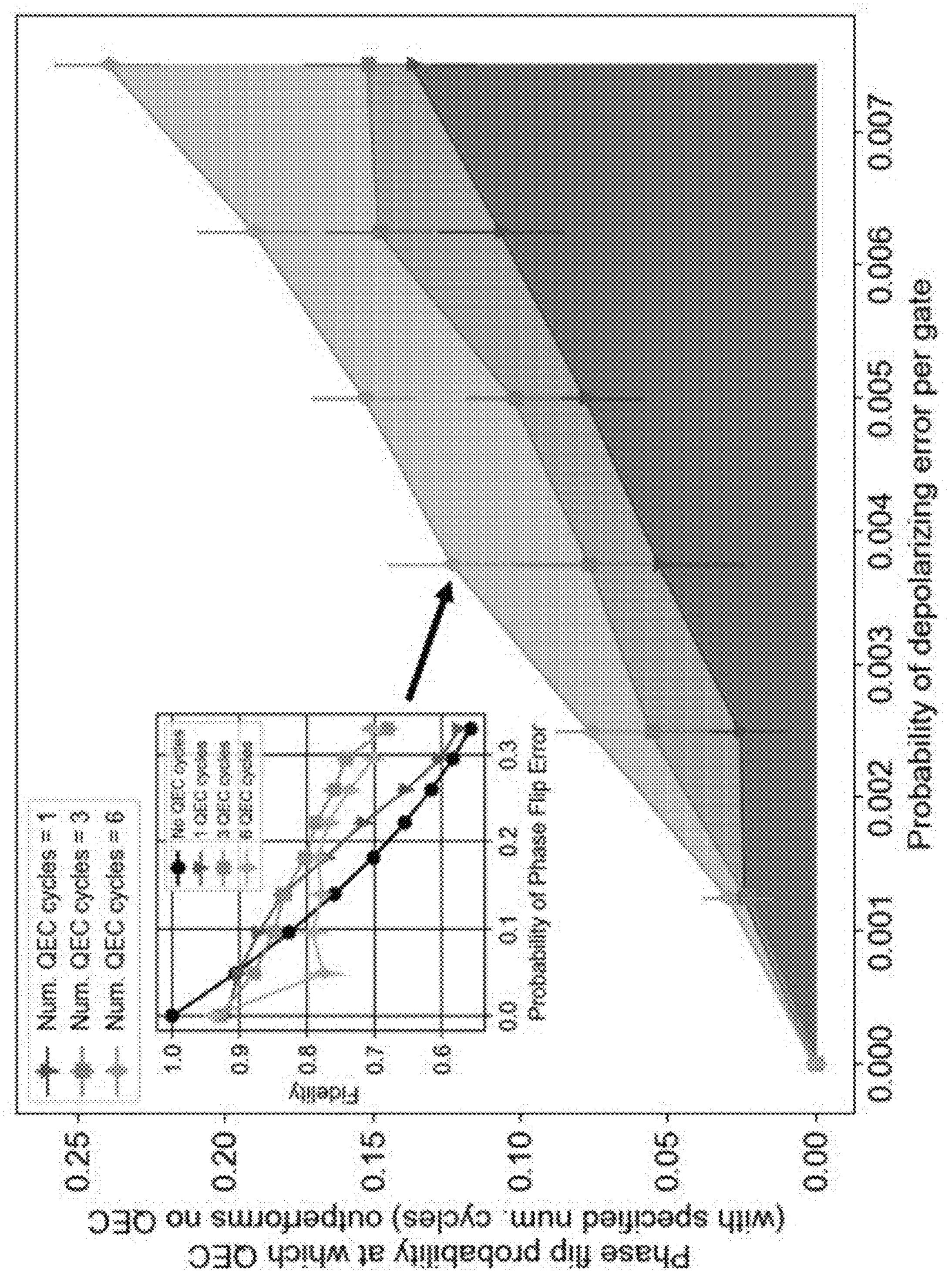
FIG. 8 shows prophetic plots of various example quantum error management schemes.
Figure 9B:
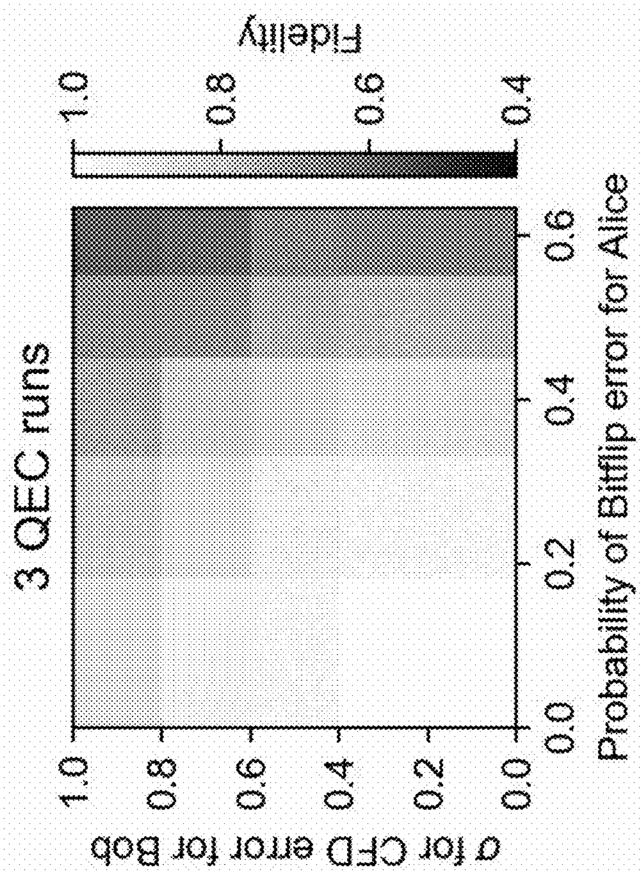
FIGS. 9A, 9B, 9C, and 9D show prophetic plots of fidelity of the shared entanglement as a function of the CFD noise on Bob and the probability of bit flip error for Alice, for various example quantum error management schemes.
Figure 9A:
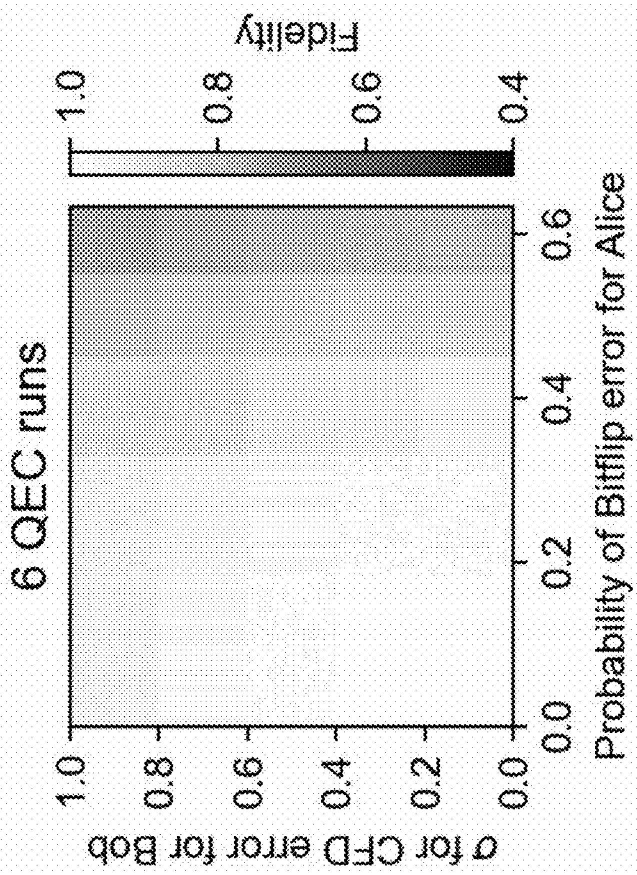
Figure 9D:
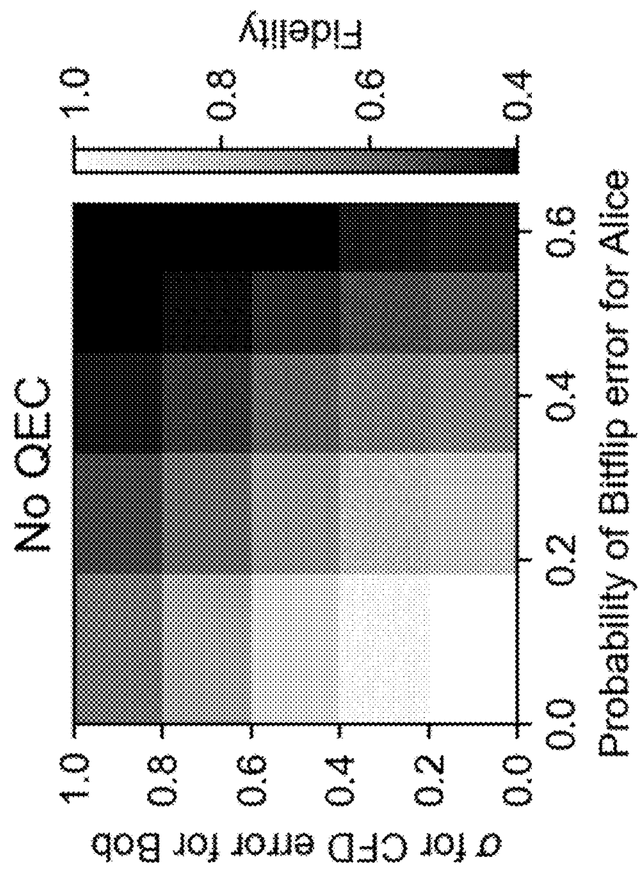
Figure 9C:
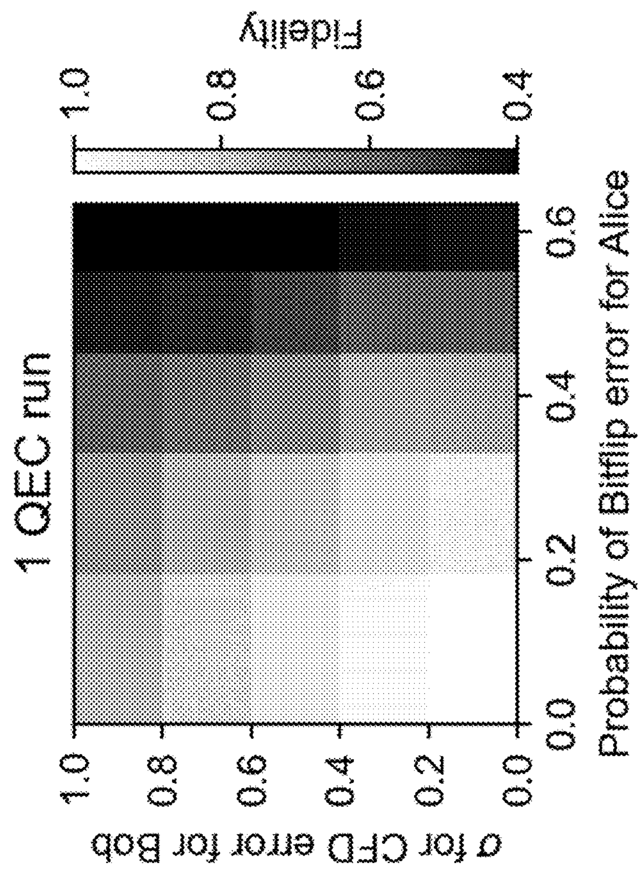

FIG. 8 shows a prophetic plot of the error probability threshold at which it becomes more beneficial, in terms of the fidelity of the shared Bell state, to apply QEC despite the associated added gate noise. The simulations use a phase flip error model for the qubit idle noise, and a depolarizing error model for the qubit gate noise. The inset prophetic plot shows the fidelities of a shared Bell state between Alice and Bob (mean calculated over 100 simulations) plotted against the probability of phase flip error during an idle noise time, for a gate depolarizing probability of 0.00375. The inset prophetic plot also shows that while at small probabilities of phase flip error, the additional gate noise introduced through the QEC code reduces the shared Bell state fidelity compared to the fidelity of a Bell state with no QEC, there is a threshold at longer noise durations where the QEC code results in higher fidelities. The threshold increases as the probability of gate noise error increases. Different numbers of repeated QEC cycles are also plotted.

QEC codes can be applied simultaneously to different quantum nodes sharing entanglement. This is possible even with different noise types and different QEC codes for each node.

FIGS. 9A, 9B, 9C, and 9D show prophetic plots of the mean fidelities for a shared Bell state between Alice and Bob, given different levels of noise for Alice and for Bob, and for different refresh rates, a single QEC application, or no QEC application. The simulations apply CFD noise and a CFD QEC code on Bob, and bit flip noise and a bit flip QEC code on Alice. The prophetic plots show that higher refresh rates can maintain higher fidelities for longer, but even a single QEC application applied by Alice, Bob, or both, can significantly improve fidelities.

Referring again to FIGS. 9A, 9B, 9C, and 9D, the results show that short QEC codes can be used as a noise management and error correction tool in near term quantum nodes that may have a limited numbers of qubits. In end-to-end entanglement swapping protocols, entangled pairs experience wait times during the protocol, during which they are susceptible to decoherence or other noise. When a short QEC code is applied concurrently to each entangled qubit in an entangled pair but on separate quantum nodes during these wait times, there may be increases in entangled pair fidelity. In some example, when the QEC codes are continuously repeated during the wait time, high-fidelity entangled states can be maintained for even longer durations than when the QEC code is applied only once at the end of the wait time. Although gate noise can reduce the benefits associated with short QEC code use, the transition where the cost of short QEC codes outweighs the benefit may be predicted or determined.

Local QEC/noise management is well-suited for quantum networking protocols and can be applied for multiple use cases within this context. Protecting entanglement during swapping protocols and teleportation can significantly improve performance metrics. For illustration purposes, the results were shown for bipartite entanglement, however, the results generalize to the multipartite case, thus allowing the protection of n-party entanglement arising in applications such as quantum switches supporting all-to-all connectivity with heterogeneous noise types at each node. The ability of local QEC to protect long-range entanglement without additional protocol overhead is an advantage over purification methods, although it does not preclude the use of purification since they can be used in tandem. For example, local QEC could be used to slow decoherence of shared entanglement while waiting for purification to run allowing it to operate in the lower fidelity regime with a larger coherence time improvement.

The methods described herein may use algorithms for optimal scheduling of mitigation actions given the available resources and noise environment. This may include determining sequential and/or parallel stabilizer schedules, adaptive encoding, and crossover regimes where one mitigation method/schedule outperforms the others. Large scale quantum networks may use a variety of quantum error management tools in order to achieve sufficiently high fidelity Bell states via end-to-end entanglement generation for reliable quantum communication.

The following Examples show how the adapted CFD code exhibits properties that may allow it to operate as a valid QEC code for protecting Bell states shared between nodes A (Alice) and node B (Bob). Without loss of generality and for illustrative purposes, the shared state considered in the following examples is the $\phi^+$ Bell state.

Example 1: Let $U_z \equiv (|\chi_0\rangle\langle\chi_0| - |\chi_1\rangle\langle\chi_1|)$. The stabilizer $U_s = U_z \otimes Z$ stabilizes the encoded states $|0\rangle \equiv |\chi_0\rangle|_0\rangle$ and $|1\rangle_L \equiv |\chi_1\rangle|1\rangle$ if $\langle\chi_0|\chi_1\rangle = 0$.

Example 2: A CFD encoded state of the form $$\psi_L = \frac{1}{\sqrt{2}}(|\chi_0\rangle_A|0\rangle_A|\chi_0\rangle_B|0\rangle_B + |\chi_1\rangle_A|1\rangle_A|\chi_1\rangle_B|1\rangle_B)$$

can be constructed from an initial state of the form $\psi_0 = |\chi_0\rangle_A|\chi_0\rangle_B\phi^+ = |\chi_0\rangle_A|\chi_0\rangle_B(|0\rangle_A|0\rangle_B + |1\rangle_A|1\rangle_B)$ using a controlled encoding operation $U_E$ which maps $|\chi_0\rangle \to |\chi_1\rangle$.

Example 3: A CFD encoded state of the form $$\psi_L = \frac{1}{\sqrt{2}}(|\chi_0\rangle_A|0\rangle_A|\chi_0\rangle_B|0\rangle_B + |\chi_1\rangle_A|1\rangle_A|\chi_1\rangle_B|1\rangle_B)$$

can be stabilized using local stabilizers $U_{S,A} \otimes I_B$, $U_{S,B} \otimes I_A$, and $U_{S,A} \otimes U_{S,B}$ where $U_{S,A} = U_{S,B} = U_z \otimes Z$.

Example 4: Let $|0\rangle_L \equiv |\chi_0\rangle|0\rangle$ and $|1\rangle_L \equiv |\chi_1\rangle|1\rangle$ represent logical states within the code subspace $C_0$. Let $H_E$ represent the error Hamiltonian mapping code space states to error subspace $C_1$ states: $H_E|0\rangle_L = k|\chi_1\rangle|0\rangle \equiv |0\rangle_E$ $H_E|1\rangle_L = k|\chi_0\rangle|1\rangle \equiv |1\rangle_E$ where k is a proportionality constant. The local stabilizers $U_S = U_z \otimes Z_2$ (applied to A and/or B sides) anti-commute with the local errors $E_A$, $E_B$ over CFD logical states $|\psi_L\rangle$:

$$\{U_{S,A}, E_A\}|\psi_L\rangle = 0$$

$$\{U_{S,B}, E_B\}|\psi_L\rangle = 0$$

Example 5: Let $|0\rangle_L \equiv |\chi_0\rangle|0\rangle$ and $|1\rangle_L \equiv |\chi_1\rangle|1\rangle$ represent logical states within the code subspace $C_0$. Let $H_E$ represent the error Hamiltonian mapping code space states to error subspace $C_1$ states: $H_E|0\rangle_L \propto |\chi_1\rangle|0\rangle \equiv |0\rangle_E$ $H_E|1\rangle_L \propto |\chi_0\rangle|\rangle \equiv |1\rangle_E$. The correction unitary $U_x = |\chi_0\rangle\langle\chi_1| + |\chi_1\rangle\langle\chi_0|$ corrects errors by mapping $U_x: |0\rangle_E \to |0\rangle_L$ and $U_x: |1\rangle_E \to |1\rangle_L$ if $\langle\chi_0|\chi_1\rangle = 0$.

From these Examples, we can see that our adaptation of the CFD code for protecting distributed entanglement works in a similar way to a repetition code with respect to the stabilizer properties and ability to detect (and in this case correct) errors. This follows from the Examples above: in Example 1 the stabilization of logical qubits is established, whereas in Example 3 the ability to stabilize the full distributed/encoded state using local stabilizers is shown. The construction of the encoded state is established in Example 2 and the ability to correct local errors is shown via Example 4. The detection of local errors using local stabilizers has the same structure as Eq. 22.

Figure 10A:
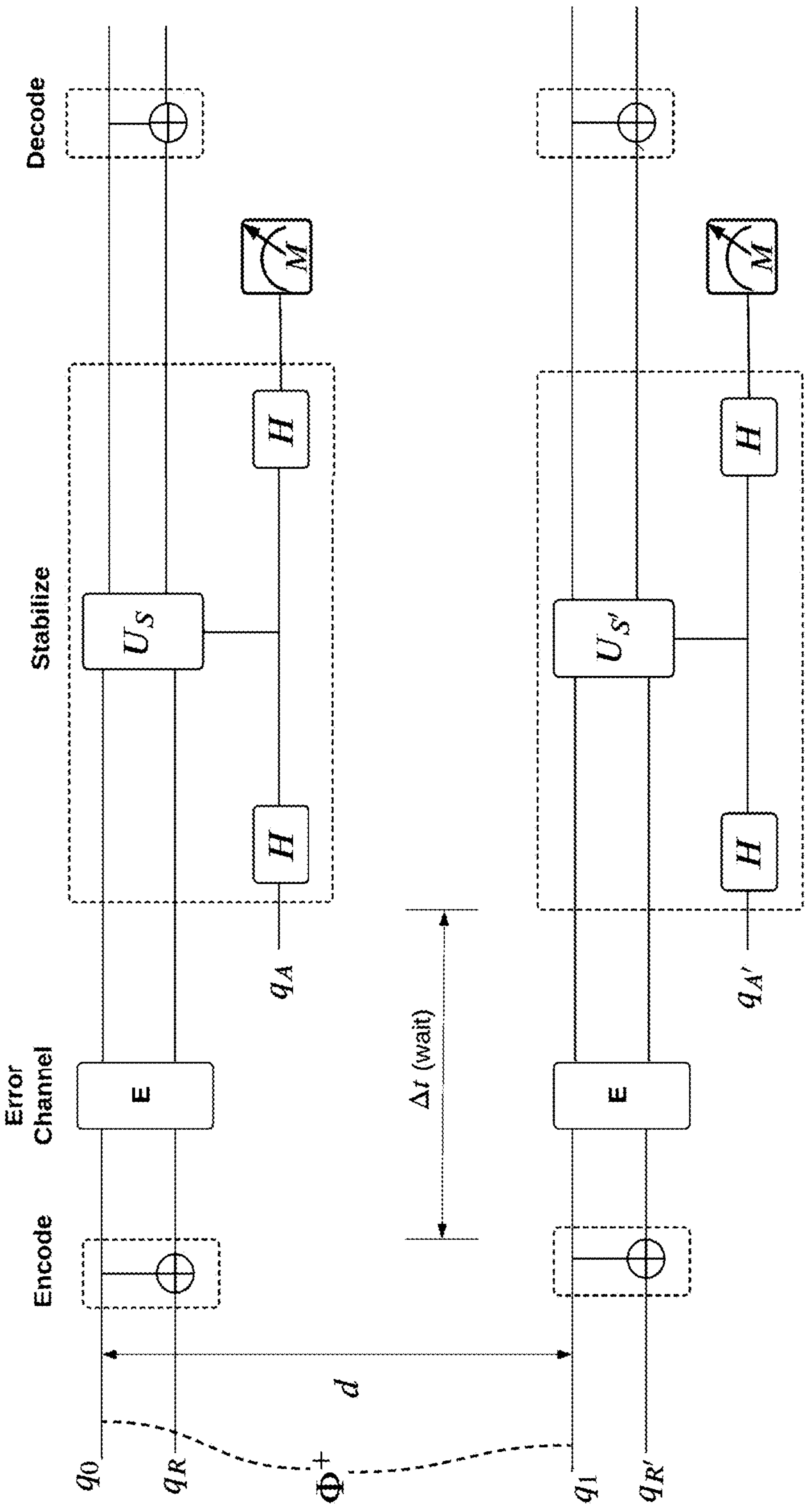
FIG. 10A shows a schematic diagram of an example error detection scheme using a distributed two-qubit code.

FIG. 10A shows an example error detection scheme using a distributed two-qubit code. In this example, a $\phi^+$ Bell state is distributed between two network nodes with each node applying local stabilizer operations using local 2-qubit codes to validate the joint state during the idle time after the encode step and before the stabilizer circuits validate the state. The initial state is:

$$\psi_0 = \Phi^+_{0,1}|q_R q_{R'} q_A q_{A'}\rangle = \frac{1}{\sqrt{2}}(|00\rangle_{0,1} + |11\rangle_{0,1})|0\rangle_R|0\rangle_{R'}|0\rangle_A|0\rangle_{A'} \tag{18}$$

The encoded state after the first CNOT operation on each endpoint is (suppressing normalization factors hereafter for clarity):

$$\psi_{Enc} = (|00\rangle_{0,1}|0\rangle_R|0\rangle_{R'} + |11\rangle_{0,1}|1\rangle_R|1\rangle_{R'})|0\rangle_A|0\rangle_{A'} \tag{19}$$

The logical state to protect is $$\psi_L \equiv (|00\rangle_{01}|0\rangle_R|0\rangle_{A'} + |11\rangle_{01}|1\rangle_R|1\rangle_{A'})$$

and so then $\psi_{Enc} = \psi_L|0\rangle_A|0\rangle_{A'}$. Also let $\tilde{\psi}_L \equiv E\psi_L$ where E is some error(s) occurring on $q_0$, $q_R$, $q_1$, and/or $q_{R'}$ assuming no gate noise on the stabilizer operations. Note that $\psi_L$ is decodable back to the usable $\phi^+$ state with additional CNOT operations on each side. After applying the first Hadamard of the stabilizer circuits on each side the state will become:

$$\psi_{S_1} = \tilde{\psi}_L(|0\rangle_A + |1\rangle_A)(|0\rangle_{A'} + |1\rangle_{A'}) \tag{20}$$

The terms where $q_A$ and $q_{A'}$ are $|1\rangle$ will generate control signals to enable the stabilizer operations $U_S$ in $q_0$, $q_R$, and $U_{S'}$ on $q_1$, $q_{R'}$ and so the state will become:

$$\psi_{S_2} = \tilde{\psi}_L|00\rangle_{AA'} + U_{S'}\tilde{\psi}_L|0\rangle_A|1\rangle_{A'} + U_S\tilde{\psi}_L|1\rangle_A|0\rangle_{A'} + U_S U_{S'}\tilde{\psi}_L|1\rangle_A|1\rangle_{A'} \tag{21}$$

Finally, after applying the last Hadamard operation in the stabilizer circuits the state will be:

$$\begin{aligned}\psi_S = &(I + U_{S'} + U_S + U_{S'}U_S)\tilde{\psi}_L|00\rangle_{AA'} + \\ &(I - U_{S'} + U_S - U_{S'}U_S)\tilde{\psi}_L|01\rangle_{AA'} + \\ &(I + U_{S'} - U_S - U_{S'}U_S)\tilde{\psi}_L|10\rangle_{AA'} + \\ &(I - U_{S'} - U_S + U_{S'}U_S)\tilde{\psi}_L|11\rangle_{AA'}\end{aligned} \tag{22}$$

The two-qubit code results from the previous section can be applied to the special case of single qubit bit flip errors occurring during the idle time. Since the expected errors are bit flips corresponding to X operations, the stabilizers can utilize Z operations to satisfy the anti-commutation requirement, (i.e., ZX=−XZ) and the stabilizer operations operating on the VL state in this special case become: $U_S = Z_0 Z_R I_1 I_{R'}$, $U_S = I_0 I_R Z_1 Z_{R'}$, and $U_S U_S = Z_0 Z_R Z_1 Z_{R'}$. The error syndromes can be determined as follows.

In the no-error case $E = I_0 I_R I_1 I_{R'}$ and $\tilde{\psi}_L = \psi_L$. The one-sided stabilizers $U_S$ and $U_{S'}$ stabilize the full (distributed) state since $Z_0 Z_R I_1 I_{R'}|\psi_L\rangle = I_0 I_R Z_1 Z_{R'}|\psi_L\rangle = Z_0 Z_A Z_1 Z_{R'}|\psi_L\rangle = |\psi_L\rangle$. This is a useful property of the bit flip channel. Based on this, the only non-vanishing term in Eq. 22 is the first one which means the no-error case is associated with syndrome $S=|00\rangle_{AA'}$. The other AA' terms cancel due to equal sign parity and invariance of the logical state to the stabilizer operations.

In the case where there are errors on $q_0$ or $q_R$ only, then $E=X_0I_R$ or $E=I_0X_R$ with $\tilde{\psi}_L=E\psi_L$ and the syndrome is $S=|10\rangle_{AA'}$. The anti-commutation of E with $U_S$ (and so also with $U_SU_{S'}$) results in all positive signs within the $|10\rangle_{AA'}$ term. The other AA' terms have sign changes but maintain equal sign parity and so vanish.

In the case where there are errors on $q_1$ or $q_{R'}$ only, then $E=X_1I_{R'}$ or $E=I_1X_{R'}$ with $\tilde{\psi}_L=E\psi_L$ and the syndrome is $S=|01\rangle_{AA'}$. The anti-commutation of E with $U_{S'}$ (and so also with $U_SU_{S'}$) results in all positive signs within the $|01\rangle_{AA'}$ term. The other AA' terms have sign changes but maintain equal sign parity and so vanish.

In the case where there are errors on $q_0$, $q_R$ and $q_1$, $q_{R'}$, then the X error occurs on ($q_0$ or $q_R$) and ($q_1$ Or $q_{R'}$). The degraded logical state will be $\tilde{\psi}_L=E\psi_L$ and the syndrome will be $S=|11\rangle_{AA'}$. The anti-commutation of E with $U_S$ and $U_{S'}$ results in all positive signs within the $|11\rangle_{AA'}$ term. The other AA' terms have sign changes but maintain equal sign parity and so vanish.

The above example analysis shows that it is possible to detect single bit flip errors in the distributed Bell state by using local one-sided stabilizers, but that it cannot be determined in which physical qubit the error occurred. This information can still be useful within a network protocol to inform the controller that the entanglement needs to be restarted. In the following description, multi-qubit codes are explored which will allow correction/recovery actions to be performed and therefore can effectively extend the coherence time of the quantum memories.

FIG. 10B shows a table of example error syndromes, the stabilizers involved in error detection, and possible underlying error locations, for a distributed two-qubit code with an assumed ancilla qubit order of $$q_A q'_A.$$

Note that multiple underlying error conditions can be aliased onto the same error syndrome and not all of these possible conditions are enumerated in the table. The two-qubit code cannot detect errors occurring on both physical qubits within the same logical qubit. Undetectable errors will show up as an error syndrome of 0.

Figure 10C:
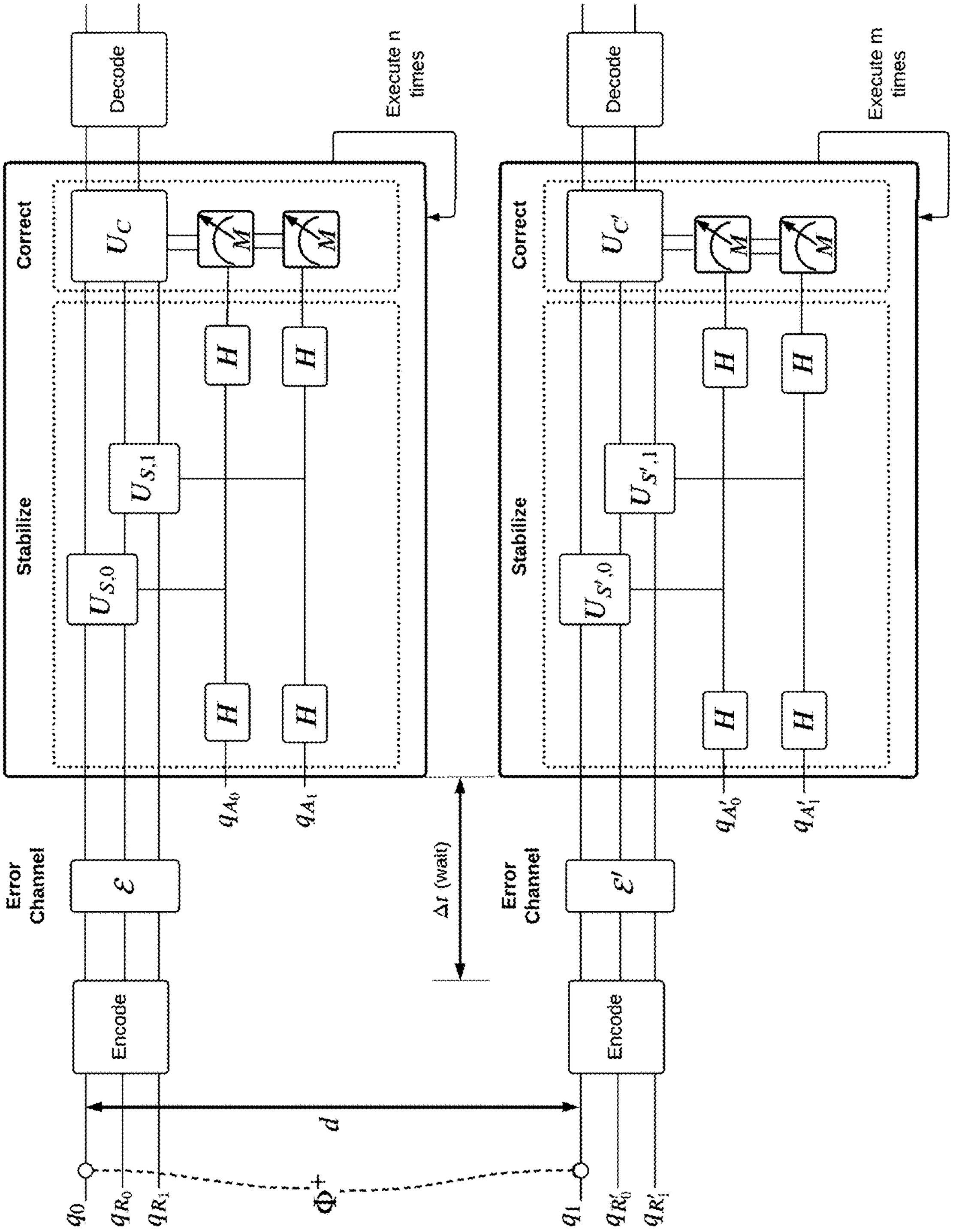
FIG. 10C shows a schematic diagram of an example error detection and correction scheme using a distributed three-qubit code.

FIG. 10C shows an example error detection and correction scheme using a distributed three-qubit code. In this example, there are two redundancy qubits on each node to encode the logical state $$\psi_L = \frac{1}{\sqrt{2}}|000000\rangle + |111111\rangle$$

(with assumed qubit order $$|q_0 q_1 q_{R_0} q_{R'_0} q_{R_1} q_{R'_1}\rangle)$$

and two ancillary qubits to control the stabilizer operations. Proceeding as before, the state prior to the final Hadamard operation in the stabilizer circuit can be written as (with the ancillary qubit order as $$|q_{A_0} q_{A_1} q_{A'_0} q_{A'_1}\rangle):$$

$$\begin{aligned}\psi_{S_2} = {} & \tilde{\psi}_L|0000\rangle + U_{S',1}\tilde{\psi}_L|0001\rangle + U_{S',0}\tilde{\psi}_L|0010\rangle + U_{S',0}U_{S',1}\tilde{\psi}_L|0011\rangle + \\ & U_{S,1}\tilde{\psi}_L|0100\rangle + U_{S,1}U_{S',1}\tilde{\psi}_L|0101\rangle + U_{S,1}U_{S',0}\tilde{\psi}_L|0110\rangle + \\ & U_{S,1}U_{S',0}U_{S',1}\tilde{\psi}_L|0111\rangle + U_{S,0}\tilde{\psi}_L|1000\rangle + U_{S,0}U_{S',1}\tilde{\psi}_L|1001\rangle + \\ & U_{S,0}U_{S',0}\tilde{\psi}_L|1010\rangle + U_{S,0}U_{S',0}U_{S',1}\tilde{\psi}_L|1011\rangle + \\ & U_{S,0}U_{S,1}\tilde{\psi}_L|1100\rangle + U_{S,0}U_{S,1}U_{S',1}\tilde{\psi}_L|1101\rangle + \\ & U_{S,0}U_{S,1}U_{S',0}\tilde{\psi}_L|1110\rangle + U_{S,0}U_{S,1}U_{S',0}U_{S',1}\tilde{\psi}_L|1111\rangle\end{aligned}$$

If each stabilizer $U_{S,0}$, $U_{S,1}$, $U_{S',0}$, $U_{S',1}$ stabilizes the distributed logical state and local stabilizers which potentially overlap also exhibit this property, then a valid 3-qubit distributed QEC code can be constructed. For example, if $U_{S,0}=Z_0Z_{R0}$ and $U_{S,1}=Z_{R0}Z_{R1}$ then $U_{S,0}U_{S,1}=Z_0Z_{R_1}$ which is a valid stabilizer for the logical state (for bit flip channels). After the final Hadamard operation in the stabilizer circuits on both sides, the stabilizer state Ws can be expanded in terms of the measured state of the ancillary qubits (the error syndrome) and the stabilizer operations.

FIG. 10D shows a table of example error syndromes, the stabilizers involved in error detection, and possible underlying error locations, for a distributed three-qubit code with an assumed ancilla qubit order $q_{A_0}q_{A_1}q_{A_0'}q_{A_1'}$. Note that multiple underlying error conditions can be aliased onto the same error syndrome and not all of these possible conditions are enumerated in the table. Some of the relatively higher-probability aliased conditions are shown in parentheses.

Here an example Hadamard transform is considered. Consider an initial state given by:

$$\psi = a_{00}|00\rangle + a_{01}|01\rangle + a_{10}|10\rangle + a_{11}|11\rangle \tag{23}$$

By applying a Hadamard operation on each qubit (e.g., apply the operator $H_0 \otimes H_1$), the basis state will be transformed as:

$$\begin{aligned}|00\rangle \to \frac{1}{2}(|0\rangle + |1\rangle)(|0\rangle + |1\rangle),\ |01\rangle \to \frac{1}{2}(|0\rangle + |1\rangle)(|0\rangle - |1\rangle), \\ |10\rangle \to \frac{1}{2}(|0\rangle - |1\rangle)(|0\rangle + |1\rangle),\ |11\rangle \to \frac{1}{2}(|0\rangle - |1\rangle)(|0\rangle - |1\rangle).\end{aligned}$$

Thus, each of the original basis states is transformed into a linear superposition of all basis states. This means that the amplitude of each original basis state will make a contribution to the amplitude of all of the new basis states, which is seen after combining terms:

$$\begin{aligned}\psi' = {} & (a_{00} + a_{01} + a_{10} + a_{11})|00\rangle + (a_{00} - a_{01} + a_{10} - a_{11})|01\rangle + \\ & (a_{00} + a_{01} - a_{10} - a_{11})|10\rangle + (a_{00} - a_{01} - a_{10} + a_{11})|11\rangle\end{aligned}$$

Indexing the original basis states as $|m_0m_1\rangle$ and the new basis as $|k_0k_1\rangle$, then the condition where the sign of each contribution becomes negative can be determined. Wherever $m_i=1$ in the original basis there is the possibility of a negative sign due to the action of the Hadamard but the negative sign is only assured when the corresponding index $k_i=1$ because this is the portion of the output superposition where the sign change actually occurred in the new basis. Therefore the output state can be expressed as:

$$\psi' = \sum_{k_0\in 0,1}\sum_{k_1\in 0,1}\left(\sum_{m_0\in 0,1}\sum_{m_1\in 0,1}(-1)^{m_0k_0}(-1)^{m_1k_1}a_{m_0m_1}\right)|k_0\rangle|k_1\rangle \tag{24}$$

Which can be written more compactly written as:

$$\psi' = \sum_k\sum_m(-1)^{m\cdot k}a_m|k\rangle \tag{25}$$

where m·k is the inner product of the index bitstrings. This result is generalizable to larger state spaces by summing over the additional dimensions while keeping the analogous sign logic.

The stabilizer state for the distributed three qubit code (i.e., the output of the stabilizer circuits) can be used to determine how the error syndromes map to the stabilizer operations. The ancilla qubit order is $$q_{A_0}q_{A_1}q_{A_0'}q_{A_1'}.$$

Some implementations of the techniques described herein can be implemented in a layered quantum networking environment. The description below includes a variety of example implementations of features of a layered quantum networking environment.

Figure 11:
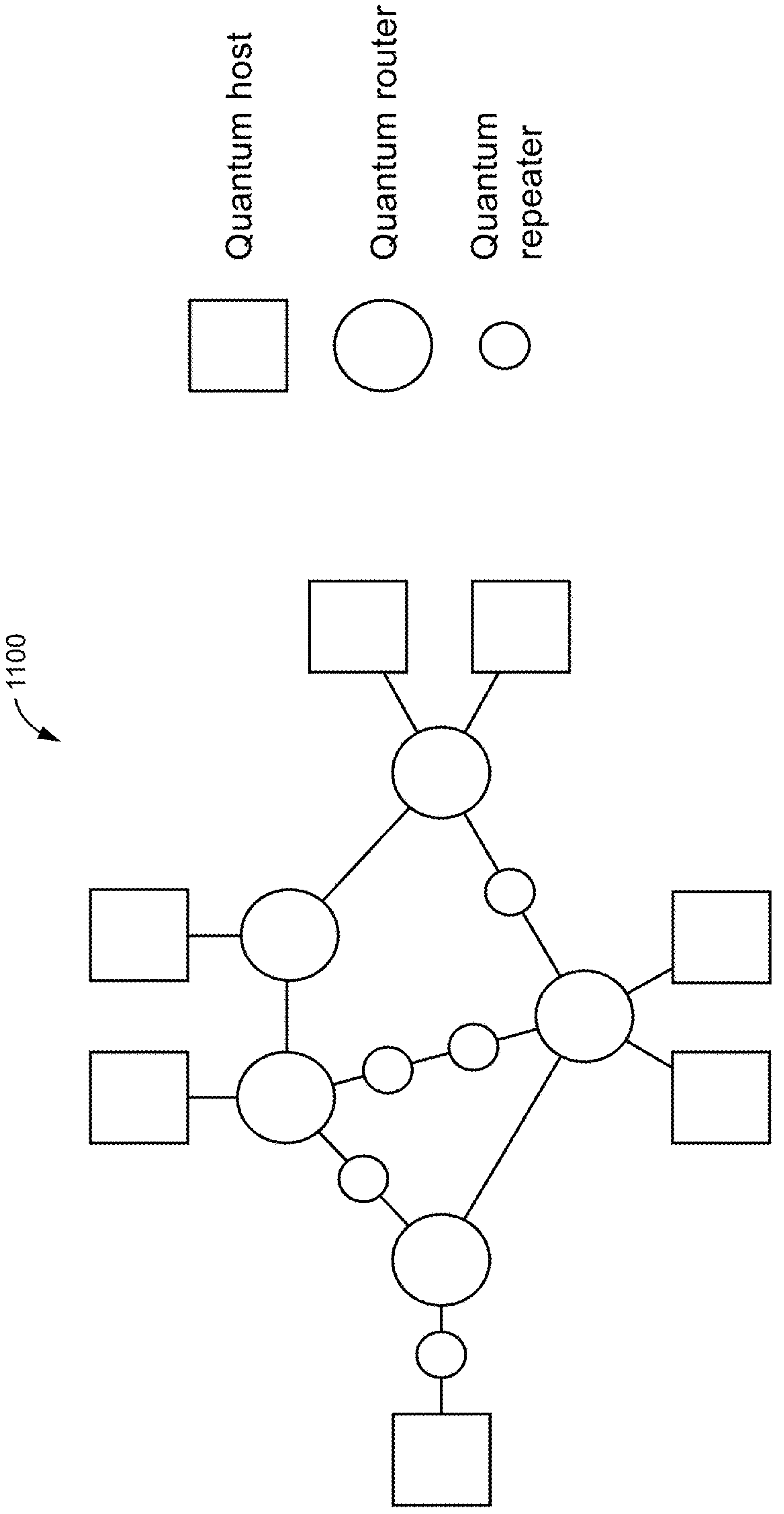
FIG. 11 is a schematic diagram of an example quantum networking environment.

FIG. 11 shows an example quantum networking environment 1100 that includes nodes that have been enabled to facilitate the establishment of entangled quantum states associated with quantum elements in different quantum nodes that have been entangled with each other. Some of the nodes in this environment include quantum host nodes comprising quantum elements configured to store quantum states for some periods of time, over which the fidelity of those quantum states may be changing. For example, a quantum element can be implemented using any of the following: a color center defect (e.g., NV centers) in a crystal material (e.g., diamond), an atom or ion trapped in an electromagnetic field, an ensemble of atoms in a vapor cell, an electric current in a superconducting circuit, a structure in a semiconductor material having multiple energy levels (sometimes referred to as a quantum dot or artificial atom), or a topological qubit arrangement. There are also quantum router nodes and quantum repeater nodes, also comprising quantum elements, at which entanglement swap operations can be performed as part of a schedule for establishing end-to-end entanglements. A layered set of protocols can be used to manage the entanglement produced within various portions of the quantum networking environment 1100. The quantum networking environment 1100 may also include nodes that do not contain any quantum elements but do participate in determining and/or transmitting real-time classical messages or other messages sent on a classical communication channel.

For ease of reference, this portion of the Detailed Description includes various sections that together describe a variety of example implementations of aspects of a layered quantum networking environment. The division of this portion of the description into sections does not necessarily limit the applicability of the features described to those respective sections. The multiple layers of different example implementations of the quantum networking environment 1100 that are described throughout various sections enable various functions on and between the nodes of a quantum network, and on other devices that are part of the nodes or otherwise support the quantum networking environment 1100. For example, the multiple layers may include a swapping layer of a quantum network control plane. The swapping layer runs a swapping protocol, which performs a series of entanglement swap operations to stitch elementary entanglements together to produce end-to-end entanglements. Other layers in some implementations of the quantum networking environment 1100 may include an elementary entanglement generation layer, a distillation/purification layer, and a teleportation layer, for example.

2. Quantum Hosts, Routers, Repeaters, and Nodes

One example of a swapping protocol disclosed herein produces a series of end-to-end entangled qubit pairs between a pair of quantum hosts, which we refer to as quantum host A and quantum host B.

In some examples, whenever an end-to-end entangled pair of qubits is produced, one qubit of the pair is delivered to quantum host A and the other qubit of the pair is delivered to quantum host B.

A quantum host is a device that hosts the quantum application which can utilize or store the produced end-to-end entanglement. Examples of quantum hosts include: quantum computers that perform a clustered or distributed quantum computation, devices that use quantum secure communications based on entanglement (e.g., the E91 protocol), and sensors in a distributed quantum sensing application. Quantum hosts are sometimes also referred to as quantum endpoints or quantum end-nodes.

For explanation purposes only, an embodiment of the system with bi-partite entanglement is considered herein, and hence there are two quantum hosts. In general, multi-partite entanglement (e.g., Greenberger-Horne-Zeilinger (GHZ) states) amongst three or more hosts may be generated by an appropriately configured quantum networking environment, assuming the quantum operational capabilities on the quantum repeater nodes and quantum router nodes are sufficient. In some examples of bi-partite entanglement, the two quantum hosts are not directly connected to each other. For example, they may be connected to each other indirectly with some number of quantum repeaters or quantum routers in between. The quantum repeaters and quantum routers are responsible for producing point-to-point elementary entanglements and for performing entanglement swapping to concatenate those point-to-point elementary entanglements together to form end-to-end entanglements. Examples of concatenating the point-to-point elementary entanglements together in this manner are described in more detail within various examples included herein, which may refer to a process of "stitching" together, or otherwise combining, the results of different entanglement operations at various intermediate stages until end-to-end entanglement is achieved between particular "end" nodes. One difference between a quantum repeater and a quantum router is that a quantum repeater has exactly two interfaces to quantum channels whereas a quantum router can have more than two interfaces.

In general, many of the swapping protocol procedures are exactly the same for quantum repeaters and quantum routers. In some implementations, the main difference is that a quantum repeater swaps entanglements associated with a fixed pair of interfaces, whereas a quantum router has to make a choice of which two interfaces' entanglements to perform a swap operation on. Unless specifically mentioned otherwise, the terms quantum repeater and quantum router are used interchangeably herein. In other implementations, in addition to selecting two interfaces for using or distributing bipartite entanglement, a quantum router is able to make use of any number of interfaces associated with using or distributing multi-partite entanglement (e.g., in a protocol among three or more nodes, as described in more detail below).

In some implementations, quantum repeaters and quantum routers are implicitly also quantum hosts. Herein, quantum nodes refer to quantum hosts, quantum repeaters, and quantum routers collectively. For explanation purposes only, the "quantum" adjective may be omitted herein (e.g., hosts, routers, repeaters, and nodes). As used herein, a quantum communication channel configured to carry quantum states encoded on quantum signals may be free of certain devices that may be part of a classical channel configured to carry classical messages. For example, devices such as optical amplifiers, or optical-to-electronic and electronic-to-optical conversion devices, which may be part of a classical communication channel, may be absent in a quantum communication channel. Some implementations of quantum communication channels consist essentially of one or more optical propagation media that are configured for all-optical propagation over a significant portion of the channel (e.g., optical waveguides on a chip, optical fibers, free space communication links through the atmosphere, or satellite links) and devices such as transmitters, receivers, transceivers, that are configured for optical signal generation and detection. A quantum signal encoded on an optical wave may have an electromagnetic wavelength spectrum with a peak wavelength that falls in a particular range (e.g., between about 100 nm to about 1 mm, or some subrange thereof). As used herein, a quantum device, element, or channel may have the ability to store or transmit a quantum state, or constituent of an entangled quantum state, and a classical device, element, or channel may lack the ability to store or transmit a quantum state, or constituent of an entangled quantum state.

The network of nodes within the quantum network can correspond to any of a variety of types of networks. For example, network of nodes can correspond to a network of quantum computers. Each quantum computer can include a quantum processor that has a set of quantum elements (also referred to as the qubits of the quantum processor, or as a quantum register), and other circuitry such as control circuitry that is used to perform quantum gate operations on the quantum elements. In such a quantum network, at least a first quantum processor in a first quantum computer is coupled to at least a second quantum processor in a second quantum computer over a quantum communication channel between at least the first processor and the second quantum processor. The quantum communication channels may extend over a long distance (e.g., 10s of kilometers over a regional network) or over short distances (e.g., over 10s of meters within a data center). Alternatively, the network of nodes can correspond to a network of quantum processors within a quantum computer (e.g., to scale the quantum computer to a larger number of quantum elements) in which a network of quantum processors comprises respective sets of quantum elements within the quantum processors, with at least a first quantum element in a first quantum processor coupled to at least a second quantum element in a second quantum processor over a quantum communication channel between at least the first quantum element and the second quantum element. Alternatively, the network of nodes can correspond to a network of quantum sensors (e.g., telescopes in an array of telescopes that are configured to implement long-baseline optical intensity interferometry that yields a larger effective aperture). Or, the network of nodes can correspond to a network of nodes that can include quantum modules that support certain quantum protocols, such as quantum key distribution (QKD) or other quantum cryptographic protocols such as quantum secure direct communication (QSDC).

3. Quantum Network Stack Software

Each quantum network node (i.e., each quantum host, each quantum router, and each quantum repeater) may runs software to implement functionality of the various layers within the quantum networking environment 100, also referred to as a "quantum network stack." In some examples, there is also software that runs on a centralized controller, which is described in detail below. The qualifier "on-device" may be used to refer specifically to software that runs on the distributed quantum network nodes as opposed to the centralized controller. In classical networks, the term control plane software is sometimes used to refer to the on-device network stack software. As used herein, the terms control plane and data plane may be used to refer to certain features of the classical communication that occurs in the quantum network, in addition to features that are specific to quantum networks, which may have a variety of characteristics that are not present in strictly classical systems that do not include any quantum networking devices.

4. Network Stack Software Responsibilities

Figure 12A:
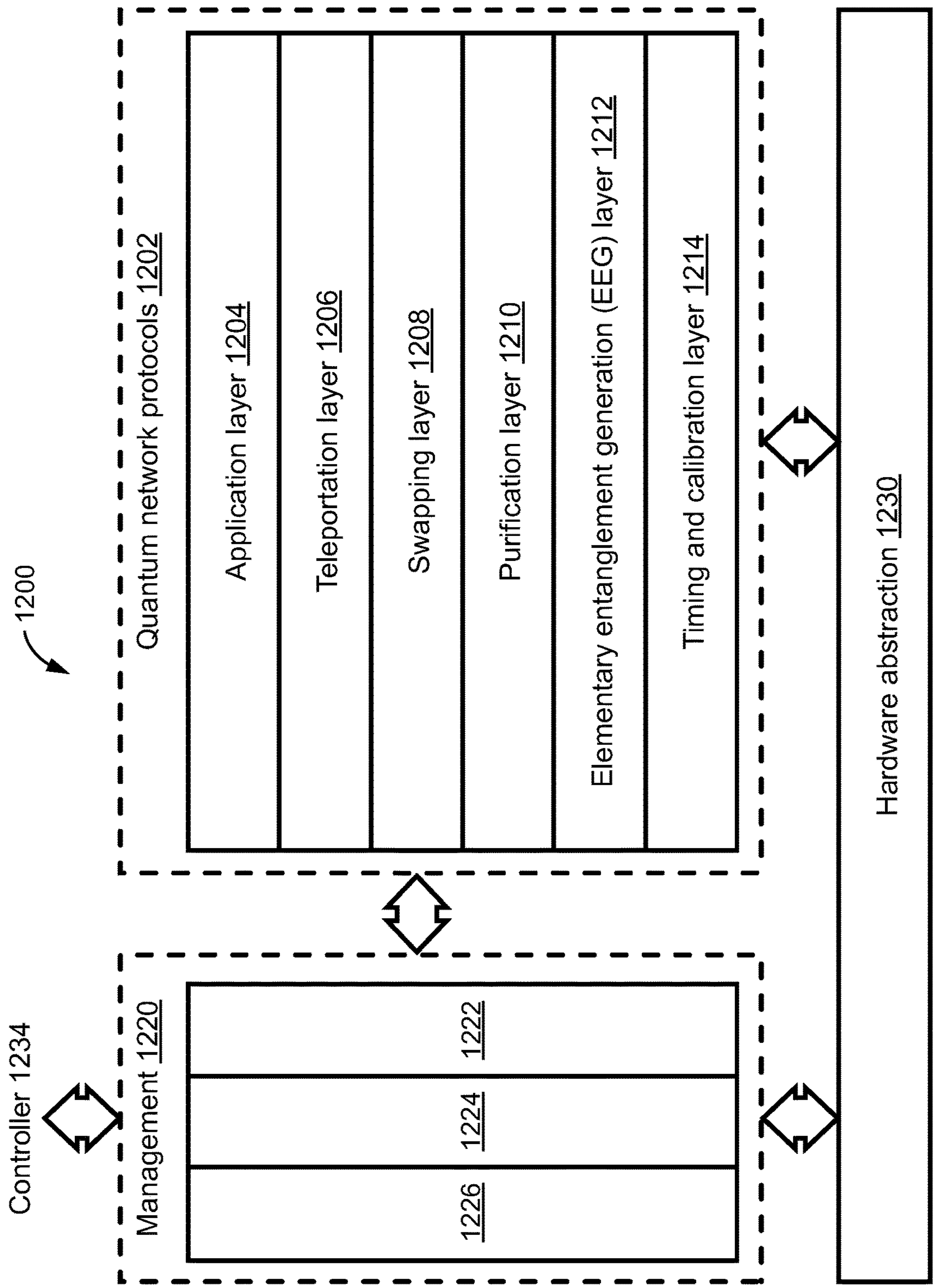
FIG. 12A is a schematic diagram of example set of quantum network stack subsystems.

FIG. 12A shows an example set of quantum network stack subsystems 1200. The on-device quantum network stack software may include multiple subsystems, such as a quantum network protocols subsystem 1202 (e.g., associated with a protocol stack), a management subsystem 1220, and a hardware abstraction subsystem 1230. The quantum network protocols subsystem 1202 can run the actual quantum network protocols between the quantum node and its peers. The protocols may be divided into layers, each with a specific responsibility (similar to the OSI reference model in classical networking). Examples of such layers can include an application layer 1204, a teleportation layer 1206, a swapping layer 1208, a purification layer 1210, an elementary entanglement generation layer 1212, and a timing and calibration layer 1214. The management subsystem 1220 can provide management functions. It may be responsible for configuration and monitoring of various aspects of the quantum network stack (e.g., protocol management 1222, quantum memory management 1224, and fidelity management 1226 (e.g., fidelity tracking performed using a fidelity estimation unit, described in more detail below)). The management subsystem 1220 can be in communication with the quantum network protocols subsystem 1202, the hardware abstraction subsystem 1230, and/or a controller subsystem 1234. The hardware abstraction subsystem 1230 may be responsible for abstracting the details of the hardware and may be in communication with the quantum network protocols subsystem 1202. It may allow the rest of the quantum network stack software to be platform independent (i.e., portable across multiple hardware platforms).

The controller subsystem 1234 can determine and install a set of rules and configurations for the quantum network protocols subsystem 1202 and the management subsystem 1220 to govern the behavior of network operations. An example rule set for the management subsystem 1220 programmatically describes a set of conditions and actions that govern how entanglement fidelity is estimated and tracked, and setting minimum fidelity thresholds to guarantee the requisite quality of service for the network application. Another example rule set for the management subsystem 1220 programmatically describes a set of conditions and actions that govern quantum resource provisioning between different virtual circuit requests and different protocols therein. In a resource-constrained network environment, quantum resources, such as quantum memories, are in great demand by several network protocols (e.g., elementary entanglement generation, purification protocol, swapping protocol) and potentially a multitude of virtual circuit requests. Rule sets, determined and installed by the controller subsystem 1234, may be useful for serving the demand placed on quantum resources. Another example rule set for the quantum network protocols subsystem 1202 programmatically describes a set of conditions and actions that determine which protocol variants to run, and govern when and how certain protocol instances are scheduled relative to each other, depending on network state (e.g., purify on elementary entanglements before swapping, set the scheduled sequence of swapping operations across repeaters in the determined path, regenerate entanglement once estimated fidelity falls below a certain threshold, wait for a confirmation message before attempting the next entanglement). The determination of such rule sets by the controller subsystem 1234 may optimize for some metric aggregating user fairness, network utility, and network performance, while taking into account factors such as network operational state, network demand, topology, resource availability, real-time telemetry, hardware characteristics, and quality of service parameters (i.e., requested end-to-end entanglement generation rate and fidelity).

5. Quantum Network Protocols Subsystem

In some examples, the swapping protocol disclosed herein consumes (i.e., utilizes and perhaps collapses parts of the quantum state) elementary entanglements that are generated by the elementary entanglement generation (EEG) protocol between neighboring nodes. The EEG protocol can be implemented using any of a variety of techniques (e.g., meet-in-the-middle, node-source, midpoint-source), depending on the capabilities of the hardware comprising each node participating in the point-to-point elementary entanglement.

Figure 12B:
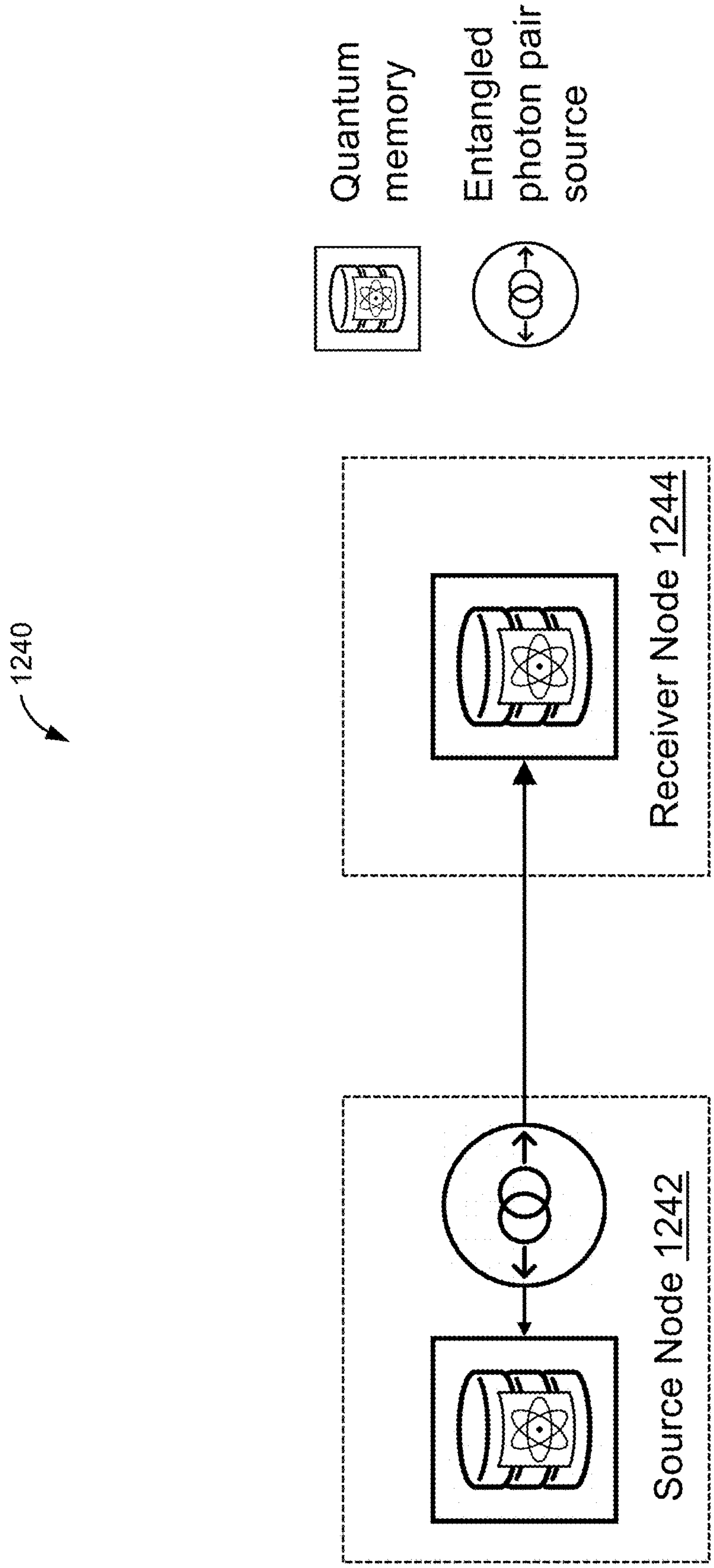
FIGS. 12B-12D are schematic diagrams of example entanglement generation techniques.

FIG. 12B shows an example node-source technique 1240 for generating point-to-point elementary entanglement between two quantum memories on neighboring nodes where each node (dashed rectangles) has a specific responsibility for implementing the EEG protocol. A first source node 1242 includes at least a quantum memory (cylinder with atomic symbol) and an entangled photon pair source (overlapping circles with two arrows). A second receiver node 1244 includes at least a quantum memory. To generate an elementary entanglement between the two quantum memories, one photon of the generated entangled pair is received by the local quantum memory in source node 1242, and the other photon is transmitted to receiver node 1244 and received by the remote quantum memory on receiver node 1244. It is not a requirement that elementary entanglement be established and stored in a pair of quantum memories. In a more general quantum network, elementary entanglement can be established between a variety of node types (e.g., the photons can be routed to anything that stores and/or consumes the elementary entanglement).

Figure 12C:
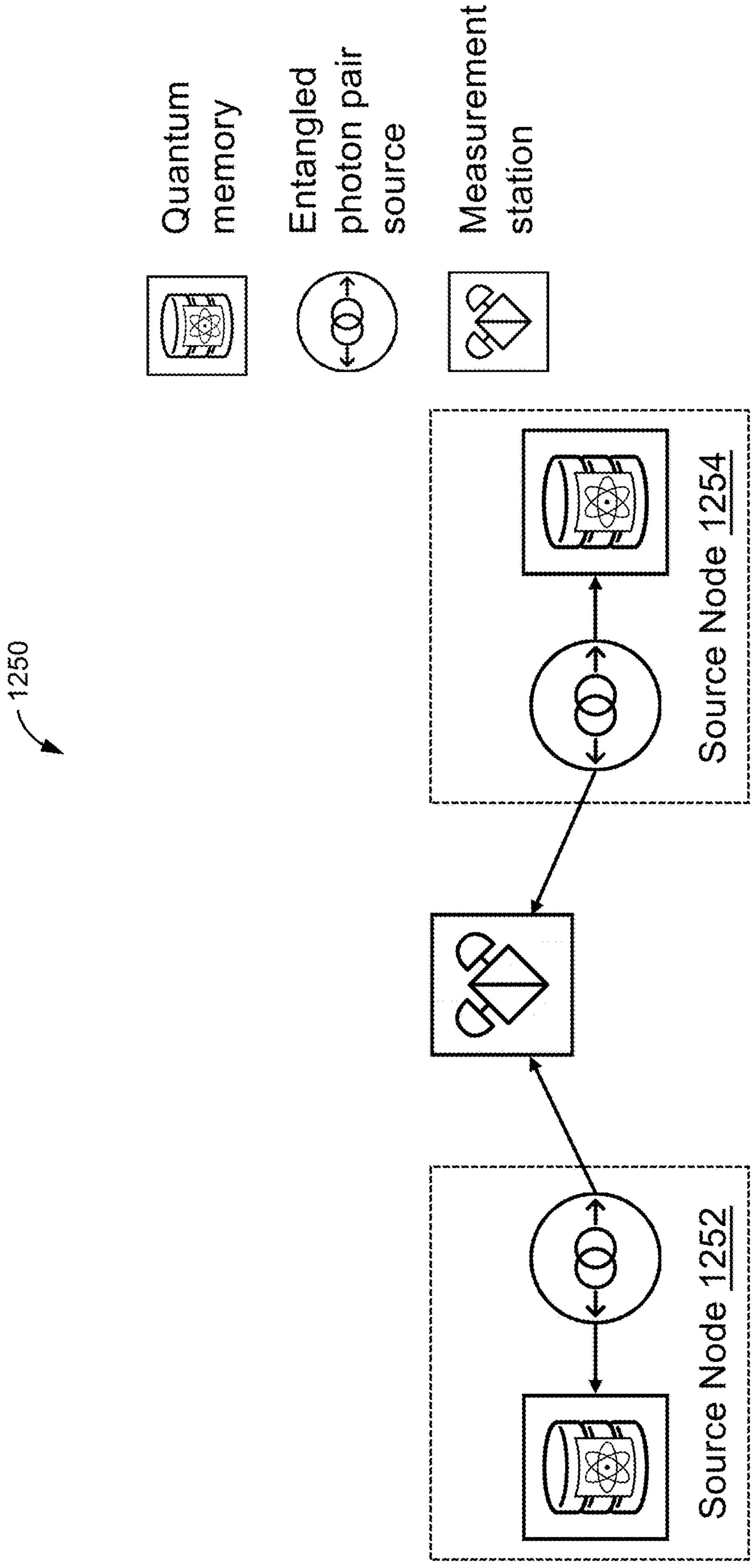

FIG. 12C shows an example meet-in-the-middle technique 1250 for generating point-to-point elementary entanglement between two quantum memories on neighboring nodes where each node (dashed rectangles) has a respective responsibility for implementing the EEG protocol. Both source nodes 1252 and 1254 consist of at least a quantum memory and an entangled photon pair source. Somewhere along the quantum channel between source node 1252 and 1254 is a measurement station (square with two semicircles), consisting of at least a set of optical components and photon detectors (semicircles), responsible for conducting measurements on received photon pairs and communicating classical measurement results back to the source nodes 1252 and 1254. In order to generate elementary entanglement between the quantum memories at source nodes 1252 and 1254, each entangled photon pair source at source nodes 1252 and 1254 emits one of its photons to the local quantum memory, and transmits the other half of the photon pair to the measurement station. For successful establishment of high-fidelity elementary entanglement, the independent photons arriving at the measurement station should be as indistinguishable as possible across all relevant degrees of freedom. An example constraint on the system is to ensure that the inter-photon arrival time at the measurement station is reduced below an appropriate threshold (e.g., a threshold on the order of nanoseconds).

Figure 12D:
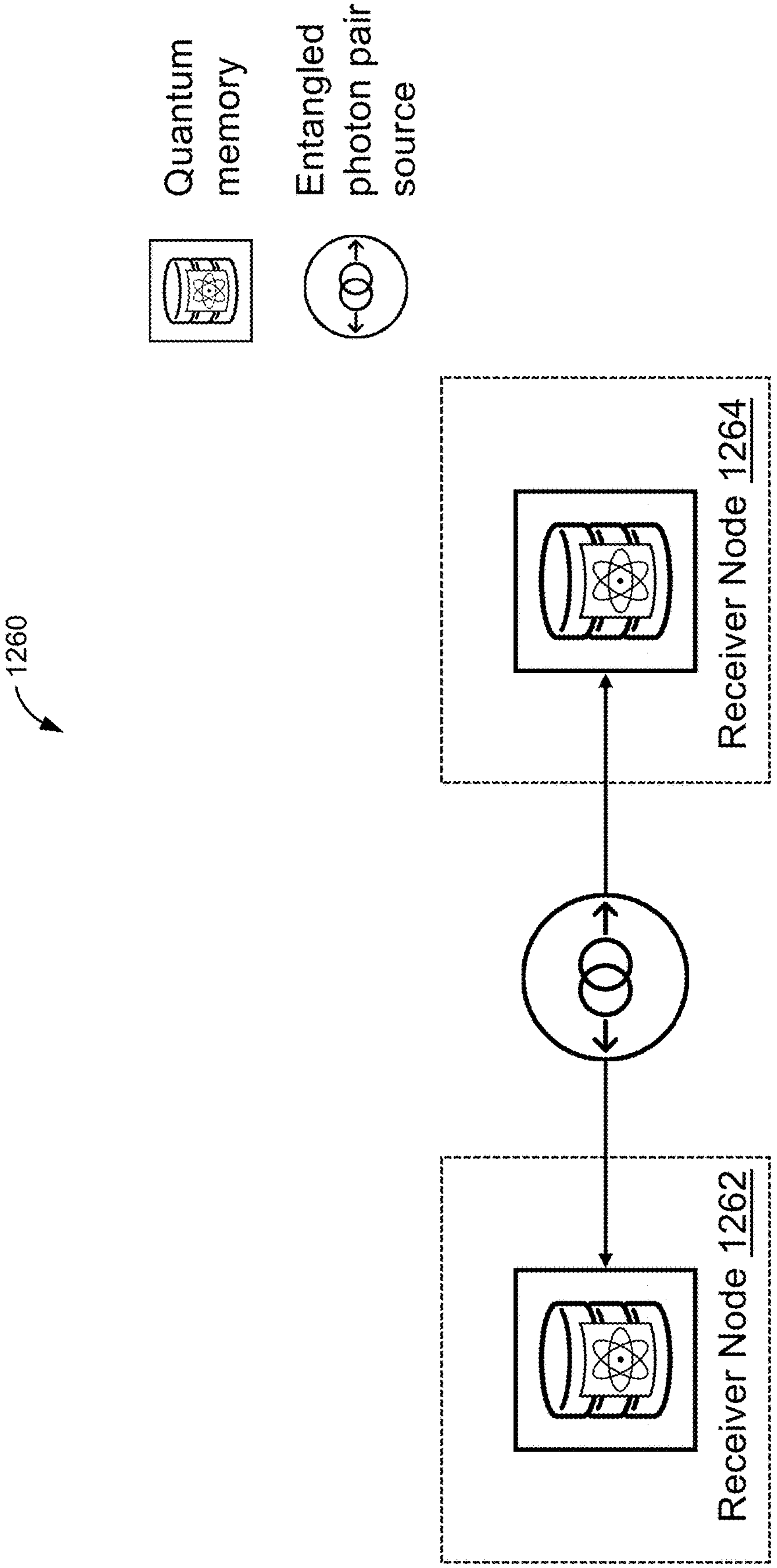

FIG. 12D shows an example midpoint-source technique 1260 for generating point-to-point elementary entanglement between two quantum memories on neighboring nodes where each node (dashed rectangles) has a respective responsibility for implementing the EEG protocol. Both receiver nodes 1262 and 1264 consist of at least a quantum memory. Somewhere along the quantum channel between receiver node 1262 and 1264 is an entangled photon pair source (overlapping circles with two arrows) responsible for generating and transmitting entangled photons to both receiver nodes 1262 and 1264. To successfully establish entanglement between receiver nodes 1262 and 1264, one photon from the entangled photon pair source is transmitted and received by the quantum memory on receiver node 1262, and the other photon from the generated pair is transmitted and received by the quantum memory on receiver node 1264.

The swapping protocol may also interact with a purification protocol which attempts to combine multiple pairs of entanglements into a smaller number of entanglements of higher fidelity. The purification protocol may run before or after the swapping protocol, or both. The purification protocol can be implemented using any of a variety of techniques.

Once the swapping protocol has finished producing an end-to-end entanglement (i.e., a pair of entangled quantum elements, one on each host), this end-to-end entanglement may be delivered to the next-higher layer. The next-higher layer is often teleportation. Or, if (additional) rounds of purification are desired before teleportation, then the next-higher layer may be purification and the layer on top of that may be teleportation. Or, if the application consumes entanglement directly without teleportation (e.g., a quantum key distribution [QKD] application), then the next-higher layer may be the application layer.

Figure 13:
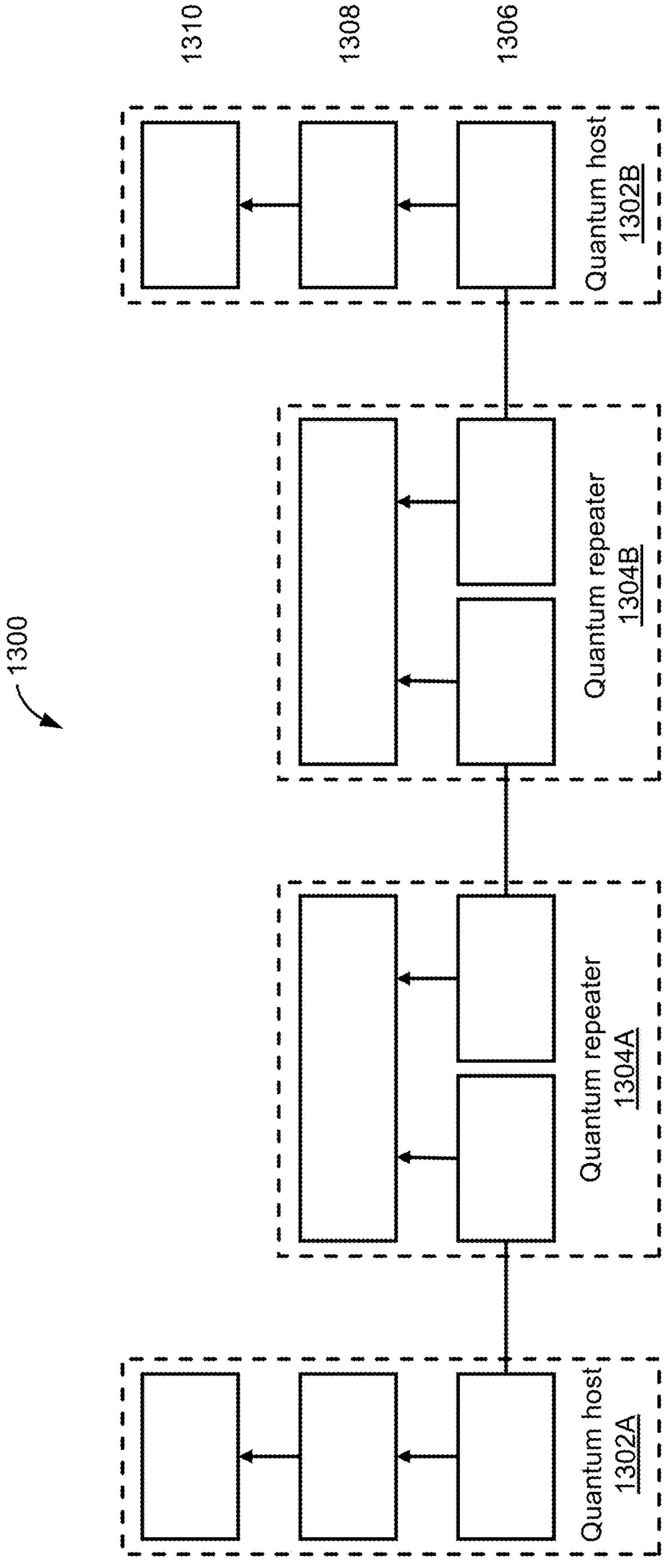
FIGS. 13-15 are schematic diagrams of examples of layered protocols.

FIG. 13 shows an example of layered protocols 1300 where the protocols (empty rectangles) are divided into layers, each with a specific responsibility. A first quantum host 1302A, a second quantum host 1302B, a first quantum repeater 1304A, and a second quantum repeater 1304B, each comprise two or more layers of protocols. In this example, the first layer of protocols is an elementary entanglement generation layer 1306. A second layer of protocols is a swapping layer 1308. A third layer of protocols 1310 is only applied to the first quantum host 1302A and the second quantum host 1302B and may comprise purification, teleportation, and/or application.

Figure 14:
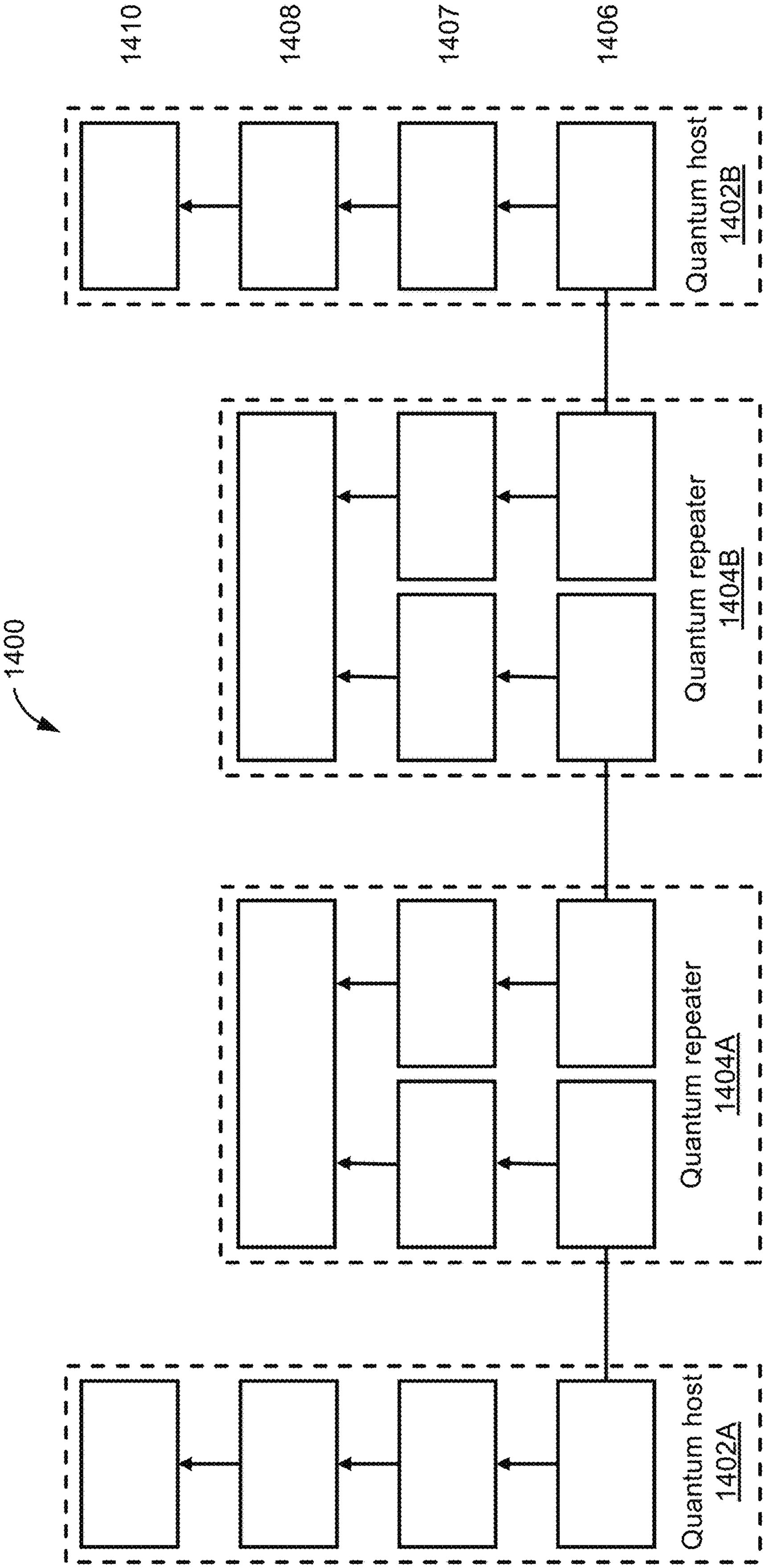

FIG. 14 shows an example of layered protocols 1400. A first quantum host 1402A, a second quantum host 1402B, a first quantum repeater 1404A, and a second quantum repeater 1404B, each comprise three or more layers of protocols. In this example, the first layer of protocols is an elementary entanglement generation layer 1406. A second layer of protocols is a (possibly optional) purification layer 1407. A third layer of protocols is a swapping layer 1408. A fourth layer of protocols 1410 is only applied to the first quantum host 1402A and the second quantum host 1402B and may comprise purification, teleportation, and/or application. In other examples, the purification layer 1407 may be on some but not all of the nodes.

In general, the layering can differ from node to node. For example, the network may only perform the initial round of purification for some links (e.g., long links) and not for other links (e.g., short links).

Figure 15:
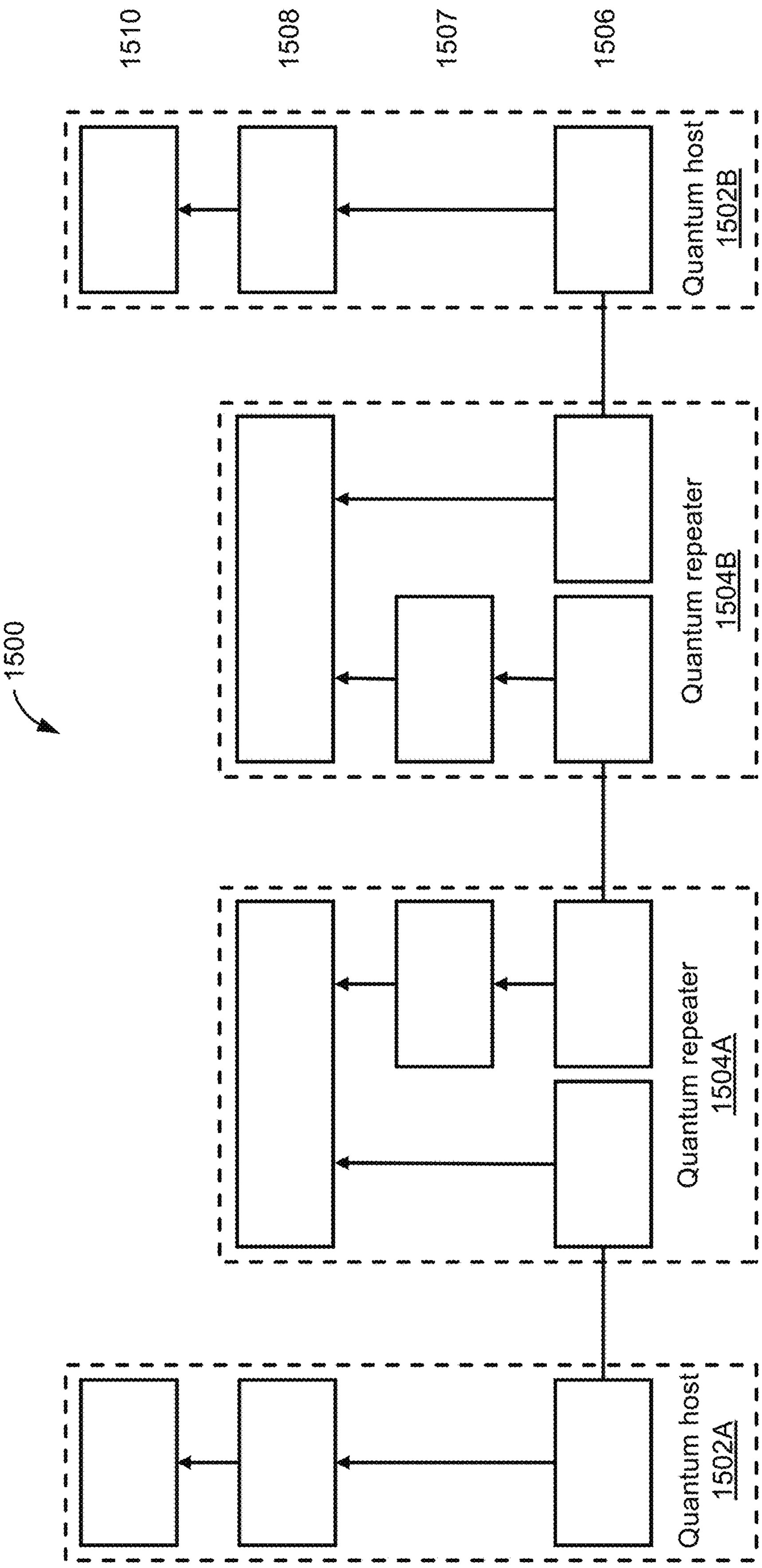

FIG. 15 shows an example of layered protocols 1500 with an initial purification layer 1507 before a swapping layer 1508 on the repeater-to-repeater link but not on the host-to-repeater links. A first quantum host 1502A, a second quantum host 1502B, a first quantum repeater 1504A, and a second quantum repeater 1504B, each comprise three layers of protocols. In this example, the first layer of protocols is an elementary entanglement generation layer 1506. A second layer of protocols is a purification layer 1507 on the repeater-to-repeater link but not on the host-to-repeater links. A third layer of protocols is a swapping layer 1508. A fourth layer of protocols 1510 is only applied to the first quantum host 1502A and the second quantum host 1502B and may comprise purification, teleportation, and/or application.

Furthermore, there can be multiple rounds of purification as deemed necessary to correct for the effects of noise and decoherence.

In addition to interfacing with upper and lower layers, the entanglement swapping protocol may interact with a memory management module for managing the local qubit resources (e.g., quantum memories, or other quantum elements capable of storing qubits associated with various entangled quantum states or other quantum states, over some duration of time with potentially changing fidelity) that store entanglements used by the entanglement swapping protocol. For example, the controller can provide resource usage information to the nodes (e.g., in the form of a schedule, a ruleset, and/or conditional parameters) to indicate to the entanglement swapping protocol running on the nodes which quantum elements can and cannot be used, and/or when particular quantum elements can be used. The rules can be provided in association with virtual circuits connecting different entities (e.g., different user pairs). Proper servicing of all users may involve the controller, the entanglement swapping protocol, and the local memory management module to ensure correct and fair resource usage. The entanglement swapping protocol may also interact with a fidelity estimation unit for tracking the quality of entanglements consumed and produced by the protocol.

The details of the underlying quantum hardware that is accessed by the entanglement swapping protocol may be kept abstract through the use of a hardware abstraction layer.

6. The Hardware Abstraction Subsystem

Figure 16:
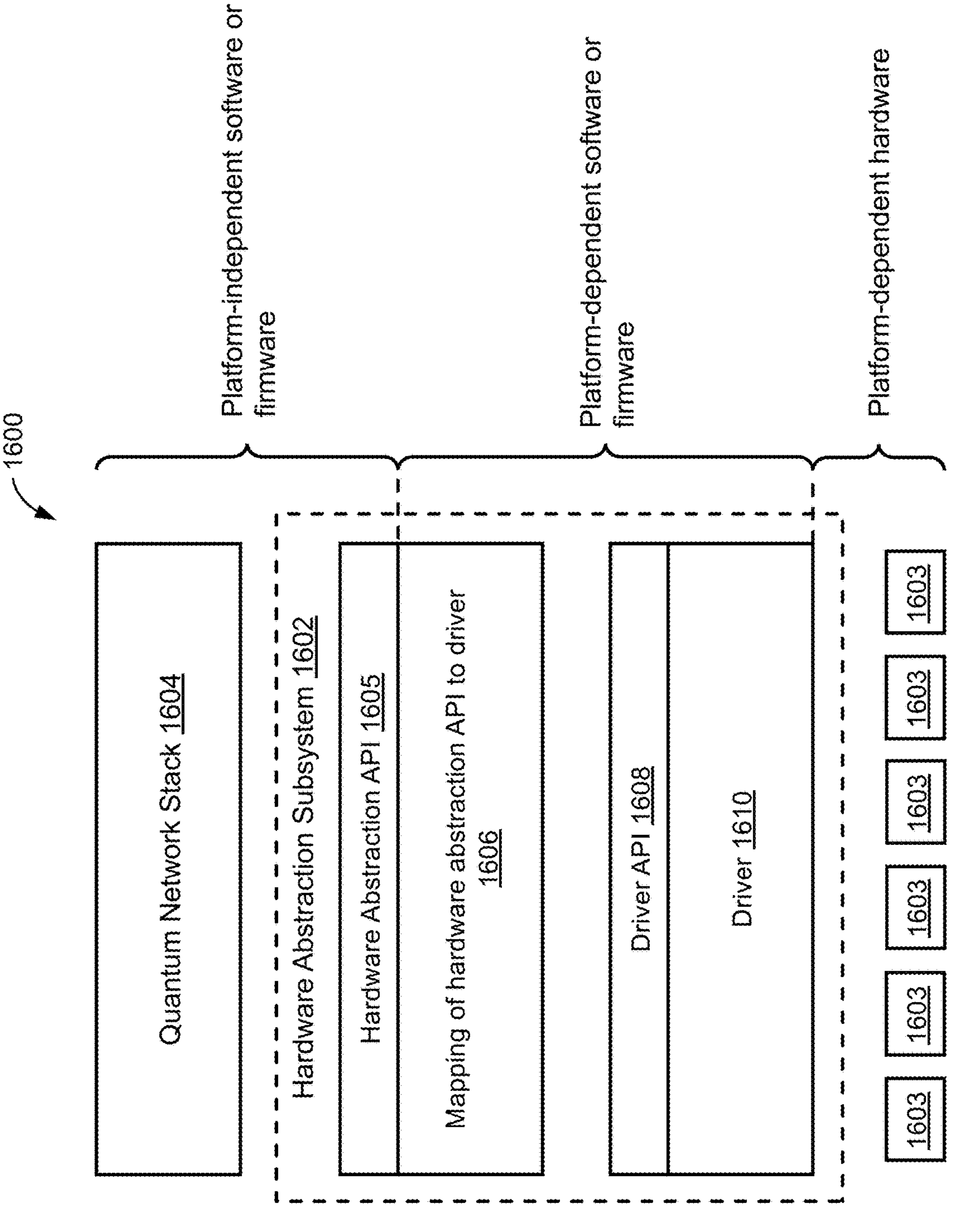
FIG. 16 is a schematic diagram of an example technology stack.

FIG. 16 shows an example technology stack 1600 including a hardware abstraction subsystem 1602 (also referred to as the hardware abstraction layer, or HAL) that is responsible for abstracting the details of underlying hardware 1603. In some examples the hardware abstraction subsystem 1602 allows a quantum network stack 1604 software to be implemented in a platform-independent and portable manner. The hardware abstraction subsystem 1602 defines a set of abstract hardware devices, such as entangled photon pair sources, single photon sources, single photon detectors, quantum memories, Bell state measurement stations, etc. The abstract hardware devices may map one-to-one to a physical hardware device. Alternatively, the abstract hardware device may be a more complex higher-level abstraction that maps to a group of physical hardware devices. For example, a memory-based quantum repeater abstract hardware device provides an abstraction of performing an entanglement swap between two quantum memories. In physical reality, represented at a lower level of abstraction, this may be implemented using passive optics, quantum memories, and photon detectors, or by using quantum gates, depending on the underlying physical platform. Another example of an abstract hardware device is a quantum key distribution end node, where the provided abstraction is associated with performing quantum measurements and running protocols to generate secret key material. In physical reality, represented at a lower level of abstraction, this may be implemented using passive optics, quantum measurement systems, and classical processors, depending on the protocol variant and underlying physical platform. Another example of an abstract hardware device is a quantum router, which provides abstraction of distributing entanglement over three or more interfaces. In physical reality, represented at a lower level of abstraction, the quantum router may be implemented using passive optics, optical switches, detectors, quantum memories, entangled photon sources, and frequency converters, depending on the underlying physical platform and network architecture.

The hardware abstraction subsystem 1602 can provide a north-bound application programming interface (API) for the quantum network stack software above it, which is referred to as a hardware abstraction API 1605. The hardware abstraction API 1605 operates together with a mapping of hardware abstraction API to driver 1606. The hardware abstraction API 1605 may be platform-independent (i.e., the same for all hardware platforms). For each supported abstract hardware device, the hardware abstraction API 1605 defines: (1) a set of operational attributes whose value can be read to retrieve some operational aspect of the abstract hardware device (e.g., the number of photons that a counting single photon detector has detected), (2) a set of configuration attributes whose value can be written to set some configuration aspect of the abstract hardware device (e.g., the target rate at which an entangled photon pair source should generate entangled photon pairs), (3) a set of notifications that the abstraction hardware device can generate to report that some event has occurred (e.g., to report a fault), and (4) a set of actions that can be invoked on the abstract hardware device to request it to perform some action (e.g., to trigger a quantum memory to emit a photon that is entangled with the qubit that is stored in the quantum memory). A formal data modeling language (e.g., YANG (RFC 6020 from Internet Engineering Task Force (IETF)), incorporated herein by reference) can be used to provide a formal description of the attributes, notifications, and actions listed above, and to automatically generate the hardware abstraction API 1605 from the formal description in one or more programming languages. A quantum memory at a given node can be implemented using any of a variety of types of quantum elements configured to store a quantum state or a constituent of a quantum state (e.g., potentially entangled with other constituents of a collective quantum state). A quantum element configured to store a quantum state or constituent of a quantum state corresponding to a single qubit may also be referred to herein as a "single qubit memory" or simply a "qubit memory."

The functions provided by the hardware abstraction API 1605 may be divided into several classes, depending on the real-time nature of the function, including: hard real-time functions, soft real-time functions, and non-real-time functions. Hard real-time functions may be used by field programmable gate arrays (FPGAs) and application-specific integrated circuits (ASICs). Here, the exact timing of the function, possibly to nanosecond precision, is part of the function definition. Soft real-time functions may be used by software running on a controller with a real-time operating system. Here it is important that the functions are executed very fast and can be invoked at a very high rate (e.g., hundreds of thousands of invocations per second or more). Non-real-time functions may be used by software running on a general-purpose processor and a general-purpose operating system. These functions are invoked at a relatively low frequency, typically for management purposes.

Below the hardware abstraction API 1605 and the mapping of hardware abstraction API to driver 1606 is a driver API 1608 together with a driver 1610. The driver API 1608 is responsible for mapping the hardware abstraction API 1605 to concrete operation on the hardware 1603. Each hardware platform may have its own separate driver. While it is a goal for the quantum network stack 1604 software to be portable and platform-independent, it is not necessarily completely oblivious of the details of the underlying physical hardware 1603. For this reason, some implementations of the hardware abstraction API 1605 may include resource and capability discovery functions which allow the platform-independent quantum network stack 1604 software to dynamically discover various aspects of the underlying hardware 1603 and adjust its behavior accordingly. For example, some possible questions that may be relevant include:

(1) Which types of abstract hardware devices (i.e., resources) are present in the platform? For example, are there quantum memories present?

(2) How many abstract hardware devices of each type are present in the platform? For example, how many quantum memories are present?

(3) What are the capabilities of each abstract hardware device? For example, is it possible to trigger a quantum memory to emit a photon that is entangled with the qubit stored in the quantum memory?

(4) What are the parameters of each abstract hardware device? For example, what is the T1 relaxation time (e.g., a value characterizing the time taken for a higher energy state that encodes a first basis state associated with a quantum element, such as a first excited state, to evolve over time to a lower energy state that encodes a second basis state associated with that quantum element, such as a ground state during storage) and the T2 dephasing time (e.g., a value characterizing the time taken for an initial phase of a state associated with a quantum element to evolve over time to a state whose phase is no longer close enough to the initial phase according to a phase metric during storage) for each quantum memory?

(5) What is the logical topology of the abstract hardware devices (i.e., what are the relationships between them)? For example, on which pairs of quantum memories is it possible to perform a specific two-qubit operation (e.g., a quantum gate operation)?

7. Virtual Circuits

In some examples, a connection-oriented model may be used, where before two hosts can start to produce entanglement, they first establish a virtual circuit (VC).

Figure 17:
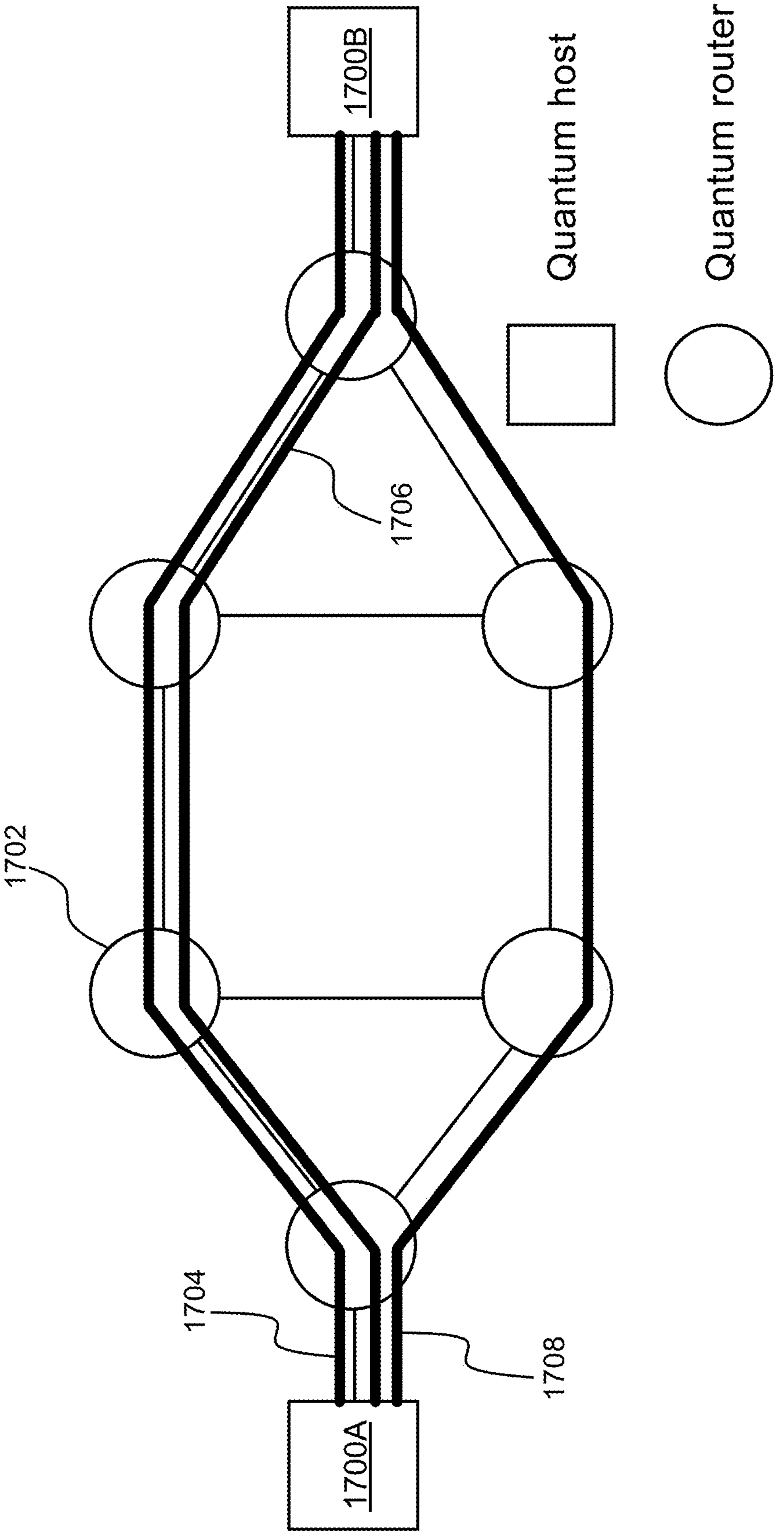
FIG. 17 is a schematic diagram of example virtual circuits.

FIG. 17 shows an example of a collection of virtual circuits over paths between quantum host nodes 1700A and 1700B (also referred to as simply "hosts"). The quantum host nodes 1700A and 1700B are connected via a set of six quantum router nodes 1702 (also referred to as simply "routers") that have point-to-point connections between neighboring pairs quantum router nodes. Additionally, two of the quantum router nodes have respective connections to respective quantum host nodes. This set of nodes could be a subset of a larger quantum network. In this example, there are three virtual circuits 1704, 1706, and 1708. In a connection-oriented model, each node has one instance of the swapping finite-state machine (FSM) instance per quantum virtual circuit that transits the node. Each virtual circuit is associated with a corresponding path through one or more quantum router nodes. Two different virtual circuits may share the same path, as do virtual circuit 1704 and virtual circuit 1706 in this example. Additionally, two quantum host nodes may have more than one virtual circuits between them, as in virtual circuits 1704, 1706, and 1708 in this example. Some classical information may be shared among nodes associated with the same virtual circuit. That classical information may not necessarily be required to traverse the same path as the virtual circuit, but for some protocols (e.g., some secure protocols) there may restrictions on nodes other those on the path associated with the virtual circuit forwarding (or otherwise receiving) the classical information. On the routers, the swapping FSM manages two qubit memories and is responsible for swapping the two qubits at the correct time. The swapping FSM is also responsible for exchanging classical messages with swapping FSM instances on other nodes to coordinate the swaps to produce end-to-end entanglements and to detect and recover from failure scenarios. Some examples may include "swapping" FSM instances on the hosts which only manage a single qubit memory. We put the word "swapping" in quotes because these FSM instances (having only a single qubit memory) do not physically perform any swaps. However, they do take part in the protocol (i.e., the classical message exchange) to coordinate the creation of end-to-end entanglements and to detect and recover from failure scenarios. The FSM instances on the hosts deliver the end-to-end entanglements that are produced to the next-higher layer. The mechanism to decide the path for the virtual circuit can be implemented using any of a variety of techniques. Choosing the path may be the responsibility of the path computation element (PCE) which uses information (e.g., the topology) provided by the routing protocol.

The mechanism for creating the virtual circuit can be implemented using any of a variety of techniques. For example, one approach is to use a distributed signaling protocol to install the virtual circuits and the FSM instances (e.g., using an east-west protocol as described below). Another approach is to use a logically centralized controller that installs the virtual circuits and the FSM instances on each visited node (e.g., using a north-south protocol as described below). The FSM instances are installed with appropriate parameters for configuring the protocols run by the FSM instances.

In some of the examples disclosed herein, it is assumed that the path for the virtual circuit has already been chosen and that the virtual circuit has already been created. Under such an assumption, the example protocols and the example state machines that each node on the already-created virtual circuit executes to produce end-to-end entanglement may be described.

8. The Controller

The quantum network may also include a centralized controller (also referred to as simply "controller") that is responsible for implementing high-level centralized functions.

Figure 18:
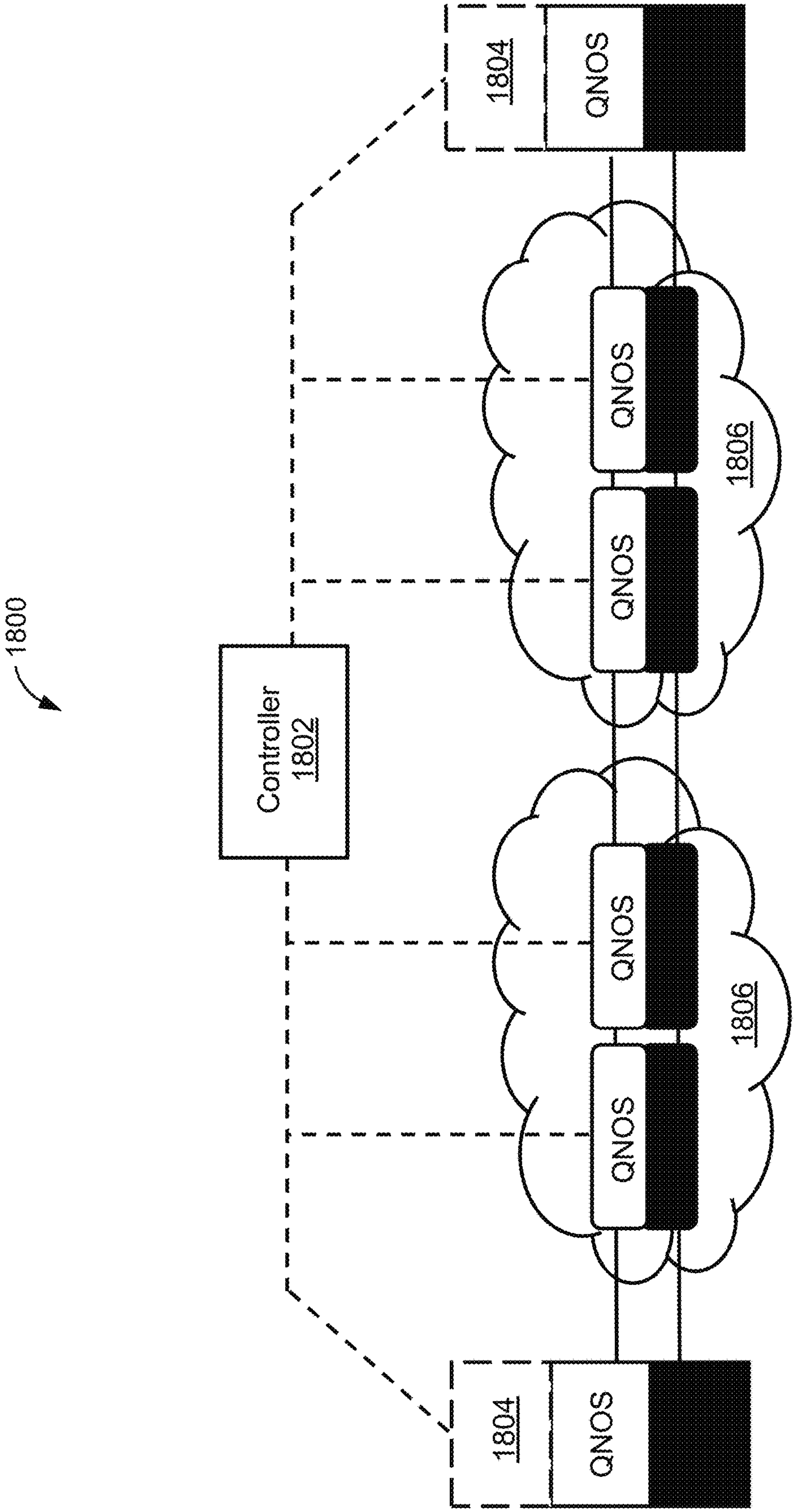
FIG. 18 is a schematic diagram of an example quantum network.

FIG. 18 shows an example quantum network 1800 comprising a centralized controller 1802. The centralized controller 1802 may be logically centralized but physically distributed. For example, the centralized controller 1802 may be implemented on a cluster of redundant local servers to avoid a single point of failure and to allow the controller to scale-out as the quantum network grows. The centralized controller 1802 may also be referred to as the Software Defined Networking (SDN) controller, following common terminology in classical networking. The responsibilities of the centralized controller 1802 may include: (1) centralized device and network management, (2) auto-discovery of the network topology, (3) auto-discovery of available resources in the quantum network (e.g., the number of quantum memories and their coherence times), (4) optimized routing of the virtual circuits (also known as traffic engineering) based on the provided traffic demand matrix and/or the auto-discovered available resources in the network, (5) gathering and storing network telemetry data, and (6) dynamic re-optimization after failures of traffic pattern changes. The network 1800 may have local servers 1804 and remote servers 1806 (i.e., cloud servers) that are in communication with other local servers 1804, remote servers 1806, and/or the centralized controller 1802. The local servers 1804 and the remote servers 1806 may have a quantum network operating system (QNOS) stored in memory.

9. East-West Protocols Used in Combination with North-South Protocols

In some examples, the quantum nodes (i.e., the quantum hosts, the quantum routers, and the quantum repeaters) may run east-west protocols with each other. These protocols can implement the various layers of the on-device quantum network stack (e.g., timing and calibration, elementary entanglement generation, purification, swapping, and teleportation).

In some examples, the controller may run north-south protocols with each of the quantum nodes in the network. The north-south protocols may include communication of information that is relevant for the east-west protocols. For example, the controller may provide to the quantum nodes (e.g., in a virtual circuit installation procedure) information identifying a virtual circuit, information specifying a path for the identified virtual circuit, and an FSM instance for an east-west protocol. The controller may provide this information to each quantum router node that is on the path associated with the virtual circuit, which enables the nodes to run the associated protocol (e.g., swapping or purification). The controller may also be responsible for configuring the high-level parameters of the FSM instances based on network-defined and/or user-defined metrics (e.g., requested fidelity or quality of service, network traffic demand). The configurations may determine what specific procedure the FSM will perform. For example, a particular version of a swapping protocol can be determined. The configurations may also determine whether purification will be performed, and if so, how and/or when purification protocol will be performed.

In classical networking and/or quantum networking, there are a variety of centralized and distributed architectures that can be used. In some examples of classical networking, most of the intelligence is in the centralized controller. Correspondingly, most of the complexity in such examples may be in the north-south protocols. For example, in some SONET/SDH time-division multiplexed networks, the controller is responsible for computing the route for each virtual circuit, installing the necessary configuration state for each virtual circuit on each network node. The east-west protocols between network nodes in such examples may be relatively simple and focused on fast recovery from failures.

Alternatively, the TCP/IP-based Internet uses a decentralized design where most of the complexity is in the east-west protocols. For example, traffic routing may be done using fully decentralized protocols such as BGP and OSPF.

In some networks, some level of centralized intelligence may be useful for certain use cases, including traffic engineering and data center networks. This can be facilitated by Software Defined Networking (SDN). Examples of north-south protocols that can be used between the SDN controller and the network nodes, include OpenFlow, P4, and PCEP.

10. Node Hop Numbers

Consider a virtual circuit with N nodes in the path. The number N includes the hosts on either side of the virtual circuit. Thus, there are two hosts and N−2 routers. For N=2 there are two directly connected hosts with no routers in between. In the case of a host setting up a virtual circuit to itself (N=1), creation of the "end-to-end" entangled pair boils down to using local gates to produce a pair of local qubits entangled with each other.

Figure 19:
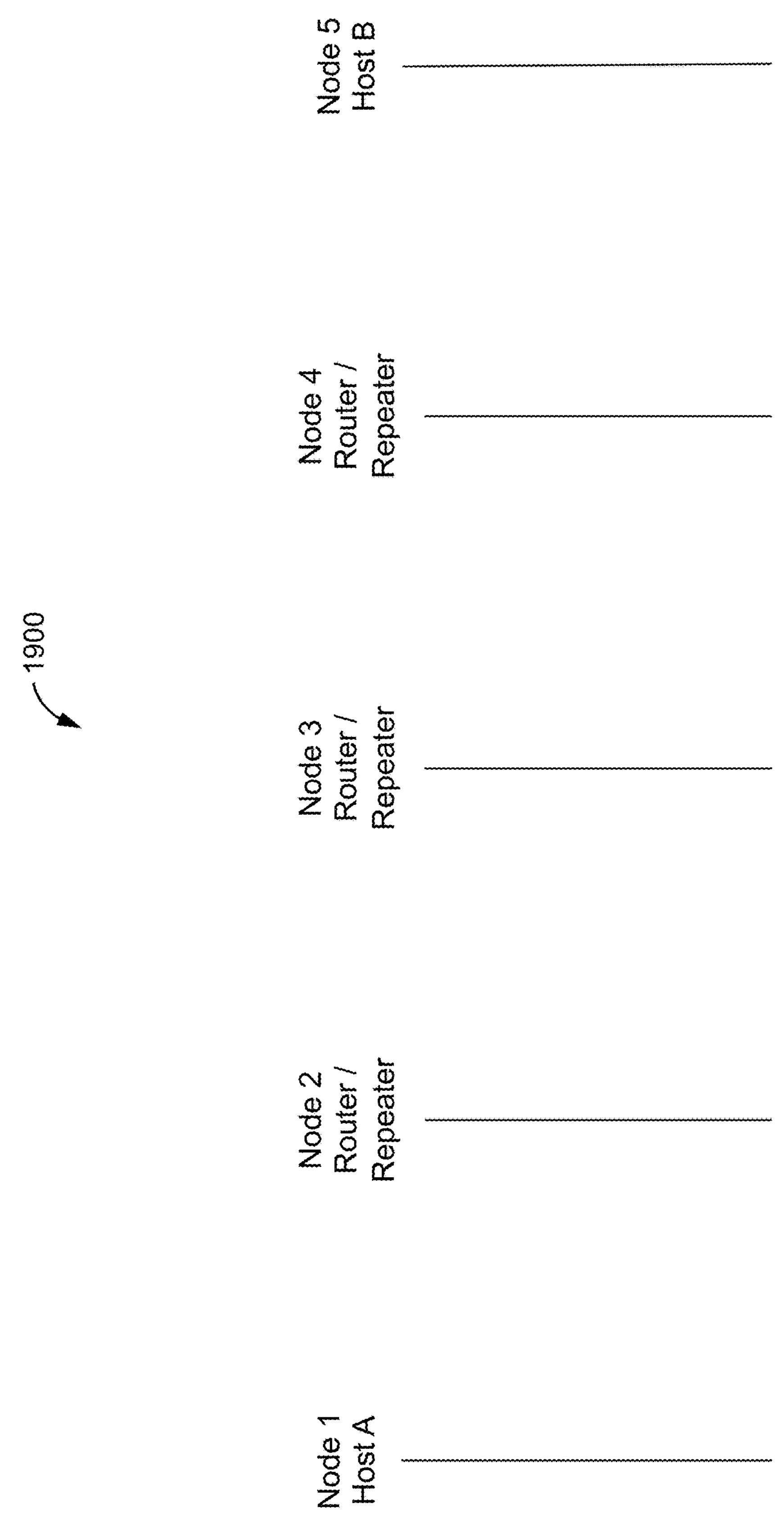
FIGS. 19-38 are schematic diagrams of example steps occurring in quantum network portions.

FIG. 19 shows a portion of an example quantum network 1900 comprising two hosts (Host A at Node 1 and Host B at Node 5) and three routers/repeaters at Node 2, Node 3, and Node 4, with a total number of nodes equal to five (N=5). The vertical black lines illustrated below each node indicate a passage of time from top to bottom which will herein be used to depict network events in a ladder diagram.

Each node in the virtual circuit may be assigned a node hop number (also referred to as a hop number, for short). The first node in the virtual circuit gets node hop number 1. The next one gets node hop number 2. The last node gets node hop number N. Hop numbers are only unique within the scope of a virtual circuit. For example, if two different virtual circuits go through the same node, that node may be node hop number 2 in one virtual circuit and node hop number 4 in the other virtual circuit. Nodes may also be assigned node identifiers, which are unique within the scope of the network. Node identifiers are different from node hop numbers. Node identifiers may not play an important role in the swapping protocol (but they can play an important role in other protocols, e.g., in some routing protocols). Herein, unless otherwise specified, node numbers or nodes labeled with numbers in diagrams are assumed to be node hop numbers.

11. A and B Sides

Quantum virtual circuits are inherently directionless (i.e., there is no source or destination). In some examples, end-to-end entangled pairs of qubits are produced symmetrically, where one qubit of the pair is delivered to one host and the other qubit of the pair is delivered to the other host. Despite the directionless nature of quantum virtual circuits, one host can be arbitrarily designated as "host A" and the other host as "host B". By convention, the node hop numbering starts at host A.

In some examples, a (preferably automated) mechanism may be used to decide which host is designated as host A and which host is designated as host B, and to assign node hop numbers. Such a mechanism could select the host with the highest system identifier as host A. In other examples, the controller could perform such selection, or the end-user could manually configure it.

On the routers the term A-side will refer to the direction towards host A and the term B-side will refer to the direction towards host B.

12. Elementary Entanglement Generation

In some examples, before any swapping can take place the elementary entanglement generation (EEG) protocol produces elementary entanglements between each node and its directly connected neighbor(s) in a path over a set of nodes.

Each node runs one instance of the EEG FSM per interface (i.e., per directly connected neighbor). The hosts (e.g., Nodes 1 and 5 in FIG. 19) run a single EEG FSM instance. The routers (e.g., Nodes 2, 3, and 4 in FIG. 19) run two instances of the EEG protocol: one instance generates elementary entanglements with the neighbor on the A-side and the other instance generates elementary entanglements with the neighbor on the B-side.

In some examples in which the swapping protocol is performed in a layer directly above a layer performing the EEG protocol, whenever the EEG protocol successfully generates an elementary entanglement, it may dispatch an Entanglement-Created event to the swapping protocol. Each instance of the EEG protocol may be associated with at least one qubit memory. For example, when attempting to create elementary entanglements between directly connected nodes X and Y, then there will be one EEG protocol instance and one associated qubit memory on node X, and there will be one EEG protocol instance and one associated qubit memory on node Y. If the EEG protocol for a given link is capable of supporting multiplexing, the EEG protocol instance may be associated with multiple qubit memories.

The EEG protocol instances on nodes X and Y cooperate to produce elementary entanglement by using, for example, a midpoint source or a midpoint Bell state analyzer. As far as the swapping protocol is concerned, the method used to produce elementary entanglement is not relevant, since the details are hidden inside the EEG protocol. Thus, different EEG protocols may be run on different hardware platforms. Regardless of which EEG protocol is running, the swapping protocol can be configured to receive Entanglement-Created events from the EEG protocol. Once the swapping protocol receives the Entanglement-Created event, the qubit on node X and the qubit on node Y are entangled with each other. Alternatively, in other examples, another layer may be between the EEG protocol layer and the swapping protocol layer, such as a purification layer, in which case the purification layer can be configured to receive the Entanglement-Created event.

Many EEG protocols involve a Bell state measurement and a subsequent Bell state correction (which uses classical messaging) to consistently produce a particular Bell state, for example $|\phi^{+}>$, by transforming a Bell state associated with a quantum element at the node to a different Bell state (using one of three operations that correspond to a change in Bell state) or confirm that the quantum element is associated with the particular Bell state (without performing any transformation operation, or by performing a transformation operation that corresponds to an identity operation). The Bell state correction can be performed as part of the EEG protocol. Optionally, the EEG protocols may have a feature that allows the swapping layer to request that the Bell state correction is deferred until after end-to-end entanglement is established. In that case, the Entanglement-Created event may also include information about what type of entanglement was actually created (i.e., which Bell pair: $|\phi^{+}>$, $|\phi^{-}>$, $|\psi^{+}>$, or $|\psi^{-}>$), where:

$$|\Phi^{+}\rangle = \frac{1}{\sqrt{2}}(|00\rangle + |11\rangle)$$

$$|\Phi^{-}\rangle = \frac{1}{\sqrt{2}}(|00\rangle - |11\rangle)$$

$$|\Psi^{+}\rangle = \frac{1}{\sqrt{2}}(|01\rangle + |10\rangle)$$

$$|\Psi^{-}\rangle = \frac{1}{\sqrt{2}}(|01\rangle - |10\rangle)$$

Information about the type of entanglement created may allow the swapping protocol to determine the final end-to-end state and perform the Bell state correction only once on either host A or B. Furthermore, such information may avoid the need for Bell state corrections on the routers, which reduces the number of applied operations, and hence improves latency and fidelity. For example, the Bell state measurement results may be tracked at each step along the way, and the Swap messages may contain information for performing Bell state correction operations that may be needed along with fidelity estimates and other metadata (e.g., identifiers, and timestamps). Bell state correction operations (i.e., operations that can convert between different states of the four Bell states) can be realized with quantum gates. The physical implementation of these correction operations depend on the method by which qubits are physically encoded, and the hardware platform that supports controlled quantum state manipulation. For example, one can implement Bell state corrections with nonlinear optics, superconducting circuits, trapped ions, atomic ensembles, vacancy centers in diamond, or a quantum memory unit coupled to a quantum processing unit.

In the case of deferred Bell state correction/conformation, in which Bell state measurement results from intermediate operations in the end-to-end entanglement distribution process are tracked and communicated, either host A or B can conduct any needed final Bell state correction to convert the generated entangled state to any of the desired Bell states. Such Bell state correction can be performed with one or more operations on only one of the two qubits in the distributed Bell state. However, to ensure correctness of the Bell state correction, hosts A and B receive sufficient information such that they agree as to which Bell state is to ultimately be produced, and agree as to which host is responsible for conducting any needed correction operation(s). In the case that the generated Bell state is already the "correct" Bell state that is intended, the host storing the qubit on which the correction operation would have been performed can simply forego any operations or apply a "no-op" operation that is essentially an identity operation that preserves the existing Bell state. To facilitate this agreement process, hosts A and B may use an east-west classical communication protocol prior to starting the entanglement generation and distribution processes. Alternatively, a centralized controller may use a north-south protocol to delegate non-conflicting Bell state correction roles to hosts A and B. In this case, the controller may use information pertaining to the host nodes' capabilities (e.g., if only host B has a quantum processor capable of performing the necessary operations), overall network state, virtual circuit request metadata, and/or quality-of-service parameters when determining Bell state correction roles for the relevant hosts. The controller may communicate and install these roles on the hosts in a static manner (i.e. fixed roles for the duration of a requested session) or in a dynamic manner, in which the hosts follow a set of rules for Bell state correction based at least in part on the type of received Bell state and other relevant metadata (e.g., timestamp information, estimated fidelity).

In some cases, instead of correcting the Bell state after entanglement is established, the Bell state measurement results can be used to notify the end nodes which Bell pair has been produced (e.g., 2 bits of information indicating one of four possible results of a Bell state measurement corresponding to one of four possible Bell pairs being established).

The Entanglement-Created event may also include information about the estimated fidelity of the entanglement. This estimate may be based on the known parameters of the hardware (e.g., the $T_1$ (relaxation time) and $T_2$ (dephasing time) decoherence times of the memory combined with observed storage times, the noise models for the optical fibers combined with observed fiber lengths, etc.) or it may be empirically determined (e.g., by performing quantum state tomography on a subset of the generated elementary entanglements).

Some hardware platforms distinguish between communication qubits and storage qubits. In some examples, a communication qubit can be directly coupled to a photonic interface, whereas a storage qubit cannot be directly coupled to a photonic interface, but only indirectly via a communication qubit (e.g., using a swap gate). In some implementations, only communication qubits can participate in the EEG protocol. Some platforms may have a very limited number of communication qubits. For example, the diamonds used in recent nitrogen-vacancy (NV) center repeater experiments have a single communication qubit and a small number of storage qubits. In such a scenario, a router may first generate elementary entanglement on the A-side, then move the communication qubit to the storage qubit, then generate elementary entanglement on the B-side, and finally perform a Bell state measurement on the storage plus communication qubit pair. Any logic that is used to move communication qubits to storage qubits may be the responsibility of the swapping protocol and not the responsibility of the EEG protocol, which can deliver elementary entanglements in communication qubits.

In the diagrams herein, a dashed black double-headed arrow is used to indicate the production of an elementary entanglement by the EEG protocol.

Figure 20:
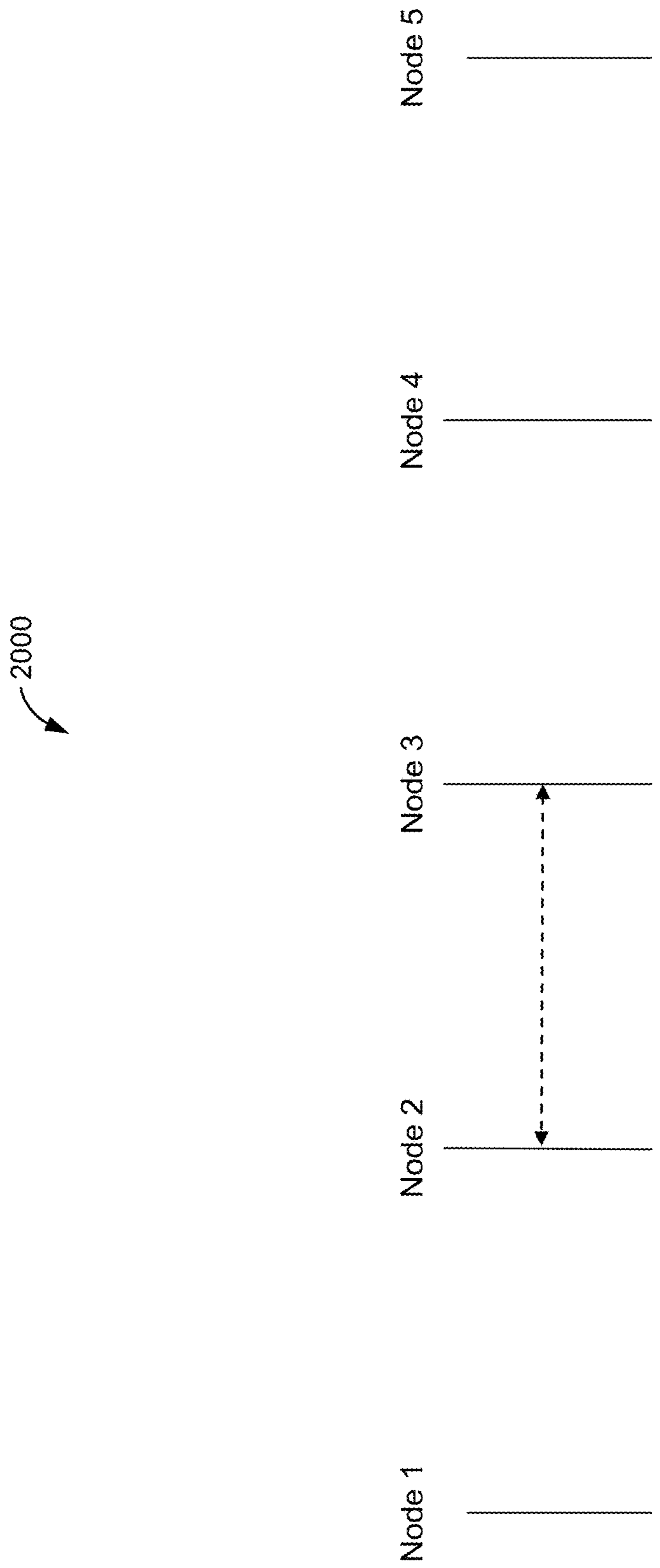

FIG. 20 shows a portion of an example quantum network 2000 where elementary entanglement (dashed line) is produced between Nodes 2 and 3. A swapping FSM instance running on node 2 will receive an Entanglement-Created event from an EEG FSM instance associated with a B-side communication qubit. A swapping FSM instance running on node 3 will receive an Entanglement-Created event from a EEG FSM instance associated with an A-side communication qubit. Each of the two arrow heads represents an Entanglement-Created event, and the dashed red line represents the fact that the two qubits are entangled with each other. Node 2 and node 3 do not necessarily dispatch their respective Entanglement-Created events at the exact same time. While the two events are typically generated very close together in time, there is often some finite time difference between the two events. To emphasize the possible time difference, the dashed black line may be drawn slanted, as shown in FIG. 21.

Figure 21:
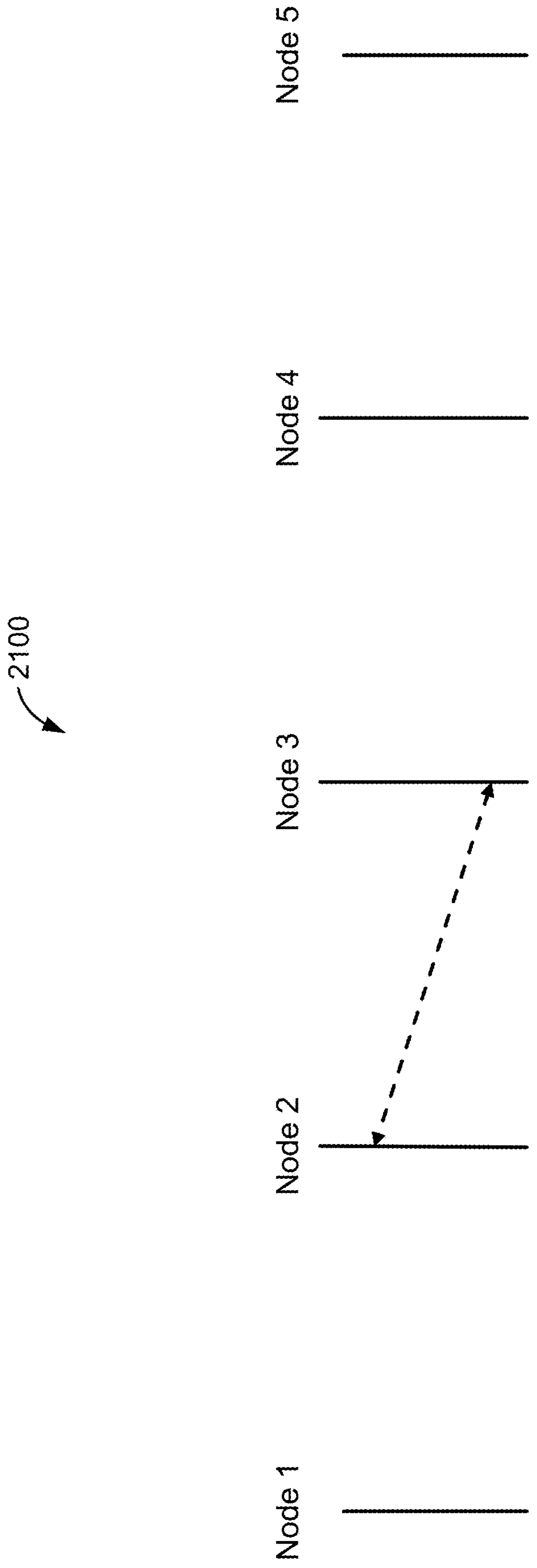

FIG. 21 shows a portion of an example quantum network 2100 where elementary entanglement (dashed line) is produced between Nodes 2 and 3 with a time lag represented by the slant of the dashed line. In all the figures disclosed herein, the time increases from the top to the bottom of the figures such that operations performed higher than other operations occur before the lower operations.

For the figures disclosed herein, although there may exist a finite time difference, for explanation purposes, the dashed black lines are drawn horizontally, unless the implications of non-simultaneous events are being actively considered.

The swapping protocol may also handle degenerate scenarios (i.e., where the time difference between the two events is unusually large) and failure scenarios (i.e., where the event is missing on one or both nodes).

Figure 22:
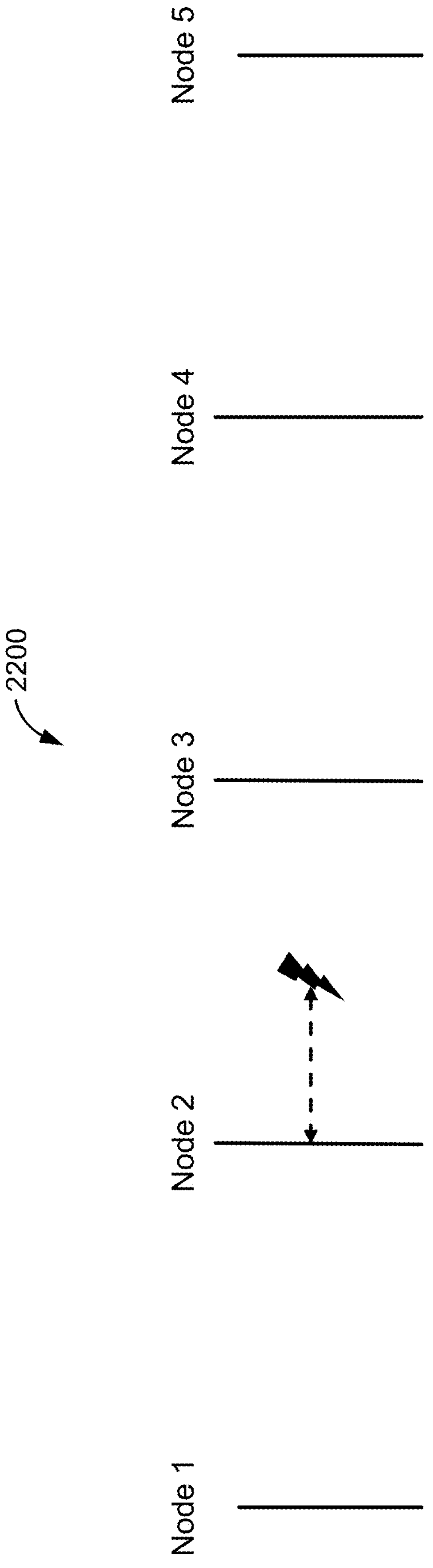

FIG. 22 shows a portion of an example quantum network 2200 where one node (Node 2) receives an Entanglement-Created event (dashed line), but the event is lost (lightning bolt) on the other node (Node 3).

There are several layers in the stack that can create an entanglement, such as the elementary entanglement layer. However, the elementary entanglement layer is not the only possible source of entanglements. The swapping layer can also produce an end-to-end entanglement by using entanglement swap operations to stitch multiple elementary entanglements together. Additionally, the purification layer may produce purified entanglement by combining multiple simultaneously existing entanglements together. By design, the layering in a quantum stack may be flexible. For example, purification may be performed before swapping or after swapping or there may not be any purification at all. The quantum stack may reuse the same Entanglement-Created event in each layer that can produce an entanglement, so that the next higher layer that consumes the entanglement does not need to information related to how the entanglement was produced.

13. Swapping

A black ⊗ symbol is used to represent a swap operation, and a short-dashed black line is used to represent a non-elementary (multi-hop) entanglement that is produced by the swap operation.

Figure 23:
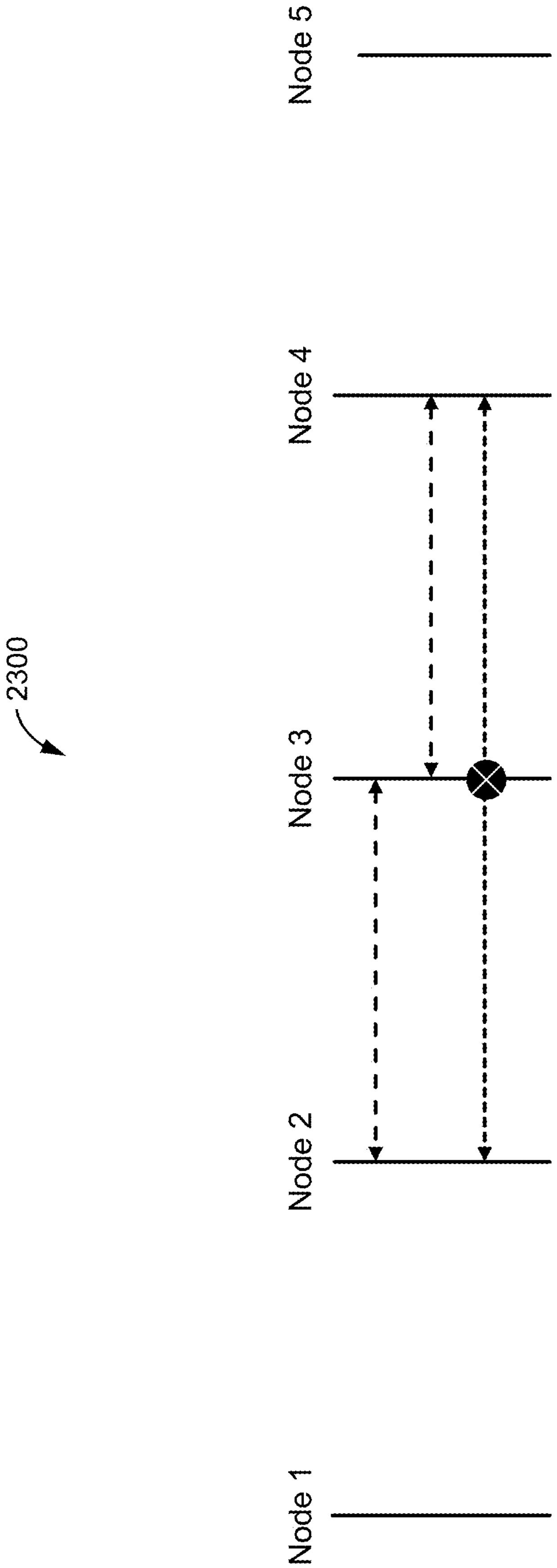

FIG. 23 shows a portion of an example quantum network 2300 where elementary entanglement (dashed line). Node 3 swaps the 2-3 entanglement with the 3-4 entanglement by performing a swap operation (black ⊗), in order to produce a non-elementary (multi-hop) 2-4 entanglement (short-dashed black line).

On some platforms, the swap operation is a heralded, non-deterministic operation. On such platforms, there is a high probability (e.g., 50%) that the swap operation fails but the platform is able to determine and distribute information about whether it succeeded or failed (this is an example of a "heralded" swap operation).

Figure 24:
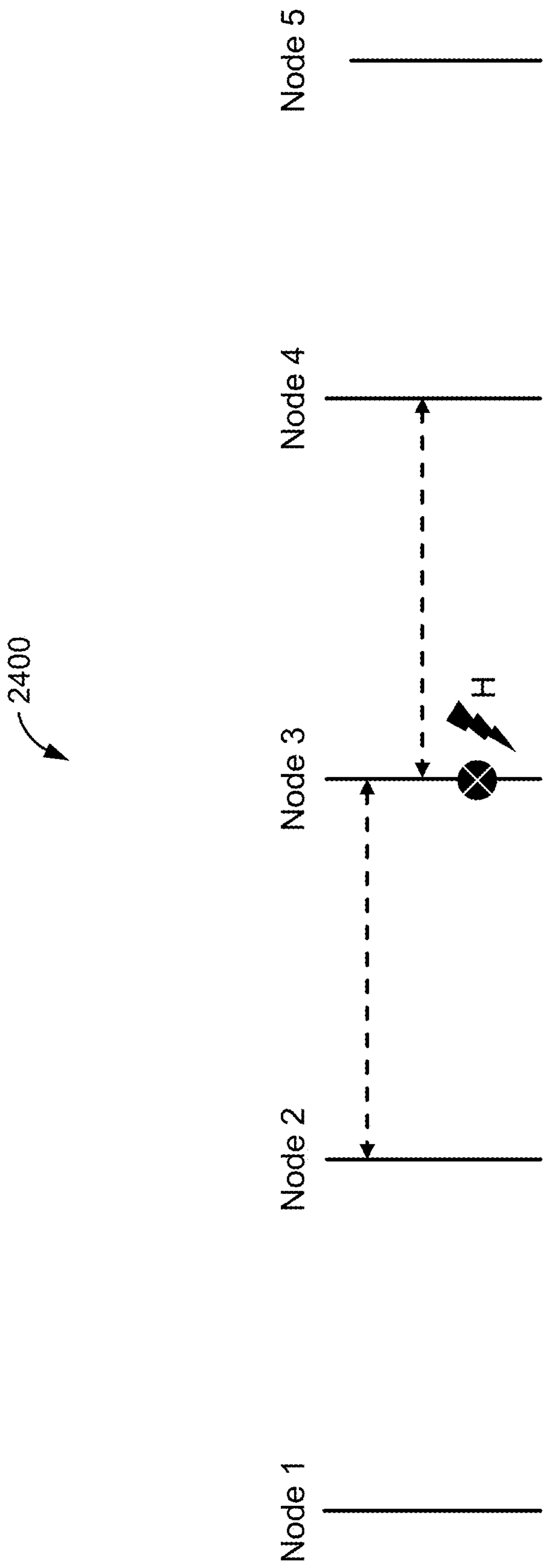

FIG. 24 shows a portion of an example quantum network 2400 where a heralded swap failure (lightning bolt) has occurred during a swap operation (black ⊗) at Node 3. The letter "H" indicates that the failure was heralded. Also, there is no short-dashed black line because the 2-4 entanglement was not created. The protocol determines that the entanglement was not created because the failure was heralded. Note that the 2-3 and 3-4 entanglements are lost because of the failed swap attempt.

Even on deterministic platforms, it is possible for low-probability non-heralded swap failures to occur.

Figure 25:
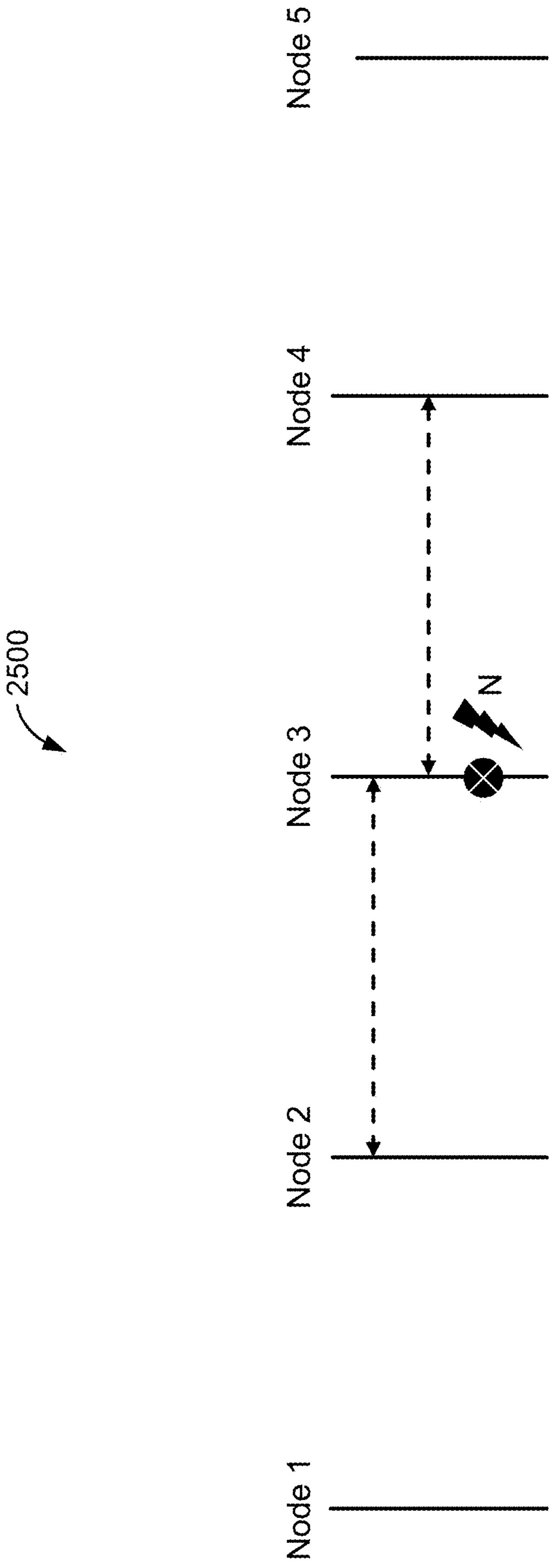

FIG. 25 shows a portion of an example quantum network 2500 where a non-herald swap failure (lightning bolt) has occurred during a swap operation (black ⊗) at Node 3. The letter "N" indicates that the failure was non-heralded. Once again, no 2-4 entanglement was produced, but in this case the protocol does not determine this because the swap failure was non-heralded.

14. Qubit Memory Hop Numbers

Elementary entanglement generation may use two qubit memories: one qubit memory on one side of the point-to-point link, and one qubit memory on the other side of the point-to-point link. In some example swapping protocols, each qubit memory is assigned to a particular virtual circuit (i.e., a single qubit memory is not or cannot be shared between multiple virtual circuits at the same time).

Figure 26:
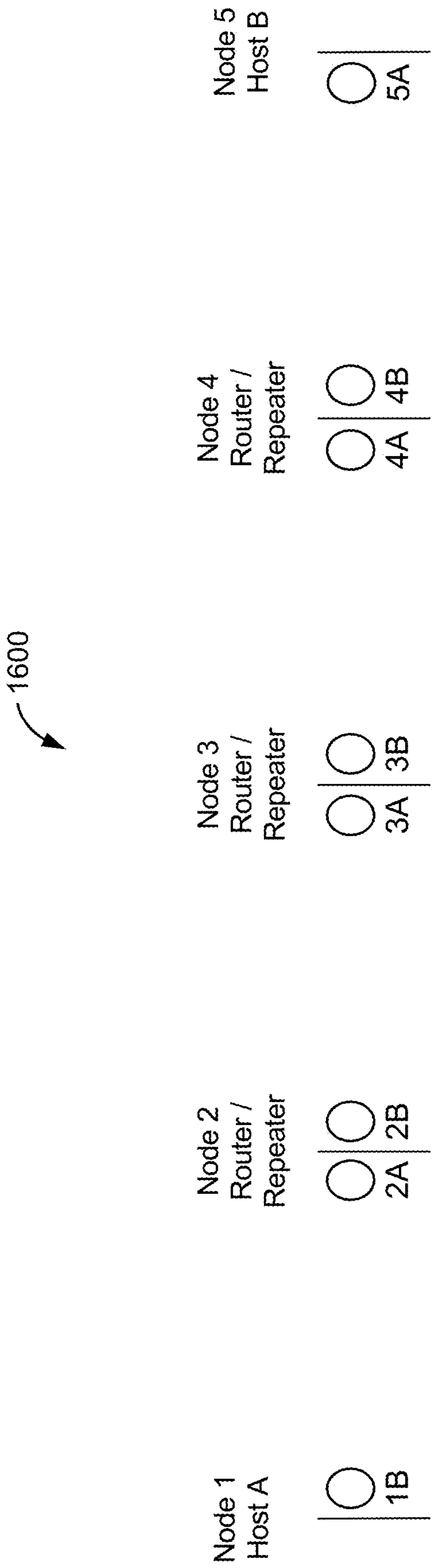

FIG. 26 shows a portion of an example quantum network 2600 comprising two qubit memories (e.g., 2A and 2B) on each router/repeater node (e.g., Node 2, Node 3, and Node 4) and one qubit memory (e.g., 1B) on each host (e.g., Host A at Node 1 and Host B at Node 5). The quantum network 2600 is shown in a virtual circuit representation. In one implementation of a prepare-and-measure system, the qubit memory on host A may be replaced by a single photon source that emits photons in a chosen state and the qubit memory on host B may be replaced by a single photon detector that measures rather than stores the received photon. A qubit memory hop "number" (i.e., label), also referred to as a qubit number, can be assigned to each qubit memory on the virtual circuit. The qubit memory hop number may be composed of the node hop number (1, 2, 3, . . . ) followed by A or B to indicate "on which side" the qubit memory is. As in the case for node hop numbers, qubit memory hop numbers are only unique in the scope of a given virtual circuit. Herein, the term "qubit" may be used instead of "qubit memory".

15. Entanglement and Qubit Ownership Tracking

In some examples, qubit ownership may be tracked through a node's Memory Management module. "Ownership" here refers to the allocation of a local qubit memory to an executing process (e.g., for management of actions associated with the qubit memory), such as the EEG protocol or the swapping protocol. By looking at one particular point-to-point link associated with a pair of qubits (one on each side), the following sequence associated with elementary entanglements being generated may be observed.

(1) The elementary entanglement generation protocol generates a point-to-point elementary entanglement. This typically takes many non-deterministic attempts, so it may not happen at a predictable regular interval. At this stage, the EEG protocol owns the qubit memory that will hold the generated entanglement and may have exclusive usage of the qubit. The entanglement swapping protocol may not be responsible for initializing the qubit for the EEG protocol.

(2) Once an elementary entanglement is generated, the ownership of the qubit storing the elementary entanglement is handed off to the higher layers (e.g., purification, swapping, teleportation, or application).

(3) The higher layers may hold on to the elementary entanglement for some amount of time. During that time, the elementary entanglement generation layer cannot use the associated qubits and cannot yet attempt to generate the next elementary entanglement. The local memory management unit will track that the qubit is not available and in use by the entanglement swapping protocol.

(4) Eventually, the higher layer will consume the entanglement. For example, purification may sacrifice an entanglement in an attempt to improve the fidelity of another entanglement. As another example, the swapping layer may swap two qubits, after which the swapped qubits are no longer needed by the swapping layer. In these scenarios, the higher layer releases the ownership of the qubit. The ownership may be returned back to the elementary entanglement layer, which can resume elementary entanglement generation attempts as soon as it owns both qubits again. This may be done by having the swapping layer free the qubit via the memory manager so that it may be allocated to the underlying EEG protocol for generating new entanglement. The entanglement swapping protocol may not be responsible for reinitializing the qubit on behalf of any other process.

(5) In some examples, it may be beneficial to track how the estimated fidelity of each entanglement evolves over time. The estimated fidelity may be updated to reflect: (A) spontaneous decoherence in qubit memories as a result of the passage of time (e.g., T1 and T2 decoherence times), (B) noise experienced as communication qubits are transmitted over a communication medium (e.g., noise associated with propagation over optical fibers) before being stored as a storage qubit, and (C) noise experienced as quantum gate operations and other local operations are applied to qubits.

When the estimated fidelity falls below a threshold, the end-to-end entanglement generation attempt may be given up, and the ownership of all involved qubit memories may be returned to the elementary entanglement generation layer (e.g., via the memory manager). Alternatively, the estimated fidelity falling below a threshold may trigger another set of protocol actions (e.g., trigger another round of purification).

16. Elementary Entanglement Sequence Numbers

As described previously, there can be a sequence of elementary entanglements on a given link between a given pair of qubits.

In some examples, it may be beneficial to distinguish one entanglement on the link from some other entanglement at a different point in time on the same link. The nodes in the network may use a method to uniquely identify one particular entanglement amongst the series of entanglements that are produced over time. One such method assigns an entanglement sequence number to each elementary entanglement that is produced on a given link, as shown in FIG. 27.

Figure 27:
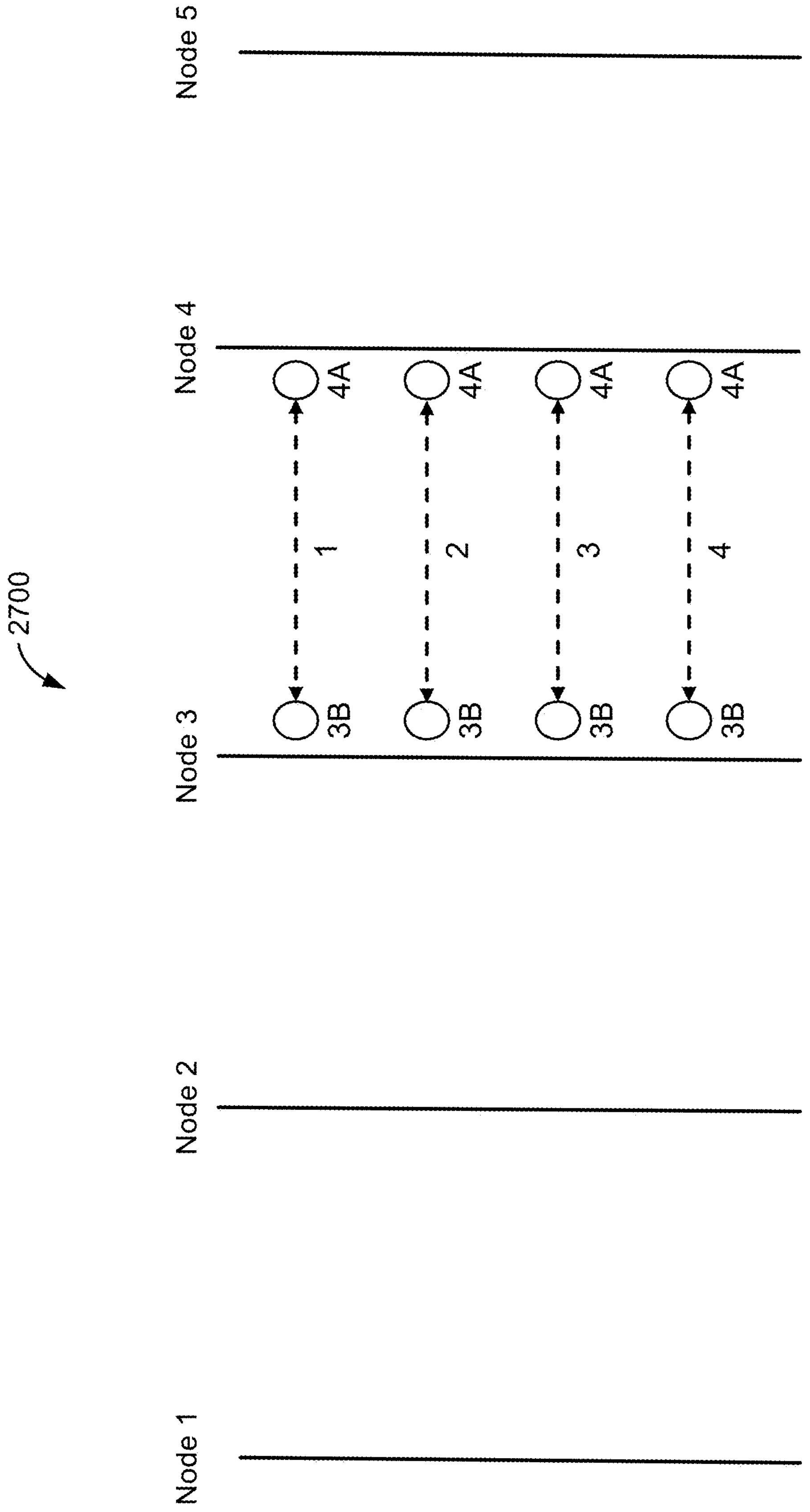

FIG. 27 shows a portion of an example quantum network 2700. Each entanglement (dashed line) on a point-to-point link is assigned a monotonically increasing sequence number. In this example, the first entanglement is number 1, the second entanglement is number 2, the third entanglement is number 3, etc. Numbers may be skipped, as long as they increase monotonically. In this example, the two nodes on either side of a point-to-point link must agree on the entanglement sequence number. It may be the role of the elementary entanglement generation protocol to assign the entanglement sequence numbers and to make sure that both sides agree. The empty circles denote quantum memories that are not currently storing an entanglement constituent.

As a practical matter, sequence numbers are stored in variables and message fields with a finite number of bits, such that the sequence number may roll-over to the initial value. One example of a technique to ensure that such a roll-over is acceptable is to ensure that the roll-over interval is longer than the longest potential lifetime of an entanglement (e.g., longer by a factor of 2, 10, 100, or 1000), and to ensure that the number comparison routines for ordering purposes take this roll-over into account. The longest potential lifetime may be determined, for example, as the longest time that the entanglement could be characterized by a high enough fidelity metric to be useful, which may depend on the characteristics of a particular quantum element being used as a quantum memory at a node (e.g., the longest time that a quantum element is configured to maintain at least a predetermined minimum fidelity of a stored quantum state.

17. Qubit State Identifiers

Figure 28:
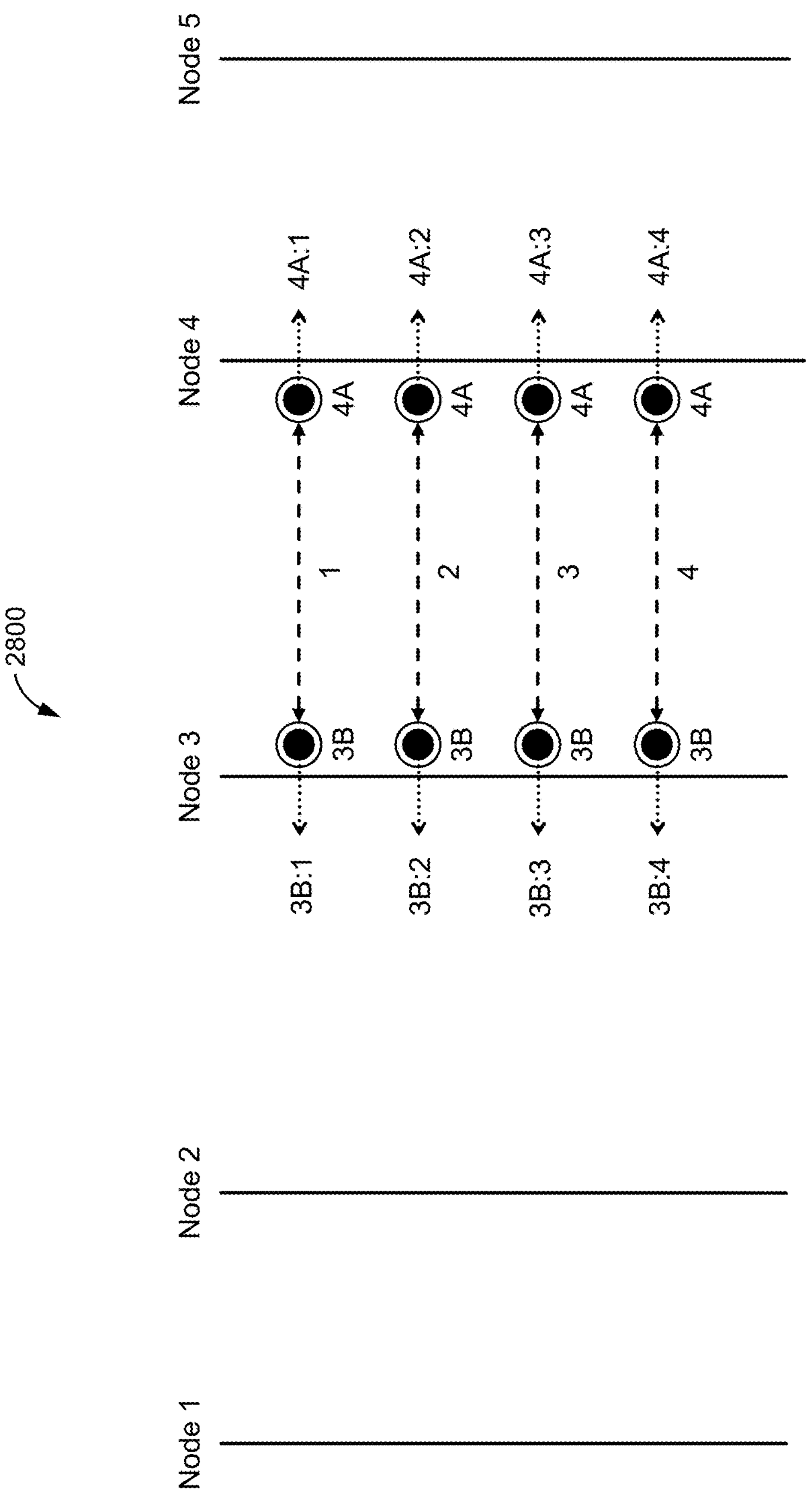

FIG. 28 shows a portion of an example quantum network 2800 comprising qubit state identifiers. Herein, the notation Q: E is used to refer to a particular qubit state, where Q is the qubit memory hop number (e.g., "3B" or "4A") and where E is the entanglement sequence number (e.g., 1, 2, 3, 4, etc.). For example, 3B: 2 refers to the state stored in qubit memory 3B after entanglement number 2 has been generated. Note that qubit state 3B: 2 cannot be considered in isolation because it is entangled with qubit state 4A: 2. We will explain how this issue can be resolved in the next section. The solid black circles denote quantum memories that are currently storing an entanglement constituent.

There exist clear distinctions between qubit memories and qubit states. Herein, a qubit memory is the physical device that is used to store qubit states. In FIG. 28, for example, the black circle labeled 3B is a qubit memory; its qubit memory hop number stays the same as time passes. In contrast, the black disk labeled 3B: 2 is a qubit state; its qubit state identifier changes over time as different states are stored in the qubit memory.

18. Entanglement Identifiers

Bipartite entanglements involving two qubit memories herein are denoted using the notation $Q_A$:$E_A$~$Q_B$:$E_B$ where $Q_A$:$E_A$ is the qubit state on the A-side of the entanglement and $Q_B$:$E_B$ is the qubit state on the B-side of the entanglement. For multipartite entanglement a different notation may be used.

Figure 29:
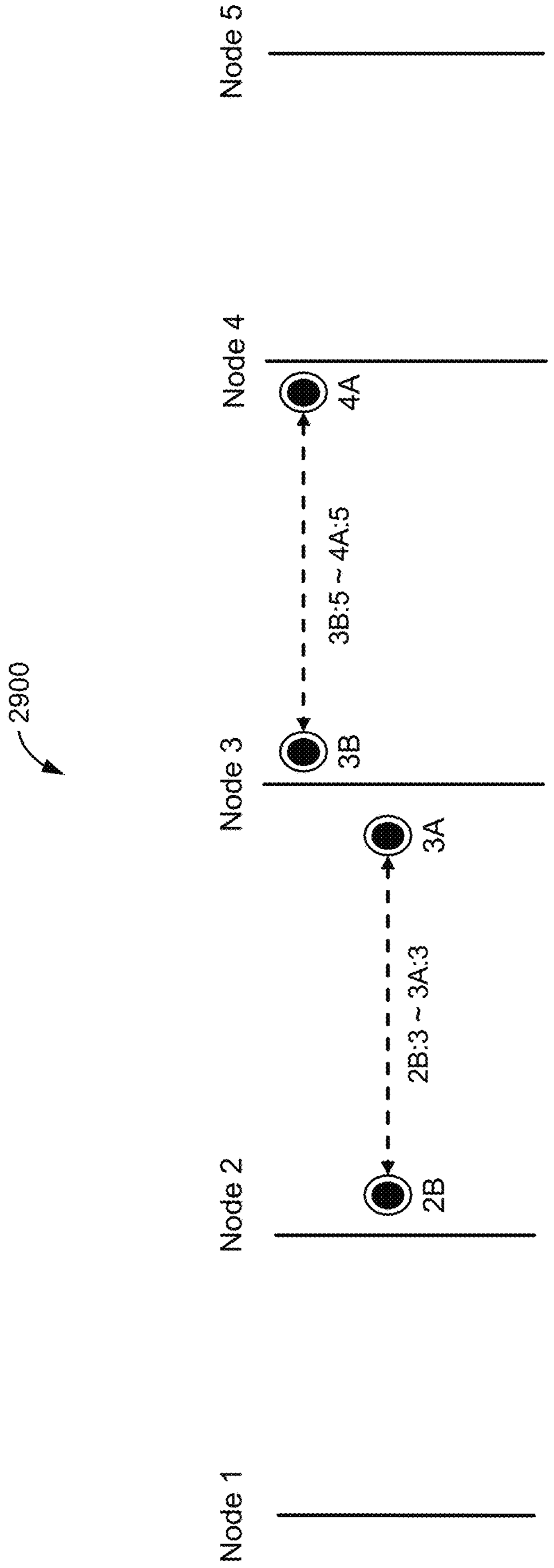

FIG. 29 shows a portion of an example quantum network 2900 comprising two elementary entanglements with corresponding elementary entanglement identifiers. Note that in this example the elementary entanglement sequence numbers 3 and 5 are used (not starting at 1), indicating that there were some other elementary entanglements generated earlier that are not explicitly shown in this example.

Figure 30:
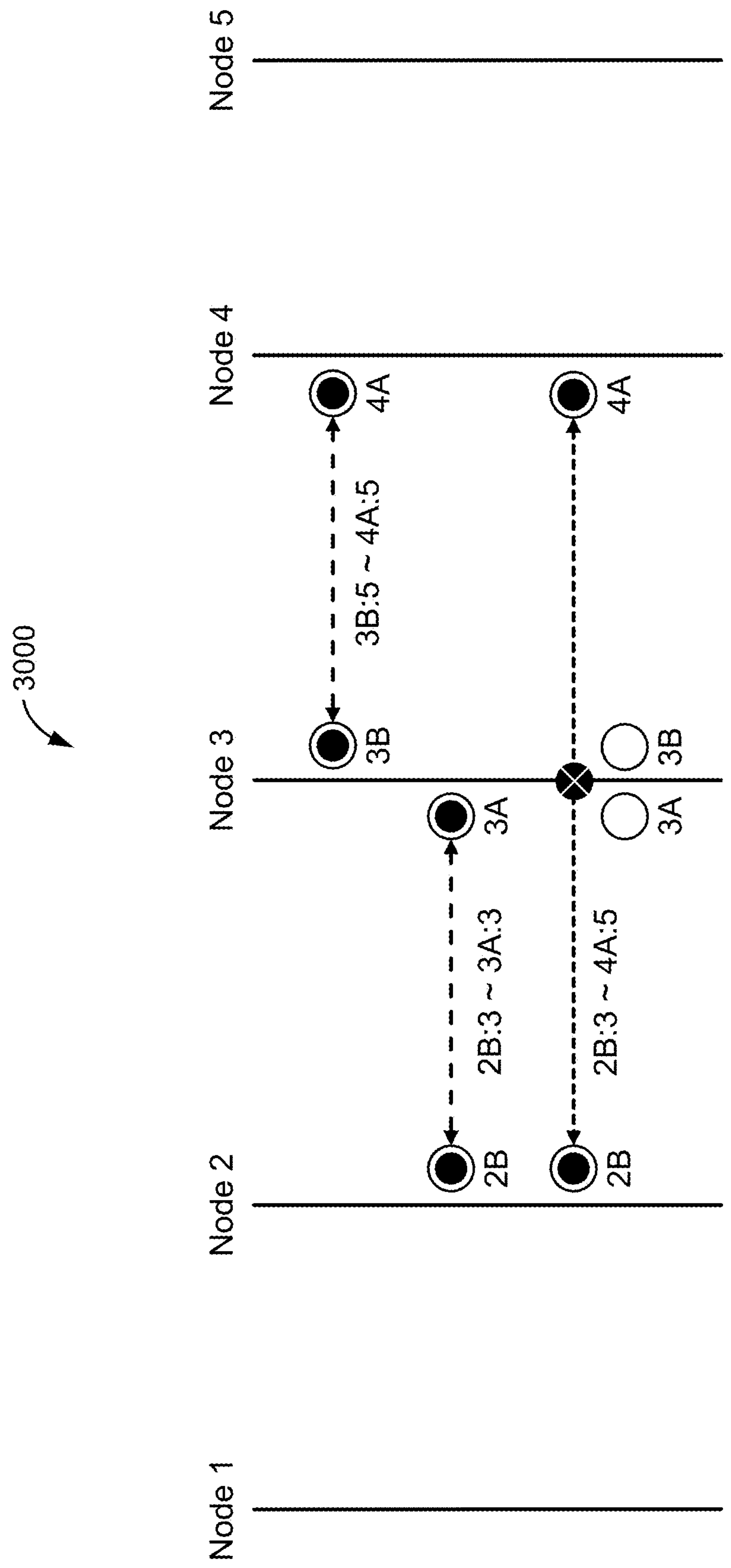

FIG. 30 shows a portion of an example quantum network 3000 comprising a non-elementary entanglement identifier (2B: 3~4A: 5), where Node 3 performs a swap operation (black ⊗) between two elementary entanglements, resulting in a multi-hop non-elementary entanglement between qubit memories 2B and 4A. Also, the qubit states 3A:3 and 3B:5 are lost in the swapping process, which makes qubit memories 3A and 3B available again (empty circles for 3A and 3B) for future elementary entanglement generation.

Figure 31:
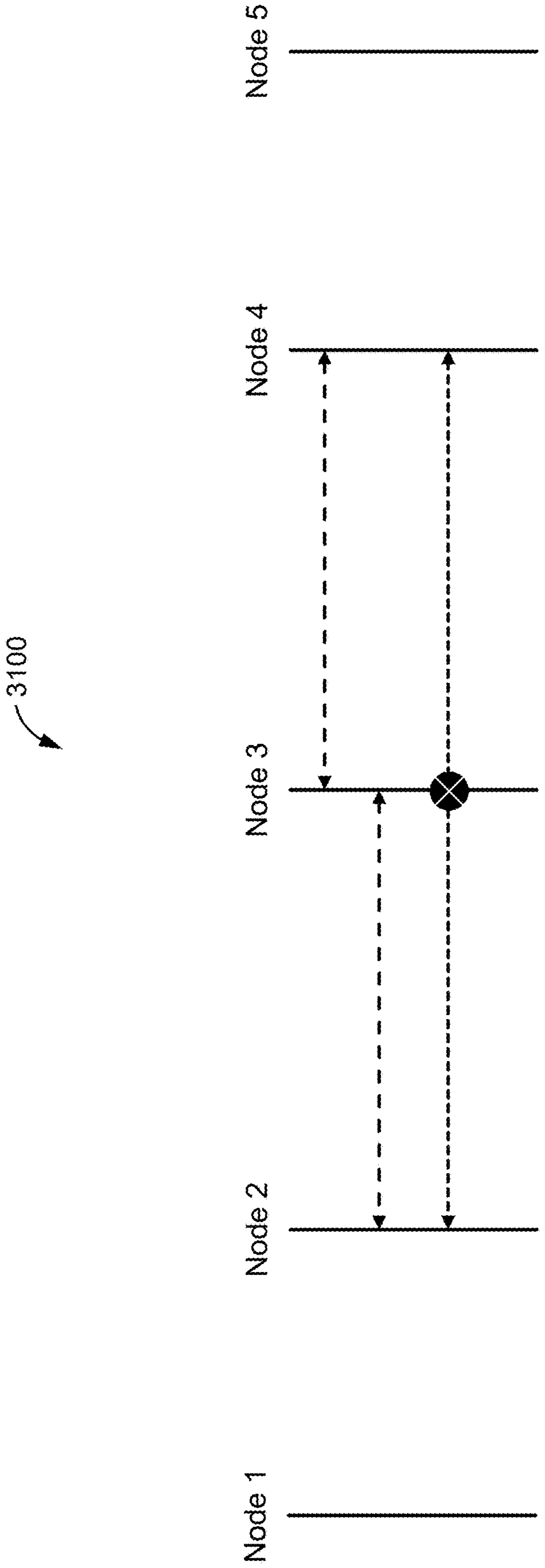

FIG. 31 shows a portion of an example quantum network 3100 representing a simplified swapping operation diagram corresponding to FIG. 30.

Herein, swap operations may be denoted in a shorthand notation. For example, "23+34=24" means that node 3 performed a swap which consumed the entanglement between nodes 2 and 3, and the entanglement between nodes 3 and 4, to produce a new entanglement between nodes 2 and 4.

19. Real-Time Classical Messages

In the figures disclosed herein, a solid black single-headed arrow is used to indicate sending a real-time classical message from one node to another node. As used herein, a "real-time classical message" can refer to any message that is sent using a technique for communicating classical information in real-time (e.g., the transmission and/or arrival times of the classical messages may be relevant to the operations). For example, some techniques encode classical information on macroscopic signals that are not capable of encoding quantum states, which in some cases involves transmission over a separate classical communication channel or network. Other encoding schemes could be used, including schemes that encode classical information within quantum signals. For example, a multiplexing scheme can be used that multiplexes quantum signals sending encoded qubits with quantum signals sending encoded classical information. For example, a protocol such as a quantum secure direct communication (QSDC) protocol can be used to send classical information, where the quantum nature of the communication scheme may provide a benefit, such as enhanced security.

Figure 32:
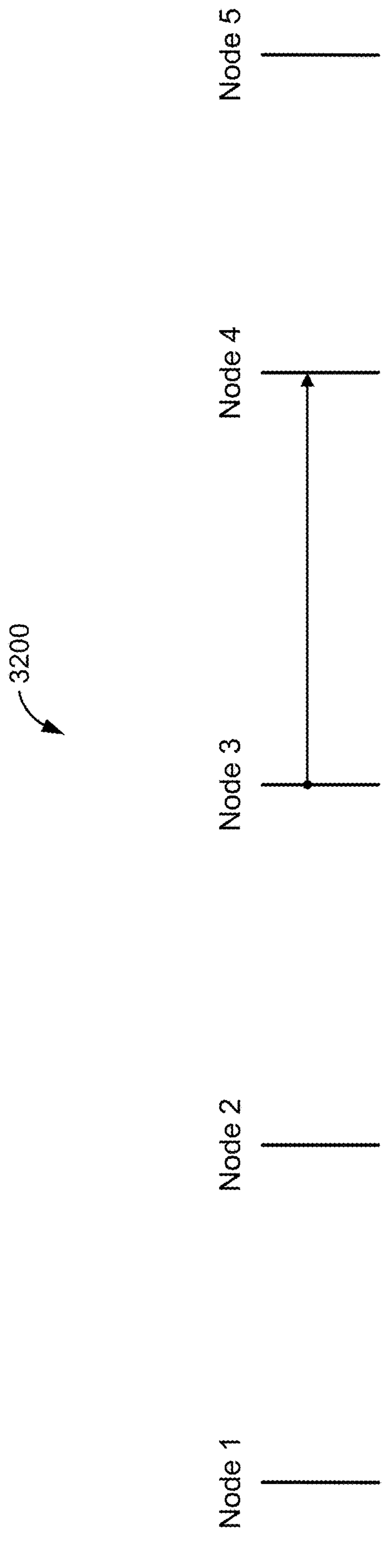

FIG. 32 shows a portion of an example quantum network 3200 where Node 3 sends a real-time classical message (solid black single-headed arrow) to Node 4. Node 3 sending the classical message is an action, typically executed as part of an FSM transition. Node 4 receiving a real-time classical message is an event, typically dispatched to an FSM. In some examples, real-time classical messages do not go through the TCP/IP stack on the host. Instead, the real-time firmware may directly encode and decode the bits of such a real-time classical message as light pulses on the fiber, possibly reducing processing latency and jitter. In such examples, real-time classical messages may be exchanged between directly connected neighbor nodes, assuming that there is a classical channel in parallel to the quantum channel.

For real-time classical messages, some finite amount of time passes between sending a message and receiving a message. For example, it takes a finite amount of time to encode the bits onto the fiber (e.g., at 10 Gbps it takes 3 ns to encode a 3-byte message, assuming 8b/10b encoding). It also takes a finite amount of time for the message to propagate along the fiber at the speed of light (e.g., it takes 50 μs to traverse a 50 km fiber link). Thus, slanted black arrows may be used to indicate the passage of time, as shown in FIG. 33.

Figure 33:
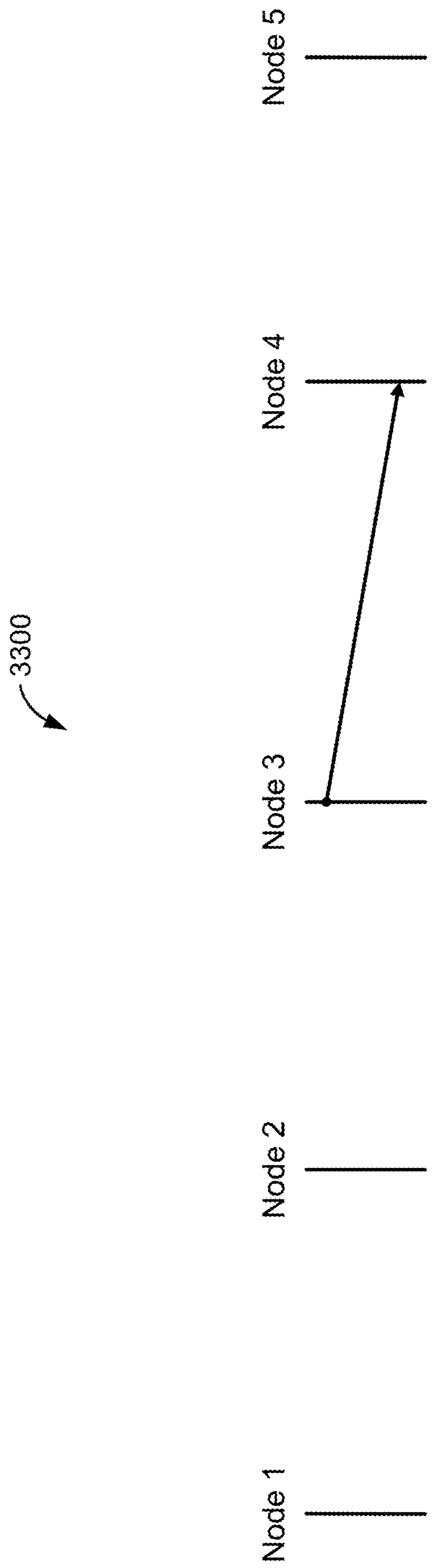

FIG. 33 shows a portion of an example quantum network 3300 where Node 3 sends a real-time classical message (solid black single-headed arrow) to Node 4, with a time lag represented by the slant of the solid black single-headed arrow.

Figure 34:
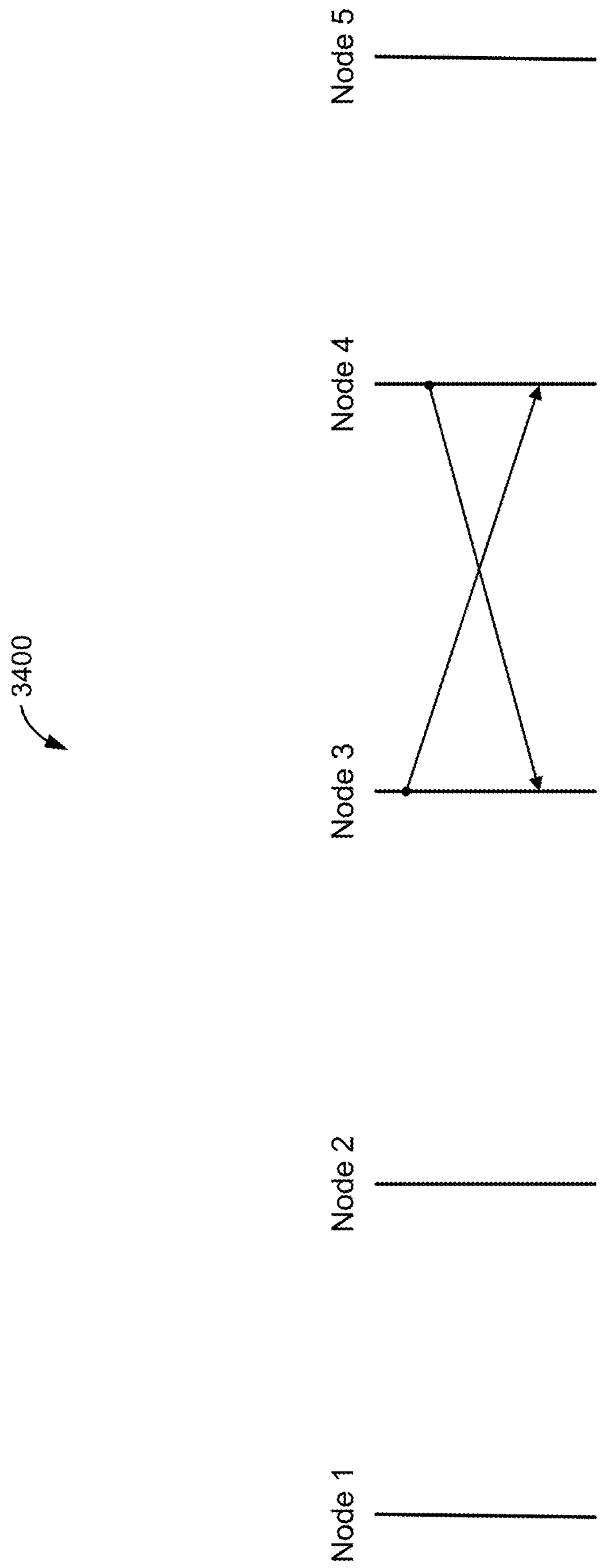

Such delays may be important when the protocol handles situations where messages "cross each other" on the fiber, as shown in FIG. 34.

FIG. 34 shows a portion of an example quantum network 3400 where Node 3 sends a real-time classical message (solid black single-headed arrow) to Node 4 and Node 4 sends a real-time classical message to Node 3, with a time lag represented by the slant of each of the solid black single-headed arrows.

For simplicity, horizontal black arrows will be used herein unless a figure is specifically considering scenarios where the propagation delay or the possibility of crossing messages matters.

Figure 35:
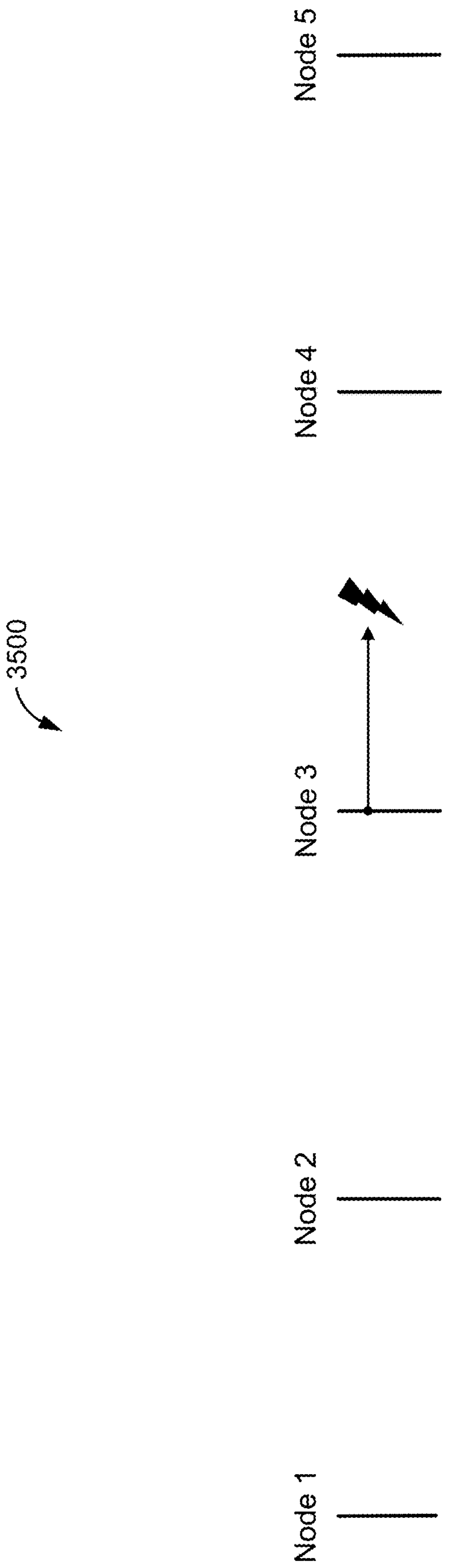

FIG. 35 shows a portion of an example quantum network 3500 where a classical message (solid black single-headed arrow) is lost (lightning bolt). Node 3 sends a classical message, but Node 4 never receives the classical message. Note that in some examples, real-time messages do not use a reliable transport protocol such as TCP. Therefore, Node 3 may be unaware that Node 4 did not receive the message, and Node 4 may be unaware that it is missing a message, unless there is some explicit acknowledgement mechanism in the swapping protocol itself.

20. Parallel Elementary Entanglement Generation

Elementary entanglement generation on a given link may start as soon as the qubit memories on either side of the link are available. Once elementary entanglement generation starts, it is a non-deterministic process (i.e., it is unknown how many attempts it will take to generate the elementary entanglement), and hence it is unknown how long it will take to generate elementary entanglement. As a result, it is unknown in which order the elementary entanglements will be created.

Figure 36:
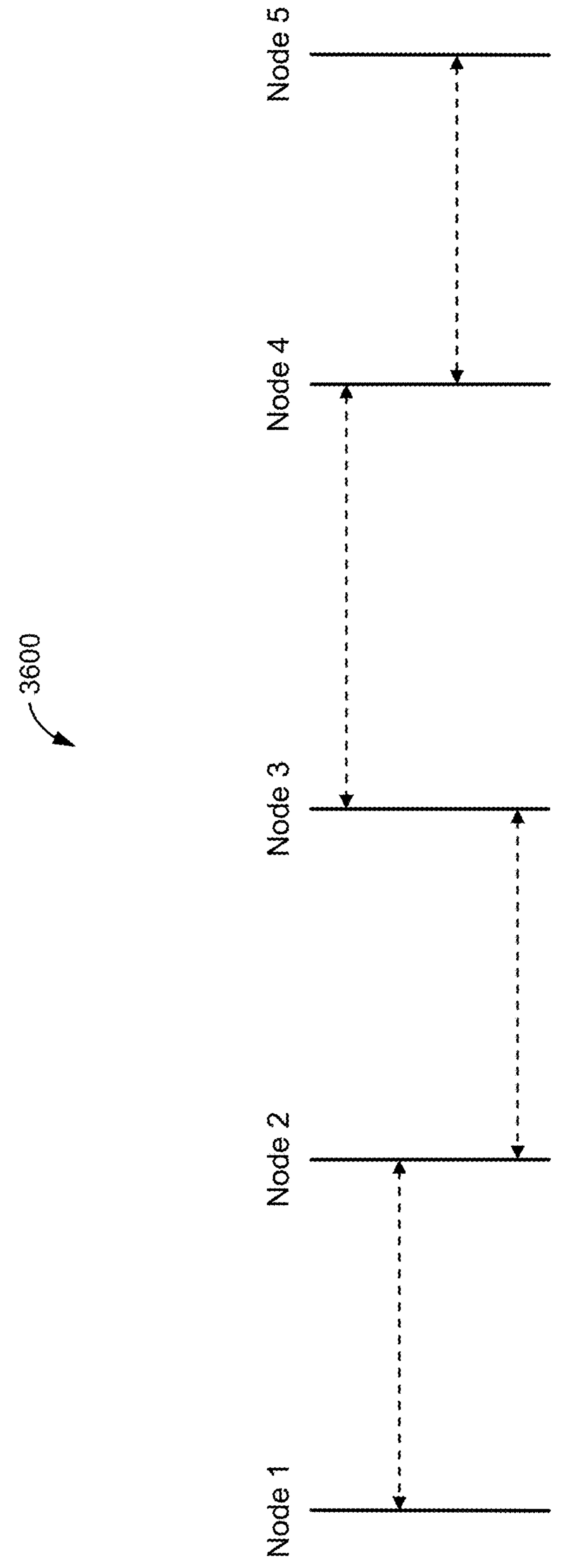
Figure 37:
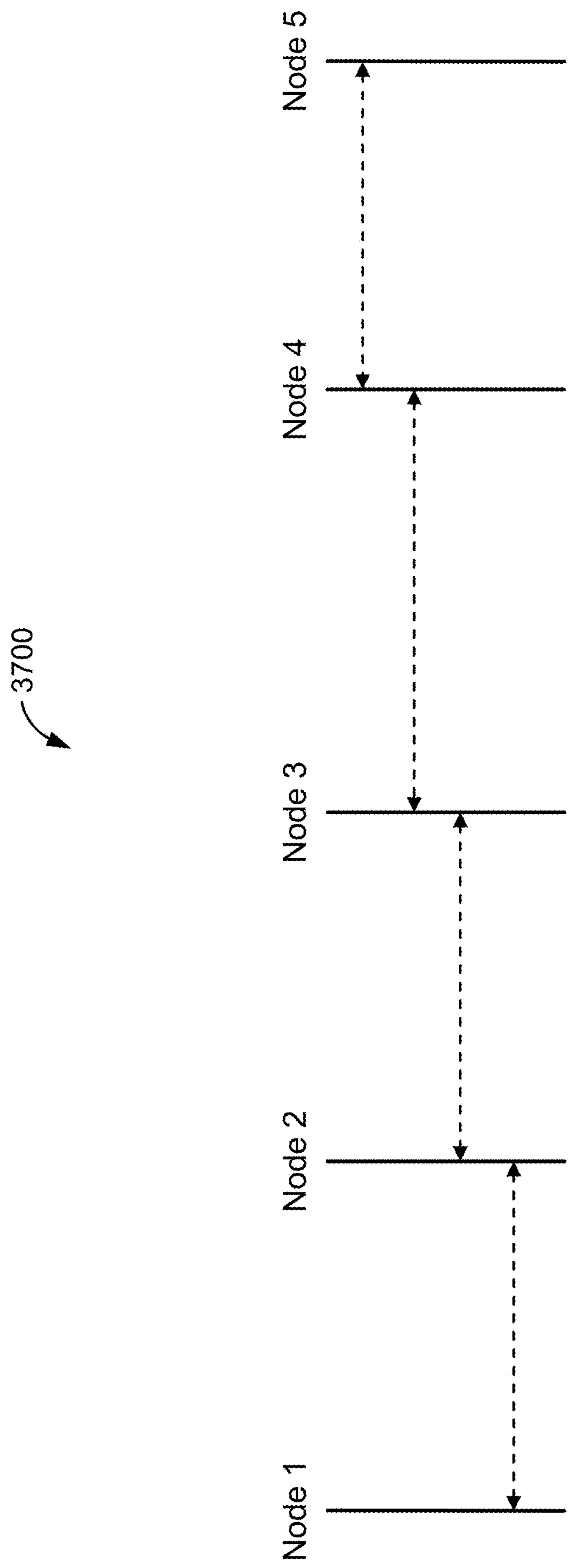

FIG. 36 and FIG. 37 show portions of example quantum networks 3600 and 3700, respectively, comprising two different orders in which entanglements could potentially be created. For example, referring to the quantum network 3600 in FIG. 36, the first entanglement generation occurs between Nodes 3 and 4, while the last entanglement generation occurs between nodes 2 and 3. In contrast, referring to the quantum network 3700, the first entanglement generation occurs between Nodes 4 and 5, while the last entanglement generation occurs between nodes 1 and 2.

21. Swapping and Swapped Messages

Nodes may perform entanglement swaps and exchange Swapped messages to create an end-to-end entanglement that is delivered to the next-higher layer. In this example, there may be two requirements for such a process. (1) With a high probability, either both hosts or neither host deliver an end-to-end to the next higher layer. It is not acceptable for one host to report an end-to-end entanglement but the other host not. Concretely, this means that an end-to-end entanglement is only delivered once all swaps across the entire path have been successfully completed. (2) When a host delivers an end-to-end entanglement to the higher layer, it reports both the local qubit state identifier and the remote qubit state identifier, in addition to other metadata associated with those identifiers. It is not sufficient to report what the local and remote qubit memories are. Those qubit memories will contain multiple different states over time, and those states are identified by qubit state identifiers which include a sequence number.

In the first case "with a high probability" is used because there may be low-probability failures that are not detected and that may be accounted for in the noise model.

Figure 38:
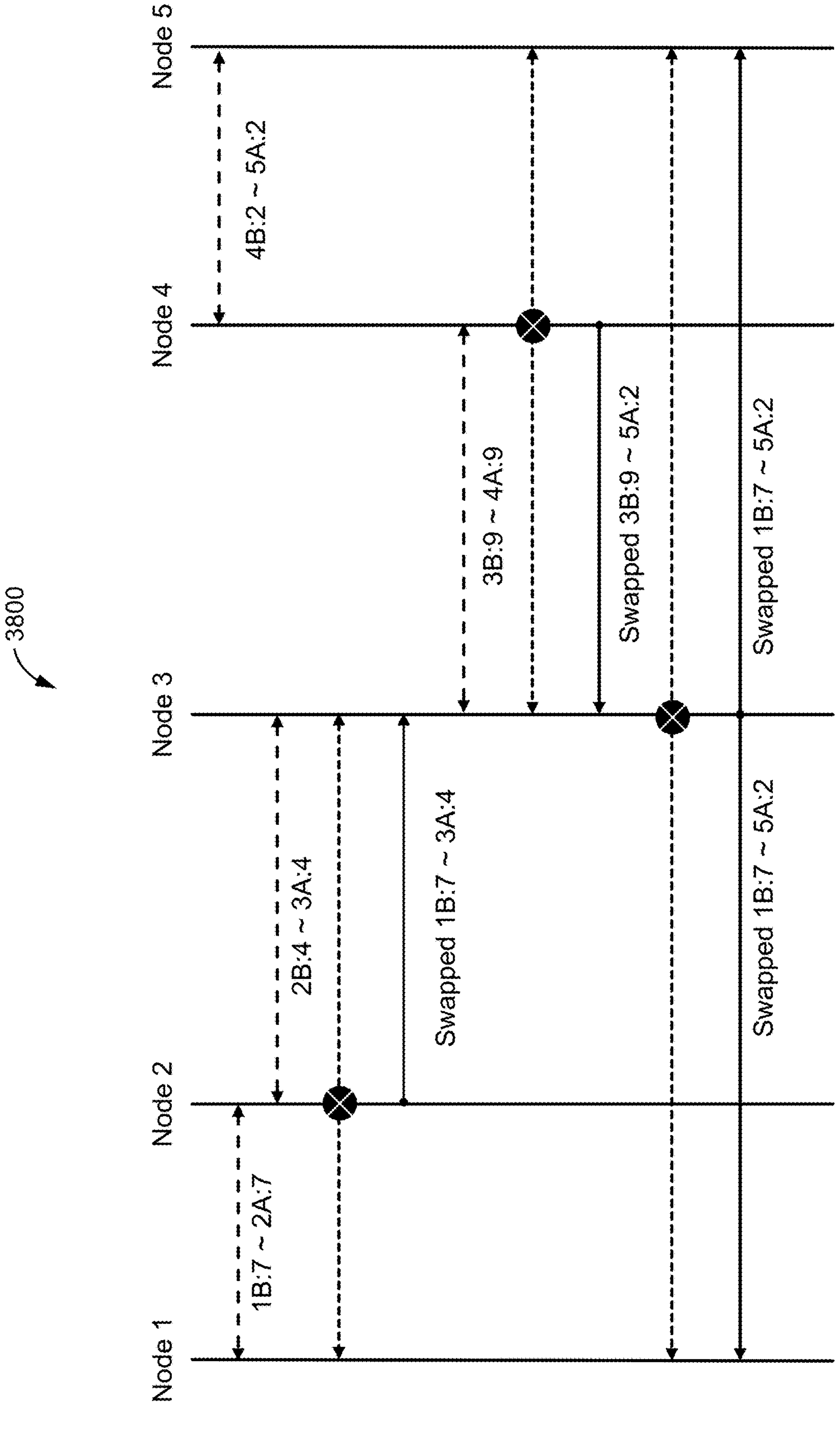

FIG. 38 shows a portion of an example quantum network 3800 where, after a node has performed a successful swap operation on two qubit memories, it sends one or two Swapped messages (e.g., Swapped 1B: 7~3A: 4) to other nodes (e.g., Node 3). A swapping node sends two Swapped messages (one to each host for the virtual circuit) if the swap was successful and was the last swap, in accordance with the schedule installed by the controller, to complete end-to-end entanglement. Otherwise, the swapping node sends a single Swapped message, namely to the next node that must perform a swap in the swap schedule. Either way, the Swapped message(s) may be sent to another node that is more than one hop away. Thus, Swapped messages may need to be forwarded across multiple hops (e.g., Node 3 to Node 5). In some implementations of the swapping protocol, the Swapped messages may need to be forwarded along a portion of the same path associated with the virtual circuit. In other implementations, the forwarding path may be different from the path associated with the virtual circuit as long as the Swapped messages get to the intended destination.

Referring again to FIG. 38, there are four Swapped messages. (1) Node 2 performs swap elementary entanglement 1B: 7~2A: 7 with elementary entanglement 2B: 4~3A: 4 to produce non-elementary entanglement 1B: 7~3A: 4. Then node 2 sends a single Swapped 1B: 7~3A: 4 message to node 3. (2) Node 4 performs swap elementary entanglement 3B: 9~4A: 9 with elementary entanglement 4B: 2~5A: 2 to produce non-elementary entanglement 3B: 9~5A: 2 and sends a single Swapped 3B: 9~5A: 2 message to node 3. (3) Node 3 waits until it has received both Swapped messages from nodes 2 and 4. Then it swaps entanglement 1B: 7~3A: 4 with entanglement 3B: 9~5A: 2 to produce entanglement 1B: 7~5A: 2. At this point the end-to-end entanglement is complete, so node 3 sends a Swapped 1B: 7~5A: 2 message to both hosts (i.e., Nodes 1 and 5). (4) When a host receives the Swapped 1B: 7~5A: 2 message, it delivers the produced end-to-end entanglement to the next higher layer.

Table 1 below shows some of the fields in an example Swapped message.

TABLE 1

Example Swapped message fields.

| Field | Description |
|---|---|
| Virtual circuit | The identifier of the virtual circuit for which the entanglement was produced. |
| Destination node | The identifier of the node to which the Swapped message is sent. |
| Entanglement identifier | The identifier of the entanglement that the swap produced. For example 3B: 2~5A: 7 means an entanglement between the qubit state with sequence number 2 stored in the qubit memory on the B-side of node 3 and the qubit state with sequence number 7 stored in the qubit memory on the A-side of node 5. |
| Bell state | Which of the four possible Bell states the entanglement is: $\|\phi^{+}>$, $\|\phi^{-}>$, $\|\Psi^{+}>$, or $\|\Psi^{-}>$. See section 29 for details. |
| Timestamp | The global timestamp when the entanglement was successfully created (for the purpose of fidelity tracking) |
| Post-swap fidelity | Estimated fidelity of the entanglement right after the swap occurred. |
| Post-swap density matrix | Estimated density matrix of the entanglement right after the swap occurred. |

Simplified entanglement state identifiers (e.g., 35) may be used herein, instead of full entanglement state identifiers (e.g., 3B: 9~5A: 2). The simplified swap notation "13+35=15" may also be used herein. Although the entanglement sequence numbers in the entanglement state identifiers may be omitted in the simplified notation, they often cannot be neglected in practice (e.g., when a host must report both the local qubit state identifier and the remote qubit state identifier, where the entanglement sequence numbers correspond to the respective qubit state identifiers).

21.1 Swap-Success and Swap-Failed Messages

Entanglement swap operations are non-deterministic in nature, and can either result in a successful swapping of the entanglement, or a failed operation which destroys the input entanglements in the process. As entanglement swap operations can be used in the process of generating end-to-end entanglement on a virtual circuit, the east-west protocols described herein communicate the information of the operational outcomes of entanglement swap operations to coordinate subsequent actions towards generating end-to-end entanglement(s). Thus, we can define Swap-Success and Swap-Failed messages.

The Swap-Success message refers to the Swapped message described above, with the fields of the message describing the successful swap operation detailed in Table 1: Swapped message fields. Herein, a "Swapped message" may also be referred to as a "Swap-Success message".

The Swap-Failed message is a message to convey information to nodes in the network that an attempted entanglement swap operation was unsuccessful. In this case, the input entanglements are destroyed in the process and there is no resulting Bell state information, nor post-swap fidelity or post-swap density matrix included in the message. The Swap-Failed message may still include a virtual circuit identifier, a destination node identifier, the identifier of the entanglement that was attempted to be produced by the operation, and/or a timestamp of the attempted swap operation.

22. The Swapping Schedule

The swapping schedule determines in which order the swaps occur, and hence in which order the Swapped messages are sent.

Figure 39:
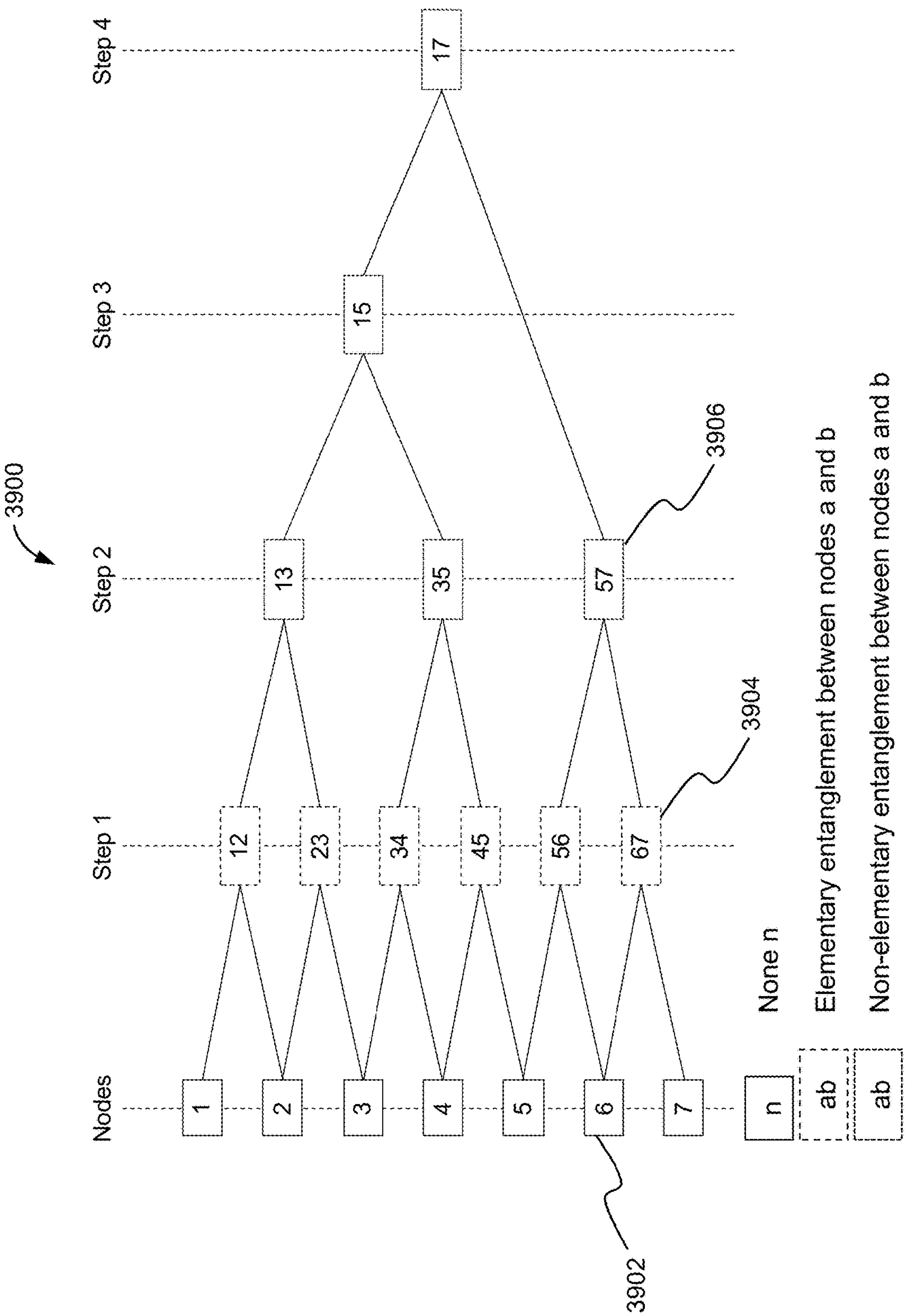
FIGS. 39-41 are schematic diagrams of example schedules.

FIG. 39 shows a first example swapping schedule 3900 for seven nodes. No entanglement at a node is represented by a solid black-bordered rectangle 3902, elementary entanglement between two nodes is represented by a dashed black-bordered rectangle 3904, and non-elementary entanglement between two nodes is represented by a short-dashed black-bordered rectangle 3906. The swapping schedule 3900 comprises the following steps. (1) Begin with 7 nodes, indicated by the solid black-bordered rectangles 3902 on the left (i.e., at the Nodes vertical line). (2) Each pair of neighboring nodes first produces an elementary entanglement at Step 1, indicated by the dashed black-bordered rectangles 3904. The number in the rectangle identifies the elementary entanglement; for example, 56 means an elementary entanglement between nodes 5 and 6. The fact that all elementary entanglements are on the same vertical line (i.e., in the same time step) means that all the elementary entanglement generations are allowed to happen asynchronously, i.e., in parallel without any interdependencies. This approach is referred to as asynchronous scheduling, hence the elementary entanglements are not necessarily produced synchronously at exactly the same moment. (3) Next, at Step 2 the following three things are allowed to happen asynchronously in parallel (note, the vertical line is not intended to mean that these three swaps happen at the same moment, only that they are performed asynchronously in parallel). (a) Node 2 waits until both elementary entanglements 12 and 23 exist. Then it performs swap 12+23=13 and sends a Swapped message to node 3. (b) Node 4 waits until both elementary entanglements 34 and 45 exist. Then it performs swap 34+45=35 and sends a Swapped message to node 3. (c) Node 6 waits until both elementary entanglements 56 and 67 exist. Then it performs swap 56+67=57 and sends a Swapped message to node 5. (4) At Step 3, Node 3 waits until it has received both the Swapped 13 message from node 2 and the Swapped 35 message from node 4. Then it performs swap 13+35=15 and sends a Swapped message to node 5. (5) At Step 4, Node 5 waits until it has received both the Swapped 15 message from node 3 and the Swapped 57 message from node 6. Then it performs swap 15+57=17. This completes the end-to-end entanglement, so node 5 sends two Swapped 17 messages, one to node 1 (host A) and one to node 7 (host B).

23. The Optimal Swapping Schedule

There are many possible swapping schedules for a given number of nodes.

Figure 40:
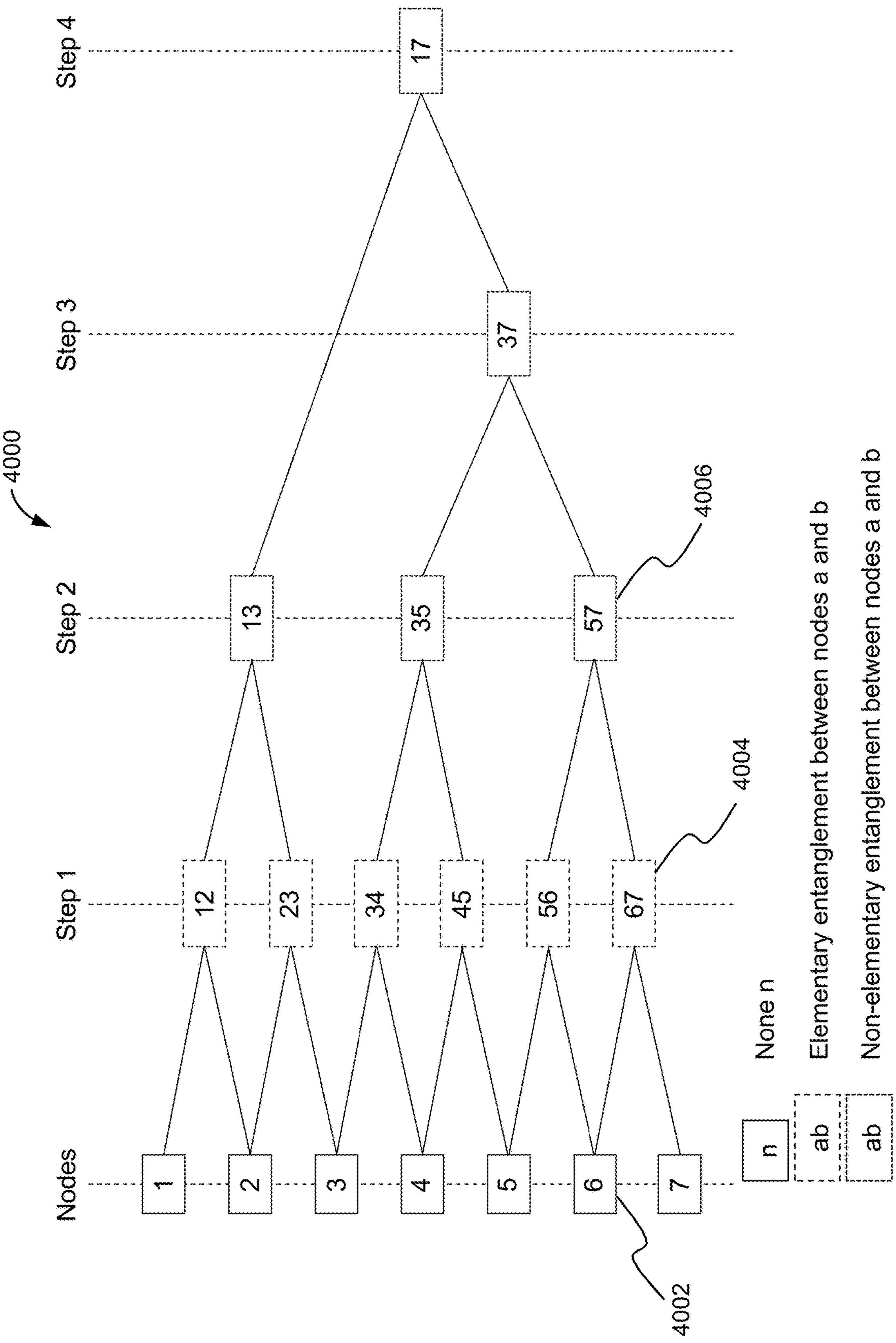

FIG. 40 shows a second example possible swapping schedule 4000 for 7 nodes. No entanglement at a node is represented by a solid black-bordered rectangle 4002, elementary entanglement between two nodes is represented by a dashed black-bordered rectangle 4004, and non-elementary entanglement between two nodes is represented by a short-dashed black-bordered rectangle 4006.

Figure 41:
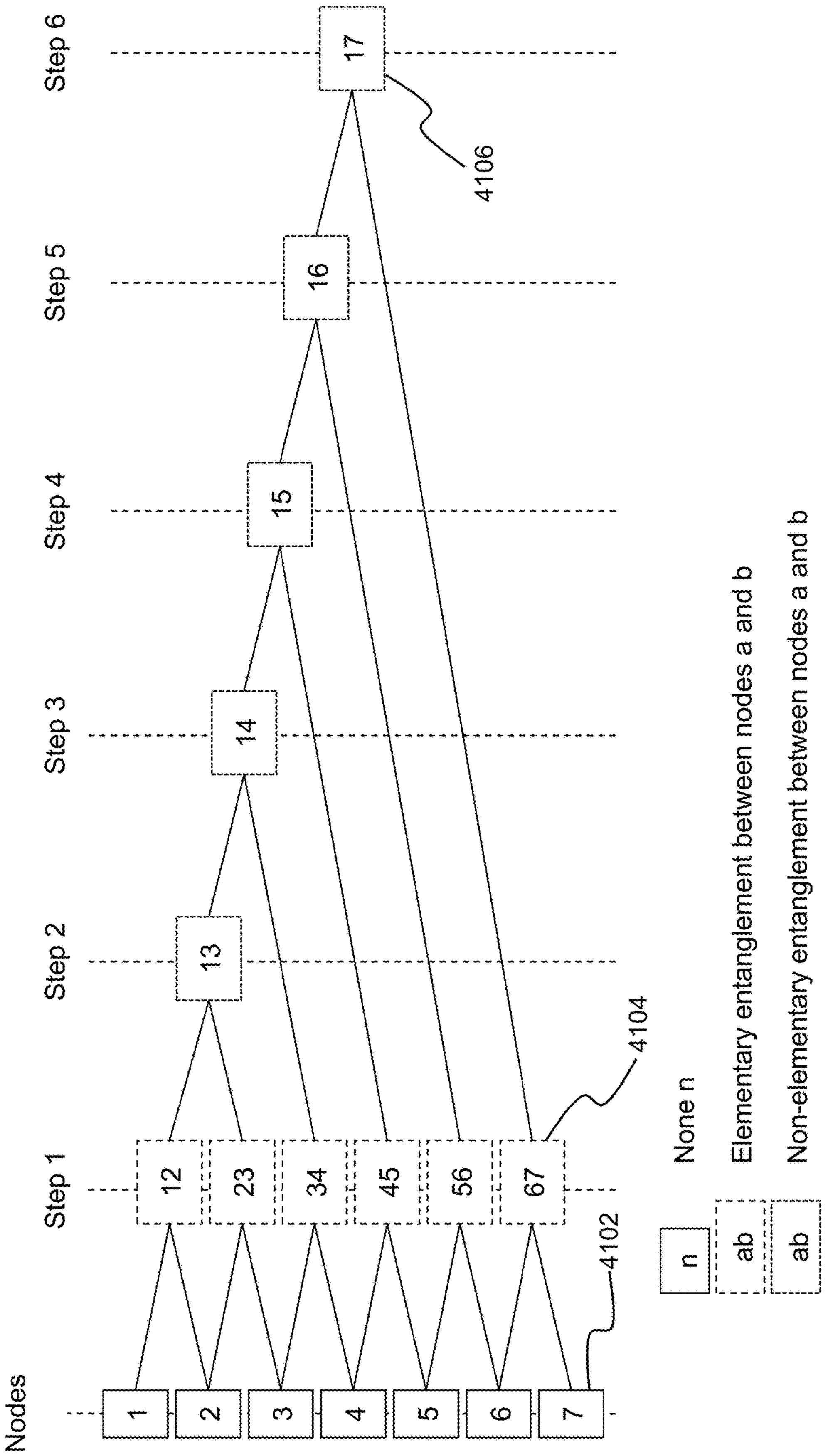

FIG. 41 shows a third example swapping schedule 4100 for 7 nodes. No entanglement at a node is represented by a solid black-bordered rectangle 4102, elementary entanglement between two nodes is represented by a dashed black-bordered rectangle 4104, and non-elementary entanglement between two nodes is represented by a short-dashed black-bordered rectangle 4106.

In general, some swapping schedules are better than other swapping schedules. In FIG. 39 and FIG. 40, only 4 steps are used to complete the end-to-end entanglement, whereas in FIG. 41, 6 steps are used. In certain circumstances (e.g., depending on the underlying architecture of the network), however, more steps may be beneficial or necessary.

In some examples, it may be the job of the quantum network controller to choose a swapping schedule for each node on a given virtual circuit. The chosen swapping schedule may be optimized with regards to one or more parameters and constraints. In some examples, the chosen swapping schedule may be optimal under the parameters of the quantum network. The quantum network takes many factors into consideration when computing a (possibly optimal) swapping schedule, including the characteristics of the qubit memories (e.g., $T_1$ and $T_2$ decoherence times), the characteristics of the fiber links (distance, loss), etc., as may be discovered through the hardware abstraction API.

24. The Swapping Schedule is Asynchronous

In some figures (e.g., FIGS. 39 and 40), the actions that are on the same vertical line (i.e., in the same time step) are allowed to happen concurrently in an asynchronous fashion. As a result, the exact sequence of events may not be fully determined by the schedule.

Figure 42:
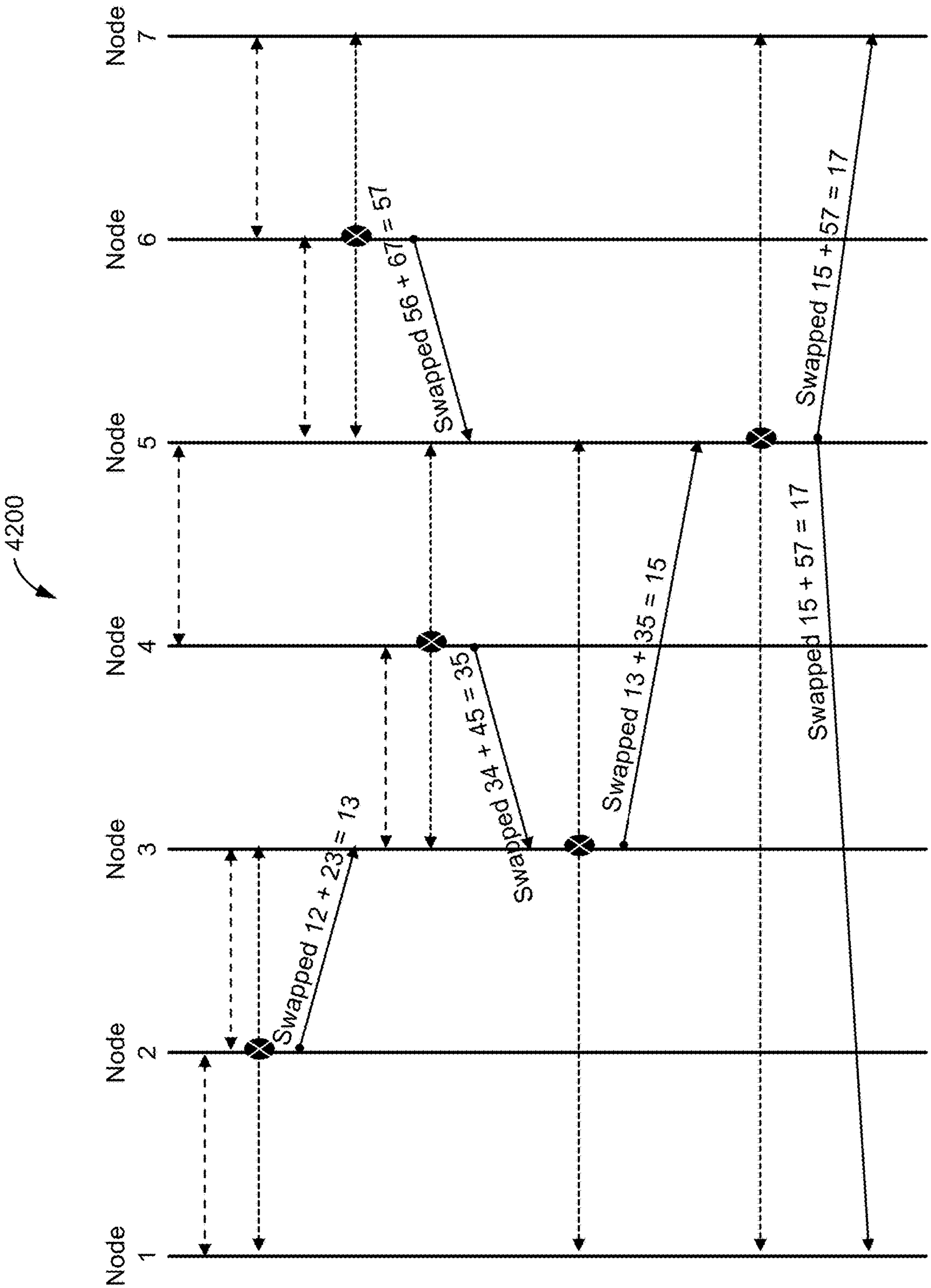
FIGS. 42-43 are schematic diagrams of example steps occurring in quantum network portions.

FIG. 42 shows a portion of an example quantum network 4200 comprising a first example sequence of events corresponding to the example swapping schedule 4100 shown in FIG. 41. In this example, the first non-elementary entanglement generated is 13 by swap 12+23=13. Furthermore, non-elementary entanglement 57 is generated before non-elementary entanglement 15.

Figure 43:
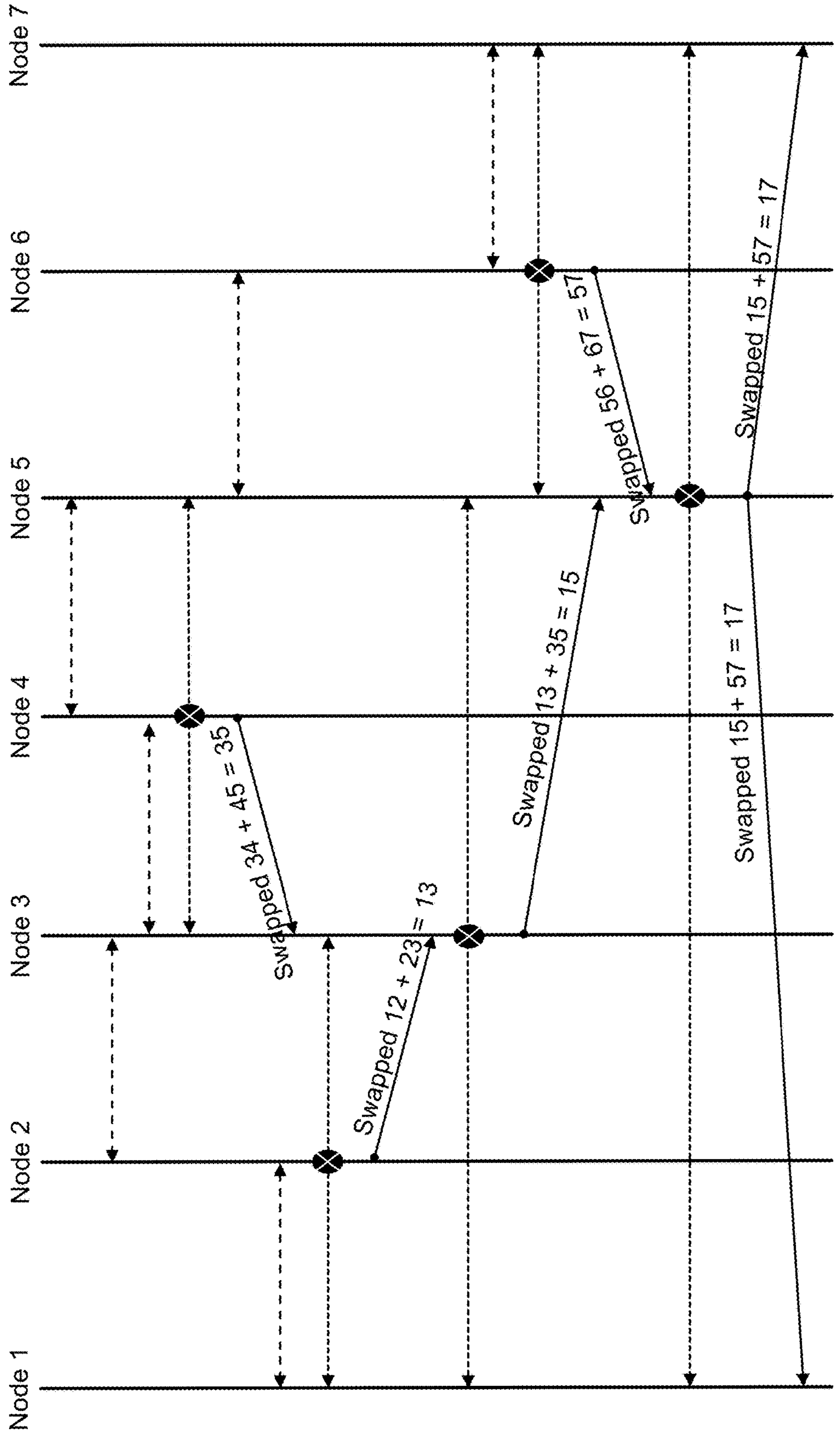

FIG. 43 shows a portion of an example quantum network 4300 comprising a second example sequence of events corresponding to the example swapping schedule 2900 shown in FIG. 29. In this example, the first non-elementary entanglement generated is 35 by swap 34+45=35. Furthermore, non-elementary entanglement 57 is generated after non-elementary entanglement 15.

Note that, while there is some asynchronicity (i.e., some freedom in the exact relative timing of the various events) there is also some ordering imposed by the swapping schedule: the Swapped messages guarantee that certain swap actions in time step n are completed before any swap actions in time step n+1.

25. Translating Schedules to Finite-State Machines

In some examples, regardless of the order in which the elementary entanglements are generated, or in which order the swaps occur, the sequence of swaps can follow the same "tree structure" imposed by the swapping schedule. As a result, it can be known in advance from which node to which node the Swapping messages will be sent. It can also be known in advance which event(s) a node must wait for before it can perform a swap.

Such information allows for the translation of the schedule into a finite-state machine (FSM) for each node in the virtual circuit. The finite-state machine may describe what events a node must wait for, when to perform a swap, and when to send a message and to which node a message is sent. Depending on the specific variation of swapping protocol and the schedule, the set of nodes to be sent a Swap-Success message may differ from the set of nodes to be sent a Swap-Failed message.

Figure 44:
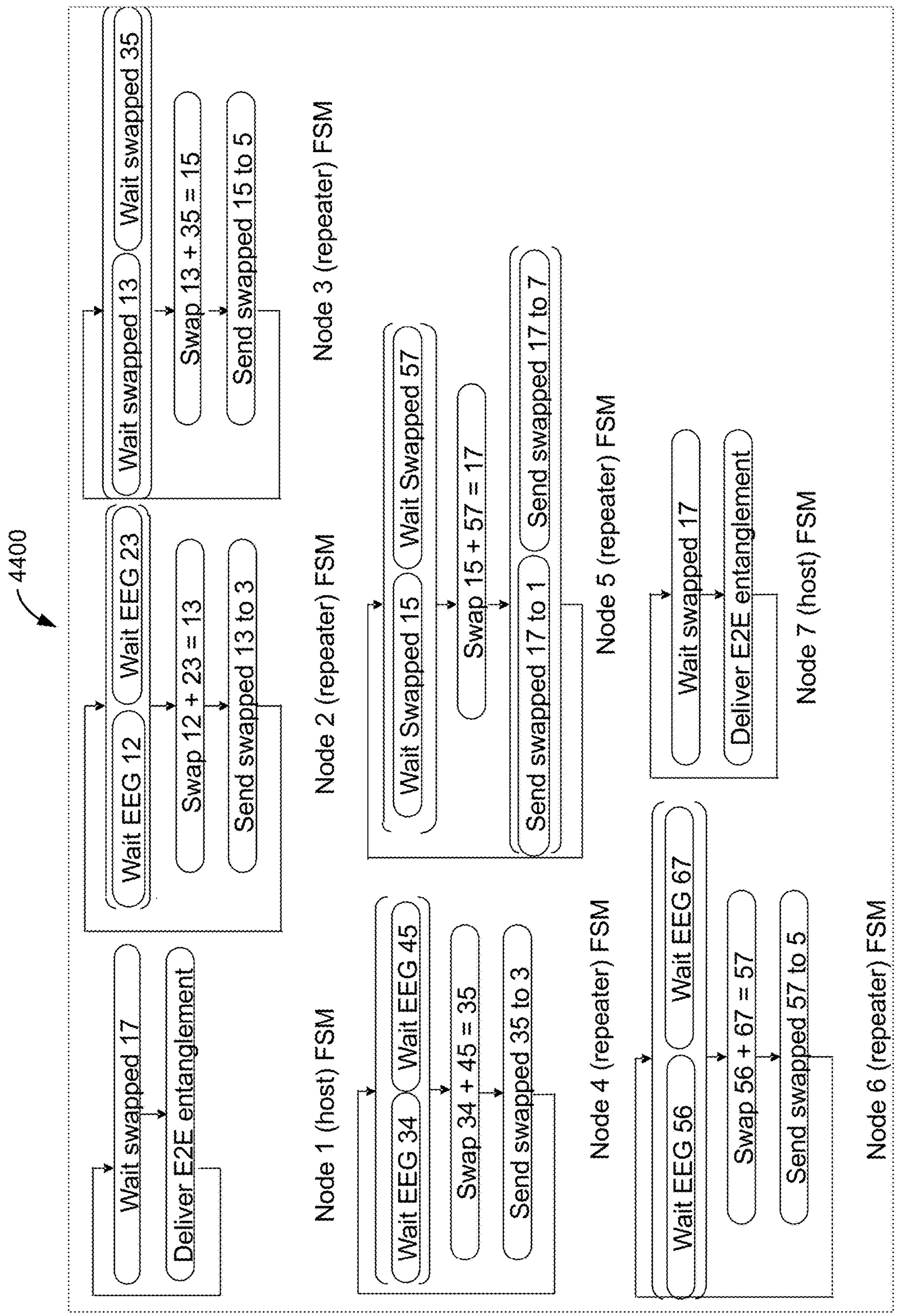
FIGS. 44-45 are finite state machine (FSM) transition diagrams for example FSMs.

FIG. 44 shows an example set of finite-state machines 4400 (FSMs), with one FSM for each node, corresponding to the first swapping schedule 3900 in FIG. 39. Although "Swap ab+bc=ac" may appear to be an action, it is in fact a state of a node. In general, executing an entanglement swap operation may involve sending a swap request to the hardware abstraction layer and waiting for a response event (e.g., success or failure) from the hardware abstraction, which occurs some finite amount of time later. Later paragraphs describe how the swapping protocol handles swap failures, depending on the variation of the protocol.

Referring again to FIG. 44, a Node 1 (host) FSM comprises two states that transition between each other after their completion: a state "Wait swapped 17" and a state "Deliver E2E (end-to-end) entanglement". A Node 7 (host) FSM behaves in a similar manner to the Node 1 (host) FSM. A Node 2 (repeater) FSM comprises a state including both "Wait EEG 12" and "Wait EEG 23". After both EEGs occur, the Node 2 (repeater) FSM transitions to a state "Swap 12+23=13" where a non-elementary entanglement generation by swapping yields entanglement 13, after which the state transitions to a state "Send swapped 13 to 3" where Node 2 sends a Swapped message to Node 3. A Node 4 (repeater) FSM and Node 6 (repeater) FSM behaves in a similar manner to the Node 2 (repeater) FSM. A Node 3 (repeater) FSM comprises a state including both "Wait Swapped 13" and "Wait Swapped 35", and, upon receiving the respective Swapped messages from Node 2 (i.e., "Send swapped 13 to 3") and Node 4 (i.e., "Send swapped 35 to 3"), transitions to a state "Swap 13+35=15". After the swap, the Node 3 (repeater) FSM transitions to a state "Send swapped 15 to 5". A Node 5 (repeater) FSM comprises a state including both "Wait Swapped 15" and "Wait Swapped 57", and, upon receiving the respective Swapped messages from Node 3 (i.e., "Send swapped 15 to 5") and Node 6 (i.e., "Send swapped 57 to 5"), transitions to a state "Swap 15+57=17". After the swap, the Node 5 (repeater) FSM transitions to a state including both "Send swapped 17 to 1" and "Send swapped 17 to 7". After Node 1 and Node 7 receive the respective Swapped messages, they each transition to the state "Deliver E2E entanglement".

Figure 45:
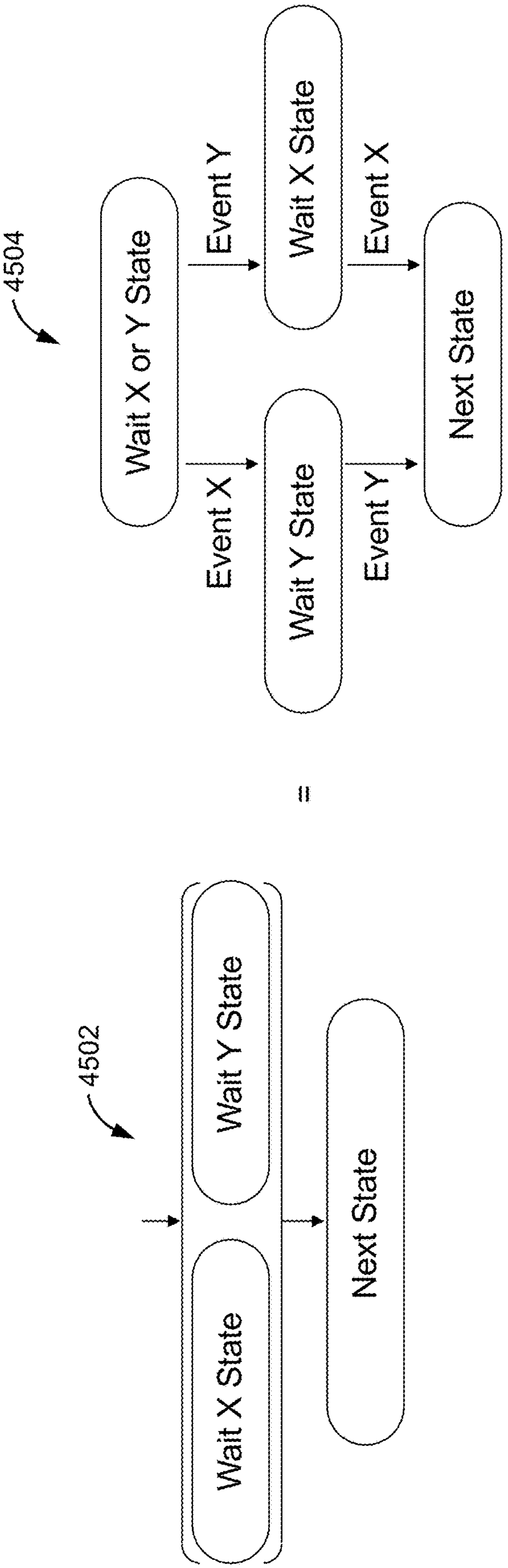

A "Send real-time classical" message, on the other hand, is technically not a state but rather an action. As such, it is not included in a box in FIG. 44. Sending a real-time classical message may be unreliable, since the message may be lost on the wire without any indication. FIG. 44 makes use of a simplified notation to indicate that the finite-state machine is waiting for two events X and Y to both occur, but as has been previously discussed, it does not matter in which order the event occurs. FIG. 45 makes more explicit the logic that is applied in the case of waiting for two events to both occur.

FIG. 45 shows an example simplification of a finite-state machine notation. A first representation 4502 of the FSM is equivalent to a second representation 4504 of the FSM. The second representation 4504 includes a state "Wait X or Y State" that transitions to a state "Wait Y State" if Event X occurs or to a state "Wait X state" if Event Y occurs. The "Wait Y State" then transitions to a state "Next State" after Event Y occurs and the "Wait X State" then transitions to a state "Next State" after Event X occurs. The first representation 4502 is simplified in comparison to the second representation 4504 and simply includes two states: a state including both "Wait X State" and "Wait Y State" that transitions to a state "Next State" after Event X and Event Y occur.

The translation from a schedule to a finite-state machine for each node may occur once the virtual circuit is established. The finite-state machines can be installed in the data plane of each node at virtual circuit establishment time. From then on, each node can efficiently perform its part of creating end-to-end entanglements by simply following the simple rules of its local finite-state machine.

26. Heralded Swap Failures

On some platforms, notably platforms using linear optics, there may be a 50% upper bound probability that a swap operation fails in a heralded manner. Heralded means that the swapping node has enough information to notify one or more nodes whether an entanglement swap attempt succeeded or failed.

Figure 46:
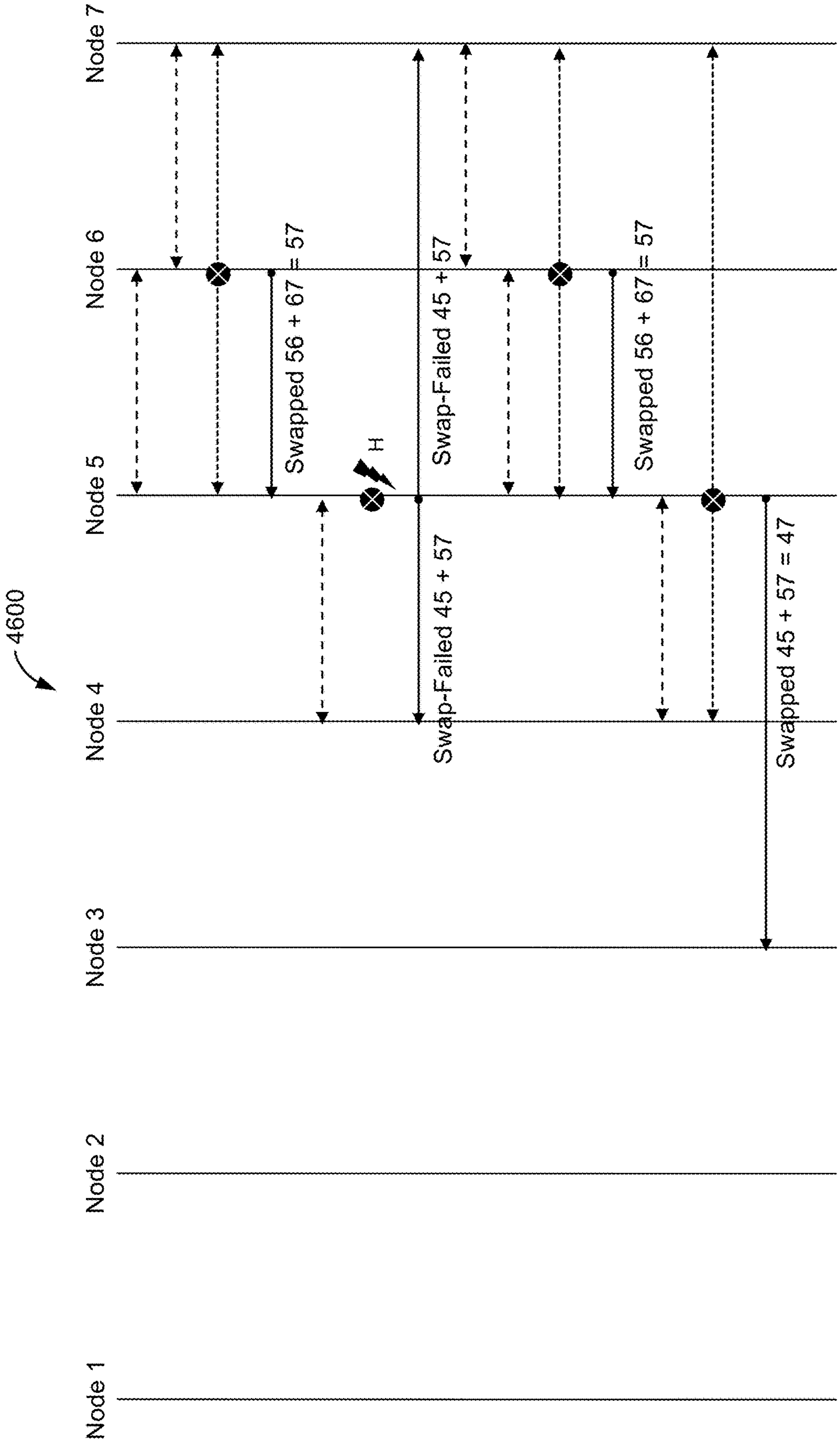
FIG. 46 is a schematic diagram of example steps occurring in a quantum network portion.

FIG. 46 shows a portion of an example quantum network 4600 that includes an example method for handling a heralded swap failure (represented as a lightning bolt and the letter "H") by using a real-time classical message: the Swap-Failed message. The quantum network 4600 is based on a portion of the underlying schedule shown in FIG. 47, a non-optimal schedule, in order to demonstrate that the Swapped (success) and Swap-Failure messages can potentially be sent to different nodes. In this example, the heralded swap failure (represented as a lightning bolt and the letter "H") is succeeded by sending "Swap-Failed 45+57" messages to Nodes 4 and 7 from Node 5, after which entanglement between Nodes 4 and 7 is reattempted and eventually succeeds, resulting in a "Swapped 45+57=47" message being sent to Node 3 from Node 5.

Figure 47:
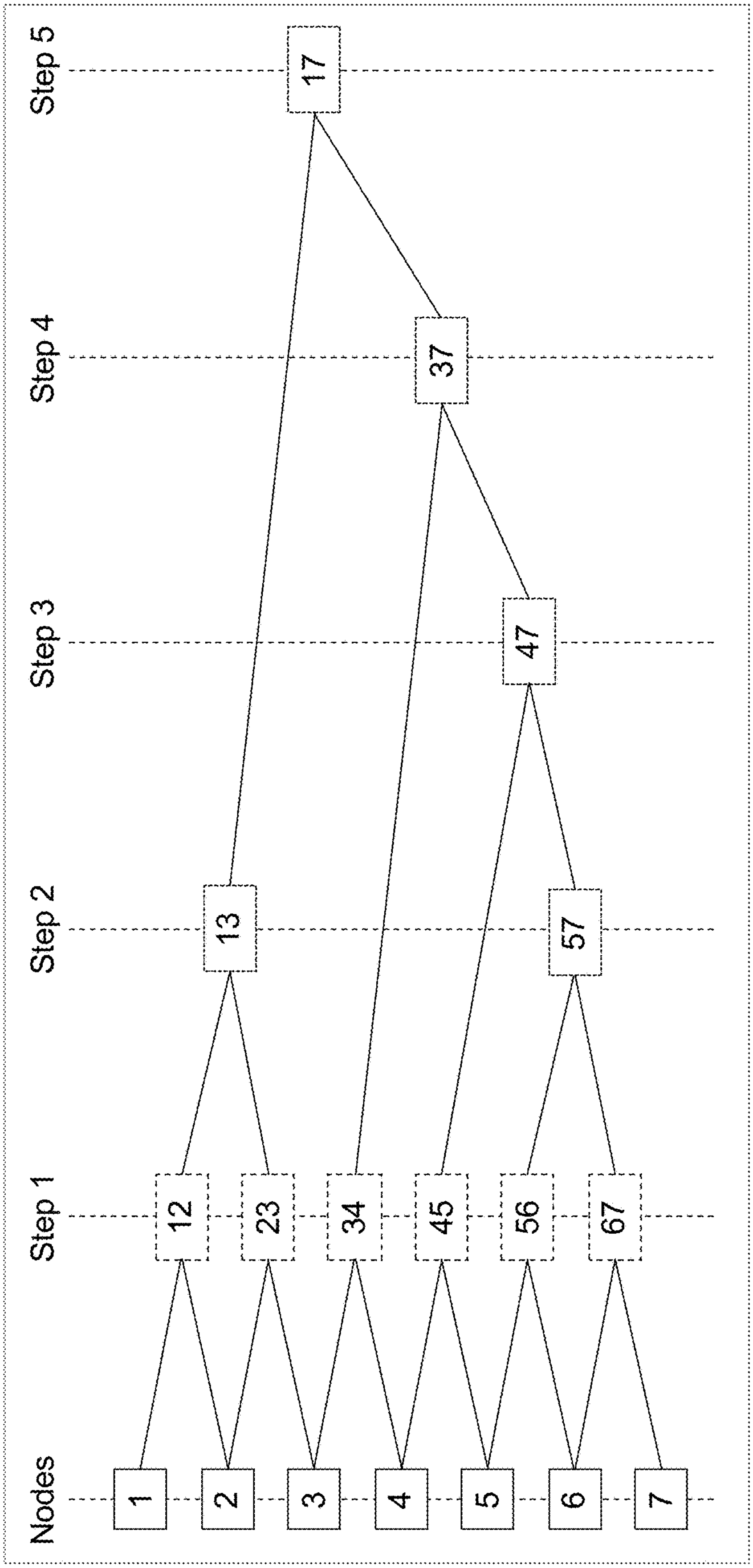
FIG. 47 is a schematic diagram of an example schedule.

FIG. 47 shows an example schedule 4700 of swapping that is used in the example quantum network 4600 in FIG. 46. The portion of the schedule 4700 used in the quantum network 4600 in FIG. 46 is the elementary entanglement generation between Nodes 4 and 5 (i.e., 45), Nodes 5 and 6 (i.e., 56), and Nodes 6 and 7 (i.e., 67), followed by swapping operations 56+67=57 and 45+57=47, the latter of which experiences a heralded swap failure at first in the quantum network 4600 before succeeding on the second attempt.

Referring again to FIG. 46, the steps to recover from a heralded swap failure are as follows:

1. For the purpose of this example, node 6 performs a swap first, which is successful. Node 6 sends a Swapped 56+67=57 message to node 5.
2. Node 5 attempts to perform the swap 45+57=47 but the swap fails in a heralded manner. Since the swap is heralded, node 5 receives information that the swap attempt failed and initiates a recovery procedure:

a. Ownership of the two local qubit memories on node 5 are released and returned to the elementary entanglement layer (note that this would have also happened if the swap was successful).
b. Node 5 sends a Swap-Failed message to the remote side of its A-side entanglement. In this case, the A-side entanglement is 45, so node 5 sends a Swap-Failed message to node 4. When node 4 receives the Swap-Failed message, it releases its B-side qubit memory and returns it to the elementary entanglement layer (this qubit memory was waiting to be swapped).
c. Similarly, node 5 also sends a Swap-Failed message to the remote side of its B-side entanglement. In this case, the B-side entanglement is 57, so node 5 sends a Swap-Failed message to node 7. When node 7 receives the Swap-Failed message, it releases its A-side qubit memory and returns it to the elementary entanglement layer (this qubit memory was waiting to be swapped).
d. There is no need to send a Swap-Failed message to node 6. The local qubit memories on node 6 were already released and returned back to the elementary entanglement layer when node 6 performed a successful swap. (Note that node 6 may forward the Swap-Failed message from node 5 to node 7, but there is no Swap-Failed message that is destined to node 6.)
e. There is already no need to send any Swap-Failed messages to nodes 1, 2, or 3. These nodes are not affected by the failed swap on node 5. Any entanglements that exist between nodes 1, 2, and 3 are still valid and can continue to be used.

3. As a result of the above recovery procedure:
a. Qubit memories 4B and 5A have both been returned to the elementary entanglement layer, which will start producing a new 45 elementary entanglement.
b. Similarly, qubit memories 5B and 6A have both been returned to the elementary entanglement layer, which will start producing a new 56 elementary entanglement.
c. Similarly, qubit memories 6B and 7A have both been returned to the elementary entanglement layer, which will start producing a new 67 elementary entanglement.
d. The normal swapping protocol procedures are followed as before. First node 6 swaps 56+67=57. Then node 5 swaps 45+57=47. In this example, the second swap attempt at node 5 succeeds, so node 5 sends a Swapped 45+57=47 message to some other node (node 3 in this example).

Figure 48:
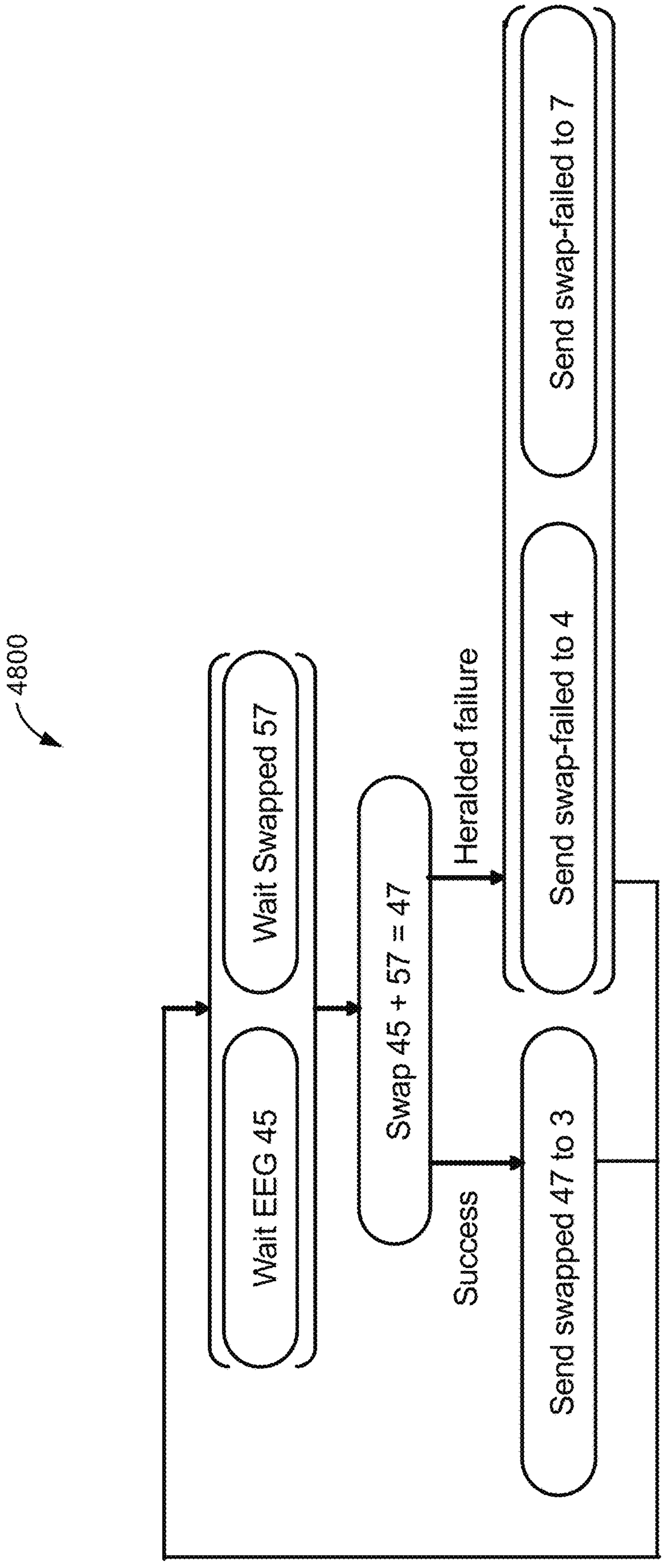
FIG. 48 is an FSM transition diagram for an example FSM.

The heralded swap failure recovery procedure is reflected in the finite-state machine (FSM), as shown in FIG. 48. Each state is labeled with an associated action that may be performed by the FSM, or one or more conditions for which the FSM is waiting. It is implicit that the swap operation releases the local two qubit memories, regardless of whether the swap operation was successful or not.

FIG. 48 shows an example FSM 4800 at a node, where the finite-state machine 4800 includes heralded swap failure recovery. The FSM 4800 comprises a waiting state that includes both "Wait EEG 45" and "Wait Swapped 57". After EEG (elementary entanglement generation) of the entangled pair 45 and after non-elementary entanglement generation by swapping creates the entangled pair 57, the FSM 4800 transitions to a state "Swap 45+57=47". After non-elementary entanglement generation by swapping creates the entangled pair 47, the FSM 4800 transitions to one of two states depending on the whether the "Swap 45+57=47" results in a "Success" or a "Heralded failure". If "Swap 45+57=47" results in "Success", the FSM 4800 transitions to a state "Send swapped 47 to 3" where a classical message indicating the swap of 45 and 57 was successful is sent to Node 3 from Node 5. If "Swap 45+57=47" results in "Heralded failure", the FSM 4800 transitions to a state "Send swap-failed to 4" and "Send swap-failed to 7", where a classical message indicating the swap of 45 and 57 resulted in a heralded failure is sent to Nodes 4 and 7 from Node 5. The FSM 4800 then transitions back to the waiting state.

27. Unheralded Swap Failures

In addition to the heralded swap failures discussed in the previous section, there may also be a low probability that the swap fails in an unheralded manner.

By definition, unheralded means that the swapping node does not receive information that the swap failed. In some examples, the node does not recover from the swapped failure, since the node does not know that the swap failed in the first place. One way to deal with such swap failures is to account for it as a source of noise, and to include it in a model for estimating the fidelity of produced entanglements, and for the SDN controller when making routing/scheduling decisions based on these unheralded swap failure probabilities.

28. Concurrent End-to-End Entanglement Creation

In some scenarios, it is possible that some nodes in the virtual circuit are already working on the next end-to-end entanglement while other nodes in the same virtual circuit are still working on the previous end-to-end entanglement.

We refer to this as concurrent end-to-end entanglement generation, and it is similar in concept to pipelining.

Figure 49:
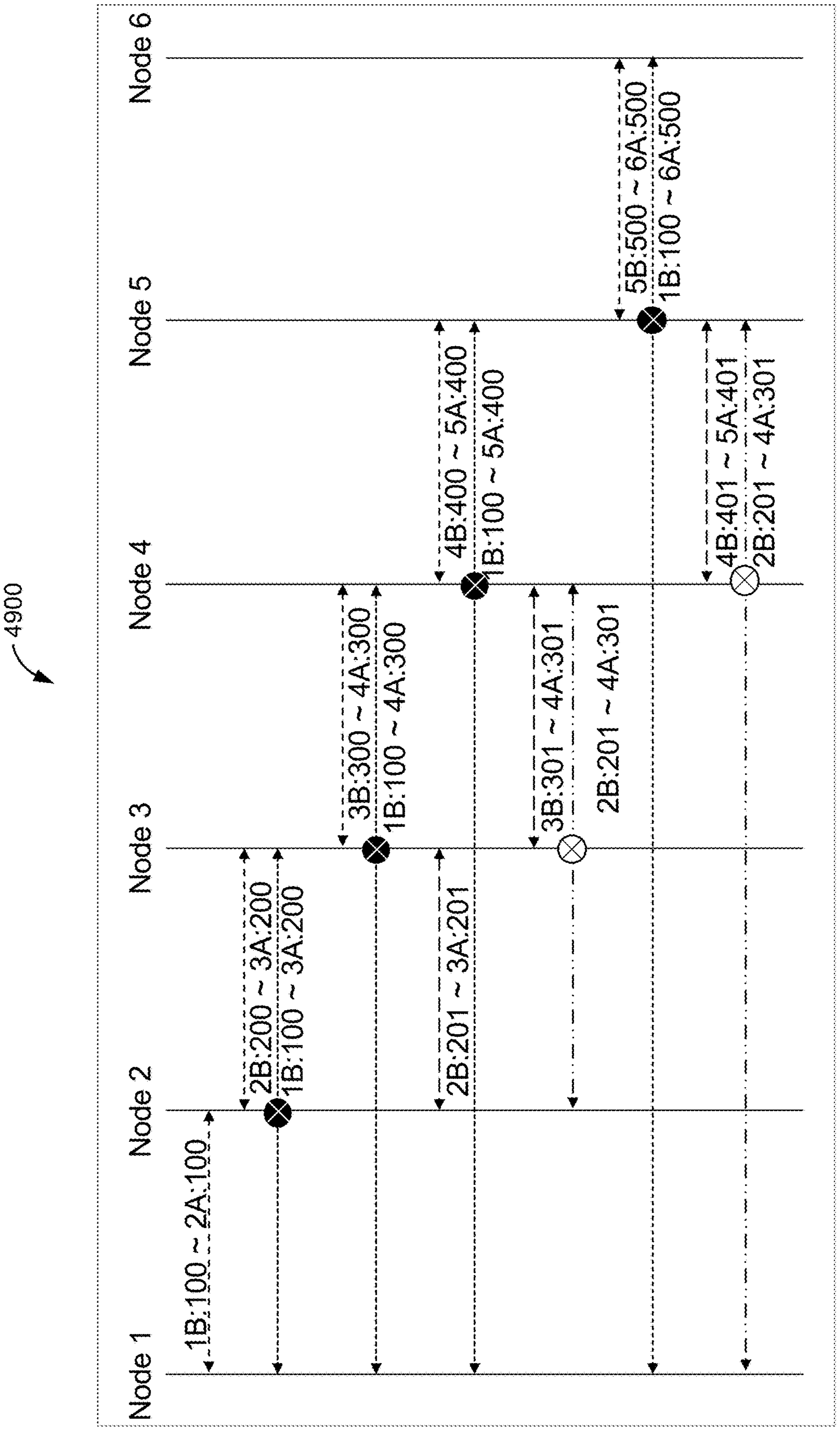
FIG. 49 is a schematic diagram of example steps occurring in a quantum network portion.

FIG. 49 shows a portion of an example quantum network 4900 comprising concurrent end-to-end entanglement generation. In this example we have two end-to-end entanglements being generated concurrently. The first entanglement generation is shown with black dashed arrows (elementary entanglement generation), black ⊗ (swap operation), and black short-dashed arrows (long-range entanglement). The second concurrent entanglement generation is shown with black long-dashed arrows (elementary entanglement generation), white ⊗ (swap operation), and long dash-dot-dot arrows (long-range entanglement).

Referring again to FIG. 49, the scenario unfolds as follows:

1. When node 2 has elementary entanglements on its A-side and B-side, it performs a swap resulting in 1B: 100~3A: 200. This frees up the two qubit memories at node 2.
2. When node 3 has elementary entanglements on its A-side and B-side, it performs a swap resulting in 1B: 100~4A: 300. This frees up the two qubit memories at node 3.
3. At this point the protocol can start generating a new elementary entanglement on the link between nodes 2 and 3 (e.g., 2B: 201~3A: 201) for the next end-to-end entanglement despite the fact that the previous end-to-end entanglement is not complete yet.
4. Similarly, after node 4 performs a swap resulting in 1B: 100~5A: 400, the protocol can already start generating the next elementary entanglement on the link between nodes 3 and 4 (e.g., 3B: 301~4A: 301).
5. When the next elementary entanglements on the 2-3 and 3-4 links are generated, the protocol can already perform a swap for the next end-to-end entanglement (e.g., 2B: 201~4A: 301), once again despite the fact that the previous end-to-end entanglement generation is not complete yet.

29. Tracking Bell State Information

Each swapping FSM may keep track of one or two entanglements. For example, swapping FSMs for hosts may keep track of one entanglement and swapping FSMs for repeaters may keep track of two entanglements. The tracked state for each entanglement may include which of the four Bell states it is, as well as the local and remote qubit state identifiers and the estimated fidelity.

When the elementary entanglement generation layer dispatches an Entanglement-Created event to the swapping layer it may include which of the four possible Bell states was generated: |ϕ+>, |ϕ−>, |ψ+>, or |Ψ−>. The swapping FSM can store this information in the corresponding tracked entanglement. While the swapping FSM is waiting for the Entanglement-Created event, the qubit Bell state is marked as pending. In some examples, when a node performs an entanglement swap, the node measures a pair of qubits it holds locally (each qubit belonging to a different entanglement, and therefore are a non-entangled pair) using a joint measurement referred to as a Bell state measurement, and determines the resulting Bell state of the extended entanglement based on results of that Bell state measurement. For example, one example of such a joint measurement using linear optics is the combination of photons encoded with the respective qubit states in two input ports of a beamsplitter and determining the presence or absence of detected photons at the two output ports of the beamsplitter. The heralding of success or failure of the measurement, and the associated entanglement swap operation, may be related to the properties of the detectors used to detect the photons. Another example of such a joint measurement uses a gate-based Bell state measurement circuit, as described in more detail below. The heralding of success or failure of the measurement, and the associated entanglement swap operation, may be related to properties of the gate-based Bell state measurement circuit.

To determine the post-swap Bell state, let each Bell state, |ϕ+>, |ϕ−>, |Ψ+>, and |Ψ−>, be mapped to a tuple (s1, s2) as follows:

TABLE 2

Mapping bell states to binary pairs.

| \|ϕ+> | \|Ψ+> | \|ϕ−> | \|Ψ−> |
|---|---|---|---|
| (0, 0) | (0, 1) | (1, 0) | (1, 1) |

Mapping the A-side Bell state $|\phi_A>$ to a tuple ($s1_A$, $s2_A$) and the B-side Bell state $|\phi_B>$ to a tuple ($s1_B$, $S2_B$) allows the determination of a new tuple ($s1_{new}$, $s2_{new}$)=($s1_A \oplus s1_B$|m1, $s2_A \oplus s2_B \oplus$m2) where '⊕' denotes the bitwise XOR operation. The resulting tuple maps back to the post-swap Bell state according to the table above. In the case of gate-based Bell state measurements (e.g., teleportation), the post-swap Bell state may also be determined via computation.

Figure 50:
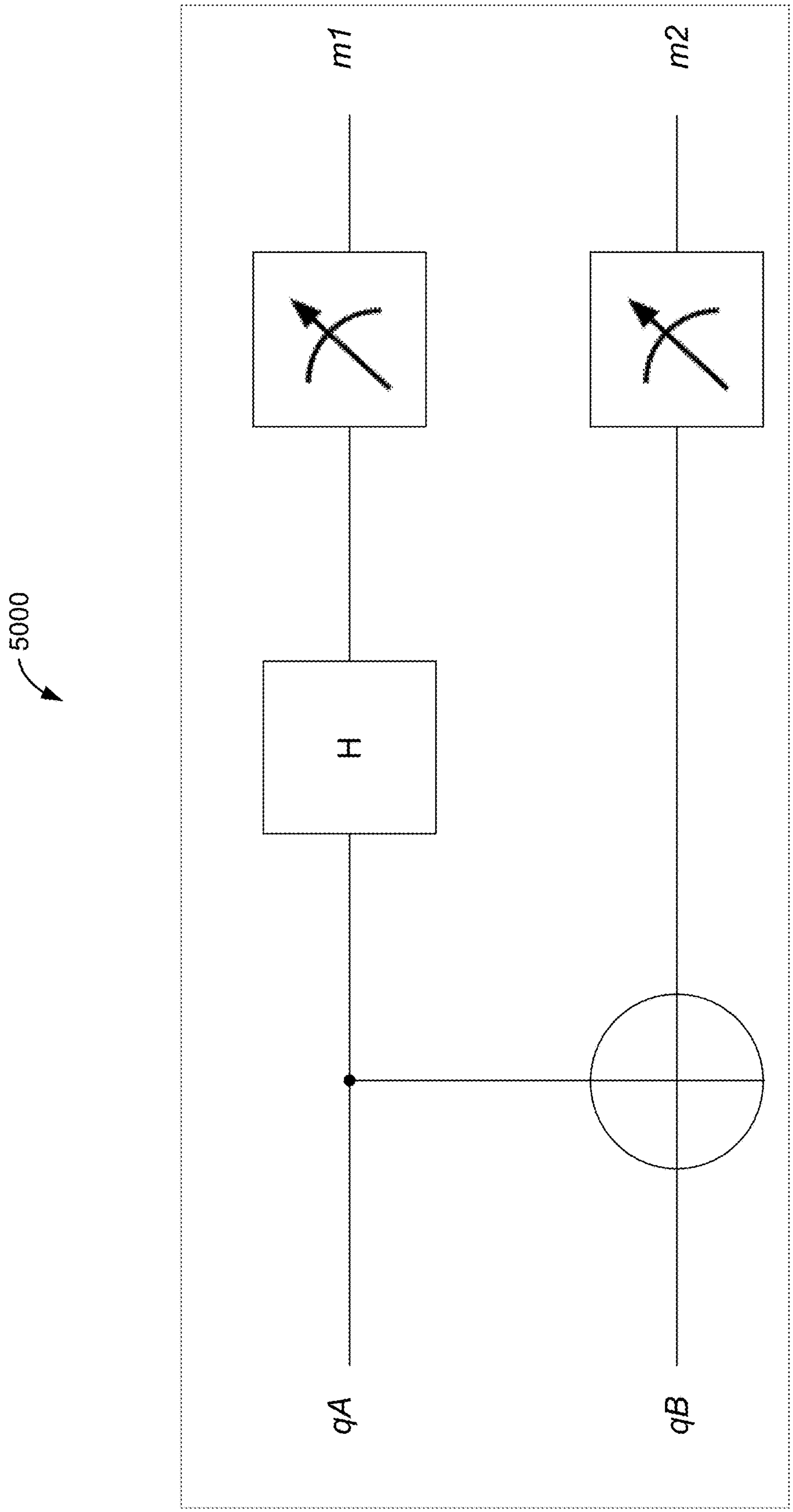
FIG. 50 is a quantum circuit diagram of an example measurement circuit.

FIG. 50 shows an example gate-based Bell state measurement circuit, where q and $q_B$ are the node's local qubits part of the A-side entanglement and B-side entanglement respectively. The circuit reads from left to right in order of operations and may be summarized as: First, apply a CNOT gate from qubit $q_A$ to qubit $q_B$ using $q_A$ as the control and $q_B$ as the target, followed by a Hadamard gate (H) on qubit $q_A$ and a measurement of both qubits in the standard (Z) basis (m1 and m2). If the role of $q_A$ and $q_B$ change within the circuit above (e.g., $q_B$ is used as the control of the CNOT and has the Hadamard applied to it) then m1 and m2 change accordingly.

After the swap is complete and the Bell state of the new extended entanglement has been determined, the swapping node may perform the following:

1. The swapping node includes the Bell state of the extended entanglement in the Swapped message that it sends to the next node in the swapping schedule. When the next node receives the Swapped message, it updates the Bell state of the affected entanglement.
2. Since the swap operation collapses the state of the local two qubits, the tracked Bell states for those qubits are set back to pending.

Once host A and host B have completed end-to-end entanglement generation, the swapping FSMs of host A and host B contain the Bell state of the end-to-end entanglement. At this point, the entanglement may be delivered to higher layers along with its Bell state information or a correction may be applied so that a desired Bell state is delivered to higher layers.

A pending Bell state may also be used in other circumstances and protocols. In some examples, it may be unnecessary to store the Bell state for an entanglement if the FSM still expects to receive a Swapped message pertaining to that entanglement. This is because the Bell state can potentially change several times due to remote swaps. The local node will not know about those intermediate Bell state changes. It will only know the final state when the Swapped message is received. Thus, if the schedule indicates that a Swap message is still expected, the Bell state is marked as pending.

An example based on FIG. 43 clarifies this:

1. When node 2 receives Entanglement-Created events for the 12 and 23 entanglements, it uses the Bell state information reported in those events, stores it in the track entanglement state, and uses it for the swap operation. This is because node 2 is not expecting any Swapped messages.

The same is true for nodes 4 and 6.

2. When node 1 receives an Entanglement-Created event for the 12 entanglement, it does not store the reported Bell state; instead it marks the Bell state as pending. This is because the actual Bell state will change several times (namely due to the swaps at node 2, 3, and 5) but node 1 is not and cannot be aware of that. Node 1 only knows what the actual Bell state is when it receives the Swapped message from node 5. The same is true for node 7.
3. Similarly, when node 5 receives Entanglement-Created events for the 45 and 56 it sets the Bell state to Pending instead of the Bell state reported in the event. This is because both Bell states on the A-side and the B-side are subject to unknown state changes, until the Swapped message is received, at which point the actual state is known. The same is true for node 3.

30. Greedy Swapping

Greedy swapping is also referred to as "as soon as possible" (ASAP) swapping. In contrast, some examples above performed swaps as late as possible, for example, just before sending the Swapped message(s). In many cases, it is possible to do the swap earlier, namely as soon as there is an elementary entanglement on both the left side and the right side. In some examples of greedy swapping, the protocol does not wait until it has received the Swapped message from any predecessor node.

Figure 51:
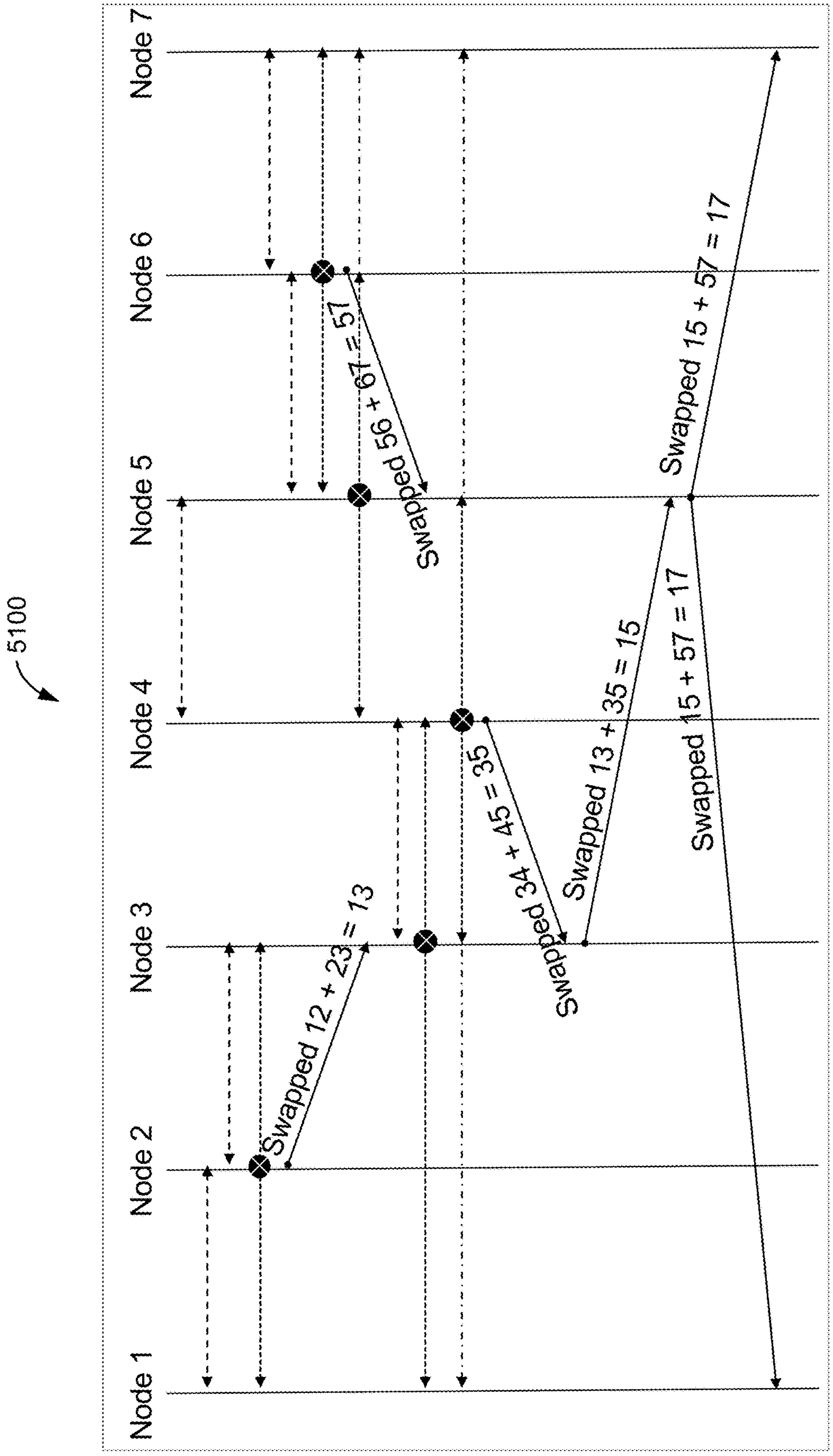
FIG. 51 is a schematic diagram of example steps occurring in a quantum network portion.

FIG. 51 shows a portion of an example quantum network 5100 performing greedy swapping (in contrast to FIG. 43, which performs swaps as late as possible). Some of the swap operations have both short-dashed black and dash-dotted black arrows. The short-dashed black arrows indicate the entanglement that the swapping node is aware of. The dash-dotted black arrows indicate the actual entanglement, which the swapping node is not aware of because it depends on events on other nodes that have not yet been communicated to the swapping node.

Referring again to FIG. 51, when node 4 performs the swap, the swap messages will indicate “34+45=45” but in reality, the swap was “14+47=17”. When performing greedy swapping, the swap messages should be interpreted slightly different. “34+45=45” should be interpreted as follows:

- Before the swap, on its A-side, node 4 has an entanglement with node 3 or some node further down the A-side of node 3.
- Before the swap, on its B-side, node 4 has an entanglement with node 5 or some node further down the B-side of node 5.
- After the swap there is an entanglement between node 3 or some node further down the A-side of node 3, and node 5 or some node further down the B-side of node 5.

In some examples, a more explicit notation may be used, such as “<34+45>=<35>” where <means “or further down the A-side” and > means “or further down the B-side”.

One of the main advantages of greedy swapping is that the swaps occur earlier. This has two implications:

1. The pre-swap entanglements have less time to decohere, which means that the post-swap entanglement will have better fidelity. That said, it may still take the same amount of time to complete all the classical messaging and to deliver the final end-to-end entanglement to the next-higher layer. So, the post-swap entanglement may have more time to decohere.
2. The qubit memories on the routers are freed up earlier. This increases the amount of concurrency (i.e., the ability to work on the next end-to-end entanglement sooner).

One possible disadvantage of greedy swapping is that the protocol may become more non-deterministic and more difficult to understand (but not necessarily incorrect). Examples of these complications may include:

1. There is a race condition whenever an elementary entanglement is created between two routers. For example, in FIG. 51, when entanglement 56 is created, there is a race condition between node 5 swapping first or node 6 swapping first. Node 6 swaps first, but it could also be that node 5 swaps first. This doesn’t affect the correctness of the protocol, since a 47 entanglement is still generated. However, it may make the protocol less predictable and more difficult to understand.
2. The Swapped messages are not necessarily sent when the swap actually occurred, but possibly later. Once again, this does not affect correctness, but it may make the protocol more difficult to follow.
3. It no longer makes sense for Swapped messages to report which entanglements were consumed, and which entanglements were produced (e.g., 12+23=13). This information is no longer known by the nodes because there may or may not have been swaps at the remote side of the entanglements. Thus, a Swapped message may only need to report the node that performed the swap.

Another possible disadvantage of greedy swapping is that the mechanism for recovering from heralded swap failures previously described no longer works. The previously described recovery mechanism can selectively restart a portion of the end-to-end entanglement after a heralded swap failure. With greedy entanglement swapping, the protocol may have to restart the entire end-to-end entanglement generation and abandon some or all elementary entanglements.

One more possible advantage of postponing the actual swap to as-late-as-possible (i.e., another advantage of late swapping) is that it may maximize the freedom of which qubit is swapped with which other qubit. In some examples such freedom is not needed, since the protocol may have pre-allocated each qubit memory to a particular virtual circuit, and who gets swapped with whom is predetermined. However, when considering sharing a qubit memory amongst multiple virtual circuits, the flexibility may be beneficial.

Unless otherwise stated, late swapping (i.e., not greedy swapping) is assumed in the examples disclosed herein. In general, translating late swapping examples into greedy swapping examples is possible. In the case of greedy swapping, the finite-state machines for the nodes can be adapted as shown in FIG. 52 (compare this with the FSM for node 5 as shown in FIG. 34).

Figure 52:
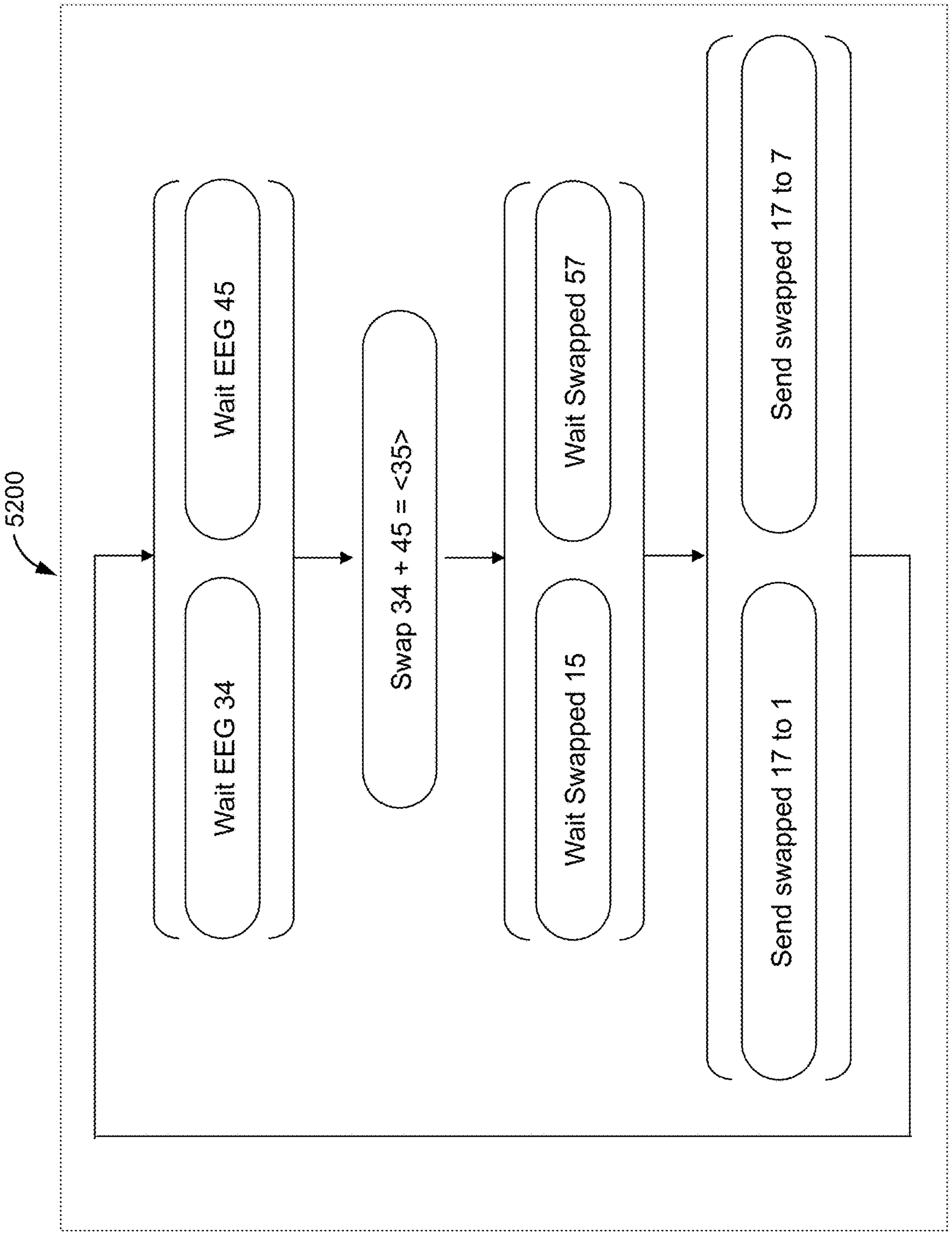
FIG. 52 is an FSM transition diagram for an example FSM.

FIG. 52 shows an example subset of FSM states 5200 and transitions among the FSM states 5200 associated with execution of an FSM (finite-state machine) at a node, where the FSM is adapted to perform greedy swapping and comprises a state including both “Wait EEG 34” and “Wait EEG 45”. After elementary entanglement generation generates entangled pairs 34 and 45, the FSM 5200 transitions to a state “Swap 34+45=<35>” where a swap operation results in an entangled pair <35>. Here, the swap operation results in <35> rather than 35 because greedy swapping is utilized, such that nodes further down the A-side of Node 3 and/or nodes further down the B-side of Node 5 may be entangled after the swap operation. The FSM 5200 then transitions to a state including both “Wait Swapped 15” and “Wait Swapped 57”, and, upon receiving confirmation that the respective swaps have occurred, transitions to a state including both “Send swapped 17 to 1” and “Send swapped 17 to 7”.

31. Tracking Fidelity

31.1 Estimating End-to-End Entanglement Fidelity

The swapping FSMs, in coordination with a Fidelity Estimation Unit, may also be responsible for providing an estimate of the fidelity of the delivered entanglement. In some implementations, the estimated fidelity may need to account for:

1. Noise introduced in elementary entanglement generation.
2. Spontaneous decoherence in qubit memories as a result of the passage of time (T1 and T2 decoherence times) while waiting to perform an entanglement swap.
3. Noise due to gates and storage during the entanglement swap.

Item (1) can be accounted for by the elementary entanglement generation protocol and the estimated fidelity provided in an Entanglement-Created event. As will be shown, in some examples the swapping protocol may be devised to handle items (2) and (3).

Each Entanglement-Created event may contain a timestamp at which the entanglement was created as well as an initial fidelity estimate of the entanglement at the time specified by the timestamp. When a network node performs an entanglement swap, it can use the timestamps, fidelity estimates, and knowledge of the two entanglements used for the entanglement swap to construct a new fidelity estimate for the entanglement produced by performing the swap.

To achieve this, the Fidelity Estimation Unit, which is configured to manage information associated with the noise characteristics of the quantum gates and measurements performed on local storage qubits, as well as the decoherence behavior of each storage qubit, may be utilized. For the swapping protocol, the decoherence behavior describes how an entanglement stored in the storage qubit decoheres as a function of time.

The Fidelity Estimation Unit may represent the decoherence behavior of each storage qubit in the form of a function F (t) (referred to as a fidelity curve) which computes the fidelity of an initially perfect (fidelity=1) entanglement that has been stored in the storage qubit for some time t. Each fidelity curve F (t) is associated with an inverse function $F^{\{-1\}}(F)$ (referred to as an inverse fidelity curve) which computes the amount of time an initially perfect entanglement has been stored for, given its current fidelity.

To compute the fidelity estimate of an entanglement produced by performing an entanglement swap, the network node first computes "pre-swap" estimates for the fidelity of each entanglement used in the entanglement swap. To compute a "pre-swap" fidelity estimate $F_{pre\text{-}swap}$, the network node determines the time delta $t_{\{store\}}$ between the creation timestamp $t_{\{create\}}$ of the entanglement and the time $t_{\{swap\}}$ at which the entanglement swap was performed. Using the initial fidelity estimate $F_{\{create\}}$ corresponding to the time $t_{\{create\}}$, the pre-swap fidelity estimate of the entanglement may be computed as:

$$F_{\{pre-swap\}} = F\left[t_{\{store\}} + F^{\{-1\}}(F_{\{create\}})\right],$$

By using the appropriate choice of F (t) and $F^{\{-1\}}(F)$ based on the storage qubit holding the entanglement, as specified in the Entanglement-Created event.

The fidelity curve F (t) may be represented as an exponential function $Ae^{Bt}+C$ where A, B, and C are chosen to lower-bound and closely approximate the fidelity of an initially perfect entanglement that is stored for some amount of time t. For example, the fidelity curve for a storage qubit that experiences purely depolarizing noise may be modeled as $$F_{depol}(t) = \frac{3}{4}e^{-\frac{t}{T}} + \frac{1}{4},$$

where T is the characteristic decay rate that describes the rate at which decoherence reduces the fidelity of the entanglement.

A fidelity curve F (t) of the form $Ae^{Bt}+C$ may be determined for a storage qubit by performing quantum state tomography on entanglement stored in the qubit for varying amounts of storage time and using software to determine A, B, and C that produce a curve which fits a plot of the empirically discovered fidelity as a function of time. In some implementations, the Fidelity Estimation Unit can be configured to perform repeated sets of quantum state tomography measurements performed at the node using the storage qubit to update the fidelity curve that characterizes the reduction in fidelity over time for that storage qubit. The parameters A, B, and C may then be modified based on these measurements to provide the corresponding lower-bounding behavior to be used until the next set of quantum state tomography measurements. Alternatively, a single set of quantum state tomography measurements can be taken and used for an arbitrary amount of time during operation of the network. Given a fidelity curve F (t)=$Ae^{Bt}$+C the inverse fidelity curve is $$F^{-1}(F) = \frac{\log\left(\frac{(F-C)}{A}\right)}{B}.$$

Computing the "pre-swap" fidelity of each entanglement accounts for item (2), where reduction in fidelity occurs due to spontaneous decoherence in storage. We will refer to the "pre-swap" fidelity estimates of the A- and B-side entanglement as $F_{psA}$ and $F_{psB}$ respectively. The computed "pre-swap" estimates may then be updated to account for noise introduced due to quantum operations and measurements that realize the entanglement swap. Each (quantum gate, storage qubit) pair may be associated with a fidelity reduction function $F_R(F_e)$ which computes an estimate of the post-gate fidelity of an entanglement with initial fidelity $F_e$. Similarly, a measurement of a storage qubit is also associated with a fidelity reduction function $F_R(F_e)$ that computes an estimate of the fidelity of an entanglement that is measured which has had its fidelity reduced due to noise introduced during the measurement.

$F_{psA}$ and $F_{psB}$ can be updated. For example, suppose a gate-based entanglement swap is performed by performing a Bell state measurement that is implemented by a CNOT gate between the storage qubits holding the A- and B-side entanglements followed by a Hadamard gate on the A-side storage qubit and a measurement of both storage qubits.

Let the CNOT gate be associated with fidelity reduction curve $F_{R,CNOT}(F_e)$, the Hadamard gate associated with fidelity reduction curve $F_{R,H}(F_e)$, and the measurements associated with fidelity reduction curve $F_{R,MEAS}$(Fe). $F_{psA}$ and $F_{psB}$ are updated in the following way:

$$F'_{psA} = F_{R,MEAS}(F_{R,H}(F_{R,CNOT}(F_1)))$$

$$F'_{psB} = F_{R,MEAS}(F_{R,CNOT}(F_2)))$$

In the case that the Bell state measurement is realized with optical components (e.g., beamsplitters and photon detectors), the operation performed may be viewed as a measurement which has a fidelity reduction function applied with no additional fidelity reduction functions corresponding to gates. The physical implementation of performing the entanglement swap may include periods of time where storage qubits decohere between the application of operations. In this case, one may apply the fidelity curves described above to account for decoherence between operations.

Fidelity reduction functions FR (Fe) may be determined empirically by performing quantum state tomography on an entanglement with varying fidelity that has had the quantum gate or measurement applied to it. Alternatively, the noise introduced by the quantum gate or measurement may be modeled by a fidelity curve F (t) and inverse fidelity curve $F^{-1}(F)$, in addition to a parameter $t_{op}$ that describes the fidelity reduction introduced in applying the fidelity curve F (t). The fidelity reduction function may then be computed as:

$$F_R(F_e) = F\left[t_{op} + F^{-1}(F_e)\right].$$

The Fidelity Estimation Unit may provide a final function, $$F_{\{SWAP\}}(F'_{psA}, F'_{psB}),$$

which estimates the post-swap fidelity of an entanglement produced by swapping entanglement with fidelities $$F'_{psA} \text{ and } F'_{psB}.\ F_{\{SWAP\}}(F'_{psA}, F'_{psB})$$

strictly accounts for the inherent loss in fidelity due to swapping imperfect entanglement and does not account for any noise introduced by quantum operations and measurements that are used on the storage qubits holding the entanglement.

$$F_{\{SWAP\}}(F'_{psA}, F'_{psB})$$

may be determined empirically using quantum state tomography as was the case for the fidelity curves and fidelity reduction curves described above or by using a function of the form $$AF'_{psA}F'_{psB} + B(1 - F'_{psA})(1 - F'_{psB})$$

where A and B may be chosen to lower-bound and closely approximate the true behavior of the entanglement swap. One example approximation uses a formula:

$$F_{\{SWAP\}}(F'_{psA}, F'_{psB}) = F'_{psA}F'_{psB} + \frac{1}{3}(1 - F'_{psA})(1 - F'_{psB})$$

which applies to the case that the entanglement used is of the Werner form corresponding to a worst-case noisy state.

When a network node performs an entanglement swap, it may include an estimate of the post-swap entanglement fidelity within the Swapped message that is sent to other nodes according to the schedule. Network nodes that originate a Swapped message (in some examples, such nodes do not wait for a Swapped message from any other node in the network before sending their own) may compute the post-swap fidelity estimates using the fidelity estimate of the elementary entanglement used in the swap. However, a network node that waits for a Swapped message on one (or both) of its sides before sending its own Swapped message may use the post-swap fidelity estimate in place of the fidelity estimate provided in the Entanglement-Created notification for the elementary entanglement on the side(s) the Swapped message(s) was received.

When the final Swapped message reaches the end nodes receiving the end-to-end entanglement, the post-swap fidelity estimate included in the Swapped message may be updated to account for the noise introduced due to storing the entanglement at the end node for the time duration until the final Swapped message is received, producing the final fidelity estimate for the end-to-end entanglement delivered to the end nodes. This may be performed using fidelity curves and inverse fidelity curves, as outlined previously for handling item (2) at the intermediate repeater nodes.

31.2 Discarding Decohered Entanglement

To provide end-to-end entanglement of sufficiently high fidelity, the entanglement swapping protocol may choose to discard elementary entanglement that has decohered for too long and its fidelity has fallen too low to satisfy the desired end-to-end entanglement fidelity. For example, in some implementations, the desired end-to-end entanglement fidelity may be determined based at least in part on a user application and may be used to determine fidelity threshold (s). This fidelity threshold information can be provided down the stack, and may originate from the controller (e.g., at the time of determining virtual channels). The fidelity curve above may also be used to determine how long an elementary entanglement may be stored for before it has fallen below an acceptable threshold $F_{Th}$.

To achieve this, a network node may compute a time delta $t_{\{timer\}}=F^{-1}(F_{Th})-F^{-1}(F_{create})$ and set a "decoherence timer" that notifies the swapping protocol at timestamp ($t_{\{discard\}}=t_{\{create\}}+t_{\{timer\}}$) to discard the elementary entanglement if it is still stored. $t_{\{timer\}}$ corresponds to the amount of time it takes for an entanglement with fidelity $F_{create}$ to decohere until it has a fidelity of $F_{Th}$. If the timer triggers at t (discard) and the entanglement is still held within the quantum memory, then it is discarded and the qubit memory is freed back to the elementary entanglement generation protocol. The timer may also trigger emission of real-time classical Entanglement-Lost messages to recover from failure scenarios, which are addressed in a later section.

While a decoherence timer can be set to trigger a discard of the entanglement once its estimated fidelity falls below an acceptable threshold $F_{Th}$, other fidelity thresholds and associated timers may be set to trigger other sets of actions (e.g., an error correction routine, a round of entanglement purification). More details on the establishment of and interaction between multiple fidelity thresholds and their associated timers are addressed in section 31.4.

31.3 Dynamic Recalculation of Estimated Fidelity

It may be the case that performing operations on one (or more) other storage qubits (which are not managed by the swapping protocol) introduces noise and decoheres storage qubits in the underlying hardware that hold entanglement used by the swapping protocol (i.e., crosstalk noise). When such an operation is performed, the fidelity estimates and timers for entanglement in effected storage qubits may also be updated according to fidelity reduction functions and fidelity curves.

To achieve this, the Fidelity Estimation Unit may contain additional information on crosstalk noise from quantum gates and measurements. Crosstalk noise is noise introduced on local qubits that are not the direct target of a quantum gate or measurement. For example, a device may execute a Hadamard gate on one storage qubit, which introduces noise on a different storage qubit and reduces the fidelity of an entanglement stored therein. The Fidelity Estimation Unit may contain additional fidelity reduction functions which update the fidelity estimate of an entanglement to account for crosstalk. When such crosstalk noise is introduced, the decoherence timer may be updated. Suppose that a stored entanglement with initial fidelity $F_{\{create\}}$ at timestamp $t_{\{create\}}$ has a timer delay of $t_{\{timer\}}$ which notifies the swapping protocol at timestamp $t_{\{discard\}}=t_{\{create\}}+t_{\{timer\}}$. Suppose further that a gate is applied to a storage qubit at some timestamp $t_{\{gate\}}$ which introduces crosstalk noise on the aforementioned stored entanglement while it was stored (that is, $t_{\{create\}}<t_{\{gate\}}<t_{\{create\}}+t_{\{timer\}}$). To update the decoherence timer, the node computes the "pre-crosstalk-noise" fidelity of the stored entanglement, applies the fidelity reduction function for the crosstalk noise, and then computes the remaining time on a new timer:

$$F_{\{pre-crosstalk-noise\}} = F\left[t_{\{gate\}} - t_{\{create\}} + F^{-1}(F_{\{create\}})\right]$$

$$F_{\{post-crosstalk-noise\}} = F_{R,crosstalk}(F_{\{pre-crosstalk-noise\}})$$

$$t_{new-timer} = F^{-1}(F_{Th}) - F^{-1}(F_{post-crosstalk-noise})$$

The new timer should then trigger at time $t_{\{new-discard\}}=(t_{\{gate\}}+t_{\{new-timer\}})$. This technique may be used to additionally account for other sources of noise that the network node may identify, such as noise introduced during the elementary entanglement generation process.

31.4 Setting Multiple Thresholds

In addition to setting timers which trigger the discarding of entanglement that has decohered too much to satisfy the desired end-to-end entanglement fidelity, timers may additionally be set to trigger the execution of purification to increase the fidelity. This may be done so that a stored entanglement may be kept in the quantum memory for a longer amount of time while waiting for the entanglement in the other quantum memory to become available for performing an entanglement swap.

For this, a network node may set a timer to trigger when the fidelity has reached a fidelity threshold $F_{Th,purify}$ and purification should be performed. Such fidelity thresholds for purification should be larger than the fidelity threshold for discarding an entanglement, as an entanglement cannot be purified if it is no longer located within the quantum memory. The timer may be calculated similarly to the previously described timer which triggers discarding of entanglement. This timer may also be updated to account for any crosstalk noise introduced.

If a timer triggers and there is an insufficient number of stored entanglements in order to perform purification, the network node may be configured to ignore purification or it may be configured to do so as soon as additional entanglements become available to enable purification. Upon performing purification, a new fidelity estimate for the now-purified entanglement may be calculated, and new timers that trigger purification or discarding of the entanglement may be computed based on the new fidelity estimate. In some implementations, it is the controller that configures the nodes to manage timers and perform associated actions (e.g., determining how timers trigger actions based on comparison of timers to thresholds, and determining what actions to perform based on predetermined rules).

In some implementations, the expiration of a timer may be mapped to trigger an action, or multiple actions, from a set of actions. The choice of triggered action(s) may depend on local state information, and/or a set of rules or instructions configured by the controller. The controller may install such rules or instructions based on user request information, network state, resource availability, network fairness or utility metrics, and/or observed telemetry from monitoring. For example, a timer can be set to expire when the estimated fidelity of an entanglement decoheres below a threshold of $F_{Th,QEM}$. Upon expiration, that timer may trigger one or more quantum error mitigation routines from a larger family of appropriate quantum error mitigation circuits. If the controller has been routinely monitoring the performance of the associated physical link(s) or node(s) and observes a common error syndrome, the controller may configure the local node to trigger a quantum error mitigation circuit that is tailored to mitigate the effects of most detrimental observed error when its local timer expires.

A timer expiration may also trigger the transmission of classical messages, the setting of new thresholds and timers, and/or the adjustment of existing thresholds and timers. Certain actions may be triggered with the intention of improving the fidelity of an existing entanglement (e.g., via a purification routine), but are stochastic in nature and may actually result in a decrease in estimated fidelity if unsuccessful. In such a case with unsuccessful purification, another fidelity threshold for triggering purification may be increased or established with the intention of triggering another attempted round of purification before reaching the discard threshold. In cases where the purification or error mitigation routine is successful in improving the estimated fidelity of the entanglement, another fidelity threshold may be decreased to avoid running another round of resource-intensive purification or error mitigation.

The involvement of the controller in the dynamic installation and configuration of multiple fidelity thresholds, timers, and their associated actions is valuable for efficient operation and management of a robust quantum network system. As different actions may take different amounts of time or resources to run, the nodes, in conjunction with the controller, may use these timers and configurations effectively to preserve and improve overall network reliability, fairness, and performance (e.g., end-to-end entanglement fidelity, end-to-end entanglement generation rate).

32. Handling Entanglement Decoherence 32.1 Motivation and Assumptions

During the process of creating end-to-end entanglement to meet the requests of the virtual circuit (VC) demand database, many elementary and non-elementary entanglements may be consumed by the swapping protocol in order to distribute long-range entanglement across the network. To create end-to-end entanglement between the hosts of an N-node path, the swapping protocol may need to consume Q (N) entanglement pairs. In the era of non-deterministic photon sources, diverse quantum hardware platforms with differing noise models, and varying link distances, as the network develops more complexity, it becomes rapidly more probable that at least one entangled pair of qubits will decohere beyond recovery as it is waiting to be consumed by a swapping protocol FSM instance. There are factors which negatively impact the entanglement fidelity other than the idle passage of time, such as gate noise. An analysis of the impact of these factors on entanglement fidelity has been disclosed herein, which may allow for the following assumptions to be achieved:

(1) The estimated fidelity metric and its tracking is robust and accurate enough to determine with a high degree of confidence whether an entanglement pair has sufficient fidelity for consumption via entanglement swapping.

(2) A fidelity threshold $f_{min}$ is predetermined by some external entity (e.g., the SDN controller) such that, at any point in time, if the estimated entanglement fidelity of a pair of qubits falls below $f_{min}$, that entanglement is deemed unusable for the creation of end-to-end entanglement based on the Virtual Circuit Service Request and associated Quality of Service (QOS) parameters.

(A) Note that the singular notation of $f_{min}$ used herein is for explanation purposes. In reality, calculation of $f_{min}$ may be link-dependent (e.g., set a higher threshold for elementary links and a lower threshold for longer-distance links). Each node may have a pre-installed table for all the links it should expect to deal with based on the predetermined swapping schedule. This threshold table may also be (logically) installed by the SDN controller.

(3) Nodes running the swapping protocol have the ability to detect in real-time when an entangled pair associated with said node falls below the estimated fidelity threshold $f_{min}$. This may be done via a set of decoherence timers.

(4) If the estimated fidelity of an entangled pair falls below $f_{min}$, the protocol may determine the pair is beyond fidelity recovery (e.g., by purification) and the entanglement may be reestablished. In general, two thresholds per link, one triggering purification and another triggering restart, may be used. For explanation purposes, it is assumed that falling below the fidelity threshold triggers a complete reestablishment of the entanglement.

32.2 Entanglement-Lost Messages

To adapt our swapping protocol to handle decohered entanglements, a new type of classical message may be used: the Entanglement-Lost (EL) message. The EL message may contain an entanglement identifier, signifying the entanglement link that was lost, as well as the entanglement sequence number and virtual circuit associated with that lost link. The following table shows some of the fields within an example EL message, with an indication of which fields are "required" or "optional" in this particular example message format:

TABLE 3

Fields of an Entanglement-Lost message

| Field | Description |
|---|---|
| Entanglement Identifier (required) | Qubit identifiers and entanglement sequence number indicating which physically entangled qubit pair was lost |
| Virtual Circuit Identifier (required) | Identifier for the associated virtual circuit (used for determining which FSM instances to dispatch the EL event to) |
| Delay (optional) | Optional delay indicating when to start the entanglement regeneration process |
| Authentication (required) | Material for verifying the identity of the sending node |

Due to the probabilistic nature of quantum hardware, channel loss, and the quantum operations that underpin quantum network protocols, attempts at establishing end-to-end entanglement may often be unsuccessful. To recover from such system failures such as qubits being lost, entanglement swaps being unsuccessful, or qubits decohering below a useful fidelity threshold, the controller subsystem may configure the quantum network protocol stack to automatically reattempt elementary entanglement generation. As many subprocesses of quantum networking protocols rely on photon interference to establish and distribute entanglement, subsystems my require photons to be substantially indistinguishable and substantially synchronized. Thus, to generate high-fidelity end-to-end entanglement, it may be beneficial to synchronize the establishment (and re-establishment) of elementary entanglement on local links. Such synchronous establishment of entanglement may further improve photon interference, mitigate decoherence, enable higher-fidelity swapping operations, prevent throughput bottlenecks, and result in higher-fidelity end-to-end entangled pairs. One way to increase (or in some cases maximize) the probability of synchronous establishment of nearby elementary entanglements is to specify an entanglement regeneration delay value in the EL message, as described in Table 3. If appropriately configured and specified by the controller subsystem, a node receiving an EL message may intentionally delay the time to attempt generation of a new elementary entanglement with its respective neighboring node. It may be the responsibility of the controller subsystem to calculate, install, and update such delay values in the appropriate protocol subsystem(s). The controller subsystem may take into account network state, network information, topology, performance characteristics, hardware capabilities, and real-time telemetry/metrology to calculate and install delay values. The controller subsystem may use classical processing units, graphical processing units, and/or quantum processing units to calculate such values. The controller subsystem may run these calculations using mathematical, analytical, simulation, Bayesian, and/or machine learning algorithms to calculate entanglement regeneration delays. Such algorithms may use experimental telemetry/metrology data to iteratively adjust delays with the objective of maximizing aggregate network performance, utility, and/or fairness.

Figure 53A:
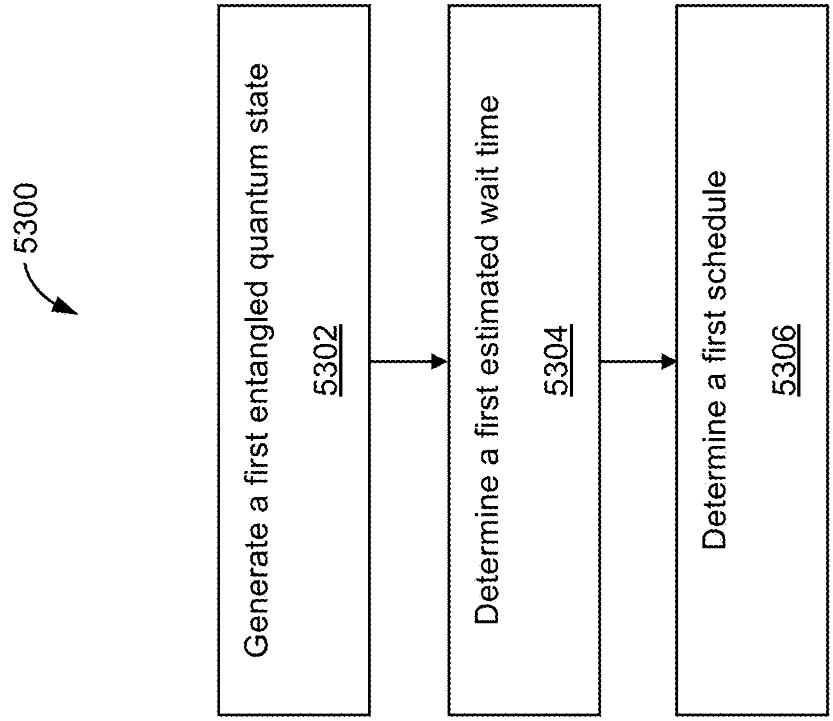
FIGS. 53A-53C are flowcharts of example procedures for managing entangled quantum states in a network of nodes.

FIG. 53A shows an example procedure 5300 for managing entangled quantum states in a network of nodes. The procedure 5300 includes: generating (5302) a first entangled quantum state characterized by a non-factorable quantum relationship among two or more quantum state constituents comprising (1) a first quantum state constituent stored at a first quantum element at a first node in the network and (2) a second quantum state constituent stored at a second quantum element at a second node in the network; determining (5304) a first estimated wait time over which the first quantum state constituent is estimated to be stored at the first quantum element while preserving a fidelity of the first entangled quantum state above a fidelity threshold; and determining (5306) a first schedule for performing one or more quantum error management operations over a portion of the first estimated wait time. The one or more quantum error management operations affect the first quantum state constituent, and the first schedule is based at least in part on (1) the first estimated wait time and (2) one or more estimated fidelities of the first entangled quantum state associated with one or more candidate quantum error management operations.

Figure 53B:
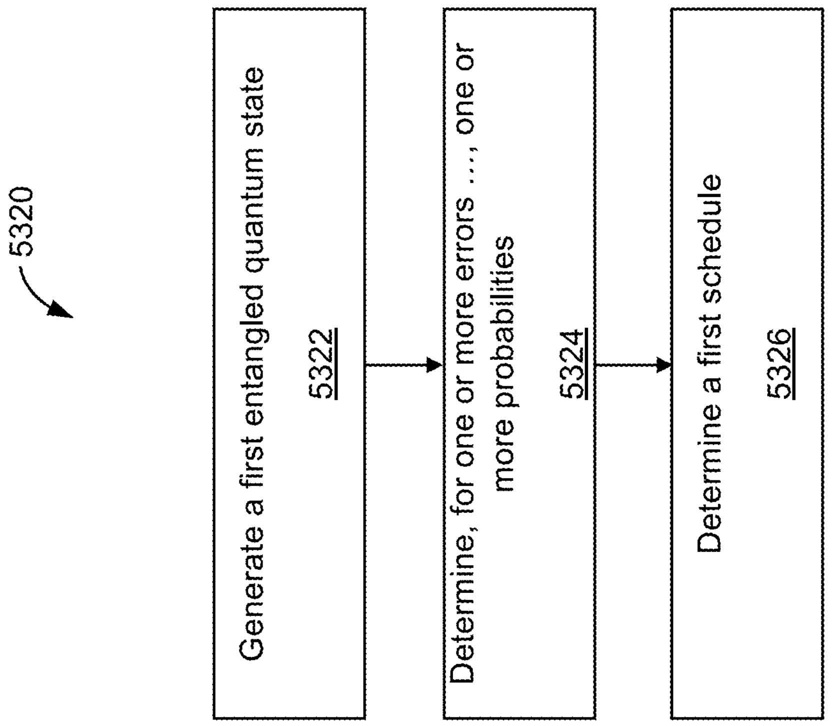

FIG. 53B shows an example procedure 5320 for managing entangled quantum states in a network of nodes. The procedure 5320 includes: generating (5322) a first entangled quantum state characterized by a non-factorable quantum relationship among two or more quantum state constituents comprising (1) a first quantum state constituent stored at a first quantum element at a first node in the network and (2) a second quantum state constituent stored at a second quantum element at a second node in the network; determining (5324), for one or more errors associated with at least the first quantum state constituent, one or more probabilities of the errors occurring over a first time period; and determining (5326) a first schedule for performing one or more quantum error management operations over a second time period that starts after the first time period. The one or more quantum error management operations affect the first quantum state constituent, and the first schedule is based at least in part on (1) the first time period and (2) an estimated fidelity of the first entangled quantum state after at least one of the one or more quantum error management operations.

Figure 53C:
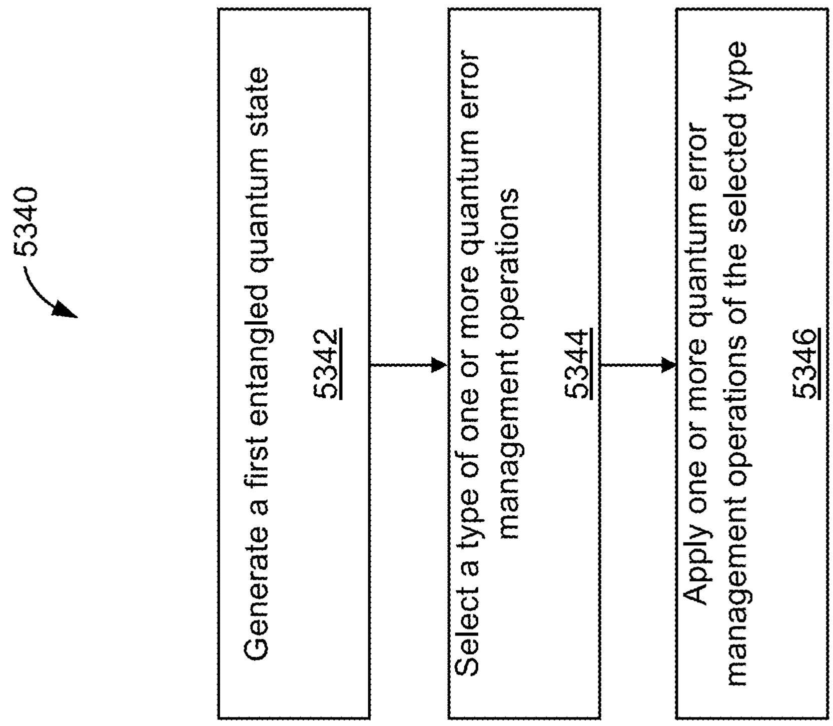

FIG. 53C shows an example procedure 5340 for managing entangled quantum states in a network of nodes. The procedure 5340 includes: generating (5342) a first entangled quantum state characterized by a non-factorable quantum relationship among two or more quantum state constituents comprising (1) a first quantum state constituent stored at a first quantum element at a first node in the network and (2) a second quantum state constituent stored at a second quantum element at a second node in the network; selecting (5344) a type of one or more quantum error management operations from two or more different types of quantum error management operations, based at least in part on a number of resource quantum elements available at the first node after the first quantum state constituent is stored at the first quantum element; and applying (5346) one or more quantum error management operations of the selected type to affect the first quantum state constituent. At least two of the different types of quantum error management operations use a different number of resource quantum elements.

Figure 54:
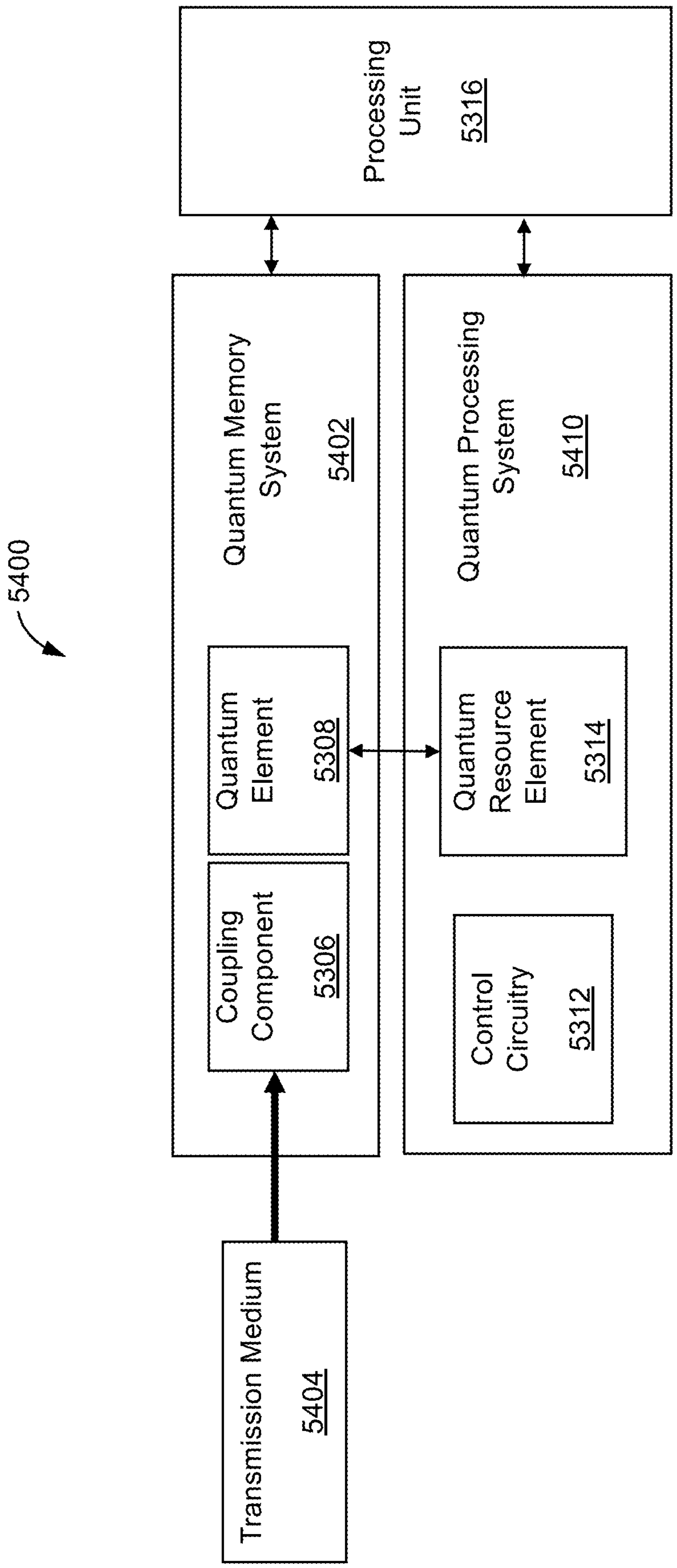
FIG. 54 is a schematic diagram of an example quantum networking stem at a node in a network of nodes.

FIG. 54 shows an example quantum system 5400 at a first node in a network of nodes. A quantum memory system 5402 comprises: an interface configured to receive an electromagnetic wave from a transmission medium 5404, and a coupling component 5306 configured to couple one or more photons from the interface to a first quantum element 5308 at the first node configured to store a first quantum state constituent of a first entangled quantum state characterized by a non-factorable quantum relationship among two or more quantum state constituents, the quantum state constituents comprising (1) the first quantum state constituent and (2) a second quantum state constituent stored at a second quantum element at a second node (not shown) in the network. A quantum processing 5410 system comprises: control circuitry 5312 configured to perform one or more quantum error management operations affecting the first quantum state constituent, and one or more resource quantum elements at the first node, where at least one of the quantum resource elements 5314 is configurable to be coupled to the first quantum element 5308. A processing unit 5316 is configured to manage the one or more quantum error management operations. The managing includes at least one of: (a) providing a first schedule for one or more quantum error management operations affecting the first quantum state constituent, where the first schedule is based at least in part on (1) at least a portion of a time over which the first quantum state constituent is stored at the first quantum element and (2) an estimated fidelity of the first entangled quantum state after at least one of the one or more quantum error management operations, or (b) providing a type of one or more quantum error management operations selected from two or more different types of quantum error management operations based at least in part on a number of the resource quantum elements available at the first node after the first quantum state constituent is stored at the first quantum element.

Other aspects of the techniques associated with a layered quantum networking environment can include the following.

In one aspect, in general, a method for managing entangled quantum states in a network of nodes comprises: sending, from a controller in the network, scheduling information to each of a plurality of nodes in the network, where the scheduling information specifies a procedure to be executed for scheduling entanglement swap operations associated with portions of a plurality of paths through nodes in the network; for each of two or more pairs of nodes on a first path over a set of N nodes in the network, establishing entanglement between pairs of quantum elements in the respective nodes of that pair of nodes based at least in part on one or more quantum signals transmitted over one or more quantum communication channels, where N≥3; performing a plurality of entanglement swap operations among different respective subsets of nodes in the set of N nodes using the pairs of entangled quantum elements; and managing the plurality of entanglement swap operations during establishment of end-to-end entanglement between respective quantum elements in the nodes at the ends of the first path over the set of N nodes based at least in part on: the scheduling information, identifiers that identify entanglement resulting from respective entanglement swap operations, and a plurality of estimates of fidelity of entanglement between a first quantum element at the first node in the network and a second quantum element at a second node in the network, where the plurality of estimates are generated at different respective times and/or at different respective nodes in the network.

In another aspect, in general, a method for managing entangled quantum states in a network of nodes, for a plurality of time periods, comprises: receiving, at a first node in the network, a first message indicating that a first quantum element at the first node is entangled with a quantum element at a second node in the network, where the first message comprises a first identifier that uniquely identifies one of a plurality of entanglement generation operations between the first and second nodes over a first time period of the plurality of time periods; receiving, at the first node, a second message indicating that a second quantum element at the first node is entangled with a quantum element at a third node in the network, where the second message comprises a second identifier that uniquely identifies one of a plurality of entanglement generation operations between the first and third nodes over the first time period; and generating, at the first node, a third identifier that identifies an entanglement resulting from an entanglement swap operation based on the entangled quantum elements at the first and second nodes and the entangled quantum elements at the first and third nodes. The generating comprises: including at least a portion of the first identifier in the third identifier, and including at least a portion of the second identifier in the third identifier.

Aspects can include one or more of the following features.

The generating further comprises: including in the third identifier one or more values that uniquely identify a link between the first and second nodes from all other links on a path through a series of nodes that includes the first, second, and third nodes, and including in the third identifier one or more values that uniquely identify a link between the first and third nodes from all other links on the path.

The one or more values that uniquely identify the link between the first and second nodes comprise a value that identifies the first node and a value that identifies the second node.

The first node receives the first message from the second node.

The first node receives the first message at a first layer executing on the first node from a second layer executing on the first node.

In another aspect, in general, a method for managing entangled quantum states in a network of nodes comprises: for each of two or more pairs of nodes on a path over a set of N nodes in the network, establishing entanglement between pairs of quantum elements in the respective nodes of that pair of nodes based at least in part on one or more quantum signals transmitted over one or more quantum communication channels, where N>3; performing a plurality of entanglement swap operations among different respective subsets of nodes in the set of N nodes using the pairs of entangled quantum elements, where each entanglement swap operation comprises: performing a joint measurement on a non-entangled pair of quantum elements in a node that is a member of two different pairs of nodes of the two or more pairs of nodes, resulting in a measurement result; and managing the plurality of entanglement swap operations during establishment of end-to-end entanglement between respective quantum elements in the nodes at the ends of the path over the set of N nodes using a set of classical messages transmitted over one or more classical communication channels, where each classical message in the set of classical messages comprises one or both of: information indicating success or failure of a particular entanglement swap operation, and information indicating the measurement result of the joint measurement performed for the particular entanglement swap operation. One or more of the classical messages in the set of classical messages are sent in a first direction between nodes on the path, and one or more of the classical messages in the set of classical messages are sent a second direction opposite to the first direction between nodes on the path. None of the classical messages in the set of classical messages or messages acknowledging success or failure of one or more of the plurality of entanglement swap operations are transmitted from one of the nodes at the ends of the path with a destination of the other of the nodes at the ends of the path.

Aspects can include one or more of the following features.

The joint measurement comprises a Bell state measurement.

The classical messages further comprise an estimate of a fidelity of an entanglement established using the particular entanglement swap operation.

The non-entangled pair of quantum elements comprise members of two different pairs entangled quantum elements.

The one or more quantum communication channels comprise at least a first transmission medium on links between nodes of the set of N nodes, and the one or more classical communication channels comprise at least a second transmission medium on the links different from the first transmission medium.

The one or more quantum communication channels comprise a first wavelength band on at least one optical transmission medium on links between nodes of the set of N nodes, and the one or more classical communication channels comprise a second wavelength band on the optical transmission medium on the links.

In another aspect, in general, a method for managing entangled quantum states in a network of nodes comprises: sending, from a first node in the network, a first message indicating that a first quantum element at the first node is entangled with a second quantum element at a second node in the network, where the first message comprises a first estimate of a fidelity of entanglement between the first and second quantum elements, and a timestamp indicating a time associated with the first estimate; generating, based at least in part on the first message, a second estimate of a fidelity of the entanglement between the first and second quantum elements, at a second time after the time indicated by the timestamp; comparing the second estimate to each of a plurality of thresholds; and performing a first action in response to a result of comparing the second estimate to a first threshold of the plurality of thresholds, and performing a second action different from the first action in response to a result of comparing the second estimate to a second threshold of the plurality of thresholds.

Aspects can include one or more of the following features.

At least one of the plurality of thresholds is adjusted between the first time and the second time based at least in part on information characterizing an event occurring on at least one of the first or second nodes.

The event comprises an operation that increases noise associated with the first or second quantum element, and the threshold that is adjusted is reduced.

The event comprises an operation that reduces noise associated with the first or second quantum element or an operation that performs error correction or mitigation associated with the first or second quantum element, and the threshold that is adjusted is increased.

The event comprises an action that is performed based at least in part on a result of comparing a third estimate of a fidelity of the entanglement between the first and second quantum elements, generated at a third time between the first and second times, to one of the plurality of thresholds.

The second estimate is based at least in part on a value resulting from a function applied to the first estimate.

In another aspect, in general, a method for managing entangled quantum states in a network of nodes comprises: receiving, at a first node in the network, a first message indicating that a first quantum element at the first node is entangled with a second quantum element at a second node in the network, where the first message comprises a first estimate of a fidelity of entanglement between the first and second quantum elements; receiving, at the first node, storage information characterizing a reduction in fidelity due to storage of quantum states on at least one of the first or second quantum element, and swap information characterizing a reduction in fidelity due to one or more quantum operations associated with an entanglement swap operation based on the entangled quantum elements at the first and second nodes and entangled quantum elements at another pair of nodes; and generating, at the first node, a second estimate of a fidelity of a result of the entanglement swap operation based at least in part on: the storage information, and the swap information.

Aspects can include one or more of the following features.

The second estimate of the fidelity of the result of the entanglement swap operation is further generated based at least in part on purification information characterizing an increase in fidelity due to at least one entanglement purification operation.

The storage information comprises a time duration resulting from an inverse function applied to the first estimate.

The storage information characterizes the reduction in fidelity based at least in part on a plurality of measurements of previously stored quantum states on at least one of the first or second quantum elements for different durations of time.

The storage information characterizes the reduction in fidelity based at least in part on a computed model characterizing time dependence of quantum states stored on at least one of the first or second quantum elements.

The swap information characterizes the reduction in fidelity based at least in part on at least one previously performed entanglement swap operation associated with at least one of the first or second quantum element.

The swap information characterizes the reduction in fidelity based at least in part on a computed model of an entanglement swap operation associated with at least one of the first or second quantum element.

In another aspect, in general, a method for managing entangled quantum states in a network of nodes comprises:

sending, from a controller in the network, a first message to a first node in the network, where the first message comprises scheduling information that specifies a procedure to be executed for scheduling entanglement swap operations associated with portions of a plurality of paths through nodes in the network; sending, from the controller, a second message to a second node in the network, where the second message comprises the scheduling information; executing at least a portion of the procedure at the first node based at least in part on the first message and based at least in part on information associated with one or more previous attempts to establish entanglement between nodes on a first path of the plurality of paths that includes the first node; and executing at least a portion of the procedure at the second node based at least in part on the second message and based at least in part on information associated with one or more previous attempts to establish entanglement between nodes on a second path of the plurality of paths that includes the second node.

Aspects can include one or more of the following features.

The information associated with one or more previous attempts to establish entanglement between nodes on the first path comprises information indicating success or failure of an entanglement swap operation.

The information associated with one or more previous attempts to establish entanglement between nodes on the first path comprises information indicating receipt of classical messages.

The information associated with one or more previous attempts to establish entanglement between nodes on the first path comprises an estimate of fidelity of entanglement established between a pair of nodes on the first path.

The information associated with one or more previous attempts to establish entanglement between nodes on the first path comprises information indicating that an estimate of fidelity of entanglement established between a pair of nodes on the first path is below a predetermined threshold.

The information associated with one or more previous attempts to establish entanglement between nodes on the first path comprises information indicating a result of a Bell state measurement performed in an entanglement swap operation.

Aspects can have one or more of the following advantages.

Techniques for managing entanglement swap operations may enable identifiers to be determined in an efficient manner that reduces the amount of overall communication that is needed.

Techniques for fidelity estimation can enable fidelity estimates to be efficiently updated and compared to multiple different thresholds to take into account a variety of factors that may impact fidelity.

Techniques for providing network control can allow for both centralized network management as well as dynamic local state transitions that enable responsiveness to local conditions associated with entanglement generation.

In another aspect, in general, a method for managing entangled quantum states in a network of nodes comprises: sending, from a controller in the network, scheduling information to each of a plurality of nodes in the network, where the scheduling information specifies a procedure to be executed for scheduling entanglement swap operations associated with portions of a plurality of paths through nodes in the network; for each of two or more pairs of nodes on a first path over a set of N nodes in the network, establishing entanglement between pairs of quantum elements in the respective nodes of that pair of nodes based at least in part on one or more quantum signals transmitted over one or more quantum communication channels, where N≥3; performing a plurality of entanglement swap operations among different respective subsets of nodes in the set of N nodes using the pairs of entangled quantum elements; and managing the plurality of entanglement swap operations during establishment of end-to-end entanglement between respective quantum elements in the nodes at the ends of the path over the set of N nodes based at least in part on: at each of a first node, a second node, and a third node on the first path, using the scheduling information to perform at least a portion of the procedure, and at the first node, generating a first identifier that identifies entanglement resulting from an entanglement swap operation based on (1) entangled quantum elements at the first and second nodes identified by a second identifier, and (2) entangled quantum elements at the first and third nodes identified by a third identifier, where the generating comprises: including at least a portion of the second identifier in the first identifier, and including at least a portion of the third identifier in the first identifier.

In another aspect, in general, a method for managing entangled quantum states in a network of nodes comprises: for each of two or more pairs of nodes on a first path over a set of N nodes in the network, establishing entanglement between pairs of quantum elements in the respective nodes of that pair of nodes based at least in part on one or more quantum signals transmitted over one or more quantum communication channels, where N≥3; performing a plurality of entanglement swap operations among different respective subsets of nodes in the set of N nodes using the pairs of entangled quantum elements; and managing the plurality of entanglement swap operations during establishment of end-to-end entanglement between respective quantum elements in the nodes at the ends of the first path over the set of N nodes based at least in part on: a plurality of messages sent between nodes in the network, including a first message indicating that a first quantum element at a first node in the network is entangled with a second quantum element at a second node in the network, where the first message comprises a first estimate of a fidelity of entanglement between the first and second quantum elements, and a plurality of estimates of fidelity of entanglement, including a second estimate of a fidelity of the entanglement between the first and second quantum elements, where the second estimate is generated at the second node based at least in part on at least one of (1) the first message, or (2) fidelity reduction information comprises at least one of (a) storage information characterizing a reduction in fidelity due to storage of quantum states on at least one of the first or second quantum element, or (b) swap information characterizing a reduction in fidelity due to one or more quantum operations associated with an entanglement swap operation based on the entangled quantum elements at the first and second nodes and entangled quantum elements at another pair of nodes.

In another aspect, in general, a method for managing entangled quantum states in a network of nodes comprises: sending, from a controller in the network, scheduling information to each of a plurality of nodes in the network, where the scheduling information specifies a procedure to be executed for scheduling entanglement swap operations associated with portions of a plurality of paths through nodes in the network; and managing the scheduled entanglement swap operations based at least in part on: at each of a first node, a second node, and a third node on the first path, using the scheduling information to perform at least a portion of the procedure, a plurality of messages sent between nodes in the network, including a first message indicating that a first quantum element at a first node in the network is entangled with a second quantum element at a second node in the network, where the first message comprises a first estimate of a fidelity of entanglement between the first and second quantum elements, and a plurality of estimates of fidelity of entanglement, including a second estimate of a fidelity of the entanglement between the first and second quantum elements, where the second estimate is generated at the second node based at least in part on at least one of (1) the first message, or (2) fidelity reduction information comprises at least one of (a) storage information characterizing a reduction in fidelity due to storage of quantum states on at least one of the first or second quantum element, or (b) swap information characterizing a reduction in fidelity due to one or more quantum operations associated with an entanglement swap operation based on the entangled quantum elements at the first and second nodes and entangled quantum elements at another pair of nodes.

The techniques described above, including techniques based on equations that describe physical states of devices and/or signals propagating into, between, or from various devices, can be implemented using one or more programs comprising instructions for execution on a device or module including one or more processors or other circuitry for executing the instructions. For example, the instructions can execute procedures of software or firmware that runs on one or more programmed or programmable computing devices or modules including at least one processor and at least one data storage system (e.g., including volatile and/or non-volatile memory or storage media). The programs may be provided on one or more non-transitory computer readable media, or delivered over a communication medium such as network to a device where is stored on one or more non-transitory computer readable media. The instructions of the program may be operable to cause one or more processors of computing devices or modules (e.g., within the nodes of a network) to perform various steps of the program individually or together. The term "non-transitory," as used herein, is intended to exclude electromagnetic signals as they are propagating over a communication medium, but is not intended to otherwise limit the type of computer-readable medium that may store any portion of the programs. For example, a non-transitory computer readable medium may include a dynamic random-access memory (DRAM) or other medium that does not necessarily store information in a permanent or non-volatile manner.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for managing entangled quantum states in a network of nodes, the method comprising:

generating a first entangled quantum state characterized by a non-factorable quantum relationship among two or more quantum state constituents comprising (1) a first quantum state constituent stored at a first quantum element at a first node in the network and (2) a second quantum state constituent stored at a second quantum element at a second node in the network;

determining a first estimated wait time over which the first quantum state constituent is estimated to be stored at the first quantum element while preserving a fidelity of the first entangled quantum state above a fidelity threshold; and determining a first schedule for performing one or more quantum error management operations over a portion of the first estimated wait time, where the one or more quantum error management operations affect the first quantum state constituent, and where the first schedule is based at least in part on (1) the first estimated wait time and (2) one or more estimated fidelities of the first entangled quantum state associated with one or more candidate quantum error management operations.

2. The method of claim 1, further comprising updating the first schedule in response to received classical information.

3. The method of claim 2, where the received classical information is from the first node.

4. The method of claim 3, where the received classical information comprises at least one of (1) a noise strength or (2) a noise type, associated with a third quantum element at the first node.

5. The method of claim 3, where the received classical information comprises at least one of (1) a noise strength or (2) a noise type, associated with the first quantum element at the first node.

6. The method of claim 2, where the received classical information is from the second node.

7. The method of claim 6, where the received classical information comprises information that an entanglement process in the network failed.

8. The method of claim 2, where the received classical information is from a third node in the network.

9. The method of claim 8, where the received classical information comprises information that an entanglement process in the network failed.

10. The method of claim 2, where the received classical information is from a controller in the network that sends messages to each of a plurality of nodes in the network comprising at least a portion of scheduling information that specifies a procedure to be executed for scheduling entanglement swap operations associated with portions of a plurality of paths through nodes in the network.

11. The method of claim 1, where the first node and the second node are spatially separated by at least one meter.

12. The method of claim 1, where the first node and the second node are optically coupled in free space or by an optical fiber.

13. The method of claim 1, where the estimated fidelity is based at least in part on an estimated noise associated with at least one quantum error management operation.

14. The method of claim 1, where the first entangled quantum state further comprises a third quantum state constituent.

15. The method of claim 14, where the third quantum state constituent is stored at a third quantum element at the first node.

16. The method of claim 14, where the third quantum state constituent is stored at a third quantum element at a third node in the network.

17. The method of claim 1, where the one or more quantum error management operations comprise a quantum gate operation.

18. The method of claim 17, where a gate noise characteristic of the quantum gate operation is associated with a fidelity reduction.

19. The method of claim 17, where the one or more quantum error management operations comprise one or more quantum error correction operations performed using the quantum gate operation in a quantum circuit.

20. The method of claim 19, where a quantity of the one or more quantum error correction operations in the first schedule is two or more.

21. The method of claim 20, where the quantity is determined based at least in part on the first estimated wait time.

22. The method of claim 1, where a quantity of the one or more quantum error management operations in the first schedule is two or more.

23. The method of claim 1, further comprising selecting the one or more quantum error management operations affecting the first quantum state constituent from a plurality of types of quantum error management operations that are each configured to use a different quantity of quantum resources available at the first node.

24. The method of claim 23, further comprising:

determining a second estimated wait time over which the second quantum state constituent is estimated to be stored at the second quantum element while preserving the fidelity of the first entangled quantum state above the fidelity threshold; and determining a second schedule for performing one or more quantum error management operations over a portion of the second estimated wait time, where the one or more quantum error management operations affect the second quantum state constituent, and where the second schedule is based at least in part on (1) the second estimated wait time and (2) an estimated fidelity of the first entangled quantum state after at least one of the one or more quantum error management operations.

25. The method of claim 24, where the one or more quantum error management operations affecting the second quantum state constituent are performed independently from the one or more quantum error management operations affecting the first quantum state constituent.

26. The method of claim 25, where each of the quantum error management operations affecting the second quantum state constituent increases the estimated fidelity of the first entangled quantum state.

27. The method of claim 24, where the one or more quantum error management operations affecting the second quantum state constituent are different from the one or more quantum error management operations affecting the first quantum state constituent.

28. The method of claim 24, where the one or more quantum error management operations affecting the second quantum state constituent comprise one or more quantum error correction operations having a first code size, and the one or more quantum error management operations affecting the first quantum state constituent comprise one or more quantum error correction operations having a second code size different from the first code size.

29. The method of claim 24, where the one or more quantum error management operations affecting the second quantum state constituent comprise one or more quantum error correction operations based on a first code, and the one or more quantum error management operations affecting the first quantum state constituent comprise one or more quantum error correction operations based on a second code different from the first code.

30. The method of claim 24, where a quantity of the one or more quantum error management operations in the first schedule is different from a quantity of the one or more quantum error management operations in the second schedule.

31. The method of claim 23, where the plurality of types of quantum error management operations include two or more of: a dynamical decoupling operation configured to use no redundancy quantum elements or ancilla quantum elements, a first decoherence-free subspace encoding operation configured to use no redundancy quantum elements or ancilla quantum elements, a second decoherence-free subspace encoding operation configured to use at least one redundancy qubit and no ancilla quantum elements, or a quantum error correction operation configured to use at least one redundancy qubit and at least one ancilla qubit.

32. The method of claim 1, where the fidelity of the first entangled quantum state is preserved above the fidelity threshold before an entanglement swap operation is performed on the first entangled quantum state and a second entangled quantum state associated with the second node and a third node in the network.

33. The method of claim 32, where the entanglement swap operation is performed during establishment of end-to-end entanglement between respective quantum elements in nodes at respective ends of a path over a set of N nodes using a set of classical messages transmitted over one or more classical communication channels, where $N>3$.

34. The method of claim 33, where the entanglement swap operation is one of a plurality of entanglement swap operations among different respective subsets of nodes in the set of N nodes using pairs of entangled quantum elements in respective pairs of nodes between which entanglement has been established.

35. The method of claim 34, where each entanglement swap operation of the plurality of entanglement swap operations comprises performing a joint measurement on a non-entangled pair of quantum elements in a node that is a member of two different pairs of nodes of the respective pairs of nodes.

36. The method of claim 1, where the fidelity of the first entangled quantum state is preserved above the fidelity threshold before an entanglement purification operation is performed on the first entangled quantum state and a second entangled quantum state associated with the first node and the second node.

37. The method of claim 1, further comprising modifying a timer associated with an estimated time of decoherence of the first entangled quantum state based at least in part on the first schedule.

38. The method of claim 1, where the first estimated wait time is based at least in part on an entanglement generation time associated with a second entangled quantum state characterized by a non-factorable quantum relationship among two or more quantum state constituents comprising (1) a third quantum state constituent stored at a third quantum element at the second node and (2) a fourth quantum state constituent stored at a fourth quantum element at a third node in the network.

39. The method of claim 38, further comprising generating a third entangled quantum state characterized by a non-factorable quantum relationship among two or more quantum state constituents comprising (1) the first quantum state constituent and (2) the fourth quantum state constituent, the generating comprising performing a joint measurement of the second quantum state constituent and the third quantum state constituent.

40. The method of claim 39, where the joint measurement is a Bell state measurement.

41. The method of claim 1, where an initial estimated fidelity of the first entangled quantum state is determined based at least in part on a message received at the first node, where the message comprises a first estimate of a fidelity of the first entangled quantum state, and a timestamp indicating a time associated with the first estimate.

42. The method of claim 41, where an updated estimated fidelity of the first quantum state is determined based at least in part on a second estimate of the fidelity of the first entangled quantum state determined after the time indicated by the timestamp.

43. The method of claim 41, where the first estimated wait time is determined after comparing the initial estimated fidelity of the first entangled quantum state to the fidelity threshold.

44. The method of claim 41, where the first schedule is also based at least in part on the initial estimated fidelity of the first entangled quantum state.

45. The method of claim 41, where the first schedule is also based at least in part on post-operation estimated fidelities associated with the first quantum state constituent after each of the one or more quantum error management operations.

46. The method of claim 1, where at least one of the one or more quantum error management operations is a quantum error mitigation operation.

47. The method of claim 1, where at least one of the one or more quantum error management operations is a quantum error correction operation.

48. The method of claim 1, where the one or more estimated fidelities of the first entangled quantum state comprise a first estimated fidelity of the first entangled quantum state after a first candidate quantum error management operation associated with a first time, and a second estimated fidelity of the first entangled quantum state after a second candidate quantum error management operation associated with a second time.

49. The method of claim 48, where the first and second candidate quantum error management operations are a same quantum error management operation associated with different times.

50. The method of claim 48, where determining the first schedule further comprises determining a first value based at least in part on the first estimated fidelity and the first time, and determining a second value based at least in part on the second estimated fidelity and the second time.

51. The method of claim 50, where the first value and the second value are further based at least in part on an initial fidelity of the first entangled quantum state at a beginning of the first estimated wait time.

52. The method of claim 51, where (1) the first value depends at least in part on a first difference between the initial fidelity and the first estimated fidelity and (2) the second value depends at least in part on a second difference between the initial fidelity and the second estimated fidelity.

53. The method of claim 52, where (1) the first value is proportional to the first difference between the initial fidelity and the first estimated fidelity and (2) the second value is proportional to the second difference between the initial fidelity and the second estimated fidelity.

54. The method of claim 51, where determining the first schedule further comprises scheduling the first candidate quantum error management operation to be performed at the first time if the first value is smaller than the second value and if the first estimated fidelity is larger than a third estimated fidelity of the first entangled quantum state at the first time with no candidate quantum error management operation performed.

55. The method of claim 50, where determining the first schedule further comprises scheduling the second candidate quantum error management operation to be performed at the second time if the second value is smaller than the first value and if the second estimated fidelity is larger than a fourth estimated fidelity of the first entangled quantum state at the second time with no candidate quantum error management operation performed.

56. The method of claim 48, further comprising determining an objective function that depends at least in part on (1) the one or more estimated fidelities of the first entangled quantum state, and (2) one or more times associated with the one or more candidate quantum error management operations.

57. The method of claim 56, where determining the first schedule further comprises scheduling a candidate quantum error management operation to be performed based at least in part on the objective function.

58. The method of claim 57, where the scheduled candidate quantum error management operation is associated with at least one minimum value or at least one maximum value of the objective function.

59. The method of claim 56, where determining the objective function comprises executing one or more machine learning algorithms.

60. The method of claim 1, where at least one candidate quantum error management operation is not scheduled to be performed during the first estimated wait time.

61. The method of claim 25, further comprising selecting the one or more quantum error management operations affecting the second quantum state constituent from a plurality of types of quantum error management operations that are each configured to use a different quantity of quantum resources available at the second node.

62. The method of claim 61, where the selecting the one or more quantum error management operations affecting the first quantum state constituent occurs at the first node, and the selecting the one or more quantum error management operations affecting the second quantum state constituent occurs at the second node.

63. The method of claim 61, where the first node and the second node are in communication over the network over a path through one or more nodes in the network that is greater than 10 meters long.

64. The method of claim 61, further comprising:

generating a second entangled quantum state characterized by a non-factorable quantum relationship among two or more quantum state constituents comprising (1) a third quantum state constituent stored at the first quantum element at the first node in the network and (2) a fourth quantum state constituent stored at the second quantum element at the second node in the network;

determining a third estimated wait time over which the third quantum state constituent is estimated to be stored at the first quantum element while preserving a fidelity of the second entangled quantum state above the fidelity threshold; and determining a third schedule for performing one or more quantum error management operations over a portion of the third estimated wait time, where the one or more quantum error management operations affect the third quantum state constituent, and where the third schedule is based at least in part on (1) the third estimated wait time and (2) one or more estimated fidelities of the second entangled quantum state associated with one or more candidate quantum error management operations.

65. The method of claim 64, where for the first entangled quantum state and the second entangled quantum state, or for the first quantum state constituent and the second quantum state constituent, different types of quantum error management operations are performed from a set of types of quantum error management operations comprising two or more of: a dynamical decoupling operation configured to use no redundancy quantum elements or ancilla quantum elements, a first decoherence-free subspace encoding operation configured to use no redundancy quantum elements or ancilla quantum elements, a second decoherence-free subspace encoding operation configured to use at least one redundancy qubit and no ancilla quantum elements, or a quantum error correction operation configured to use at least one redundancy qubit and at least one ancilla qubit.

66. The method of claim 23, where the selecting the one or more quantum error management operations affecting the first quantum state constituent occurs after the first node and the second node are in communication over the network, based at least in part on a quantity of quantum resources available at the first node before a start of the first estimated wait time.

67. The method of claim 66, where the first node and the second node transmit classical messages over one or more classical communication channels and transmit quantum signals over one or more quantum communication channels, and the selecting the one or more quantum error management operations affecting the first quantum state constituent occurs after at least one of the first node or the second node transmits a classical message over the one or more classical communication channels.

68. The method of claim 23, where selecting one or more quantum error management operations affecting a respective quantum state constituent from a plurality of types of quantum error management operations, is repeated for each of two or more different entangled quantum states of which the respective quantum state constituents are members, including for the first entangled quantum state and for each of one or more additional entangled quantum states.

69. The method of claim 23, where:

the selecting the one or more quantum error management operations affecting the first quantum state constituent occurs after the first node and the second node are in communication over the network, based at least in part on a quantity of quantum resources available at the first node before a start of the first estimated wait time; and selecting one or more quantum error management operations affecting a respective quantum state constituent from a plurality of types of quantum error management operations, is repeated for each of two or more different entangled quantum states of which the respective quantum state constituents are members, including for the first entangled quantum state and for each of one or more additional entangled quantum states.

70. A quantum networking environment configured for managing entangled quantum states in a network of nodes, the quantum networking environment comprising:

an entanglement generation layer configured for generating a first entangled quantum state characterized by a non-factorable quantum relationship among two or more quantum state constituents comprising (1) a first quantum state constituent stored at a first quantum element at a first node in the network and (2) a second quantum state constituent stored at a second quantum element at a second node in the network;

one or more modules including at least one processor on the first node configured for:

determining a first estimated wait time over which the first quantum state constituent is estimated to be stored at the first quantum element while preserving a fidelity of the first entangled quantum state above a fidelity threshold; and determining a first schedule for performing one or more quantum error management operations over a portion of the first estimated wait time, where the one or more quantum error management operations affect the first quantum state constituent, and where the first schedule is based at least in part on (1) the first estimated wait time and (2) one or more estimated fidelities of the first entangled quantum state associated with one or more candidate quantum error management operations.

* * * * *